(12) United States Patent
Mikhailov et al.

(10) Patent No.: US 6,990,534 B2
(45) Date of Patent: Jan. 24, 2006

(54) METHOD FOR A PROACTIVE BROWSER SYSTEM FOR IMPLEMENTING BACKGROUND FRAME MAINTENANCE AND ASYNCHRONOUS FRAME SUBMISSIONS

(75) Inventors: Dmytro Mikhailov, Vancouver (CA);
Olga Sboychakova, Vancouver (CA);
Geoffrey Hansen, Vancouver (CA)

(73) Assignee: Flowfinity Wireless, Inc., Vancouver (CA)

( * ) Notice: Subject to any disclaimer, the term of this patent is extended or adjusted under 35 U.S.C. 154(b) by 654 days.

(21) Appl. No.: 10/197,676

(22) Filed: Jul. 16, 2002

(65) Prior Publication Data

US 2003/0018714 A1    Jan. 23, 2003

Related U.S. Application Data

(60) Provisional application No. 60/306,785, filed on Jul. 20, 2001.

(51) Int. Cl.
*G06F 17/00* (2006.01)

(52) U.S. Cl. .................. 709/250; 709/219; 709/225; 707/103; 713/163

(58) Field of Classification Search ............ 709/250, 709/218, 225, 103, 219; 455/124, 125; 713/163; 707/103
See application file for complete search history.

(56) References Cited

U.S. PATENT DOCUMENTS

| | | | | |
|---|---|---|---|---|
| 5,680,619 A | * | 10/1997 | Gudmundson et al. | ...... 717/108 |
| 5,907,704 A | * | 5/1999 | Gudmundson et al. | ...... 717/100 |
| 6,081,263 A | * | 6/2000 | LeGall et al. | ............... 715/760 |
| 6,546,397 B1 | * | 4/2003 | Rempell | ..................... 707/102 |
| 6,792,323 B2 | * | 9/2004 | Krzyzanowski et al. | ...... 700/90 |
| 2004/0003073 A1 | * | 1/2004 | Krzyzanowski et al. | .... 709/223 |
| 2004/0006566 A1 | * | 1/2004 | Taylor et al. | ............... 707/100 |
| 2004/0148307 A1 | * | 7/2004 | Rempell | ..................... 707/102 |
| 2005/0055472 A1 | * | 3/2005 | Krzyzanowski et al. | ....... 710/5 |
| 2005/0172018 A1 | * | 8/2005 | Devine et al. | .............. 709/223 |

OTHER PUBLICATIONS

Milic-Frayling et al., Webscout: Support for Revisitation of Web Pages within a Navigation Session, IEEE, 2003, (WI'03).*

Djunaidy et al., Development of web navigation guide system based on the hypertext probabilistic grammar, IEEE, 2002, pp. 317-322.*

* cited by examiner

*Primary Examiner*—Khanh Quang Dinh
(74) *Attorney, Agent, or Firm*—Mehrman Law Office, P.C.; Michael J. Mehrman

(57) ABSTRACT

A proactive browser system configured to implement stateful frame navigation using content specific icons, background frame maintenance, and asynchronous frame submissions. The proactive browser system includes three components: user-side proactive application terminals (PAT), network-resident proactivity enablement servers (PES), and server-side proactive wireless web-based application servers. The PAT resides on user terminals and functions as an enhanced browser that accommodates proactive application services. The PES resides in the wireless network between the proactive application servers and the user terminals, and implements proactivity support services including queuing of proactive application submissions, presence detection of proactive application terminals, and routing of proactive application submissions from proactive application servers to the proactive application terminals. The proactive application servers are web-based application servers configured to provide proactive application services to take advantage of the enhanced capabilities enabled by the PAT and PES components.

20 Claims, 72 Drawing Sheets

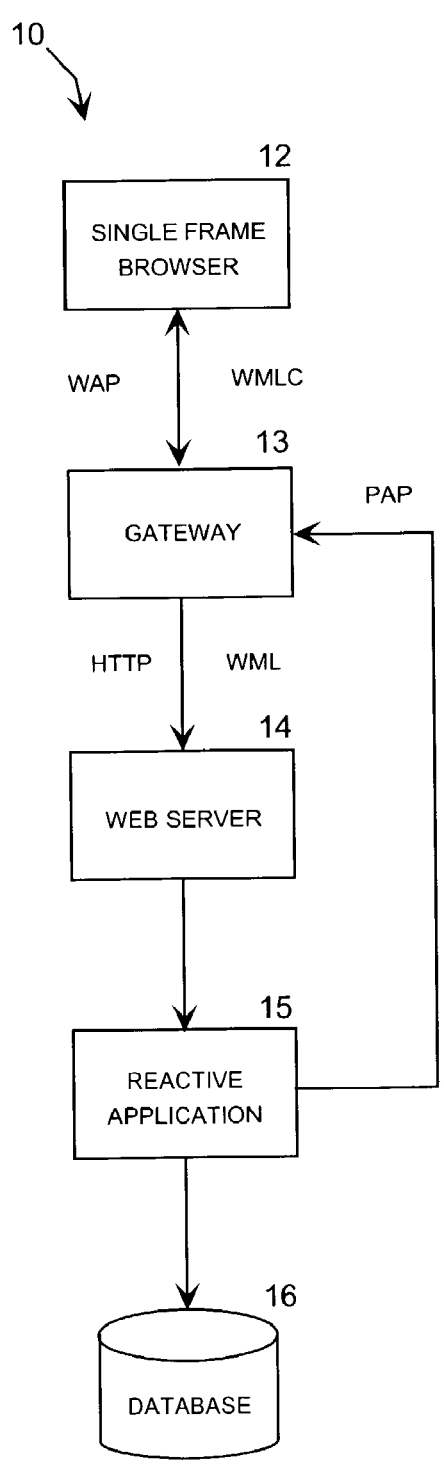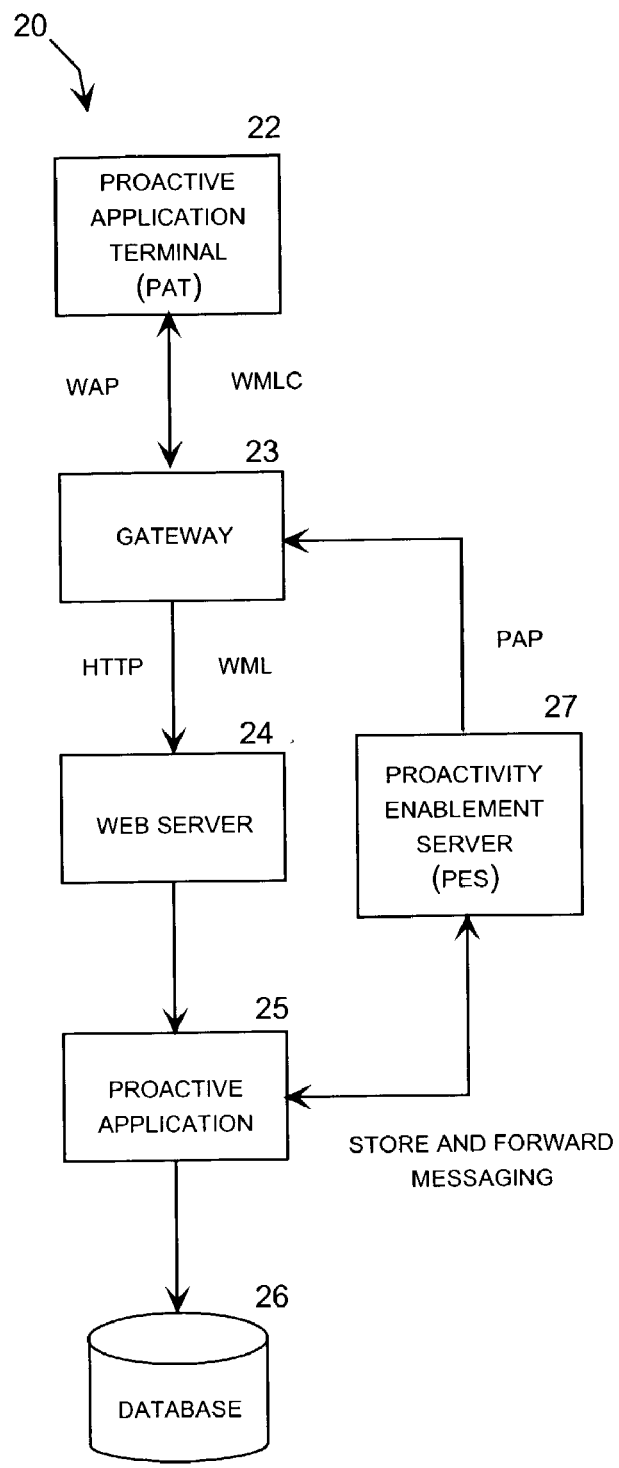
FIG. 1 PRIOR ART
FIG. 2 PROACTIVE WAP SYSTEM

METHOD FOR A PROACTIVE BROWSER SYSTEM FOR IMPLEMENTING BACKGROUND FRAME MAINTENANCE AND ASYNCHRONOUS FRAME SUBMISSIONS

REFERENCE TO RELATED APPLICATION

This application claims priority to commonly-owned U.S. Provisional Patent Application Ser. No. 60/306,785 filed on Jul. 20, 2001.

TECHNICAL FIELD

This invention relates generally to wireless terminals and data applications and, more particularly, relates to a proactive browser system configured to implement stateful frame navigation using content specific icons, background frame maintenance, and asynchronous frame submissions.

BACKGROUND OF THE INVENTION

Although wireless devices have become increasingly popular, the inherent limitations in the current browser and application technology present a serious impediment to further acceptance of wireless web-based applications. In particular, the single-frame paradigm currently prevailing in Wireless Application Protocol (WAP), compact HTML and similar browsers introduces unacceptable levels of latency and poor support for sophisticated application functionality. As a result, wireless web-based applications have experienced poor customer acceptance and a resulting inability to achieve widespread deployment.

There are many types of wireless data systems designed for a wide variety of wireless data applications. In this context, a "wireless data application" is a system operating with structured data on a public or private wide area, local or personal wireless data network (further referred to as Mobile Network) that a user can access and interact with on a portable device using a browser. Wireless data applications typically connect to database servers or other data management systems where data is stored. Common examples include wireless Internet access, Customer Relationship Management, Partner Relationship Management, Employee Relationship Management, Supply Chain Management, mobile surveys and other data collection applications, healthcare and other telematics systems, field workforce dispatch, mobile timesheet reporting, location-independent collaboration, remote monitoring, notification and alert applications, commerce and trading applications including stock trading, procurement, purchasing and inventory solutions, and so forth. Examples of Mobile Networks include Mobitex, 802.11, GPRS, UMTS, etc.

The interest to wireless data applications is on the rise mostly due to the economic efficiency expectations driven by the opportunity of enabling real-time structured data access and exchange from personal portable devices. These expectations are stimulated by the opportunity to cut inefficiencies in today's handling of mobile workforce, mobile data collection and other important applications that are normally handled via fax, voice communications using phone, or traditional paper documents and forms. Recent addition of wireless messaging including SMS and email messaging has been a popular way to address such inefficiencies, however in most cases such phone, fax, paper, SMS and email communication is done in unstructured and unmanageable way that requires manual data handling. Examples of such information handling inefficiencies include a typical task of manual retyping data collected on paper or via email into a computerized database system, obtaining data reports by phone from a person having access to a computer system, inability to respond in a structured way to email or SMS message generated by a database-driven system, and so forth.

Although wireless data applications are often a low-cost alternative to other types of mobile data management solutions, wireless data applications present their own challenges to users and application developers. There are two commonly used ways to implement wireless data applications using web technology, and coding proprietary applications on the devices.

Web applications and HTML applications in particular have been a big success in many areas. Evolution of web computing resulted in a whole new application architecture commonly referred to as "thin client computing". There have been several attempts to extend this widely successful model into the wireless networks. As a result of a broad industry-wide effort to port and adapt web technology to wireless networks, a standard known as Wireless Application Protocol (WAP) has been created. WAP browsers run on portable devices and handle special type of web pages in a format known as Wireless Markup Language (WML). Due to widespread adoption of WAP standard by telecom operators and mobile device manufacturers, development of WAP applications became a trivial task that average web engineers can master efficiently. WAP applications inherit all the advantages of web applications architecture. However existing applications present a substantial barrier in terms of quality of user experience that has resulted in unacceptably low rates of adoption of WAP and other similar browser technologies by the end users. Many wireless application projects have never gone beyond trial deployment phase due to the fact that application users refuse to use WAP applications in their day-to-day operations. Partially such user frustration can be attributed to inconvenient data input methods (e.g. a small mobile phone keypad) and unreasonably downsized screens found in the presently available mobile device models. However there are many other important reasons for the users to reject existing wireless applications as means of conducting data transactions. These reasons include unacceptably slow response times, blocking user interfaces of regular web applications, inefficient design of the applications, lack of proactive data communication functionality, and so forth.

All mobile browser implementations known to the inventors utilize synchronous page navigation model. In such model full screen of the application is blocked immediately after the user initiates a page submission to the server and the application remains unusable until the page that the server sent in response is loaded, processed and rendered on the screen. Such blocking mode of operation leaves users unproductively waiting every time a submission or request is made to the server. The concept of synchronous page navigation has been inherited from traditional web-based applications and thus became the standard way to handle wireless and mobile-optimized pages. Inventors strongly believe that different methods for handling mobile data are required in order to enable application users to be more productive. In fact, even the users of traditional web applications will benefit from the inventions described in this specification.

The research conducted by the inventors has led to the conclusion that it is possible to express the degree of usability of thin-client applications (such as HTML applications or WAP applications) with a generic measurement formula of "relative user productivity". For the purpose of the research the relative user productivity measurement formula has been defined as 100*Tr/(Tr+Tw), where Tr is the average time the user spends reading or interacting with application pages, and Tw is the total time the user spends waiting for the page to submit, load, parse and display. With this measurement the difference in adoption of web applications versus mobile applications can be explained. With web applications page size is normally substantial (often pages span multiple computer screens), thus it often takes several minutes to read and interact with each page, while wait time is usually minimal (in range of few seconds for reasonably configured online applications with broadband Internet access). The result is that relative productivity of web applications is approaching 100% (for example if it takes 3 seconds to load a page and 90 seconds to read and interact with the page, relative productivity is 100*90/(90+3)=96.8%). With mobile (e.g. WAP) applications pages are very small and it takes only a few seconds to read each page. The total wait time for each page is substantial, often exceeding 30 seconds. The result is that relative productivity of mobile applications is well below 50% (for example, if it takes 10 seconds to read the page and 30 seconds of total wait time, relative productivity is 100*10/(10+30)=25%).

This research leads to the conclusion that the balance of wait time versus the productive time user spends with application is one of the important factors that requires major optimization. It has been proven in tests and demo applications built by the inventors for different industries and use cases that elimination of wait time dramatically increases user productivity and satisfaction. Inventors believe that the results of this measurement will be routinely enhanced as faster devices and wireless networks are rolled out. However the user productivity challenge will remain an important barrier to be solved in order to enable wide user acceptance of wireless application technologies.

Another conclusion from the research conducted by the inventors is that most applications require bidirectional flow of information. In most applications analyzed by the inventors there is explicit need for server-initiated wireless data transactions. The latest WAP standard as of time of this writing, WAP 1.2, provides for "push" functionality, however it is normally restricted at implementation level to push of notifications, rather than fully-functional server-initiated transactions and user interaction interfaces. The inventors believe that in order to address this challenge a whole new paradigm of application life cycle is required.

Overall traditional WAP and other application implementations have failed to deliver user experience required by the average person. Development of wireless data applications with proprietary coding approach is the major alternative to thin-client approach for application developers. There are several programmable device platforms available on the market, including Pocket PC devices that use Windows CE operating system from Microsoft, Research In Motion Limited (RIM) handheld pagers, Palm OS-based devices, etc, that provide reasonably sized screens and convenient data input methods such as fully-functional keyboards or pen interfaces. Such programmable device platforms allow application developers to hard-code application functionality on the device using C, C++, C#, Java and other programming languages. Since application developers have full control of the application functionality, such applications normally deliver high quality user interfaces.

However proprietary application coding on portable devices requires very substantial investment of engineering resources and in many cases is economically irrational. Maintenance of the coded applications also represents a substantial challenge. Major investment factors associated with proprietary coding approaches include low levels of development automation, high complexity of coding, extensive testing and optimization requirements, as well as lack of application portability between multiple device platforms and wireless networks. These challenges are complemented with the need to use certain middleware communications solutions in order to enable application-level protocols over packet-level wireless network communications interfaces provided by most public packet-switched wireless networks today. Such middleware solutions are often based on vendor-specific proprietary protocols and require substantial upside investment as well as long-term vendor lock-in. Proprietary coding of wireless data applications proved to be economically unprofitable method of addressing the need for structured wireless data applications. Inventors believe that certain challenges mentioned above will eventually be resolved (for example, roll out of GPRS networks with support for TCP/IP communications will eliminate requirements for proprietary middleware products, and deployment of Java technology on wireless devices will make wireless data application development an easier task and will reduce the portability challenges, etc). However inventors are convinced that Web-based applications will remain a more attractive alternative compared to application coding on the wireless devices.

Thus there is a need in the art for a method and system for development and deployment of proactive "thin-client" wireless data applications that do not exhibit user experience limitations of traditional mobile browser implementations. Specifically, there is a need for an application development methodology and application support infrastructure including browser and server support system implementations, that enable wireless data application developers to utilize economically efficient and standard mobile web technologies to build data applications with acceptable user experience, and that overcome the needs for significant investments in application development that are presently required to successfully develop and deploy wireless data applications.

Therefore, there is a need for a new paradigm for wireless web-based application services that improves both real and perceived system performance, accommodates increased levels of application functionality, and enables increased levels of customer acceptance.

SUMMARY OF THE INVENTION

The present invention meets the needs described above in a proactive browser system that implements stateful frame navigation using content specific icons, background frame maintenance, and asynchronous frame submissions. The term "stateful" when used in connection with "frame navigation" means that the system can browse among a number of frames, such as frames displaying Internet sessions, while the frames retain their respective session-based "states." For example, the "state" of a frame displaying an Internet session changes as the user interacts with the site by selecting buttons, filling in boxes, selecting pages, scrolling within a frame, and so forth. The invention permits stateful frame navigation, which means that user may select among a number of frames while the frames retain their states. In other words, the system maintains a number of stateful frames concurrently, any of which may be selected as the active frame (i.e., activated for user interaction), while the other non-selected frames become background frames.

Although they are not currently selected for user interaction, the background frames retain their states until they are once again selected as the active frame.

To implement stateful frame navigation, the system displays a plurality icons, with each icon corresponding to a network-based site. The term "site" in this specification refers to a web site, network-resident application or a part of such application. The system then receives a first command selecting a first icon and, in response, links to a first site and displaying a first frame in an active mode for user interaction with the first site, the first frame having a state comprising visible and operational characteristics associated with the first frame. While the first frame is in the active mode, the system receives interaction commands in association with the first frame that alter the state of the first frame. The system then receives a command selecting a second icon and, in response, links to a second site. The system also deactivates the first frame from the active mode, and displays a second frame in the active mode for user interaction with the second site, the second frame having a state comprising visible and operational characteristics associated with the second frame.

Then, while the second frame is in the active mode, the system maintains the first frame in a background mode which preserves the altered state of the first frame. The system also receives interaction commands in association with the second frame and alters the state of the second frame in response to the interaction commands. In response to receiving a second command selecting the first icon the system links to the first site and displays the first frame in the active mode and in its altered state. In addition, while the first frame is in the active mode, the system maintains the second frame in a background mode which preserves the altered state of the second frame. In other words, the system implements stateful frame navigation.

Typically, a proactive application terminal, such as a wireless telephone or personal digital assistant, maintains the frames and icons. To implement a number of services for the proactive application terminal, a network-based proactive application is configured to identify a particular frame maintained on the proactive application terminal and to remotely interact with that frame. The proactive application may initiate the interaction with the frame and, in particular, may initiate an interaction with a background frame without interfering with the user's interaction with the active frame on the proactive application terminal.

To implement frame navigation using "content specific" icons, the browser system may also obtain a content specific image associated with the first site, and display the content specific image in connection with the first icon. Similarly, the system may obtain a content specific image associated with the second site, and display the content specific image in connection with the second icon. For example, the content specific image associated with the first site is published in connection with the first site; and the content specific image associated with the second site is published in connection with the second site. More specifically, the content specific image associated with the first site may be specified in a metatag located on the first site; and the content specific image associated with the second site may be specified in a metatag located on the second site. Also, the content specific image associated with the first site may be published in an application server associated with the first site; and the content specific image associated with the second site may be published in an application server associated with the second site.

As another alternative, the content specific image associated with the first site may be created by the proactive browser system based on attributes associated with the first site, and the content specific image associated with the second site is created by the proactive browser system based on attributes associated with the second site. For example, the content specific image for a first site may be based on a routing name assigned to the first site; and the content specific image for a second site may be based on a routing name assigned to the second site.

To implement background frame maintenance, the proactive browser system may also receive information associated with a frame in the background mode; and alter the state of the frame while it is in the background mode. To indicate this change in frame state, the system may alter the appearance of the icon associated with the background frame to indicate that its state has changed while the frame is in the background mode. The system may also initiate a background frame, or an active frame, in response to a received message. The system may also implement background page loading by initiating a data download into a first frame, and then maintaining the first frame as a background frame during the download and navigating to a second frame as the active while the download takes place.

The invention may also include a wireless web-based application system including one or more proactive application terminals, each implementing a current frame configured with user interaction and one or more background frames configured for simultaneous interaction with wireless web-based application servers without interrupting the user interaction with the current frame. The web-based application system also includes one or more proactive application servers, each configured to detect a triggering event and, in response to the triggering event, to automatically interact with one or more of the background frames on one or more of the proactive application terminals without interrupting the user interaction with the current frames on the proactive application terminals.

The wireless web-based application system may also include a network-resident proactivity enablement server located in a communication path between the proactive application terminals. This proactivity enablement server is configured to queue submission from the proactive application servers to the proactive application terminals, detect on-line presence of the proactive application terminals, and route a submission to an intended proactive application terminal upon detection of the on-line presence of the intended proactive application terminal. The proactivity enablement server may also receive presence notification messages from the proactive application terminals, and send notification messages to the proactive application server corresponding to the presence notification messages from the proactive application terminals.

To implement asynchronous frame submissions, the invention may also include a proactive application terminal configured to monitor network presence and routing conditions, detect a lack of network presence, and enter an off-line interaction mode. Then, during the off-line interaction mode, the terminal receives and queues user submissions; detects network presence, and enters an on-line interaction mode. During the on-line interaction mode, the terminal transmits the queued user submissions while ignoring corresponding application responses.

In view of the foregoing, it will be appreciated that the present invention greatly improves web-based browser functionality and the infrastructure for implementing wireless web-based application services. The specific techniques and structures employed to improve over the drawbacks of prior web-based browsers and application service systems and accomplish the advantages described above will become apparent from the following detailed description of the embodiments of the invention and the appended drawings and claims.

BRIEF DESCRIPTION OF THE DRAWINGS

FIG. 1 is a functional block diagram illustrating proactive browser activity in a prior art browser system.

FIG. 2 is a functional block diagram illustrating possible configuration of browser activity in the proactive wireless web-based application system of the present invention, illustrated for a WAP-based embodiment.

DETAILED DESCRIPTION OF THE EMBODIMENTS

Figure 3A:
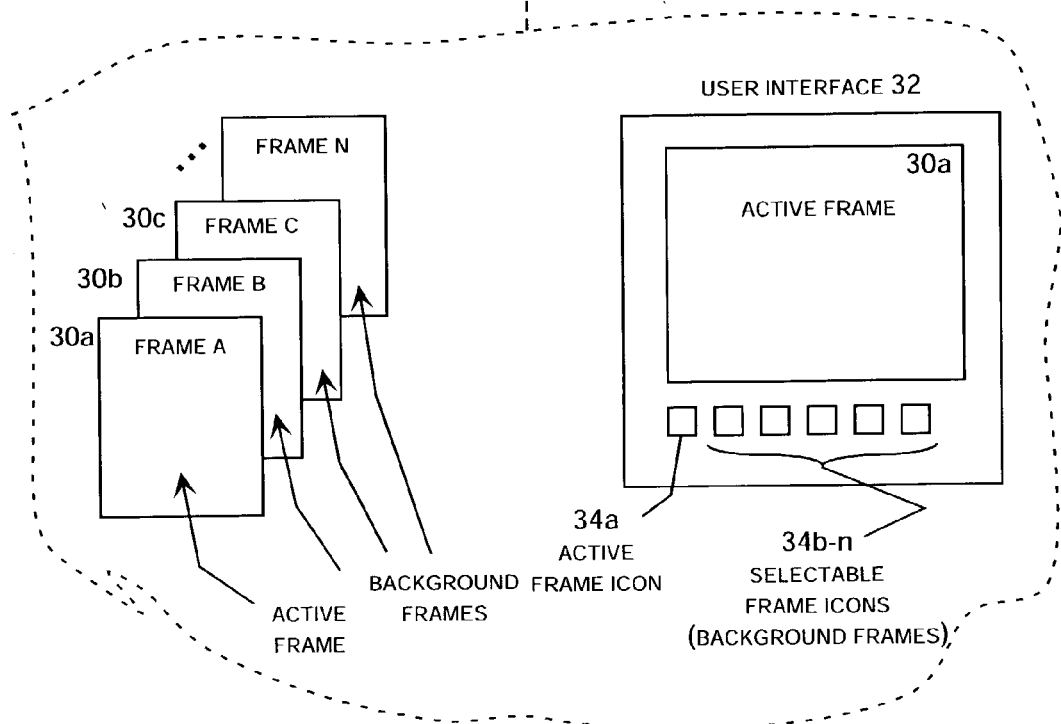
FIG. 3A is a functional block diagram illustrating the multi-frame capability of the proactive application terminal.

The particular embodiments of the inventions are relying on the Wireless Application Protocol (WAP) standard. It is understood that the present inventions can be implemented by those skilled in art using other technologies, standards and environments. The choice of WAP for these embodiments is not supposed to restrict the general meaning and scope of the present inventions.

The proactive browser system described in this specification is well suited for deployment as a proactive wireless web-based browser. The implementation of this type of system includes the definition and deployment of a new paradigm for wireless web-based applications that includes a new architecture and related browser, routing and application technology to enable a proactive wireless web-based application system. In particular, the proactive browser system may be implemented as a proactive wireless application system that includes three fundamental components: user-side proactive application terminals (PAT), optional network-resident proactivity enablement servers (PES), and server-side proactive wireless web-based application servers. The PAT resides on user terminals and functions as an enhanced capability browser that accommodates proactive application services and other beneficial browser features. The PES resides in the wireless network between the proactive application servers and the user terminals, and implements proactivity support services including queuing of proactive application submissions, presence detection of proactive application terminals, and routing of proactive application submissions from proactive application servers to the proactive application terminals. The proactive application servers are wireless web-based application servers configured to provide proactive application services to take advantage of the enhanced capabilities enabled by the PAT and PES components. In particular, the application logic to implement proactive wireless web-based services will generally reside in the proactive application servers, be routed through the PES platforms, and be received and processed by the PAT platforms for the benefit of the users and application service providers alike.

As implied by the preceding description, the present invention is not directed to particular wireless web-based application services, but instead is directed to a new architecture and support components that make proactive wireless web-based application services generally available and feasible to implement on the current hardware and communication infrastructure. On the user side, however, the present invention does offer a number of specific browser features deployed in the PAT to accommodate proactive web-based application services and other functionality to improve the usefulness and performance of the web-based browser and applications using it. In particular, the PAT implements a multiple frame interface that allows more than one frame to engage in interactivity at the same time. This allows proactive application interactivity to occur with a background frame without interrupting user interaction with the active frame. This also allows the user to navigate among a number of frames while another frame is loading and therefore blocked from user interaction. Importantly, the multiple frame interface alleviates the "dead time" problem experienced with current single frame browsers, in which interaction with the entire application is blocked while the one and only available frame loads data.

To enable presence monitoring, the PAT terminals maintain a list of usable gateways and networks, and a list of PES platforms to notify when changes occur in the PAT's network presence and routing conditions. The PAT also permits off-line submission queuing, and delivers the queued submissions to the appropriate destinations when network interaction is reestablished. The PES includes a PAT registration table, routing tables for keeping track of the network locations of the PAT terminals, and a submission queue for storing submissions directed to off-line PAT terminal. The PAT also monitors its own network presence and routing conditions, and notifies the PES platforms when changes occur in the network presence and routing conditions. The PES platforms, in turn, update their routing tables and notify the proactive application servers. This allows the PES platforms to deliver queued submissions to the PAT terminals after communication has been temporarily interrupted with the PAT terminals. In addition, the presence notification allows the proactive application servers to implement presence-based services.

In general, the new and improved features of the PAT include the multiple frame interface described above, as well as intuitive transition logic status indication, asynchronous frame activity, time and location based frame logic activation, composite document functionality, hidden frames, multi-frame bookmarks, frame "do" logic, frame persistent "do" logic, and custom frame controls. The PAT system also includes a menu-driven interface for configuring and interacting with these new browser features. In addition, the new browser functionality provides the user-side infrastructure required to support a wide range of sophisticated and valuable proactive application services that can be delivered to users without interrupting or otherwise degrading the quality of the users' interaction with the browsers on their devices. Further, the PES enables the application service providers to develop these services without having to be concerned with PAT routing and presence issues, which are handled by the PES.

The present invention includes a methodology for creating highly interactive proactive applications by combining one or more interaction processes each consisting of the following stages: anticipate, push, interact, react, and report. This methodology complements traditional synchronous document navigation model that is typically used in web applications, and enables creation of "thin" proactive data applications. The PAT also includes a multi-frame user interface for the browser with associated transaction processing capabilities and application-managed user interface logic, along with enabling inventions such as frame identifiers, frame bar navigation system with automatic and customizable frame icons, frame state indicators, hidden frame list including automatic frame categorization, special frame processing algorithms including hide and close upon document loading as well as frame state notifications to the application (such as when user has activated the frame and read the document, frame is not available, location has changed, etc). These inventions combined together enable intuitive and convenient user interface for proactive and concurrent wireless functionality managed by the server applications. This includes ability of the server application to submit document content for push delivery to the mobile device specifying how the document is to be handled by the PAT, including opening new frame, upgrading content of an existing frame, hiding a frame, closing a frame, controlling frame icon, managing frame context, etc.

The document formats that may be supported by PAT are not restricted to a particular format and may include any data presentation format such as HTML, xHTML, XML, WML, SVG, etc.

The PAT also includes timer-based and location-based frame activation features that can be managed by the application or by the user. Frame activation features enable automatic proactive application functionality driven by the events detected by the browser, such as timer expiration or location presence detection. The PAT also includes a method for asynchronous submissions including application-controlled frame activation, close, hide and frame context reset actions upon asynchronous submission, as well as submission data queuing and exposure to the user for review and corrections prior to delivery of the submission to the server application. This method allows application developers to implement submission actions that do not block user interface or wait for submission delivery confirmation, thus enabling offline data collection.

The PAT also includes a method for merged submissions that accumulate data from multiple consecutive submissions into a single data entity that is delivered to the server application in a single communication transaction. This invention enhances submission reliability and allows decreasing the number of wireless network operations in multi-screen applications and in combination with asynchronous submissions enables application developers to create applications capable of multi-document data collection in offline mode. The PAT also includes frame elements surviving link transition and document life cycle, such as frame icons, persisted DO elements, etc. This invention enables application developers to combine multiple documents into a single logically related application process.

The PAT also includes a method for document parameter data reverse posting to the browser, including ability to save to and retrieve such parameters from named databases on the device. This invention allows application developers to create proactive applications that reuse document structures already present in the browser and minimize wireless network traffic required for data delivery from applications. The PAT also includes a method for combining multiple related documents of different formats into a single composite document that shares dynamic document context between all individual documents. This invention allows application developers to create applications that can dynamically switch presentation methods (such as switch from screen-based document to a voice-based document) as requested by the user, as well as provide concurrent multi-interface document presentation.

Accordingly, the combination of the new PAT, PES and proactive application service functionality enabled by the present invention represents a new paradigm for wireless web-based application services. In this new paradigm, PAT devices are freed from single frame blocking, and asynchronous frame activity and other powerful web-based browser features are enabled. Meanwhile, application service providers receive the ability to develop and deploy increasingly sophisticated and valuable proactive wireless web-based application services to be delivered to the PAT devices. At the same time, the PES platform implements the required network support services to free both the PAT and the application services providers from concerns with this aspect of proactive wireless web-based service delivery.

Turning now to the drawings, in which like numerals refer to like elements throughout the several figures, FIG. 1 is a is a functional block diagram illustrating browser activity in a prior art wireless browser system 10. In this system, a single-frame browser 12 delivers submissions to a wireless gateway 13, which relays the submission to a web server 14. In turn, the web server 14 sends the submission to the addressed application server 15, which typically receives a page of information from a database 16 for display on the browser 12. In the current paradigm, the browser 12 remains blocked while the page loads. That is, the user cannot navigate to other documents while the requested frame is loading, causing a tedious "dead time" when using the browser. This dead time is a serious problem for wireless web applications because the latency is relatively high while the amount of information delivered is relatively low, resulting in a frustratingly poor information delivery rate.

As shown in FIG. 1, the application server 15 is capable of initiating "push" submissions to the browser 12 using the PAP protocol. It is understood that PAP is used as an example and that any other suitable protocol can be utilized. However, the PAP submission cannot be delivered if the user terminal is not presently available on the network. This requires the application server 15 to implement presence detection and resubmission logic to deliver the push submission. In addition, if the push submission is successful in reaching the browser 12, the browser will be blocked while the page loads, and the pushed page will replace whatever the browser was previously displaying. This type of intrusion may be received with annoyance and frustration by a user who did not initiate the submission. Although these technical deficiencies may seem unnecessary, they currently pervade the wireless web infrastructure and severely limit the performance and user acceptance of many wireless web applications. In particular, user acceptance of proactive wireless web applications involving "push" functions is severely depressed by these limitations.

Several other shortcomings of the prior art system shown in FIG. 1 should also be noted. First, the browser 12 can only be used on-line, and is virtually useless when the host wireless device is off line. Second, the browser 12 does not alert any other system components of its presence on an available network, which prevents developers from implementing presences-based functions. This causes application services to repeatedly attempt to access the browser 12 to deliver a submission. In addition, the browser 12 includes little if any functionality for programming or facilitating sophisticated background operations. For these reasons, the browser 12 is basically limited to on-line page retrieval to a single frame, one page at a time. Again, these limitations severely limit the usefulness and sophistication of current wireless web-based applications.

FIG. 2 is a functional block diagram illustrating browser activity in the proactive wireless web-based application system 20 of the present invention as implemented in a WAP-based embodiment described in this specification. In this system, a proactive application terminal (PAT) 22 includes multiple frame browser functionality that allows the user to navigate among multiple frames. Although only one frame, referred to as the "active frame," is capable of interacting with the user interface on the host device at any particular time, the other frames, referred to as "background frames," are nevertheless operational for simultaneous interaction with other devices and services, such as proactive applications. This allows the background frames to send submissions to and receive submissions from other components, such as proactive applications, while the user interacts with a current frame using the user interface on the host device. Because the simultaneous background interaction occurs without interrupting the user's interaction with the current frame, a wide range of proactive features may be implemented without blocking use of the mobile application user interface or otherwise inconveniencing the user. In addition, the multiple frame browser functionality allows the user to navigate to other frames while a particular frame is loading, which avoids the annoying dead time experienced with current wireless browsers.

As in the prior art system, the PAT 22 delivers submissions to a wireless gateway 23, which relays the submission to a web server 24. It is understood that the gateway 23 can be any type of connectivity endpoint for the wireless network including, but not limited to a WAP gateway, direct IP-based connection, HTTP-based connection, connection tunneled over TCP/IP (such as the MDOT protocol used to access Mobitex wireless network), etc. In turn, the web server 24 sends the submission to the addressed application server 25, which typically receives a page of information from a database 26 for display on the PAT 22. In the proactive wireless web-based application system 20, however, the PAT 22 can receive submissions in background frames while the device is simultaneously loading a page into the active frame or presenting the content in the active frame to the user. This allows the proactive application server 25 (or other components) to deliver submissions to the PAT 22 without intruding on the current interactive session. This opens the PAT 22 to a wide range of proactive application services, which is a great benefit to both users and application service providers.

To facilitate the proactive interaction, the system 20 includes a proactivity enablement server (PES) 27 in the communication path between the proactive application server 25 and the PAT 22. The PES performs a number of network functions to facilitate proactive interaction, and to relieve each proactive application server 25 from having to duplicate a similar communication infrastructure. Specifically, the PES keeps track of the network location of each registered PAT, and performs presence monitoring, submission routing, and submission queuing. In addition, each PAT performs its own network presence monitoring and notifies the appropriate PES platforms whenever its network presence conditions change. The PES platforms, in turn, may notify the appropriate proactive applications. This enables PES to deliver queued submissions to the PAT users and the proactive applications to implement presence-based features and services.

FIG. 3A is a functional block diagram illustrating the multi-frame capability of the PAT 22. In particular, the PAT enables multiple frames 30a–n for conducting web-based interactions. One of these frames, shown as frame 30a, operates as the "active frame," which is enabled for interaction with user interface 32 of the host device. The other frames, shown as frames 30b–n, operate as background frames. The user interface 32 includes a number of selectable icons that allow the user to navigate among the available frames and change the selection of the active frame. For example, the icon 34a corresponds to the currently active frame 30a, whereas the background icons 34b–n correspond to the background frames, shown as frames 30b–n. The user can navigate to and select one of the background icons 34b–n to make the corresponding frame the active frame, which will make the previously active frame 30a a background frame.

Figure 3B:
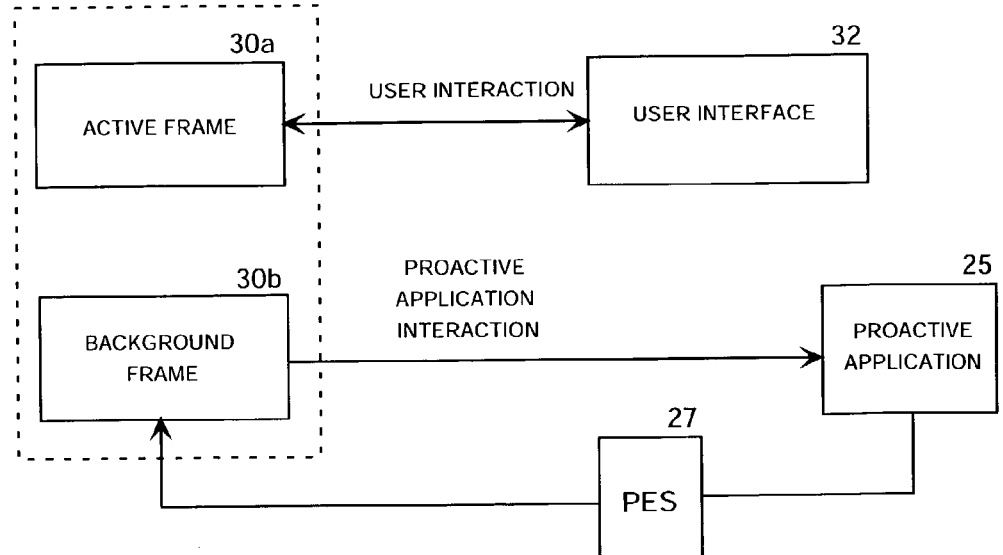
FIG. 3B is a functional block diagram illustrating the simultaneous multiple frame interaction enabled by the proactive application terminal.

FIG. 3B is a functional block diagram illustrating the simultaneous multiple frame interaction enabled by the PAT 22. Importantly, although only one frame 30a is active (i.e., operative for interaction with the user interface 32) at any particular time, the background frames are nonetheless operative for simultaneous interaction with third-party sources, such as the proactive application server 25. As noted previously, this allows the proactive application server 25 (or other components) to deliver submissions to the PAT 22 without intruding on the current interactive session, which opens the PAT 22 to a wide range of proactive application services.

The PAT 22 is configured to implement stateful frame navigation using content specific icons 34a–n, background frame maintenance, and asynchronous frame submissions. The term "stateful" when used in connection with "frame navigation" means that the system can browse among a number of frames, such as frames displaying Internet sessions, while the frames retain their respective session-based "states." For example, the "state" of a frame displaying an Internet session changes as the user interacts with the site by selecting buttons, filling in boxes, selecting pages, scrolling within a frame, and so forth. The invention permits stateful frame navigation, which means that user may select among a number of frames while the frames preserve their states. In other words, the system maintains a number of stateful frames concurrently, any of which may be selected as the active frame (i.e., activated for user interaction), while the other non-selected frames become background frames. Although they are not currently selected for user interaction, the background frames retain their states until they are once again selected as the active frame.

The proactive wireless browser system also uses "content specific" icons for frame navigation. This means that the graphic content of the icon representing a particular frame is selected to have a relationship with the content of the page. For example, the first letter of the URL corresponding to an Internet site may be displayed in the icon, such that the icon for the YAHOO site displays a "Y", the icon corresponding to the E-TRADE site displays an "E", and so forth. This type of icon definition may be performed by the browser terminal "on the fly" while the user links to various sites on the Internet. Alternatively, a graphic symbol defined by the publisher of the site may be received by the browser and displayed in connection with the corresponding icon. For example, these graphic symbols might be specified at the accessed site in metatags, and/or they may be received from an application server operating in conjunction with the site. In this manner, each site publisher and application developer can determine the appearance of the content specific graphic symbol will be displayed in connection with the associated icon on the user's browser.

The ability of the proactive wireless browser system to perform stateful frame navigation is a significant improvement over previous wireless web-based browsers, which only support a single stateful frame at a time. Therefore, these prior systems lose the state of an active document whenever a new frame is selected for user interaction, which can be frustrating for the user. The use of content specific icons for frame navigation is also a significant improvement over previous web-based browsers, which makes the user interface much more intuitive and easy to use, which is particularly useful in view of the increased number of stateful frames that the system can concurrently manage. Content specific icons enhance the effectiveness and intuitiveness of the multi-frame user interface by allowing user to quickly determine the frame of interest and by enabling application developers to assist user navigation by providing intuitive icon images. Therefore, these two improvements work together to provide an increased number of concurrently accessible stateful frames, and a system of content specific icons for navigating among the frames.

The ability of the proactive wireless browser system to concurrently maintain a number of stateful frames also leads to a number of other advantages. For example, the stateful background frames remain active for web-based interaction even though they are not currently selected by the user. This allows information to be downloaded into a background frame without interrupting the user's interaction with the active frame. For example, the user may initiate a download or "pull" of information into an active frame, and then navigate to other frames while the download completes in the background. In addition, an application or other web-based service may initiate a download or "push" of information into a background frame without interrupting the user's interaction with the active frame. In cooperation with this feature, the icon associated with a background frame may be configured to automatically change in appearance in response to a change in the state of the frame while it is in the background.

As another feature cooperating with the background push feature described above, the proactive wireless browser system may receive an information push that causes the user's browser to open a new frame, which may initially activate as the active frame or as a background frame. In addition, the proactive wireless browser system may store information push messages for a terminal that is off-line, and subsequently transmit the push messages to the terminal when it next comes on-line. In cooperation with this feature, the proactive wireless browser system may combine, update or eliminate similar push messages that are received for a terminal that is off-line, and then transmit a consolidated message to the terminal when it next comes on-line, to eliminate unnecessary messages. This functionality may be provided by PES which reduces network traffic and eliminates the need for application developer to optimize the proactive application logic for avoidance of excessive traffic accumulated while mobile device was not available on the network.

Figure 4:
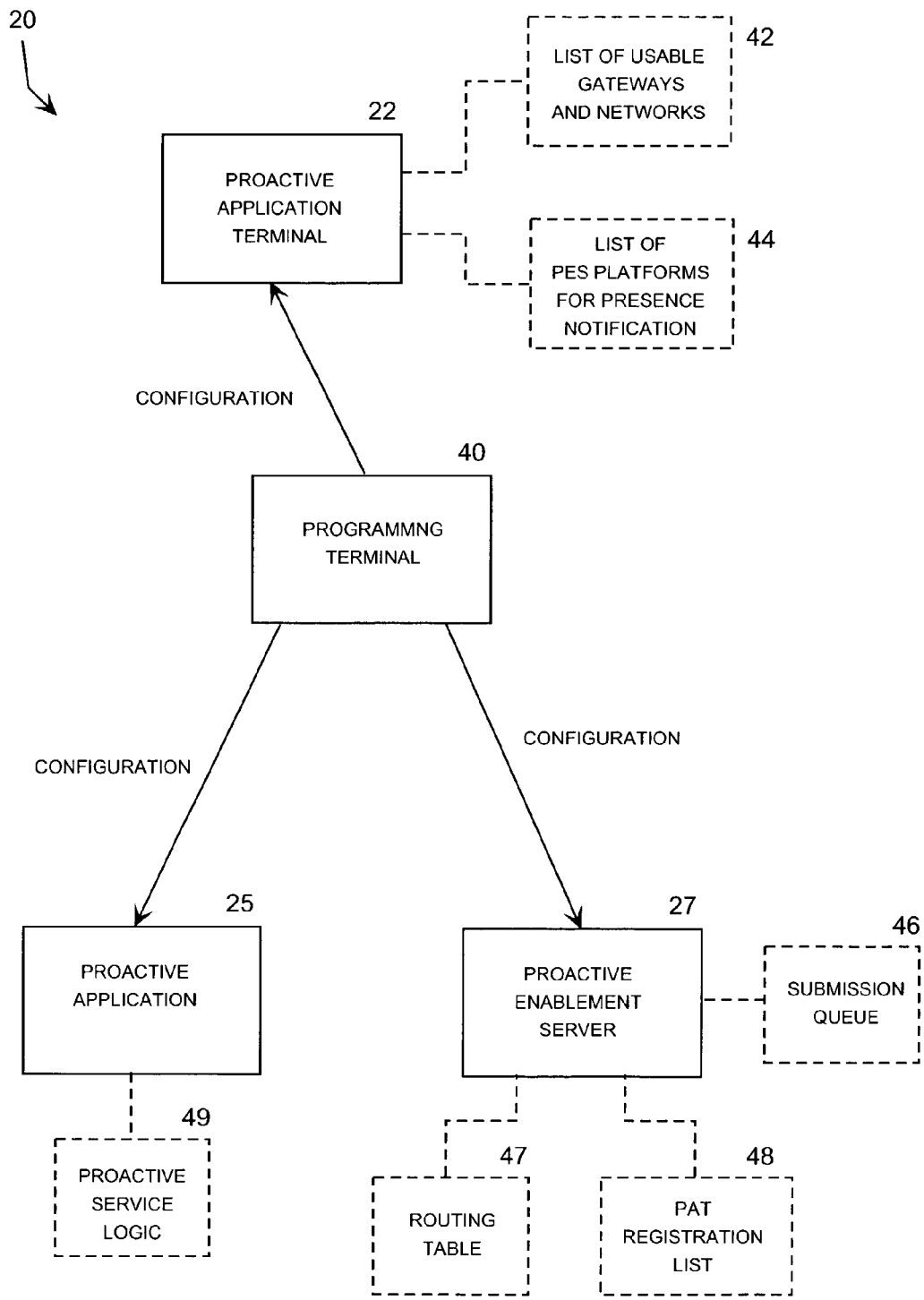
FIG. 4 is a functional block diagram illustrating the configuration of a proactive application service in the proactive wireless web-based application system.

FIG. 4 is a functional block diagram illustrating the configuration of a proactive application service in the proactive wireless web-based application system 20. In other words, FIG. 4 illustrates the elements that are typically provisioned (i.e., configured in advance) to implement proactive application services in the system 20. The configuration process may be conducted with any terminal or other device that is suitable for interacting with the various devices. In FIG. 4, the programming terminal 40 represents the configuration platform. However, the present invention is not limited to any particular configuration method or terminal, and it should be understood that different terminals may be used to configure different components of the system, and that a wide variety of different programming sources and devices may be employed to perform the configuration function. In particular, it is anticipated that wireless configuration of the PAT 22 will be advantageous.

During the configuration process, the various PAT platforms, represented by the PAT 22, are configured to include a list of usable gateways and networks 42, along with the methodology and data to be used to access and register with these gateways and networks. The PAT 22 is also configured to include a list of PES platforms 44, which the PAT 22 is directed to notify whenever the PAT detects a change in its own network and routing presence. That is, the list of usable gateways and networks 42 and the list of PES platforms 44 enables the PAT to monitor its own network and routing presence on the gateways and networks identified in the list 42, and to notify the PES platforms in the list 44 whenever a change occurs in the PAT's own network and routing presence. This allows the PES 27 to track the network presence and location of the PAT 22 for proactive submission queuing and routing purposes.

During the configuration process, the various proactive application servers, represented by the proactive application server 25 are configured with proactive service logic 49. In other words, the proactive application server 25 may be configured to provide a wide range of proactive services involving submissions to various PAT platforms, represented by the PAT 22, because the PAT can receive these submissions into background frames without interrupting the user operation of the host device and interaction with the application. Of course, many different proactive applications and services may be deployed using the proactive wireless web-based application system 20, and the present invention is not directed or limited to any particular proactive application or service.

During the configuration process, the various PES platforms, represented by the PES 27, are also configured to include a submission queue 46, a routing table 47, and possibly a PAT registration list 48. The submission queue 46 allows the PES 27 to queue submissions from the proactive application server 25 to the PAT 22 for orderly routing and storage while the PAT 22 may be offline. The routing table 47 maintains continually updated routing information for the PAT terminals, represented by the PAT 22, that are registered with the PES 27. In addition, the registration list 48 maintains continually updated registration information for the PAT terminals that are registered with the PES 27. Importantly, providing these network support services in the PES 27 relieves each proactive application server 25 from having to perform these functions.

Figure 5:
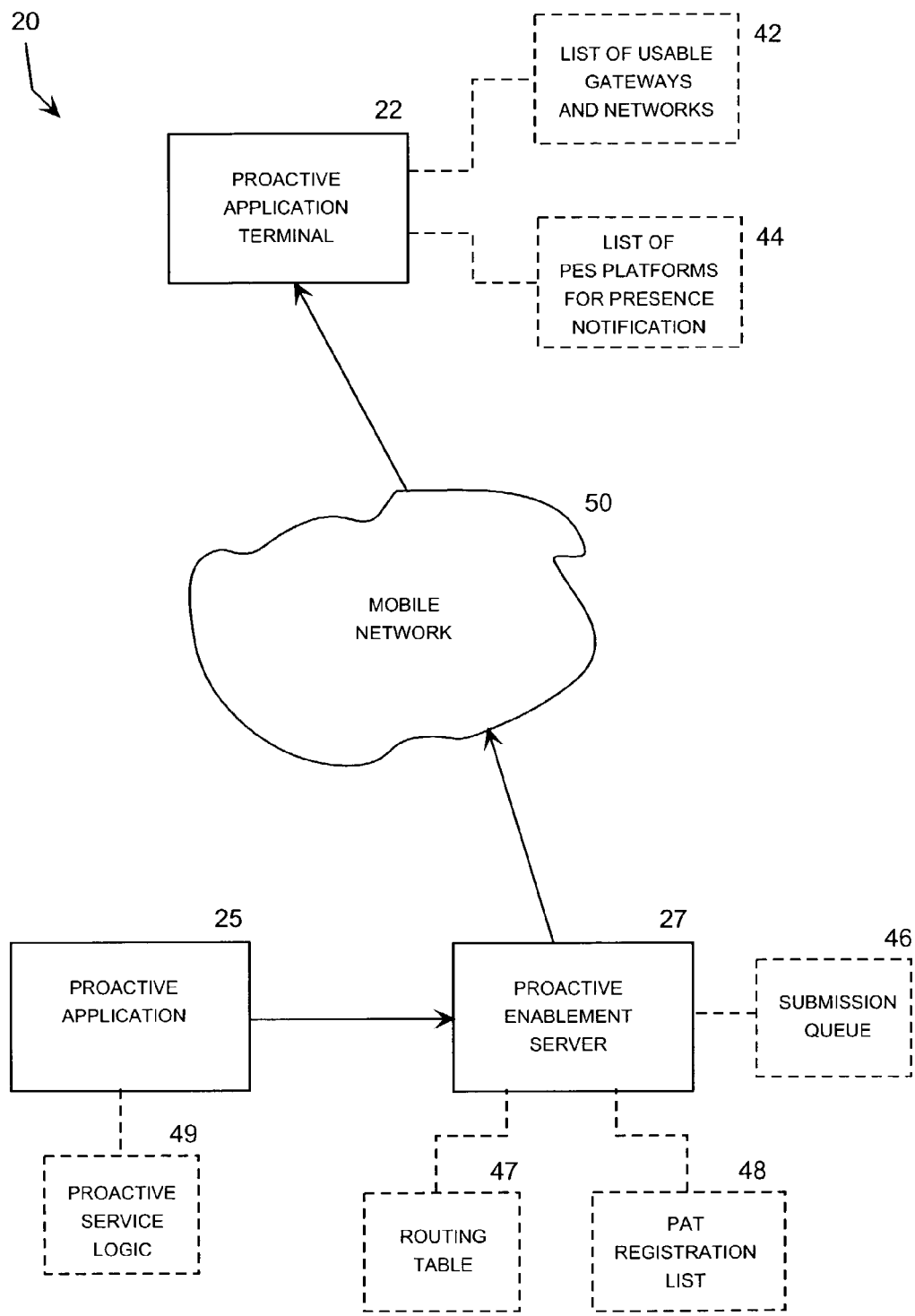
FIG. 5 is a functional block diagram illustrating the execution of a proactive application service in the proactive wireless web-based application system.

FIG. 5 is a functional block diagram illustrating the execution of a proactive application service in the proactive wireless web-based application system 20. Once the configuration shown in FIG. 4 has been completed, the execution of proactive application services is straight forward. This is because each PAT 22 continually monitors its own network presence and routing conditions, and continually provides notification of the changes in its network presence and routing conditions to the appropriate PES 27 (or multiple PES platforms, if desired). The PES platforms 27, therefore, maintain continually updated presence and routing information of the PAT terminals 22 supported by the system 20. In addition, the PES platforms 27 may relay network presence information for the PAT terminals 22 on to the proactive application servers 25 to enable the application servers to implement presence based services.

With this infrastructure in place, the proactive application server 25 implements proactive services in accordance with its proactive service logic 46, which typically involves detecting a triggering event and sending out a submission in response to the triggering event. These submissions are delivered to the PES 27, which handles queuing and routing of the submission to the PAT 22, which receives the submission in the active frame or, in many cases, in a background frame. If the PAT 22 is offline when the proactive application server 25 transmits the submission, the PES 27 queues the submission until the PAT returns to an online status. As noted above, the PAT is configured to monitor its own network presence status, and to continually update the PES 27 when that status changes. Although, the PAT 22 may not have a chance to explicitly notify the PES 27 when the PAT goes offline, in which case the PES detects the offline condition at the PAT from an unsuccessful attempt to deliver a submission. Once the PAT reestablishes a network presence, it explicitly notifies the appropriate PES of this change, and its new network location and routing information.

The described implementation of proactive service execution represents the best mode known to the inventors, and may be implemented differently depending on the capabilities of the host devices, networks, etc. The particular implementation is not supposed to restrict the general scope of the present invention.

Figure 6:
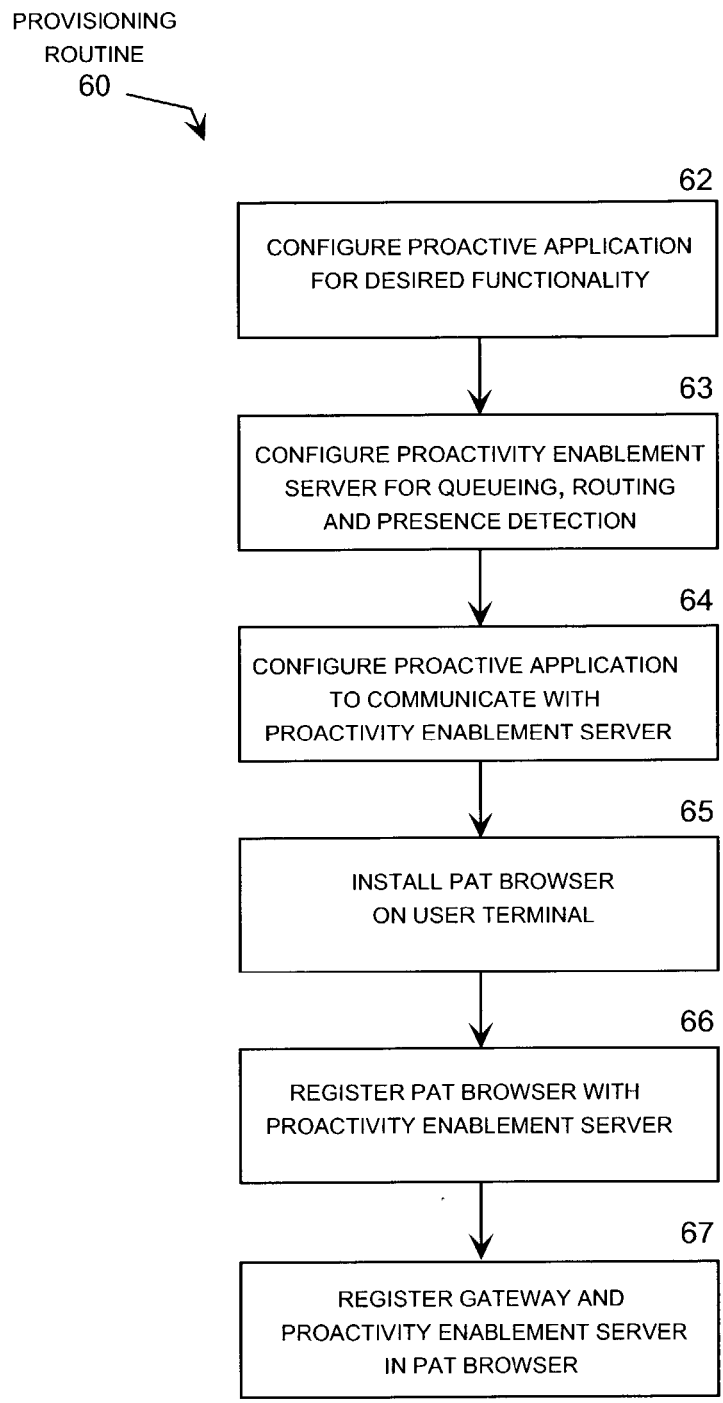
FIG. 6 is a logic flow diagram illustrating the configuration of a proactive application service in the proactive wireless web-based application system.

FIG. 6 is a logic flow diagram illustrating a provisioning routine 60 for the proactive wireless web-based application system 20. The following description will also refer to the components shown on FIG. 4. In step 62, the programming terminal 40 configures the proactive application server 25 with the desired proactive service logic 45. Step 62 is followed by step 63, in which the programming terminal 40 configures the PES 27 with the submission queue 46, a routing table 47, and a PAT registration list 48. Step 63 is followed by step 64, in which the programming terminal 40 configures the PAT 22 with the list of usable gateways and networks 42 and the list of PES platforms 44. Step 64 is followed by step 65, in which the programming terminal 40 installs the PAT browser on the host device. Step 65 is followed by step 66, in which the PAT 22 registers with the PES 27 (i.e., an entry for the PAT is created in the registration list 48, and routing information for the PAT is entered into the routing table 47). Step 66 is followed by step 67, in which the current gateway and PES 27 are registered in with the PAT 22 (i.e., an entry for the current gateway is created in the list of usable gateways and networks 42, and an entry for the PES 27 is created in the list of PES platforms 44). This completes the provisioning routine 60.

Figure 7:
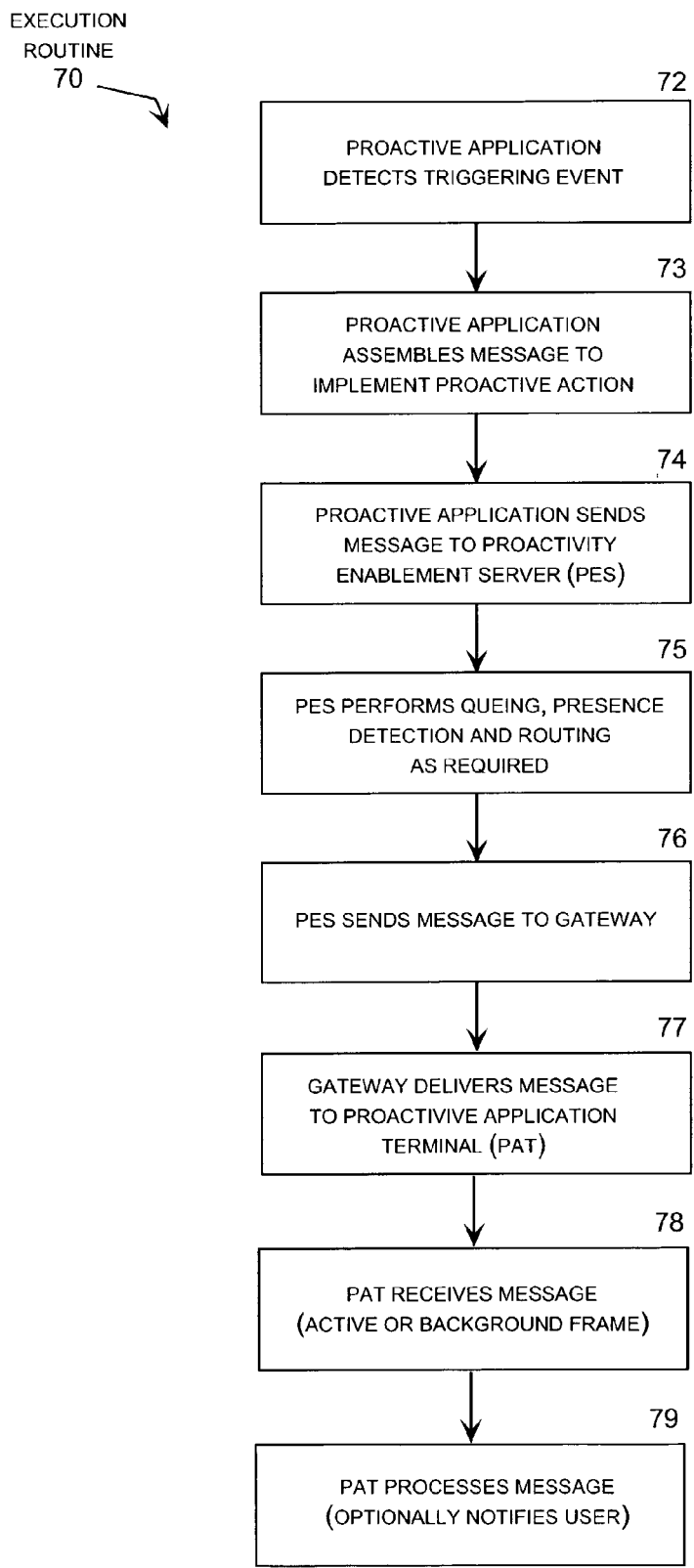
FIG. 7 is a logic flow diagram illustrating the execution of a proactive application service in the proactive wireless web-based application system.

FIG. 7 is a logic flow diagram illustrating an execution routine 70 for the proactive wireless web-based application system 20. The following description will also refer to the components shown on FIG. 5. In step 72, the proactive application server 25 detects a triggering event in accordance with its proactive service logic 49. Step 72 is followed by step 73, in which the proactive application server 25 assembles a submission message to implement a proactive service. Step 73 is followed by step 74, in which the proactive application server 25 sends the message to the PES 27 that is directed to a target PAT 22. Step 74 is followed by step 75, in which the PES 27 performs queuing and presence detection for the target PAT 22. Step 75 is followed by step 76, in which the PES 27 sends the message to the gateway serving the target PAT 22, in accordance with the appropriate queuing, presence detection and routing procedures. That is, the PES 27 may queue the message in the submission queue 46 until the PAT provides notification of its presence in a network, which allows the PES 27 to update the routing table, 27 to reflect the gateway serving the current network location of the target PAT 22 and relevant routing information. The PES 27 then routes the message to the target PAT 22 using the updated routing information (e.g., gateway) for the PAT in the routing table 47. Thus, the gateway serving the target PAT 22 receives the message in step 76. Step 76 is followed by step 77, in which the gateway relays the message on to the target PAT 22. Step 77 is followed by step 78, in which the target PAT 22 receives the message (e.g., page submission) in the active or a background frame. Step 78 is followed by step 79, in which the target PAT 22 processes the message, which may involve notifying the user in an appropriate way, such as changing a status indicator or icon corresponding to the frame that received the submission, etc.

Figure 8:
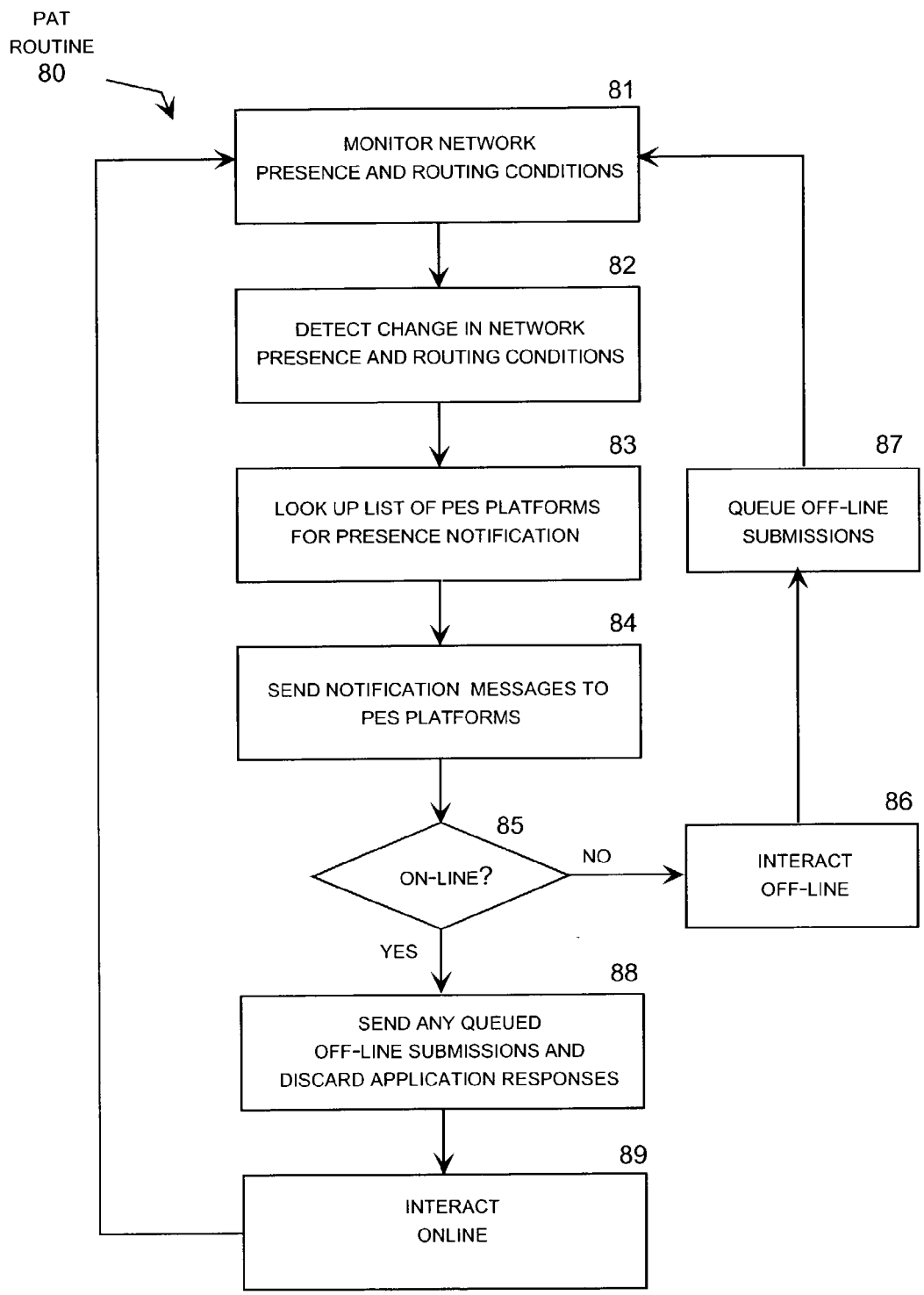
FIG. 8 is a logic flow diagram illustrating a routine performed by a proactive application terminal.

FIG. 8 is a logic flow diagram illustrating a routine 80 for implementation by the PAT 22. The following description will also refer to the components shown on FIG. 5. In step 81, the PAT autonomously monitors its own network presence and routing conditions. Conventional procedures for detecting service availability and autonomous registration procedures are well known to those skilled in the wireless communications art. Step 81 is followed by step 82, in which the PAT detects a change in it own network presence and routing conditions. Step 82 is followed by step 83, in which the PAT looks up a list of PES platforms, represented by the PES 27, in the list of PES platforms to notify 44. Step 83 is followed by step 84, in which the PAT sends notification messages to the appropriate PES platforms, which may be accomplished directly through the gateway or by way of a messaging server.

Step 84 is followed by step 85, in which the PAT determines whether it is in an online state. If the PAT is not in an online state, the "no" branch is followed to step 86, in which the PAT enters an offline interaction mode. Step 86 is followed by step 87, in which the PAT queues submissions during the offline interaction mode. Following step 87, routine 80 return to step 81, in which the PAT monitors its network presence and routing conditions. If the PAT is in an online state, the "yes" branch is followed from step 85 to step 88, in which the PAT transmits any queued offline submissions and discards any responses received from the recipient application servers. Step 88 is followed by step 89, in which the PAT enters an online interaction mode. Following step 89, routine 80 returns to step 81, in which the PAT monitors its network presence and routing conditions.

Figure 9:
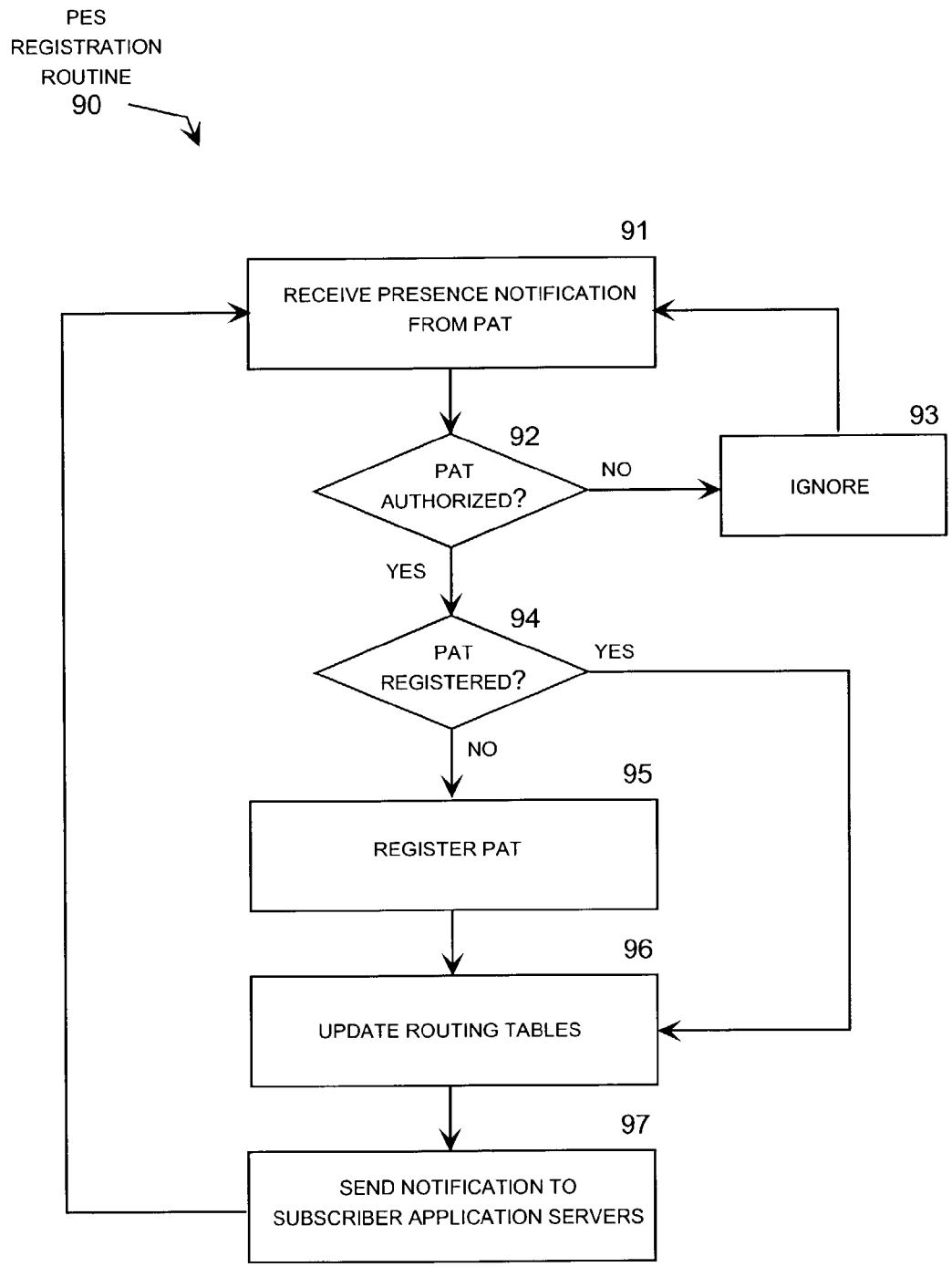
FIG. 9 is a logic flow diagram illustrating a routine performed by a proactivity enablement server.

FIG. 9 is a logic flow diagram illustrating a routine 90 for implementation by the PES 27. The following description will also refer to the components shown on FIG. 5. In step 91, the PES receives a presence notification from the PAT 22 corresponding to step 84 shown on FIG. 8. Step 91 is followed by step 92, in which the PES determines whether the PAT that sent the notification is authorized to interact with the PES, which may include a number of security procedures to ensure that the notification is valid. If the PAT that sent the notification is not authorized to interact with the PES, the "no" branch is followed to step 93, in which the PES ignores the notification, and may implement other security measures, such as logging an intrusion detection, notifying a security platform or officer, disabling communications from the offending sender, transmitting a warning message to the sender, and the like. Following step 93, routine 90 returns to step 91, in which the PES receives a presence notification from the PAT 22.

If the PAT that sent the notification is authorized to interact with the PES, the "yes" branch is followed from step 92 to step 94, in which the PES determines whether the PAT that sent the notification is registered with the PES, which typically includes a reference to the PAT registration list 48. If the PAT that sent the notification is not registered with the PES, the "no" branch is followed to step 95, in which the PES registers the PAT by creating a registration record for the PAT in the registration list 48. Step 95 and the "yes" branch from step 94 are followed by step 96, in which the PES updates the routing table 47 to indicate the current network location (e.g., gateway) and routing information for the PAT. Step 96 is followed by step 97, in which the PES may send notification to subscriber application servers 25 conveying a change in presence status for the PAT, for example by way of a messaging server. Following step 97, routine 90 returns to step 91, in which the PES receives a presence notification from the PAT 22.

Figure 10:
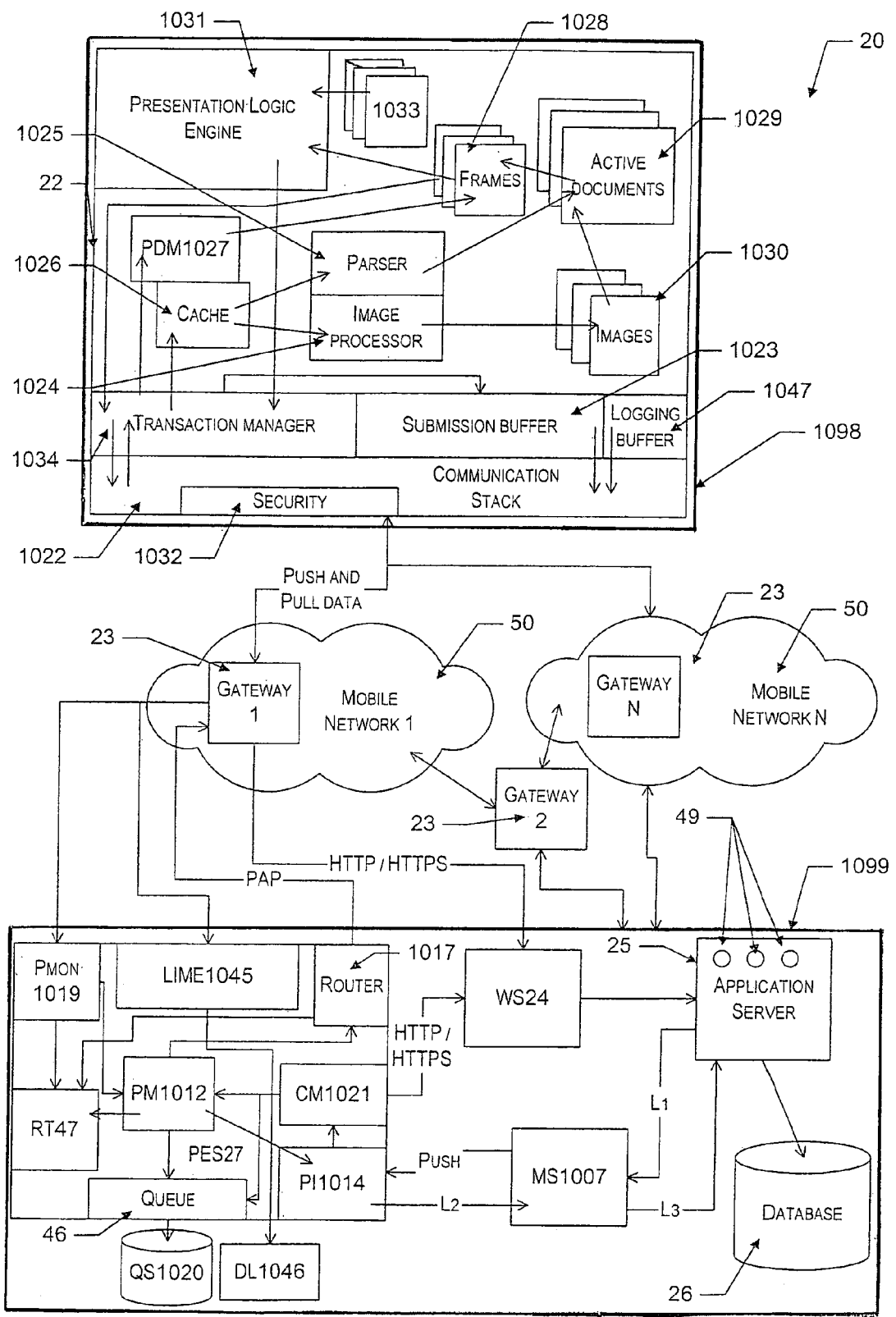
FIG. 10 is a functional block diagram illustrating possible configuration of the Proactivity Enablement Server (PES) and Proactive Application Terminal (PAT)

FIG. 10 is a functional block diagram illustrating basic components of the system 20 for proactive data applications. The system consists of server system 1099, mobile client system 1098 and Mobile Networks 50, through which the communication between client 1098 and server 1099 is performed.

The client system 1098 may be implemented as a portable wireless device with a browser specially configured to operate on Mobile Networks 50 and support proactive applications, further referred to as Proactive Application Terminal (PAT) 22. In the described embodiment the browser is based on the WAP specifications. However, WAP standard is chosen as the best mode implementation known to the inventors for the presently available networks and devices and this choice is not intended to limit the general scope of the present inventions. WAP-specific references in this specification can be substituted with other standards and methods bearing similar characteristics and providing appropriate functionality. For example, instead of WML documents the present invention can be implemented using other content description formats such as HTML, XHTML, XHTML-basic, SVG and its subsets, VoiceXML, etc. The inventors have chosen RIM 957 platform for description of the present embodiment, and all screen drawings in this specification are applicable to the best known to the inventors implementation of the present inventions on the RIM platform. However, this is not intended to limit generic scope of this invention. Particularly, most of the presentation data input and navigation functionality mentioned in this specification can equally be implemented using not only screen/keyboard interfaces but also with voice-driven interfaces, pen-computing interfaces, and so forth. For example, activation of link or similar action control in a document can be implemented using cursor selection with subsequent keyboard or track wheel click, touch-based activation with a pen, a voice command referring to the link title, a keyboard shortcut, etc.

The server system 1099 includes components that are configured to interoperate in order to deliver application services, web services, content, application logic, etc., that together form the proactive wireless application delivery chain. The present invention introduces a special server solution entitled Proactivity Enablement Server (PES) 27.

The PAT 22 may contain the following internal modules:

Communication Stack 1022, is a component, which implements and supports wireless communications protocols as defined in the WAP specification, and can alternatively support any other protocol stack such as HTTP, TCP/IP, etc;

Security Module 1032, is a component, which implements WTLS (Wireless Transport Layer Security) protocol or alternatively any other suitable security protocol (such as SSL, TLS, IPSec, PPTP, etc), and supports security and encryption for communications;

Submission Buffer 1023, is a component, which holds queue of asynchronous server submission data, communicates with Communication Stack 1022 and delivers the data to the servers in respective order; the submission buffer 1023 is stored in non-volatile device memory (such as flash memory);

Logging Buffer 1047, is a component, which buffers distributed logging and inventory information submissions until they are confirmed to be successfully delivered to the destination PES 27;

Transaction manager 1034, is a component, which coordinates and validates incoming push messages and outgoing submissions from Presentation Logic Engine 1031. Transaction Manager 1034 delivers the requests to the other PAT 22 modules for further processing; it also implements submission algorithms, based on system variables, described in FIGS. 20A–24E;

Cache 1026, is a component, which is stored in non-volatile memory and holds binary document content, images, etc. for use with other modules according to WAP and HTTP Caching Specifications as well as any other applicable specifications and the specifics of the present invention;

Persistent document manager 1027, is a component, which is stored in non-volatile memory; the manager 1027 saves and restores document, frame, and other data that may need to survive PAT and device restarts and failures;

Parser 1025, is a component, which parses and validates document content and transforms it to the internal format convenient for presentation and specific to the device platform and operating system;

Image processor 1024, is a component, which preprocesses and validates downloaded and local image resources and prepares them for presentation by transforming image data into device and operating system specific internal formats;

Images 1030, is a component, which contains the set of preprocessed images currently used in Active Documents 1029;

Frames 1028, is a component, which contains the set of frames presented to the user including names, icons and other required information;

Active documents 1029, is a component, which contains preprocessed documents currently presented to the user through frames 1028 along with frame context data and presentation;

Bookmarks 1033, is a component, which stores bookmark and document library data in non-volatile device memory;

Presentation Logic Engine 1031, is a component, which manages presentation of frames and other interaction elements to the user, handles user communication, framebar events, delivers document submissions and data changes to Transaction manager 1034 and through it to Persistent Document Manager 1027, Active documents 1029, Cache 1026, etc.; it also implements all presentation logic algorithms, processes values in system variables that affect presentation logic, etc.;

Gateway 23 facilitates routing information between the system components working in fixed and mobile networks. The fixed network may contain wired and wireless network segments. Depending on the deployment configuration, the Mobile Network 50 may include Gateway 23, or Gateway 23 that may be deployed externally to the network. Gateway 23 may be implemented as a WAP-based gateway service, a direct IP-based connection, HTTP-based connection, a connection tunneled over TCP/IP (such as the MDOT protocol used to access Mobitex wireless network), or any other connectivity endpoint suitable for enabling communications to the user terminals via Mobile Networks 50.

The server system 1099 may include the following components:

Proactivity Enablement Server (PES) 27, is a server software system, which facilitates server-initiated content delivery to mobile devices and is specially tailored for development and deployment of proactive wireless applications;

Queue Storage 1020, is a supplement to PES, which stores content delivery request data for PES. It may be implemented using databases, files, etc.;

Web Server 24, is a standard HTTP server or any other suitable application system, which is serving content requests and/or delivers information in the fixed network (Internet, Intranet, etc);

Messaging System 1007, is a supplementary component, which function is to enable routing and delivery of digital messages in heterogeneous computing environment using well-defined messaging protocols. Examples of such messaging products include but not limited to Java Messaging Server (JMS) implementations, Microsoft MSMQ, Web Services SOAP protocol, and so forth;

Application Server 25, is a system, which handles application logic and related code for proactive data applications 49 and submits content delivery requests to the Messaging System 1007 (L1);

Database 26, is a component, which function is to store and manage application and other related data;

other unlisted components, may be required to enable or extend functionality and/or performance of the system; PES 27 consists of the following modules:

Push Interface 1014, is a communication interface to Messaging System 1007, which receives content delivery requests from Application Server 25 and delivers them to Content Manager 1021. It also obtains device presence notifications and content delivery status updates (L2) from Push Manager 1012 and publishes them to Messaging System 1007, which delivers the updates to the Application Server 25 (L3).

Content Manager 1021, is a special communication component that interfaces with the Web Server 24, which upon receiving content delivery request containing content location information, such as URL, fetches the data from the Web Server 24, validates, parses, and supplies the content to Push Manager 1012 and Queue 46;

Push Manager 1012, is the main engine for managing content delivery requests and sending out events on device presence to the Application Server 25. Through Router 1017, it supplies content to the device as defined in WAP Push, Push Access Protocol (PAP), or other applicable specifications. It also stores content delivery status information and notifies the Application Server 25, through Push Interface 1014 of the current delivery status;

Router 1017, is a component, which function is to verify device browser user identity and to dispatch push messages to the appropriate device, using the mobile network the device is currently connected to. Router 1017 uses Routing tables 47 to store device location information;

Presence Monitor 1019, is a monitor component, which task is to monitor device presence across mobile networks; it updates routing tables 47 and sends the notifications on device status and availability to Push Manager 1012, which based on the nature of the detected changes communicates with Queue 46, Application Server 25 via Push Interface 1014, and Messaging System 1007;

Routing tables 47, is a storage for PES routing information and device configurations used by Presence Monitor 1019, Push Manager 1012 and Router 1017

Queue 46, is a communication and management component, which holds pending server-initiated content delivery requests for each frame on each device as well as requests that are not targeted to a specific frame. The requests are stored in Queue Storage 1020. Queue 46 also handles repeating delivery requests with the same unique identifier, by updating the data on server, and so ensures that exactly one most recent push message per frame or per cache entry will be delivered to the device after offline time interval.

Logging and Inventory Management Engine (LIME) 1045, is a logging component, which collects and logs PAT-generated errors and warnings for inspection by administrators and application developers;

Distributed Log 1046, is a non-volatile storage used to store information on errors, warnings, messages, and inventory data. It may be implemented as databases, files, etc.

Figure 11:
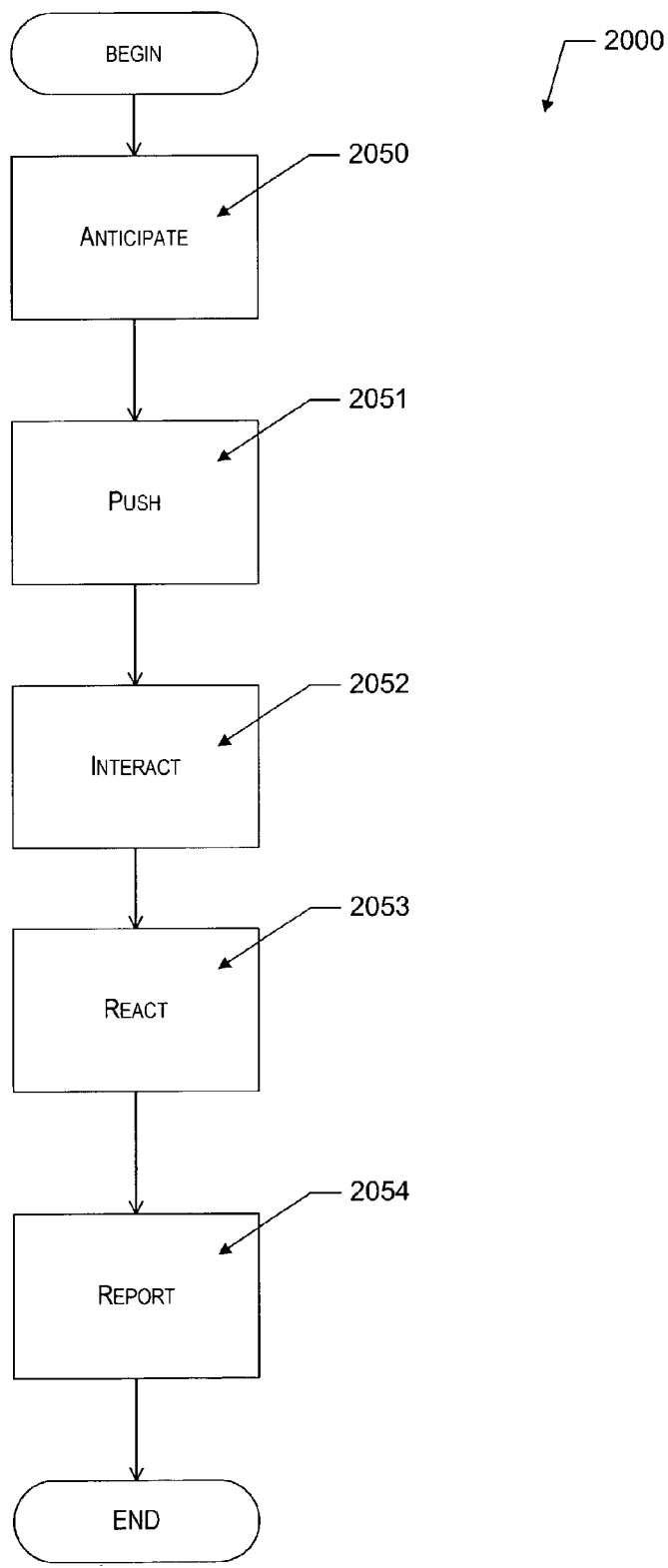
FIG. 11A is a logic flow diagram illustrating Proactive Application Microprocess methodology.
FIG. 11B is a logic flow diagram illustrating the Proactive Application Microprocess for a custom mobile application based on the logic illustrated in FIG. 11A.
FIG. 11C is a logic flow diagram illustrating the sample dispatch microprocess based on the logic illustrated in the FIG. 11A.
FIGS. 11D–E illustrate the visual interface accessible to the user of the system illustrated in the FIGS. 11A, 11B, and 11C.
Figure 11:
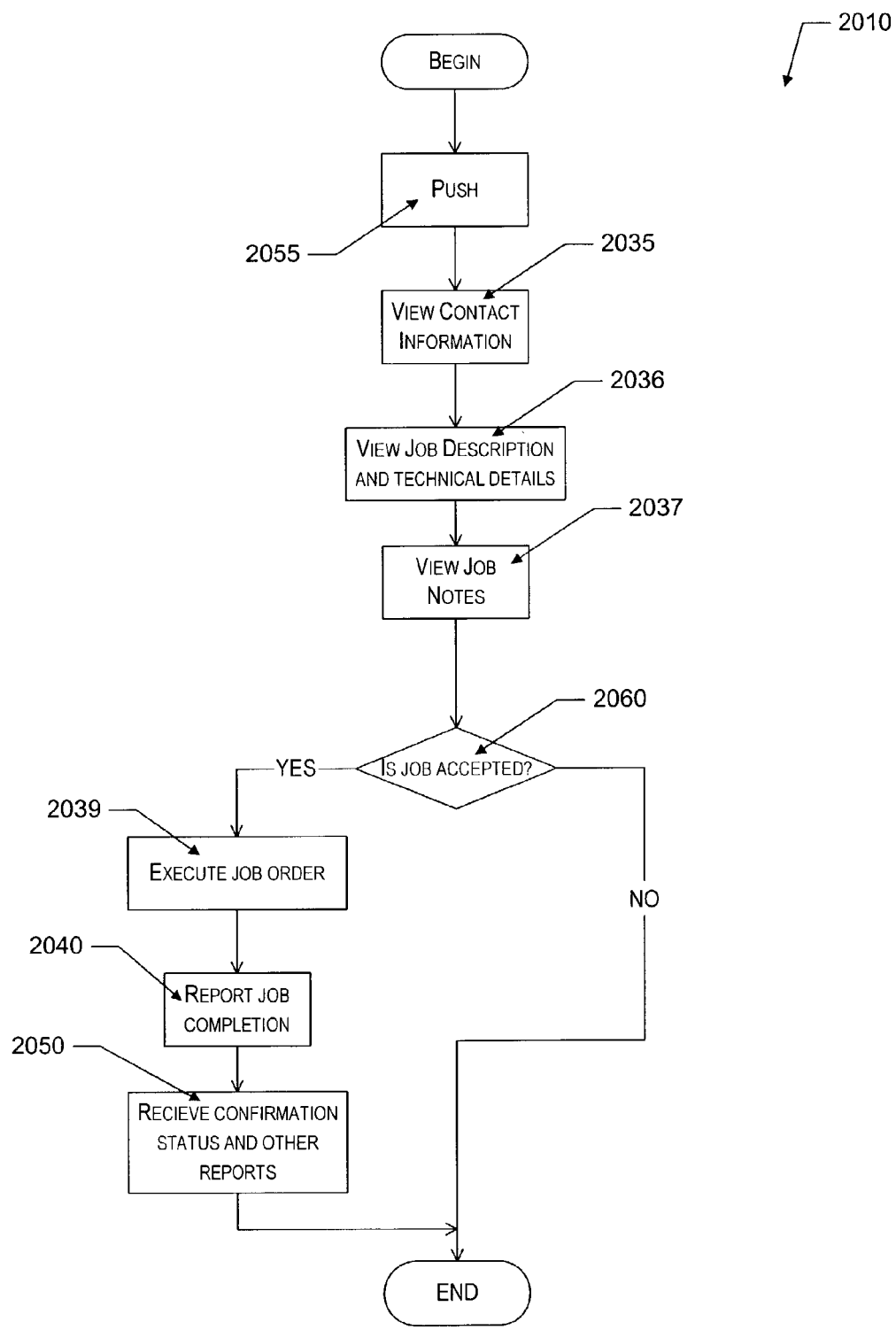
Figure 11:
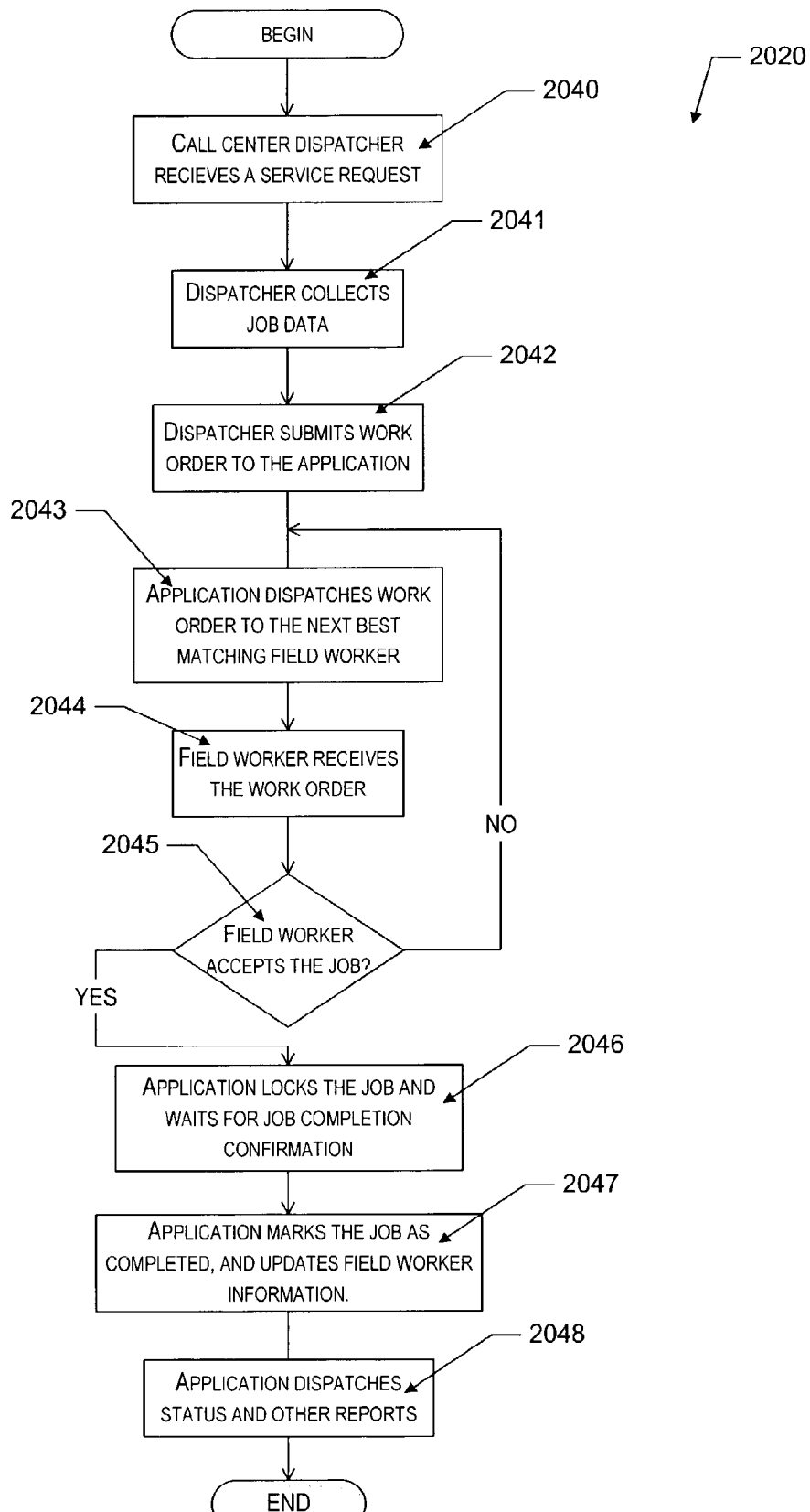
Figure 11:
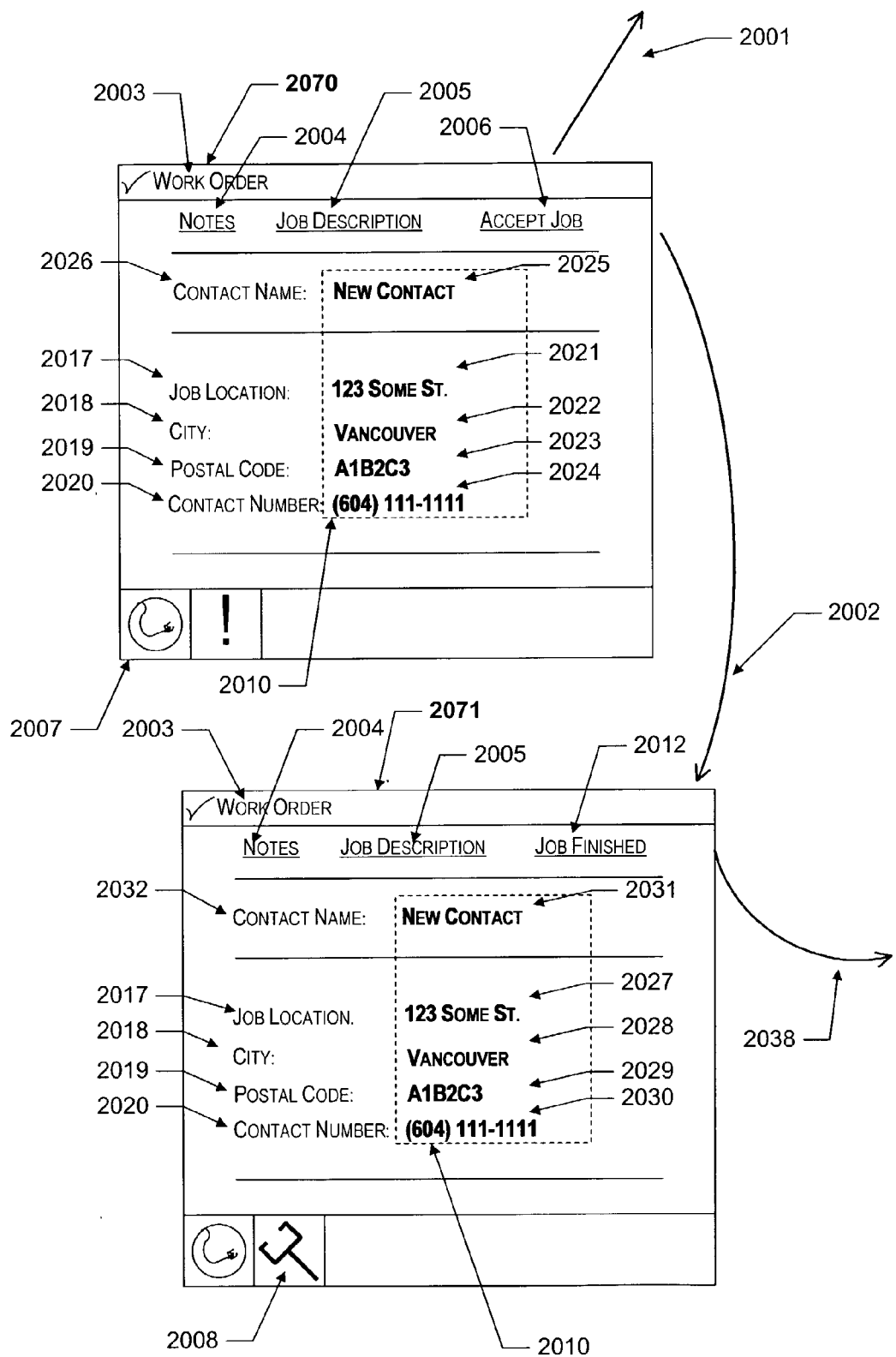
Figure 11:
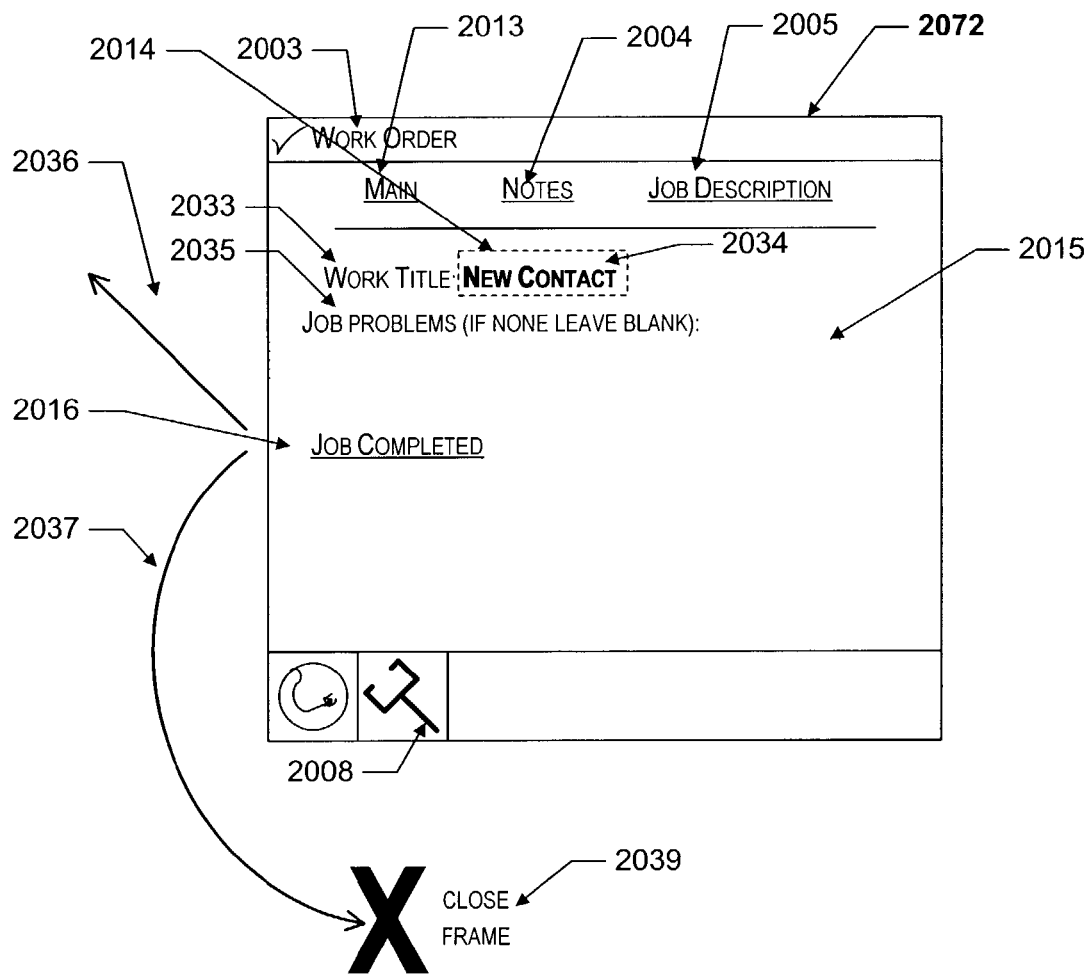

A new class of proactive application enablement technology is invented to enable application developers to create state of art proactive applications for mobile users, by combining interaction microprocesses defined in the flow described in FIG. 11A. As a sample embodiment of a proactive application, FIGS. 11B, 11C, 11D, 11E describe implementation of an application for automating the service cycle of a field technician in a gas utility company. The microprocess application model, described in FIG. 11A, complements traditional synchronous document navigation typically used in mobile applications. This application model may be used by application developers along with the other methods described in this specification. Use of this methodology is optional for application developers and description of this methodology is not supposed to limit the generic scope of the present invention.

FIG. 11A is a logic flow diagram illustrating the flow of the application microprocess methodology 2000. Routine 2000 consists of 5 sequential steps: Anticipate 2050, Push 2051, Interact 2052, React 2053, Report 2054.

In routine 2050, the mobile user anticipates application input and the server system stays in wait mode anticipating certain external events to happen to initiate application actions (e.g. call in by the customer to initiate a work order). When the anticipated request comes in, it follows to routine 2051, in which system or dispatcher collects, prepares and sends data to the remote person, with a mobile device (e.g. field worker), content delivery request containing the information required to perform the action (e.g. address and description of the fixes). In the routine 2052, the person who received the action request information interacts with the document, reviews the information and decides whether he/she can execute the requested action, after that accepts or declines the action by letting the application know his/her decision. If the remote worker accepted the work order for execution, routine 2052 follows to routine 2053, in which he/she follows up and performs necessary actions (e.g. fixes a gas meter). If the worker did not accept the work order, the execution stops and dispatcher selects another candidate worker and starts again from routine 2051. Routine 2053 is followed by routine 2054, in which remote worker reports back to the system information on work order status and any additional information, which may later be analyzed to form various kinds of reports. In this step system may interact back to the worker to request additional details, to send statistics, to dispatch pending follow-up requests, etc. Routine 2054 is followed by the "END" step, which concludes routine 2000 (microprocess). Application developers may combine such microprocesses to build dynamic proactive applications for mobile users.

FIG. 11B is a logic flow diagram illustrating sample application microprocess routine 2010. Routine 2010 is executed for a servicing technician in a gas utility company. Routine 2055 occurs whenever PAT 22 receives push message from the application, e.g. customer calling in to fix certain home gas equipment, typically it contains work order information including technical details, address, phone number, customer name, along with customer comments and suggestions. Routine 2055 follows to routine 2035. In the routine 2035 field worker reviews the work order information (e.g. which address should the worker go to). Routine 2035 follows to routine 2036, where the job description with technical details is provided. Routine 2036 follows to routine 2037, where the field worker can access all the additional information regarding the job (e.g. comment "beware of the dog"). Routine 2037 is followed by step 2060, where the field technician informs the application whether the work order is accepted or declined.

If field worker does not accept the work order, the "NO" branch is followed to the "END" step. If the field worker accepts the order, the "YES" branch is followed to routine 2039 and confirmation is sent to the application. In routine 2039 field worker executes the job order (e.g. performs gas meter repairs) and the execution follows to routine 2040, in which the field worker submits job completion report with the status of the work order to the application. The application updates the work order information, and as a result may follow to routine 2050, in which field worker receives and views reports, queries, etc. generated by the system. Routine 2050 is followed by the "END" step, which concludes routine 2010.

Different variations of the microprocess routine 2010 can be combined one after another in an application. An example of this combination is a conditionally initiated validation microprocess upon detection of data input errors. In such scenario user would enter some information into fields, initiate data submission that is performed by the PAT asynchronously and as a side effect the frame is closed by the PAT. When the application server receives the information, it validates the data and if the data is either not valid or incomplete it sends to the PES a content delivery request with the input problem description as well as the input fields to correct or complete the information provided. For the user it looks as a different follow up microprocess, which is logically connected to the previous one, but is separated in time. If during data validation on the server the data was valid, then the server accepts the submission without initiating follow up validation microprocesses.

Another variation of the example is displaying "Please wait, submission is being processed . . . " message to the user until the application server has received and checked the data. If the validation is completed without errors the user receives a confirmation microprocess confirming that the submission was completed successfully with a server-initiated content delivery request sent to the same frame, otherwise the server sends out the correction microprocess to the frame, which requests corrections or more information from the user.

It is understood that the microprocesses can be combined in any sequence and any number as required by the application requirements.

FIG. 11C is a logic flow diagram illustrating sample dispatch microprocess routine 2020. Routine 2020 is implemented for the sample application dispatching work orders to field service technicians in a gas utility company. Routine 2020 starts when the call center receives a request from the customer.

In the routine 2041, remote dispatcher collects from the customer all the information necessary for the work order. For example, this can be done with a telephone conversation between the call center operator and the customer. When all the necessary information is gathered, the dispatcher initiates routine 2042, by submitting all the data to the system. Routine 2042 is followed by routine 2043, in which the application determines the best-suited field worker for the job, and dispatches the necessary information to that worker with a content delivery request. Routine 2043 is followed to routine 2044, in which field worker receives the work order and reviews provided information (FIG. 11B) and responds to the request. Routine 2044 is followed by step 2045, where the application checks acceptance of the job order. If the field worker declined the work order, the "NO" branch is followed to routine 2043, excluding this worker from dispatch algorithm for this job.

If field worker accepts the work order, the "YES" branch is followed to routine 2046, in which the application updates the work order information, and locks it so that multiple field workers are not assigned to perform the same work. Then the application enters idle state until the application receives work order completion notification from the field worker; it follows to routine 2047, in which the application updates work order information according to the response from the field worker, and follows to routine 2048. In routine 2048 the system may send status reports to the field worker. Routine 2048 is followed by the "END" step, which concludes routine 2020.

FIGS. 11D–E illustrates sample field worker application Graphical User Interface (GUI). Specifically it illustrates screens 2070, 2071, and 2072 that the field service technician interacts with. All the screens may be implemented as a single WML document with hidden cards in it, which avoids forcing the user to wait for data loading and submissions. Screen 2070 displays the job contact information to the user. This is the initial screen user will see on receiving the push message. Screen 2070 contains three links: 2004, 2005, 2006, five static text elements: 2026, 2017, 2018, 2019, 2020, and five dynamically generated text fields: 2025, 2021, 2022, 2023, 2024, that form data block 2010. Static text elements are set to display titles for the dynamic data. Static text control 2026 is set to "Contact Name", 2017 is set to "Job Location", 2018 is set to "City", 2019 is set to "Postal Code", and 2020 is set to "Contact Number". Block 2010 is dynamically generated for every work order by the application, based on the information submitted by the call center dispatcher (FIG. 11C). Screen 2070 also contains dynamically defined icon 2007. Custom icons are described in detail further in this specification.

In the screen 2070, link 2004 can be used by the field worker to review "Job Notes" supplied by the dispatcher. Activation of link 2004 causes a transition to another WML card in the same WML document (or another document) without interaction with the server. Field worker may use link 2005 to view detailed description of the work order. Link 2005 also causes the transition to another WML card in the same WML document (or another document). After reviewing all the details, the field worker can use link 2006 to accept the job. Activation of link 2006 causes an asynchronous submission 2001 to the server, and a local transition and document navigation 2002 to screen 2071.

Screen 2071 is similar to the screen 2070, with the difference that link 2006 is replaced by link 2012, and icon 2007 is replaced by icon 2008. Screen 2071 contains all the information that is necessary for the field worker to complete the work order. Icon 2007 from screen 2070 is changed to the icon 2008 in the screen 2071 to signify that the field worker has confirmed assignment of the work order. Link 2006 from screen 2070 is changed to link 2012 in screen 2071 so that field worker can notify the system that work is completed. Activation of link control 2012 causes transition from the screen 2038 to the screen 2072.

Screen 2072 allows field worker to submit "work completed" notification to the application, as well as provide additional job related notes. Screen 2072 contains four links: 2013, 2004, 2005, 2016, two static text fields: 2033, 2035, one dynamic text field: 2034, and an input field: 2015. Links 2004 and 2005 serve same purpose as link controls 2004 and 2005 in screen 2070 and 2071. The field worker can use link 2013 to return to the screen 2071 and link 2016 to notify the application of job completion. Activation of link control 2016 causes asynchronous submission 2036 to the server, and transition 2037, which results in closure of the frame 2039.

The embodiments described below may equally apply to both regular and composite documents. Composite document concept is used to refer to a situation when multiple related documents of different document types, presentation logic and formatting (further referred to as composite document components or simply document components) are bundled by the application together into a single document entity using multipart content encoding or any other suitable means and are processed by PAT 22 as described in FIG. 36A. Such composite documents are handled in a special way, where one or more document components are used at any moment of time by PAT 22 and specifically by Presentation Logic Engine 1031. In case the same PAT 22 implementation is capable of handling more than one document component that is present is a particular composite document the user has the choice of selecting which of the supported document components is used for the presentation of the document and such selection can be changed dynamically within document presentation process. Such composite document handling allows the application to express the document using multiple document components that are best suited for different device capabilities or different presentation modes as selected by the user. The relationship between document components is transparent to the user because PAT 22 includes a method for automatic document component linking in the way of sharing a single document context between all document components of a composite document. Submission of composite documents are also transparent to the applications, provided that such applications generate the composite documents for submissions using the same names for respective variables and parameters in all composite document components.

For example, an application can generate two (2) document components (using the same variable and parameter names for the respective variables and parameters in both document components) one in WML, and another in VoiceXML formats that are combined into a single composite document and delivered to the device with a PAT 22 implementation capable of presenting both WML and VoiceXML documents. In the above example the SVG or other UI definition language can be used for UI definition instead of the WML. This would result in a single entity being added to the Active Documents 1029, and a single document context created for the frame, where the composite document is assigned. Because the respective variables and parameters in both document components share the names and because such names are managed by the same document context, the user can equally use either screen-base WML presentation or voice-based VoiceXML presentation to browse and interact with the document. On the devices where such functionality is possible PAT 22 implementation can provide synchronous presentation of composite documents. For example, a user can use such synchronous presentation mode to navigate and fill in a form using VoiceXML document component and do parallel check of the results on the screen displaying the WML document component a change in the document context made through one document component is automatically reflected in the other document component by Presentation Logic Engine 1031.

Navigation between a plurality of frames 1028 and activation of individual frames requires special frame navigation functionality. It is understood that there are multiple ways to implement such functionality and that the details of implementation may vary depending on the hardware platform and operating system capabilities (e.g. keyboard input, tracking wheel input, touch-based or pen input, voice input, screen or voice output, etc.).

The embodiment of the frame navigation and activation functionality documented in this specification is the best use scenario known to the inventors for RIM 957 platform and it is not intended to limit the general scope and nature of the present invention.

Figure 12:
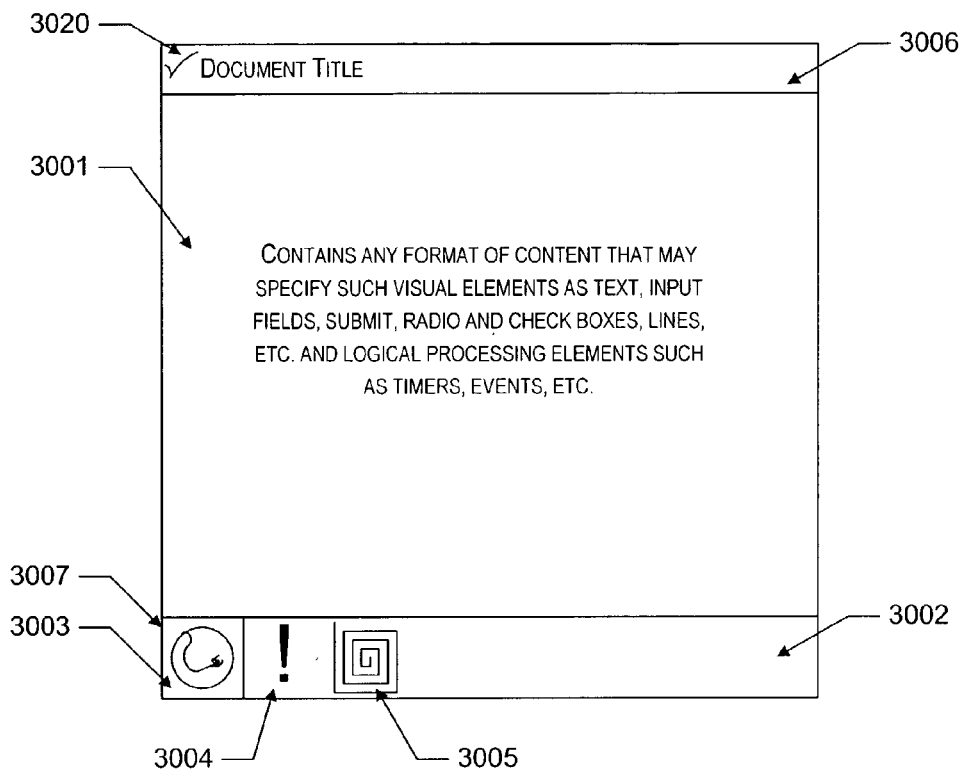
FIG. 12A illustrates PAT visual interface.
FIG. 12B illustrates PAT visual interface in the blocked frame state.
Figure 12:
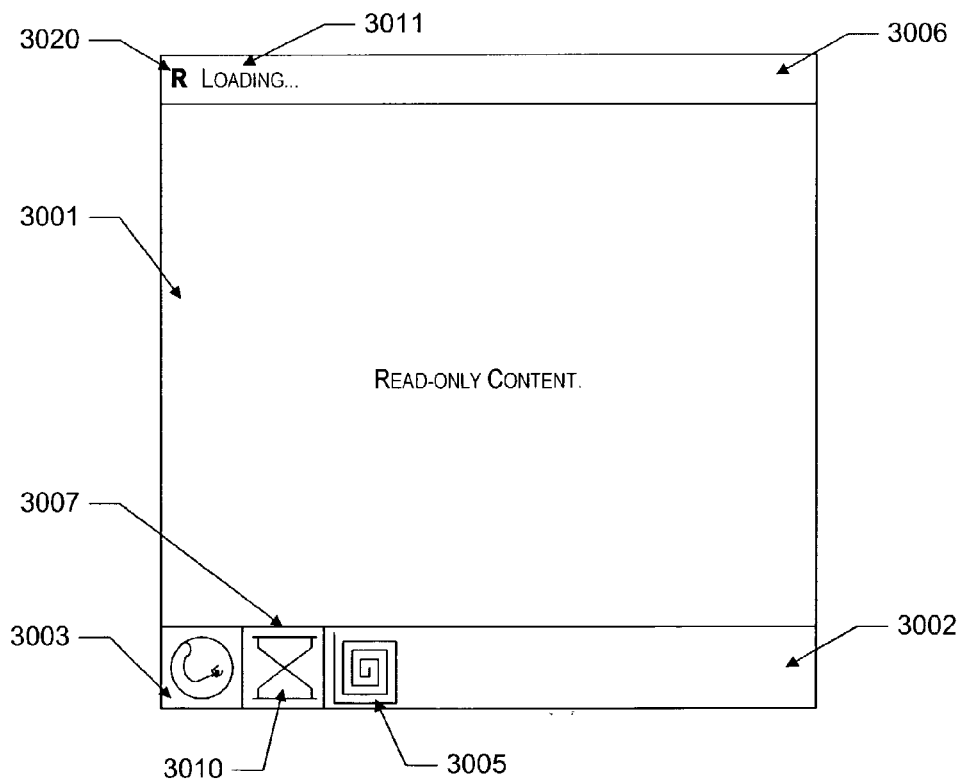

FIG. 12A illustrates appearance of multi-frame user interface embodiment for RIM 957 platform. Specifically it shows the following basic navigational elements: the frame bar 3002 containing the set of frame icons 3003, 3004, 3005 and active frame indicator 3007, content area 3001, where document content is presented to the user for the active frame, and title area 3006, containing the title of the document loaded in the active frame and status indicator 3020. Status indicator is described in detail FIGS. 17A, 17B. It is understood that the frame icons can contain any content, those skilled in art will appreciate defining icons with customized look by using local or external graphical resources, like images, characters, signs, lines, etc. It is also understood that the document content can contain any variety of text, rich text, formatting and submission fields including those described in greater detail further in this specification, which comply to WAP, HTML, SVG or other applicable specifications. The specifications set is not described in this document and can be obtained from http://www.wapforum.org, http://www.w3c.org or other third-party organizations. Alternatively specific embodiments can use custom content definition formats. Icons 3003, 3004, 3005 can be selected using scroll and navigation techniques applicable to the host device, for which the PAT 22 implementation is provided and are to be used to activate frames, in which case the active frame indicator 3007 will transition to the frame that becomes active as the result of user interactions.

FIG. 12B illustrates multi-frame interface in the process of loading new content synchronously to the active frame 3007 shown in the content area 3001. Frame title area 3006 is modified to reflect loading text indicator 3011. In the process of a synchronous request content area 3001 has its browsing and scrolling capabilities disabled until response is received from the server, parsed, processed, and the frame is unblocked. To additionally indicate this state, frame icon is changed to the special loading icon indicator 3010, which remains in effect until response is processed in which case it changes to the original frame icon 3004 or new frame icon obtained from the content according to frame icon processing algorithm described in more detail further in this specification. It is understood that blocked status and browsing restrictions are applied only to the content area 3001 of the frame being loaded and that the user can still navigate between frames, activate other frames and continue browsing and interact with the content available in other frames.

Figure 13:
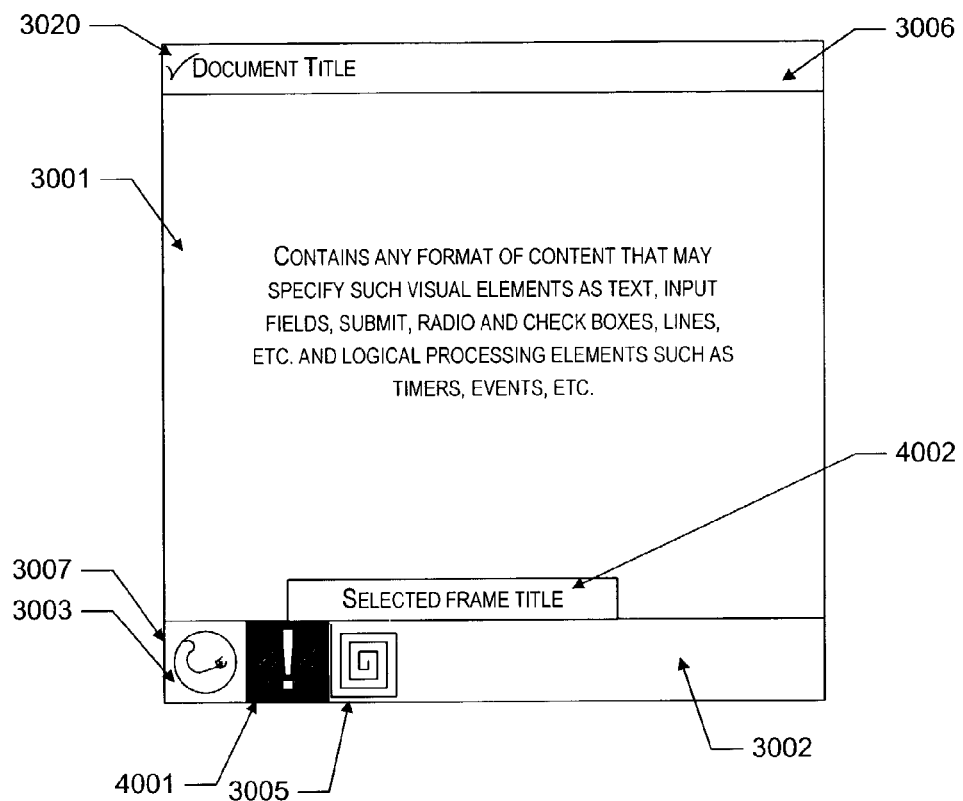
FIG. 13A illustrates the use of the framebar in the PAT visual interface, in the process of switching the active frame.
FIG. 13B illustrates the active state of the frame bar in the PAT visual interface.
FIG. 13C illustrates the inactive state of the frame bar in the PAT visual interface.
Figure 13:
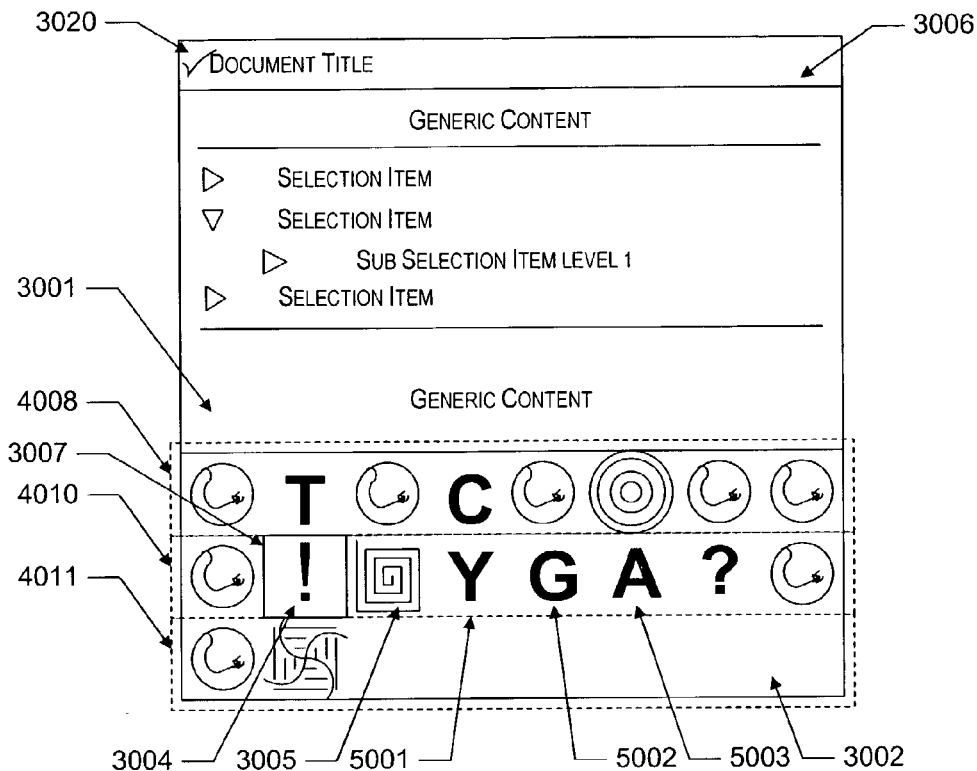
Figure 13:
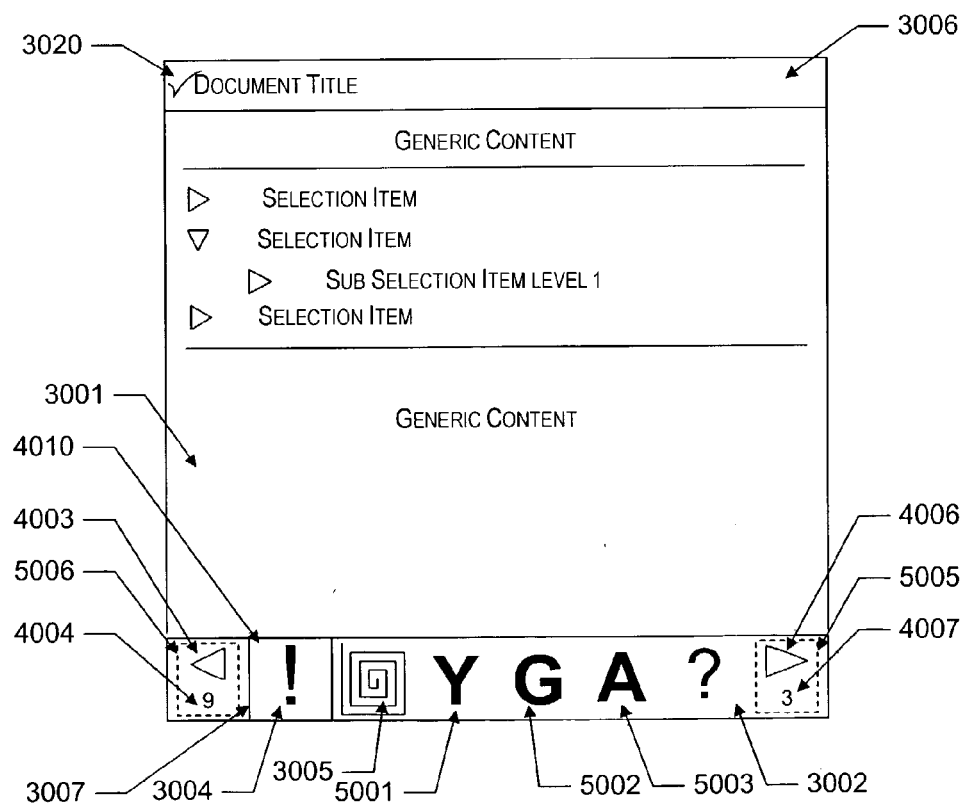

FIG. 13A illustrates multi-frame user interface in the process of navigation between frames. The active frame is marked with the active frame indicator 3007. The new candidate frame is marked by inverted icon 4001. It is understood that the way to show selected candidate by inverted icon is applicable to the described embodiment and may differ based on the specific appearance and algorithm of other navigation implementations. Generically speaking, the implementation should provide a way to select a new candidate frame from the frame bar or equivalent navigation element by using the most appropriate selection technique for the device used. In the process of navigating between frames, the invented user interface may further simplify user operation by displaying the candidate document title in the popup box 4002 which may appear within user or developer configured timeout (e.g. 1 second) after user moved focus over candidate frame icon 4001 using appropriate navigation technique applicable to the device. It is understood that the actual popup implementation may vary across different PAT versions and devices. Once the user decides to change the currently active frame 3003 he accepts the candidate 4001 and activates the frame by most appropriate selection method for the current implementation (e.g. pressing enter key) in which case the active frame indicator 3007 is transitioned over the candidate icon 4001, the inverted state that distinguishes the candidate icon is reset back to regular appearance, the special popup screen 4002 is removed and content area 3001 and title area 3006 are changed to reflect the active frame's document content.

FIG. 13B illustrates frame bar 3002 in the active state when multiple panels with icons 4008, 4010, 4011 are visible to the user. In case all icons cannot fit in the screen space allocated for the frame bar 3002 (in the current embodiment it is 3 panels), right "more" 5005 and/or left "more" 5006 indicators may be shown indicating that there are more scrollable icons in this direction (FIG. 13C). In the active state the frame bar 3002 can respond to user interactions allowing user to select new candidate frames for activation in the current implementation. While the frame bar 3002 is in active state, the user may not be able to interact with the current content 3001. When user activates new or currently active frame by most appropriate selection technique for the device, the frame bar 3002 transforms to the inactive state (FIG. 13C) displaying the panel 4010 with the icon of the active frame 3004; and user may again interact with the content area 3001 which displays active frame content.

FIG. 13C illustrates frame bar 3002 in the inactive state when only a single panel of icons 4010, containing current frame icon 3004 indicated by the active frame indicator 3007, is shown on the screen. Optional left 5006 and right 5005 "more" indicators may be present in the panel. Due to the specifics of the host device, in the current implementation, the frame bar 3002 in the inactive state cannot respond to user interactions and user can only interact with the active frame content in the content area 3001. Left "more" indicator 5006 consists of 2 elements: left arrow 4003 and counter 4004 with the number of icons available to the left of the left-most icon in this panel. Right "more" indicator 5005 consists of 2 elements: right arrow 4006 and counter 4007 with number of icons available to the right of the right-most icon in this panel. The PAT has built-in means to transfer the frame bar 3002 to the active state FIG. 13B. Depending on the specifics of the host device, it may not be necessary to implement a special active state for the navigation element providing means for frame activation (such as the frame bar described above). For example, on platforms with pen or mouse user interfaces such navigation element may be always active.

Figure 14:
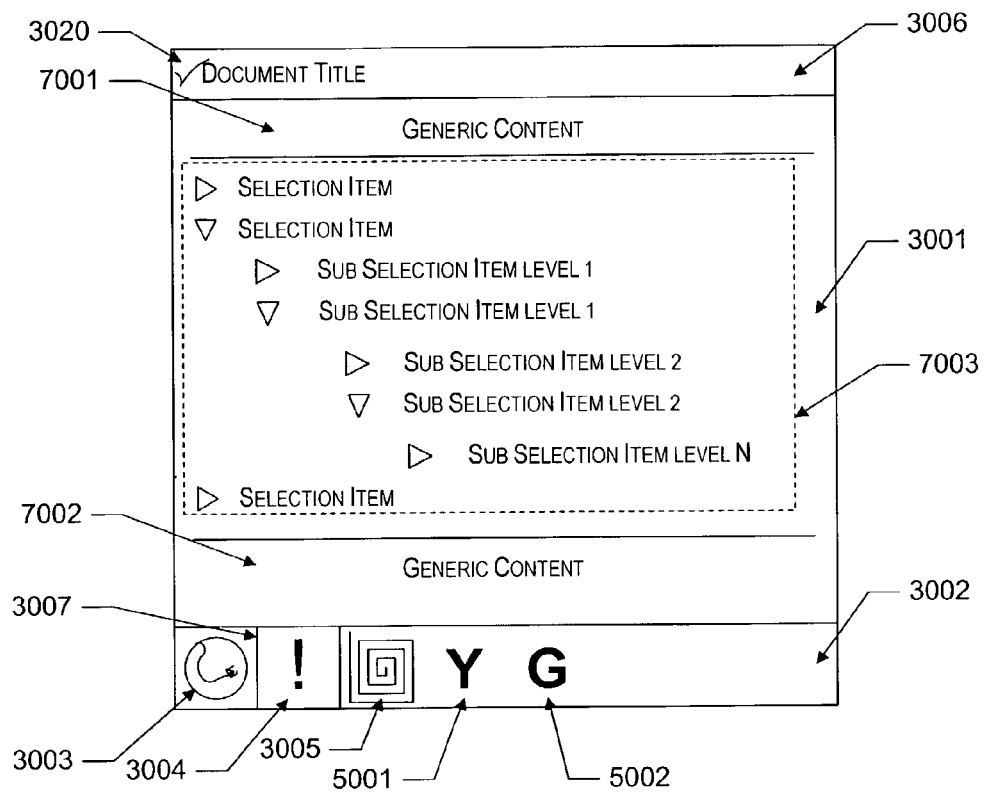
FIG. 14A illustrates automatically generated frame icons in the framebar of the PAT visual interface.
FIG. 14B illustrates fresh content indicator in the framebar of the PAT visual interface.
FIG. 14C is a logic flow diagram illustrating content delivery notification logic.
Figure 14:
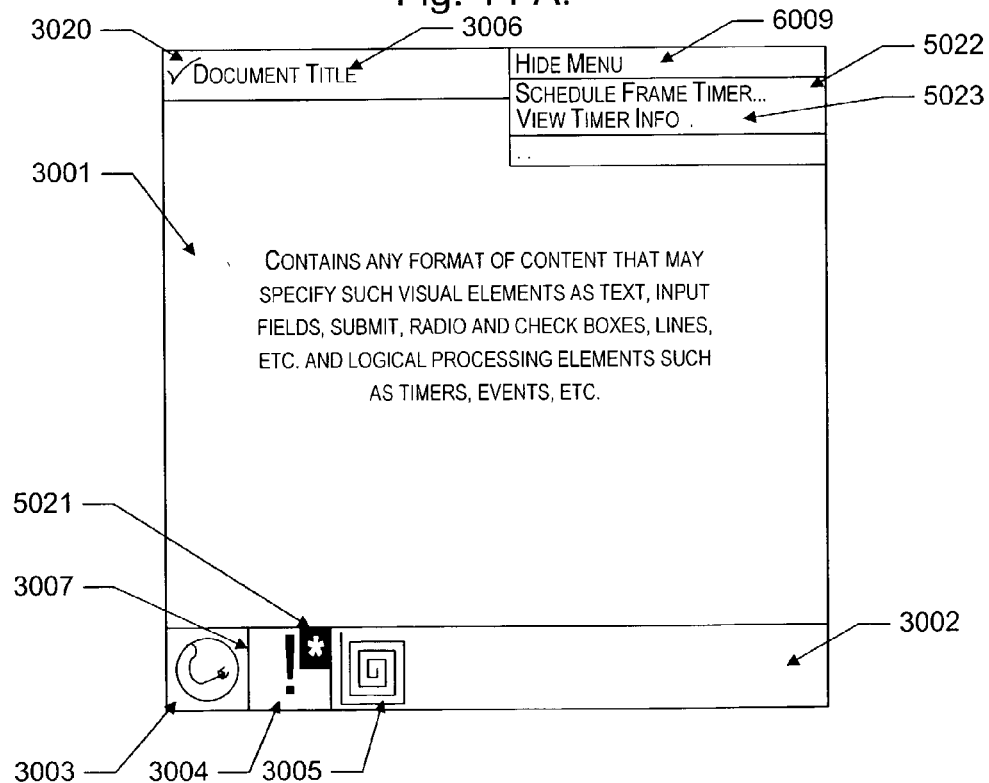
Figure 14:
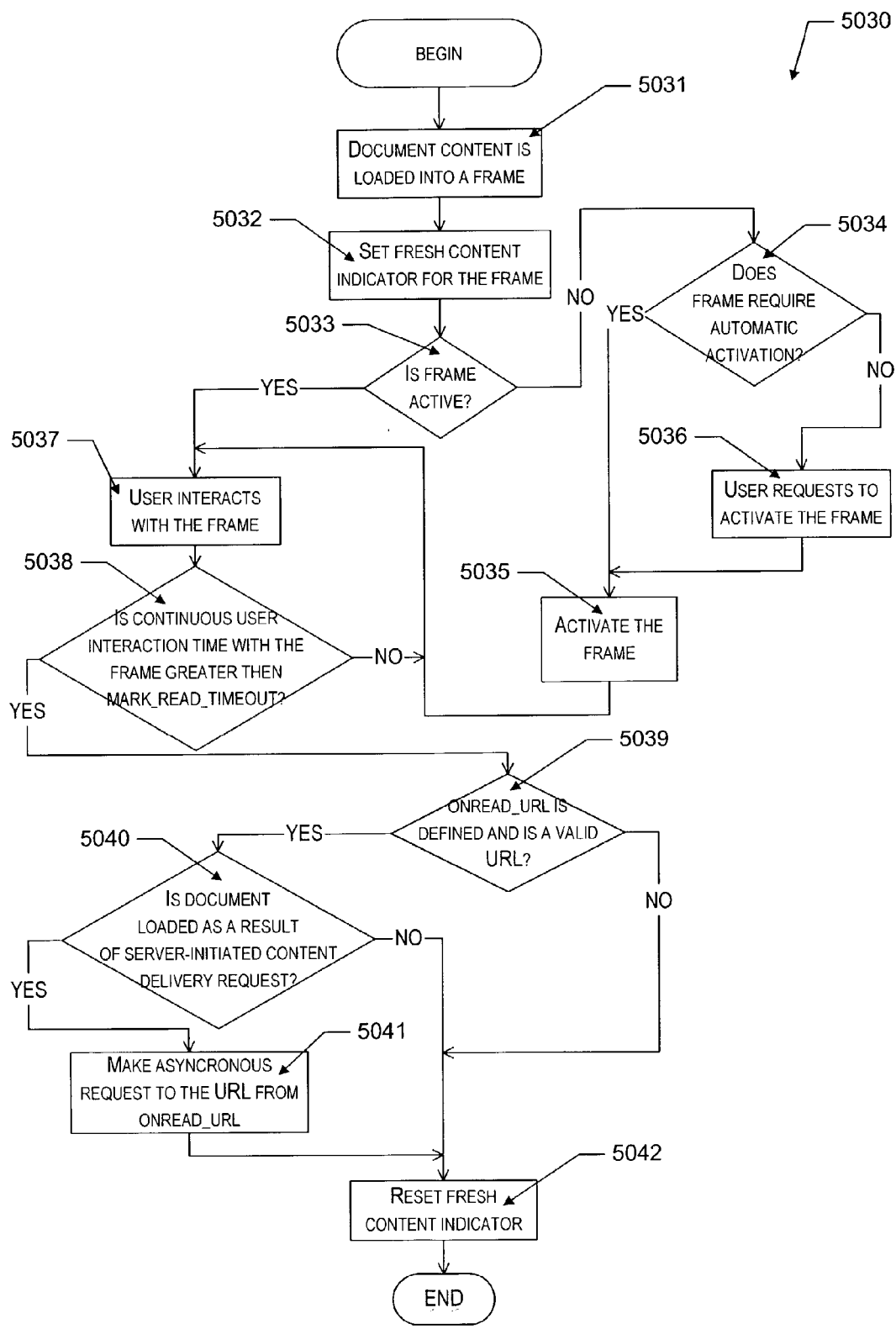

FIG. 14A illustrates the concept of dynamically generated navigation icons 5001,5002 that can be used along with default 3003, custom-defined 3004, 3005 frame icons and user-assigned icons from the icon library. Dynamically generated icons enhance intuitiveness of the interface for regular WAP, HTML and other applicable types of applications in the way that they automatically visually differentiate frames with icons in the frame bar 3002, which results in greater user convenience and productivity for navigation between multiple frames. Automatic icons may be used in case there are no custom or user-specified icons. In the present implementation, the PAT 22 contains one automatically assigned icon per each letter in the supported alphabets, which is used for presenting WML, SVG and other documents that do not have icons defined in the other ways. The decision on choosing the appropriate icon may be made based on the domain name of the URL being loaded by stripping off "http://","https://","www.", "wap.", or any other applicable prefixes. If the stripped URL starts with the digit or some other symbol, not included in the automatic icons list, the default icon 3003 may be used for the frame.

For example, according to this algorithm icon depicting English letter "Y" will be automatically chosen for a document from http://wap.yahoo.com URL. It is understood that the actual algorithm of choosing the automatic icon can enhanced to handle other situations, which can be accomplished by those skilled in art.

FIG. 14B illustrates the frame icon 3004 with fresh content indicator 5021, which denotes that the frame was not yet viewed since the last content update. In the present embodiment fresh content indicator 5021 is initially shown for each frame that was loaded by the PAT 22, but was not yet activated by user or was in the active state for less than configured MARK_READ_TIMEOUT value (default value is 3 seconds). It is understood that the timeout may be adjustable by the user. Once the user activates the frame and views its content for more that the above timeout the fresh content indicator 5021 is automatically removed from the frame icon 3004. It is understood that the actual representation of the content indicator may differ in other implementations. It is also understood that the user can at any time revert the indicator 5021 back by marking the frame as "unread". However, the application state changed due to execution of routine 5030, which utilizes onread_url, (see FIG. 14C) may not reflect the change of read status in the application server and may mark the frame as unread to the PAT 22 only. Transition to the unread state can be done in any way using the design guidelines for the device for which implementation is done, for example, with popup menu item or keyboard shortcut. Similar approach may be used to indicate other conditions to the user such as document importance or any other conditions of interest.

FIG. 14C is a logic flow diagram illustrating content delivery status notification logic 5030. The algorithm uses the notion of system variables, (see the logic described in FIGS. 20A–B).

Routine 5030 starts by following to routine 5031, which is executed each time document content is loaded into a frame in the PAT 22 and the frame is registered in the framebar and in frames 1028 and active documents 1029. Routine 5031 follows to routine 5032, which may set the fresh content indicator 5021 for the frame icon in the framebar. Then it follows to routine 5033, which checks if the frame is currently active. If the frame is active, the "YES" branch is followed to routine 5037. If the frame is not active, the "NO" branch is followed to the step 5034, in which the frame properties are checked if the frame requires automatic activation. If the frame does require automatic activation, the "YES" branch is followed to routine 5035, which activates the frame according to activation algorithm described in this specification. If the frame does not require automatic activation, the "NO" branch is followed to routine 5036, which waits in background for user request to activate the frame. When user decides to activate the frame, the routine follows to routine 5035. Routine 5035 follows to routine 5037, in which user interacts with the frame and performs various frame-related actions. Routine 5037 follows to routine 5038 which checks the amount of time user interacted with the frame continuously starting from the activation request. If the amount of continuous interaction time is still less than MARK_READ_TIMEOUT, the "NO" branch is followed to routine 5037. If the amount of time exceeds MARK_READ_TIMEOUT adjustable value (which by default is 3 sec.), the "YES" branch is followed to the step 5039, in which the value if onread_url is read and checked to be a valid URL. If the value is defined and represents a correct URL, the "YES" branch is followed to routine 5040. If the value either is not defined or is not valid, the "NO" branch is followed to routine 5042.

Routine 5040 checks the origin of the content in this frame, whether it resulted from server- or PAT-initiated request. If the PAT 22 initiated the request, the "NO" branch is followed to routine 5042. If the request was initiated by server, the "YES" branch is followed to routine 5041, which may make an asynchronous request to the URL specified as onread_url variable value, which will notify the server of the frame being read by the user. Routine 5041 follows to routine 5042, which resets fresh content indicator 5021 from the frame icon and follows to the "END" step, which concludes routine 5030.

Figure 15:
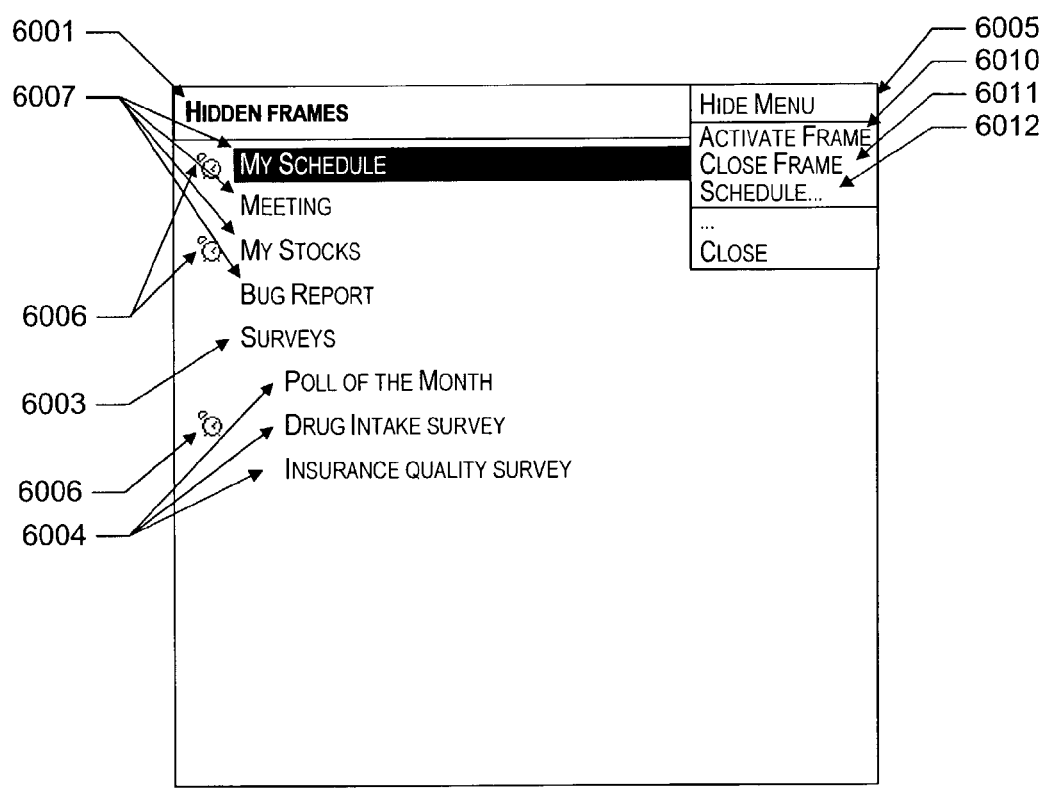
FIG. 15A illustrates hidden frame view capabilities of the PAT.
FIG. 15B illustrates frame timer scheduler interface.
FIG. 15C illustrates first step of the implementation of the frame-persistent DO elements in the PAT.
FIG. 15D illustrates second step of the implementation of the frame-persistent DO elements in the PAT.
FIG. 15E is a logic flow diagram illustrating frame-persistent life cycle for the DO elements displayed in the PAT.
FIG. 15F is a logic flow diagram illustrating do processing for FIG. 15E.
Figure 15:
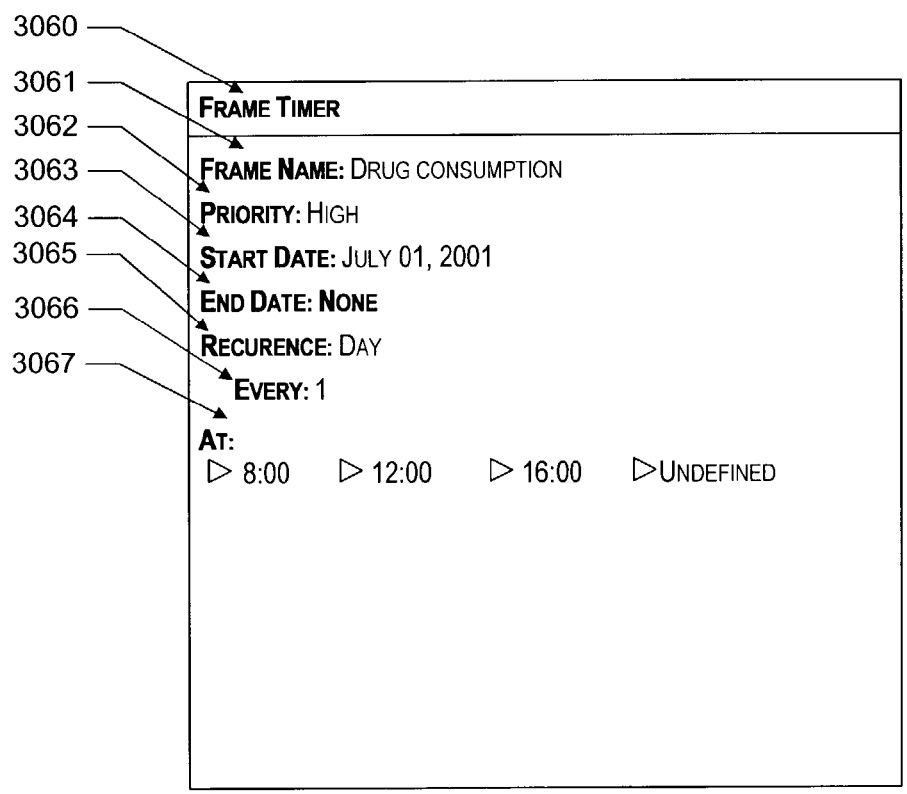
Figure 15:
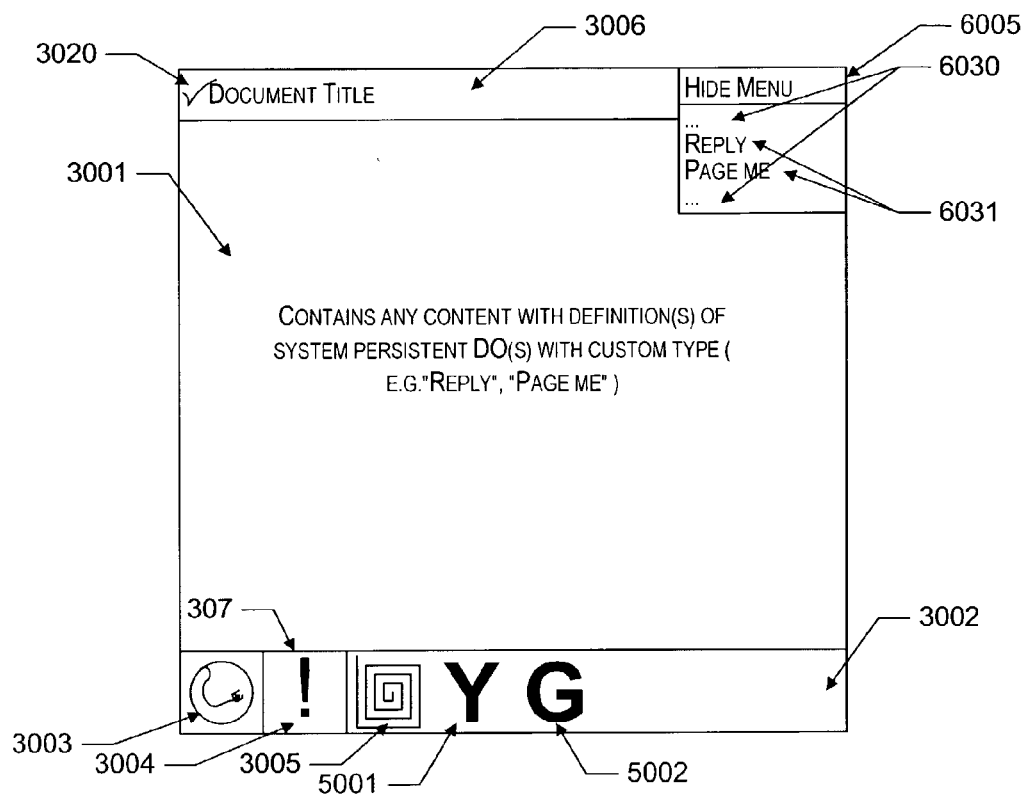
Figure 15:
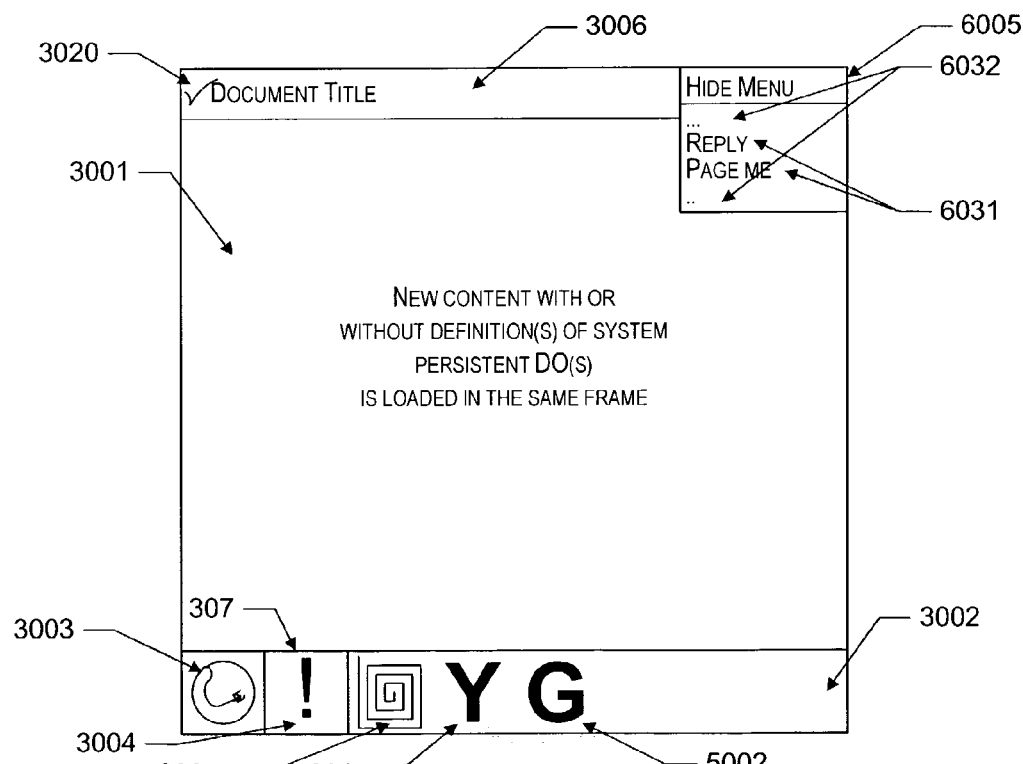
Figure 15:
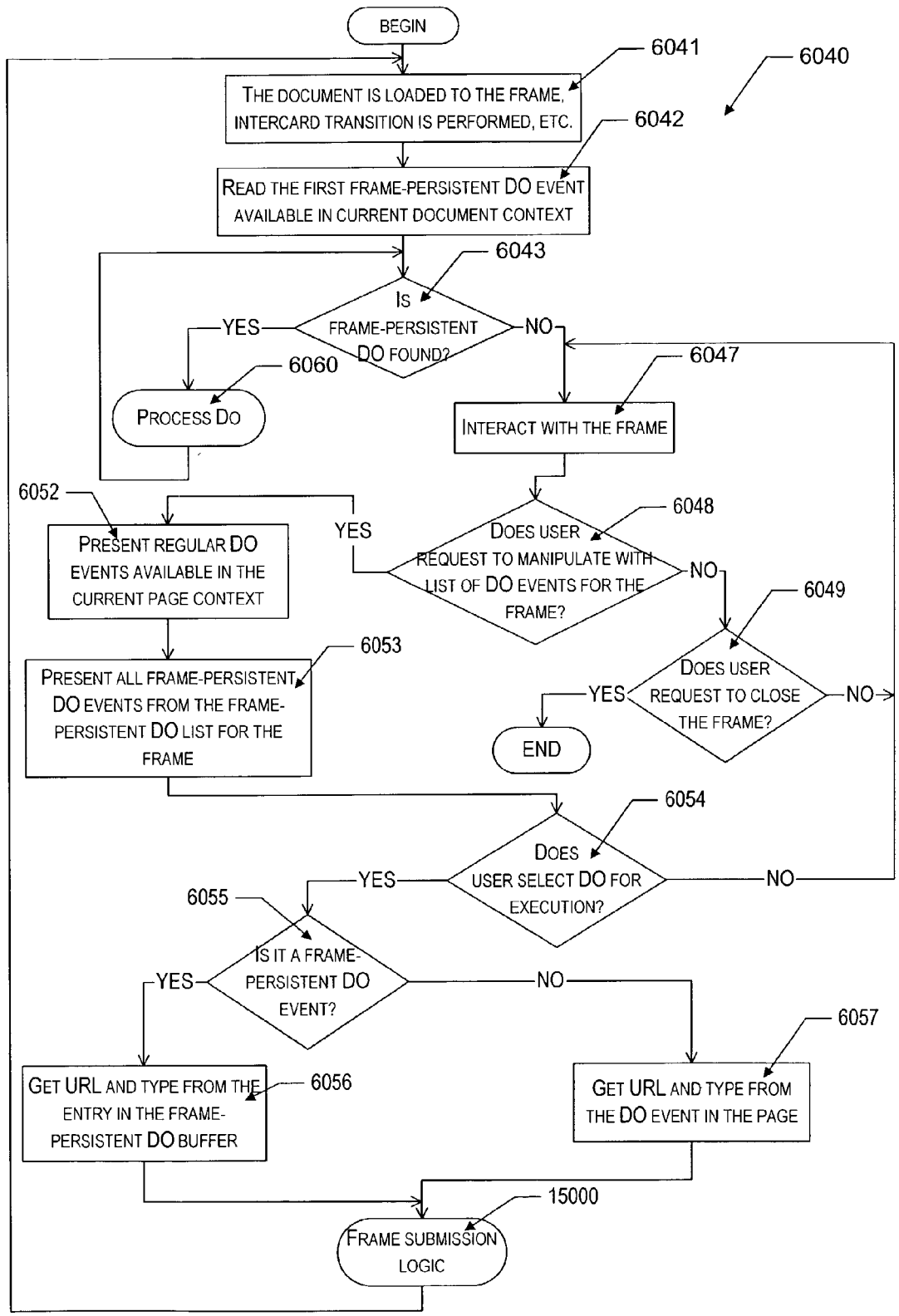
Figure 15:
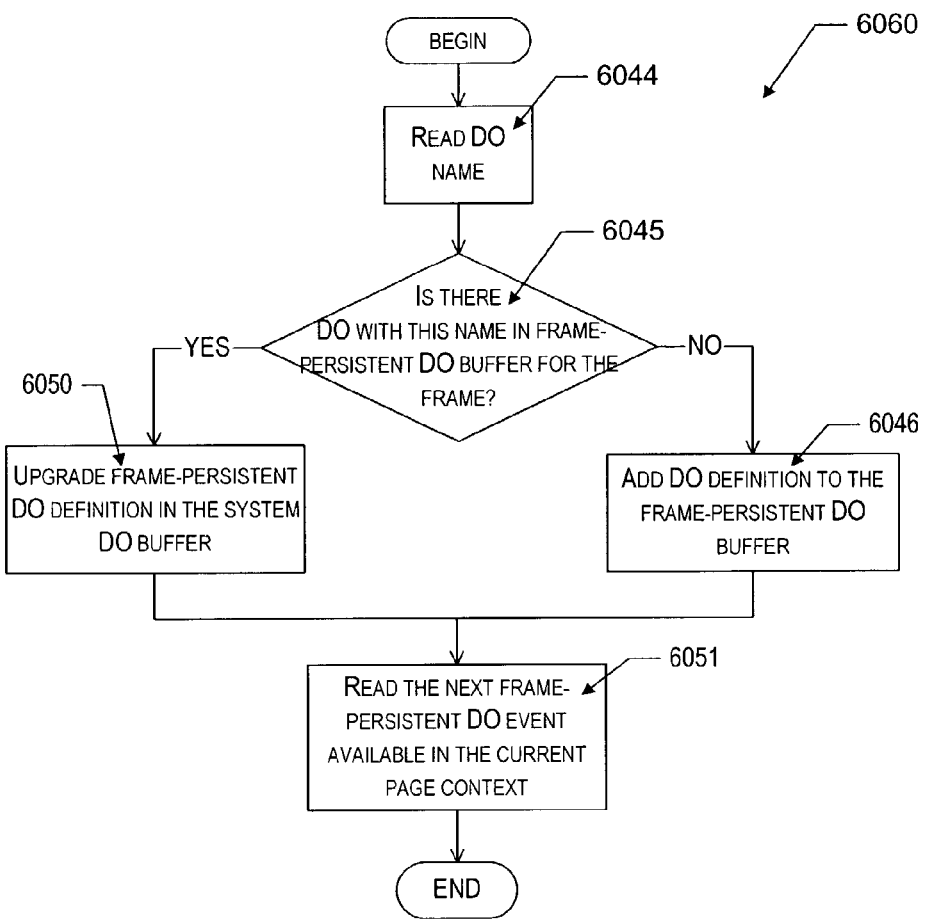

FIG. 15A illustrates an optional concept of hidden frames. Usually the active frames are identified in the frame bar with icons. However, often it is convenient to maintain a frame for a period of time, for it to be able to receive server-initiated content delivery requests and execute scheduled events as well as to preserve the frame content, but not reflect the frame on the frame bar with an icon in order to simplify frame bar navigation by decreasing the number of concurrently displayed icons.

Also often there is a need to schedule frame activation for some specific moment in time later once or recurrently. To enable this functionality the PAT 22 may feature a list of hidden frames that are not visible to the user. These frames are accessible through the hidden list. It is understood that the PAT 22 allows the user to access the list, activate or close the frames, schedule automatic frame activation events, etc. The list shows hidden frame identifier 6007 (which in the current embodiment is implemented as the title of the document or if the title is not defined-URL the document was loaded from), and associated timer indicator 6006 (which is shown at the left of the frames that are scheduled for automatic activation). Through an optional popup menu 6005, the user can interact with the hidden frame list 6010, 6011 and view/change/cancel timer parameters 6012. It is understood that interaction with the list may be accomplished with any device-specific techniques, and that the figure shows the preferred method of doing so via popup menu items. With the popup menu the user can at any moment of time activate frame from the hidden list "Activate Frame" 6010, close the frame, which stops frame and hidden frame lifecycle for the frame, "Close Frame" 6011, or schedule frame location-driven activation and/or timers "Schedule . . . " 6012. It is understood that the list of actions to be performed with the frame may include other commands along with those described herein.

The hidden list also may allow related frame grouping based on hierarchical frame names. For related frames, the application may define the frame names with the same category name prefix separated with a special category separator supported by the PAT 22 (e.g. "/"). The PAT 22 parses the name while assembling the hidden list and groups frames that have the same category names together presenting their titles 6004 under the category name read from the frame_name system variable 6003. It is understood that the grouping is done on the presentation level only, and the frames may be assigned separate frame timer values, activated separately, etc. Different embodiments may choose to implement either unlimited number of nested category levels in the hidden list (hierarchy), or limit the number of nested levels supported to a fixed number for performance and/or other reasons (e.g. simple grouping of 1 level, etc.) or not implement this feature.

FIG. 15B illustrates optional frame timer scheduler. Frame timer scheduler may allow user to schedule, reschedule or cancel timer events for the frame. The scheduler may allow setting timer priority, exact or relative execution date(s) and time(s), date or time range when the timer is recurred, recurrence intervals, actions to be performed when the timer is executed, and notification settings, etc. The figure illustrates typical timer scheduling screen, which is an example of the one of the settings described above. This example is not intended to limit the generic nature of the present invention in respect to timer functionality and management capabilities provided to the user for managing such functionality.

The figure presents the screen with the following elements:
- frame name for which scheduling is requested, in this example "Drug Consumption" 3061;
- notification priority, in this example "High" 3062;
- scheduler dates, in this example start date "Jul. 1, 2001" 3063 and end date "None" 3064;
- timer recurrence, in this example "Day" 3065, "Every:1" 3066, "At: 8:00, 12:00, 16:00" 3067 mean that the timer should execute every day at 8:00, 12:00 and 16:00 o'clock.

Another possible extension to UI interface was invented in the PAT 22: frame-persistent DO action element. Frame-persistent DO is an extension to WML DO item which in the current implementation is represented as a menu item, however, other implementations may exist in the boundaries of the concept. Frame-persistent DO remains persistent for the whole frame life cycle after it is defined with the help of PAT-recognizable custom DO or other similar actionable control or element.

FIG. 15C illustrates first step of sample implementation of frame-persistent DO in an application. In the screen we see the frame with the original content, which defined two frame-persistent DO items namely "Reply" and "Page me" 6031, along with other regular DO items for the document. The user may select any DO item in this document and associated event will be executed. At this point the system DO items are not different from regular DO items.

FIG. 15D illustrates the second step of sample implementation of frame-persistent DO in an application. To arrive at this step user has loaded different content into the same frame as in the step 1. Normally request to load a new content into the same frame fully substitutes the list of DO items as well as document presentation in content area 3001. However, there are application-specific situations when there is a need to keep some of the functions from the previous document while substituting others. Frame-persistent DO addresses this problem, by presenting frame-persistent DO items 6031 from the previous content along with the new regular DO items (if any) defined in the new document content. A good example of such need is in an instant messaging application that caches templates on the device and updates them from the server as required when they change while the message recipient wants to send a completely different document to the sender in response to the original message, the sender will only have to send the frame with system persistent DO in it containing return address information to send to and it will be available for any content in the frame, whether it is a specially designed reply document or just a WAP, HTML, or other applicable document downloaded from Mobile Network 50. Another example is performing multiple submissions to the same address but with different content without creating submission entry point (DO item) in each document, but just declaring it in the first document loaded to the PAT 22, and other occasions.

FIG. 15E is a logic flow diagram illustrating frame-persistent DO logic and lifecycle routine 6040. Routine 6040 is typically implemented by Presentation Logic Engine 1031. Routine 6040 starts by following to routine 6041 whenever some document context change occurs in the frame, for example new document content is loaded in the frame, inter-card transition is performed, frame is open, etc. Routine 6041 follows to routine 6042, in which the engine 1031 reads the first frame-persistent DO definition available in the current document context (e.g. current card, its content and template WML elements, but not the cards that are not current). Routine 6042 follows to step 6043, in which the engine checks if the frame-persistent DO was found. If there was no frame-persistent DO found, the "NO" branch is followed to routine 6047, in which user interacts with the frame. If the frame-persistent DO was found, the "YES" branch is followed to routine 6060, which processes found DO item and proceeds to step 6043 again.

Continuing from routine 6047. When user requests any action on the frame, the routine follows to step 6048, in which the action is checked to be a request to view and manipulate with the DO items for the frame (for example view the list of DO items to choose which one to execute, etc.). If the action is not a request to manipulate with the DO list, the "NO" branch is followed to step 6049. Note that this routine does not address details on any actions that user can perform with the frame related to other events, but manipulating DO items. For more detail frame life cycle see FIGS. 33A–B. In step 6049 the engine checks if the action is to close the frame. If the request is to close, the "YES" branch is followed to the "END" step, which concludes routine 6040. If the action is not to close the frame, the "NO" branch is followed to routine 6047.

If in step 6048 the user did request manipulation and review of the DO list, the "YES" branch is followed to routine 6052, which collects and forms the list of regular DO items defined in the current document to be shown to the user and follows to routine 6053. Routine 6053 collects and forms the list of all frame-persistent DO items accumulated in the frame-persistent DO list for the frame and after merging the two lists presents them to the user through some implementation-specific presentation method (e.g. popup menu items or audible phrases, etc.). When user requests an action on the list, step 6054 is executed, which checks if the user requested a DO execution. If the action was not to execute the DO actions (e.g. close popup menu), the "NO" branch is followed to routine 6047. If the action was to execute selected DO item, the "YES" branch is followed to step 6055, in which the engine checks whether the selected DO belongs to frame-persistent or document-defined regular DO items. If the DO is a frame-persistent DO, the "YES" branch is followed to routine 6056, which obtains URL, type and other needed information regarding the DO from frame-persistent DO list for the frame. If in step 6055 the DO was a regular DO defined in the document, the "NO" branch is followed to routine 6057, which gets URL, type and other information for execution following standard algorithm from the document. Routines 6056 and 6057 follow to routine 15000, described in FIG. 24A, which performs data submission using the URL, eventually delivering document content along with the submission data if configured by application developer or user. Routine 15000 follows to routine 6041 in case user changed current frame document by this submission.

FIG. 15F is a logic flow diagram illustrating DO element processing as a part of routine 6040-routine 6060. Routine 6060 starts by following to the routine 6044, which extracts DO element data including the name and follows to step 6045. In step 6045 the engine checks in frame-persistent DO list for the frame for the DO item with the same name. If such DO item exists, the "YES" branch is followed to routine 6050, which considers the information as update to the information already stored and updates found DO data with the fresh information read from the document. If no such DO item was found at the step 6045, the "NO" branch is followed to routine 6046, which adds a new record to the frame-persistent DO list containing information from the DO in the document. Routines 6050 and 6046 follow to routine 6051, which reads the next frame-persistent DO definition from the document content and follows to the "END" step delivering the DO data to the caller routine (see routine 6040).

The described persistent DO logic is an optional extension that may be used to enhance the PAT functionality.

The PAT 22 may feature a number of enhanced controls that enhance user productivity while interacting with the documents. The WAP WML Specification and similar specifications define basic list of input controls, which often fail to address use case patterns for interactive applications. The present algorithm allows defining custom controls that fit various working patterns without altering the content capability. The same source content in the present embodiment is intended to be acceptable by the PAT 22 and any other compliant WAP browser.

Figure 16:
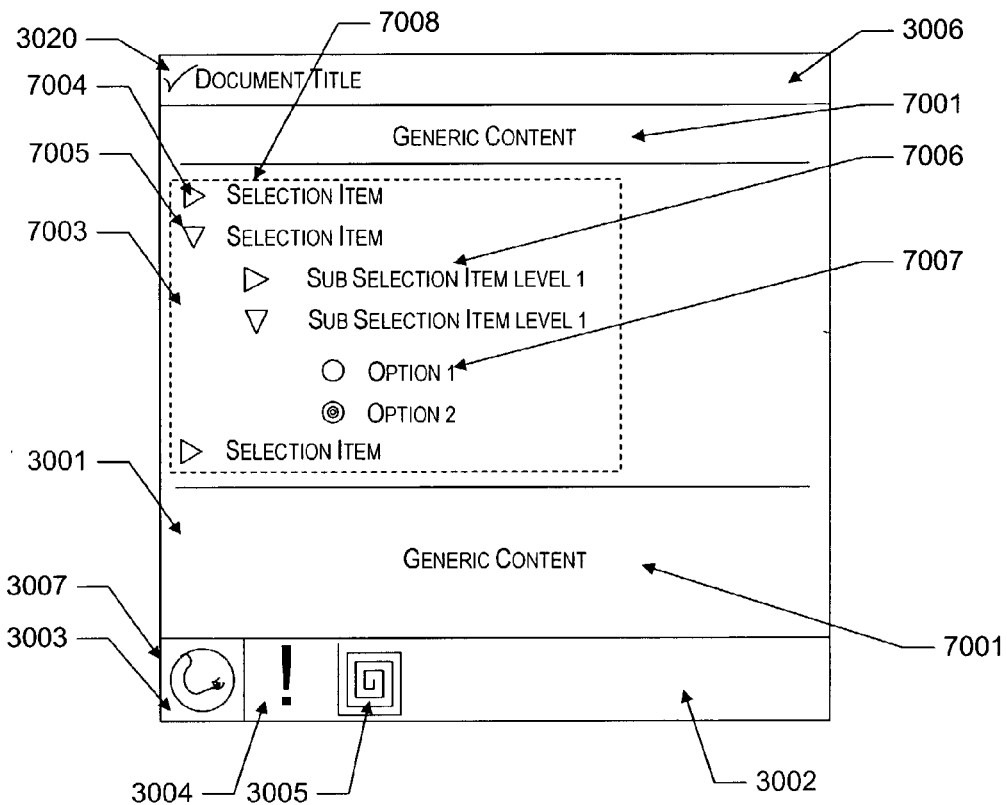
FIG. 16A illustrates visual representation of the enhanced screen control: hierarchy.
FIG. 16B illustrates visual representation of the enhanced screen control: formatted input field.
FIG. 16C illustrates visual representation of the enhanced screen control: option list.
FIG. 16D illustrates visual representation of the enhanced screen control: dropdown.
FIG. 16E illustrates visual representation of the enhanced screen control: action menu.
Figure 16:
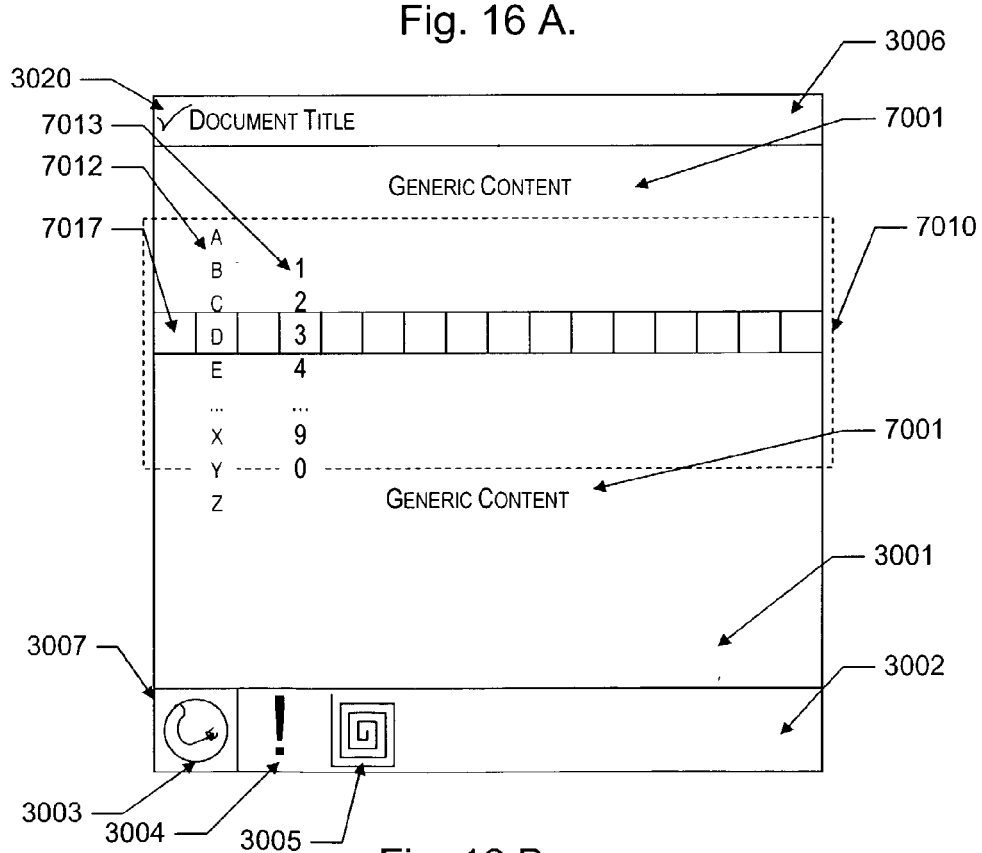
Figure 16:
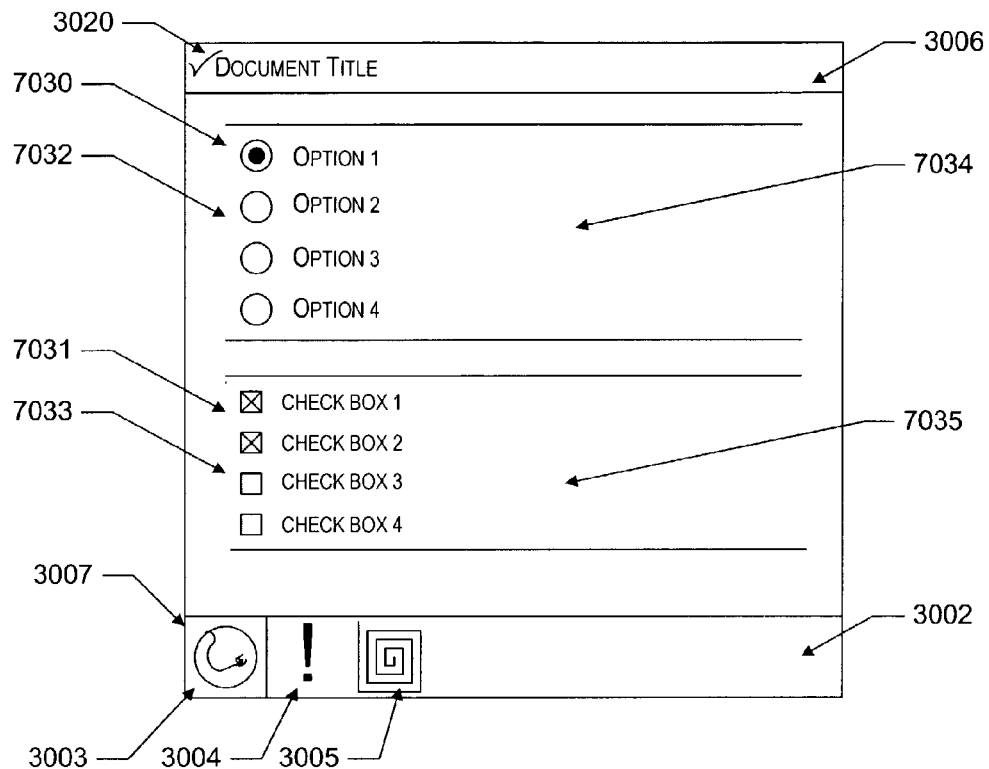
Figure 16:
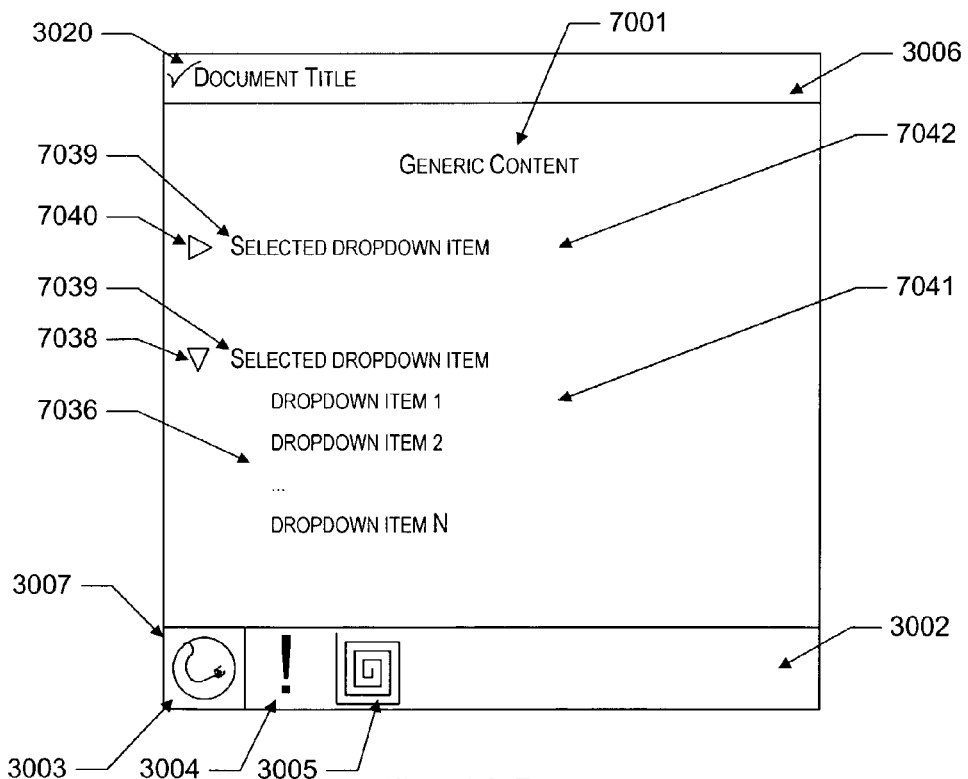
Figure 16:
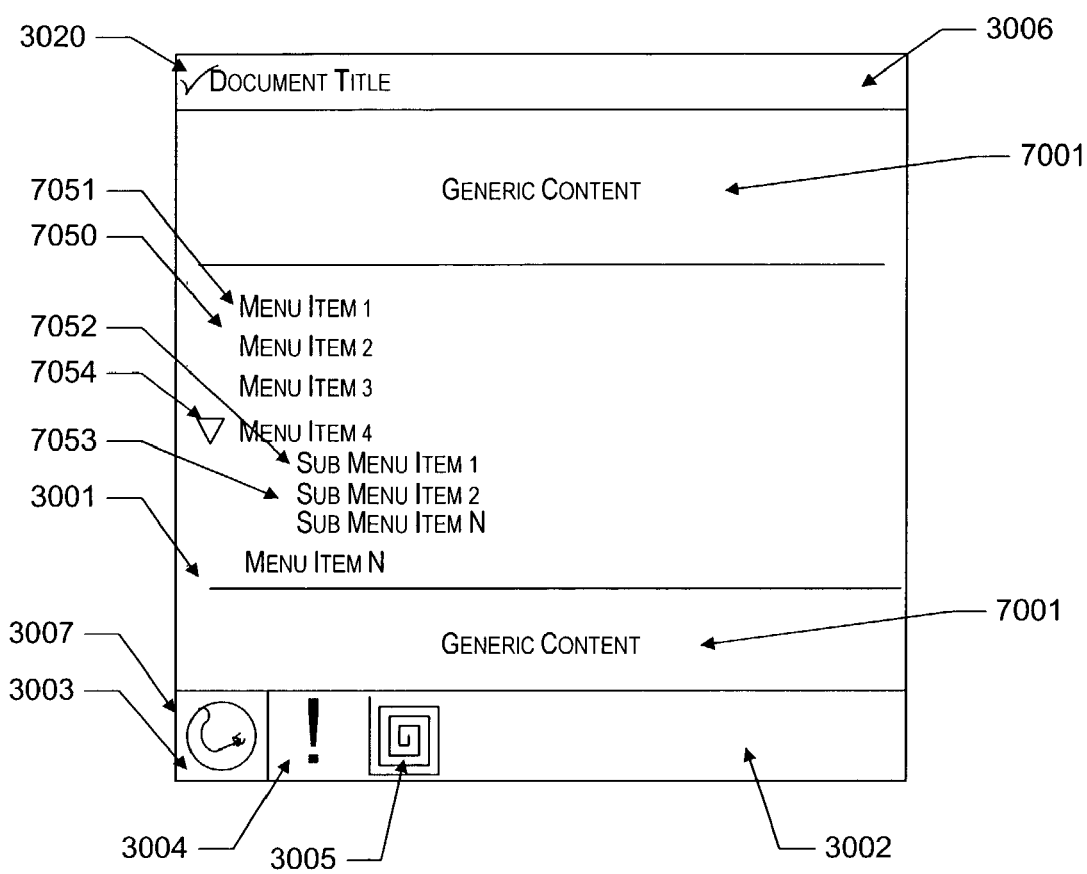

FIG. 16A illustrates one of the enhanced screen controls based on the WAP select field definition: hierarchy 7003. Hierarchy 7003 consists of multiple hierarchy levels 7006 that can contain other levels or options 7007. It is understood that hierarchy can contain single- or multi-select options 7007. Each hierarchy level 7006 can be collapsed in which case all options 7007 and nested hierarchy levels 7006 are not visible and collapse indicator 7004, 7005 shows collapsed state 7004; or it can be expanded in which case all nested options 7006 are listed underneath the hierarchy level and so are all directly nested hierarchy levels 7006 and collapse indicator 7004, 7005 shows expanded state 7005. Each hierarchy level may have associated name 7008, which is given to it by document content developer and can be customized by those skilled in art. It is understood that the hierarchy 7003 can be used anywhere in the content area 3001. FIG. 16A illustrates hierarchy 7003 surrounded by any custom content (including WML, HTML, SVG, etc) 7001, which in turn may contain any combination of text, rich text and other controls. It is understood that content 7001 can be omitted by those skilled in art while designing content layout.

FIG. 16B illustrates one of the enhanced screen controls based on the input field with format definition: formatted input field 7010. Formatted input field 7010 presents a way to perform form filling faster where there are filters defined for entry values by the developer of the document content. Formatted input field 7010 shows a single-character entry box 7017 for each character with formatting and associates list of values 7012, 7013 with it as well as the case defined in the format mask (e.g. uppercase, lowercase, digits, etc). It may combine more than one character boxes in one (e.g. when format defined for multiple characters at once). It also enables shortcuts for entering data in such entry boxes 7017 by utilizing the most natural technique for the particular device platform (e.g. thumb roll and thumb click on RIM) and automatically switches the entry case when user focuses in the box. The static text defined in filter by the content developer is presented on screen in the best possible way between appropriate single- (or multi-) character entry boxes. The algorithm of parsing format mask is described in FIGS. 19A–B.

FIG. 16C illustrates one of the enhanced screen controls based on the select field: options 7034.

There are two variants of the control: single select 7034 and multi-select 7035. Single-select field 7034 contains options 7030, 7032, while multi-select field 7035 contains checkboxes 7031, 7033. Options and checkboxes can be in selected 7030, 7031 or deselected state 7032, 7033. Single-select 7034 is different from multi-select 7035 in the number of choices that can be selected simultaneously ("1"—for single-select, and ">=0"—for multi-select). It is understood that such controls can be surrounded by any content, which depends only on the document design defined by the document developer.

FIG. 16D illustrates one of the enhanced screen controls based on the select field: dropdown 7042, 7041. The dropdown control consists of only one level 7039 with no sublevels in it; this one level consists only of options 7036. This control can represent single-select field only; hierarchy 7008 will be used for similar level structure in multi-select field. The dropdown control has 2 states: collapsed 7042 and expanded 7041.

In the collapsed state 7042, the selected item title 7039 is shown at the right of the collapsed indicator 7040 (it is understood that the order and alignment of the indicator and title may be changed/reverted, for example, for right-handed languages). In the expanded state selected item title 7039 is shown in the top level right after expanded indicator 7038, and all options 7036 are shown underneath it, indented from the left. Whenever user selects an option from the choices 7036, its title will be reflected in the top level and dropdown will automatically collapse to collapsed state 7042. It is understood that selection may be done in both collapsed and expanded state by the most appropriate selection techniques for the device (e.g. by thumb roll or with input shortcut). The current implementation provides a way to switch between the states. It is understood that such control can be surrounded by any content, which depends only on the document design defined by the developer.

FIG. 16E illustrates one of the enhanced screen controls based on the select field: action menu 7050. The action menu control is similar to hierarchy, in the way that it can contain sublevels 7053 and shows sublevel state with collapse/expand indicator 7054, but its choices contain only option item title 7051, 7052 without selected indicator at the left. Each item that is not a group may have an associated event that submits user selection or initiate document navigation.

Unlike the hierarchy it may contain no sublevels but only options or checkboxes on the top level. The selection technique used in the current implementation is the same as in the hierarchy control 7003. It is understood that such control can be surrounded by any content, which depends only on the document design defined by the developer.

The optional status indicator 3020 shown in FIGS. 12A–16E at the top-left corner of the screen allows user to obtain additional information on the PAT communication status and number or reties made. The indicator is also capable of reflecting different statuses for synchronous and asynchronous submissions. It is understood that there are multiple possible ways to implement such indication and other implementations may be optimized for the host device and user interface.

Figure 17:
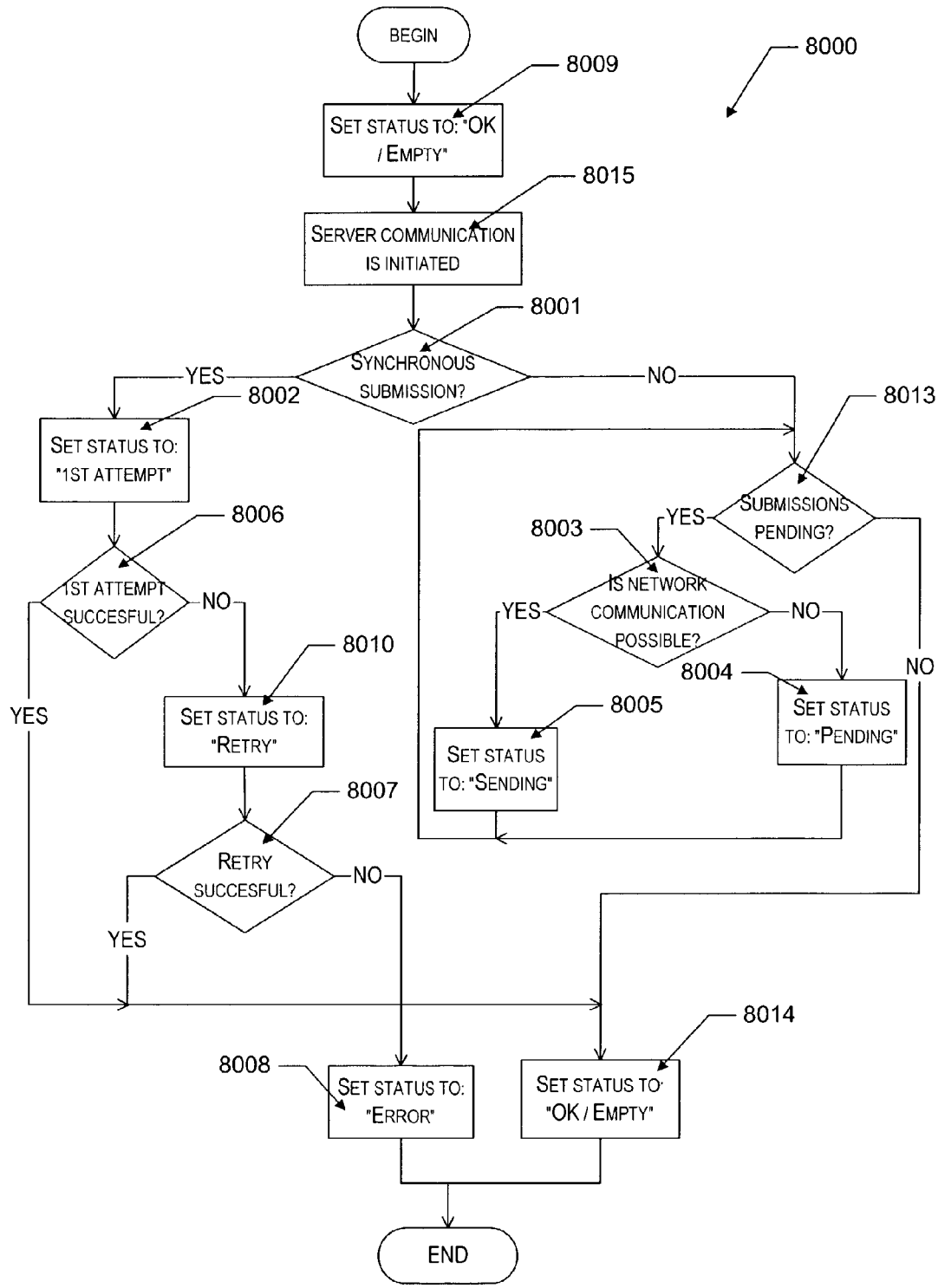
FIG. 17A is a logic flow diagram illustrating transition logic for the frame status indicator.
FIG. 17B illustrates the possible status indicators that are used by the PAT.
Figure 17:
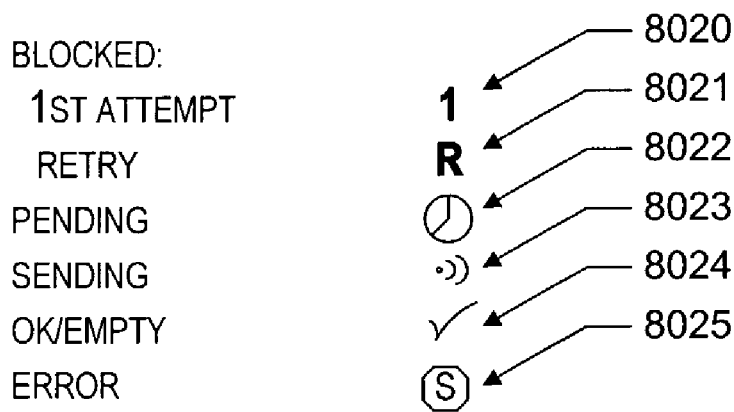

FIG. 17A is a logic flow diagram illustrating transition logic for status indicator 8000. Routine 8000 is typically implemented by the Presentation Logic Engine 1031 in cooperation with Transaction Manager 1034. For each state in status indicator 3020 there may be an icon, as documented in FIG. 17B. Routine 8000 starts by following to routine 8009 in which the engine 1031 initializes the status indicator 3020 with "ok/empty" icon 8024 and stays in idle mode anticipating user submissions from the frame. Whenever a submission from the frame occurs routine 8009 follows to routine 8015, which initiates server communication if needed and follows to routine 8001, in which the engine 1031 checks according to the frame submission logic 15000 whether submission is synchronous. If the submission is synchronous, the "YES" branch is followed to routine 8002, which initiates server communications using Mobile Network 50 and changes frame status indicator 3020 to "1st attempt" icon 8020. If the submission in step 8001 is identified as asynchronous, the "NO" branch is followed to step 8013 in which the PAT 22 checks if there are pending submissions in the submission buffer.

If the first-attempt download was successful in step 8006, the "YES" branch is followed to routine 8014 in which the engine 1031 changes the status indicator 3020 to "ok/empty" icon 8024, displays the frame to the user. If the first-attempt download was not successful in step 8006, the "NO" branch is followed to routine 8010, in which the engine 1031 changes the status indicator 3020 to "retry" icon 8021 and initiates repeating download with the same parameters through Transaction manager 1034. Routine 8010 is followed to the step 8007 in which like in step 8006 the retry download attempt is checked to be successful. If the retry download attempt is successful in step 8007, the "YES" branch is followed to routine 8014. If the retry download attempt was not successful, the "NO" branch is followed to routine 8008, in which the engine 1031 unlocks the frame, sets the status indicator 3020 to "error" icon 8025 and reports error to the user in the most appropriate way, without changing content and/or browser context data.

Continuing from the step 8013. If the network is active and accessible, the "YES" branch is followed to step 8003 in which Communication Stack 1022 checks if the network is active and accessible and reports the status back to Transaction Manager 1034. If the communication is possible, the "YES" branch is followed to routine 8005, in which the transaction manager 1034 initiates background communications for the next pending submission to server using Communication Stack 1022 and Mobile Network 50. If the network is not active or is not accessible, the "NO" branch is followed to routine 8004, in which the engine 1031 sets the status indicator 3020 to "pending" icon 8022 and waits for network events; whenever some event or notification from network comes it follows to step 8013

If there are no more pending submissions in submission buffer 1023 in step 8013, the "NO" branch is followed to the routine 8014. Routine 8005 follows to step 8013 for the next submission.

Routines 8008 and 8014 are followed by the "END" step, which concludes routine 8000.

It is understood that the indication of states with icons is only one of the possible embodiments; the other ones may user sounds, etc. depending on the device capabilities and user requirements. It is also understood that conditions and information other than those described in this specification may be indicated to the user.

FIG. 17B illustrates sample status indicator icons used in the current implementation. These icons are shown in status indicator 3020 (FIG. 12A) in response to routine 8000 in FIG. 17A. It is understood that the icons are a visual way of notifying user about current submission status and may be implementation-specific. The icons shown here are based on inventors' experience in designing user interfaces. The submission states they refer to are described as a part of routine 8000 in FIG. 17A.

Figure 18:
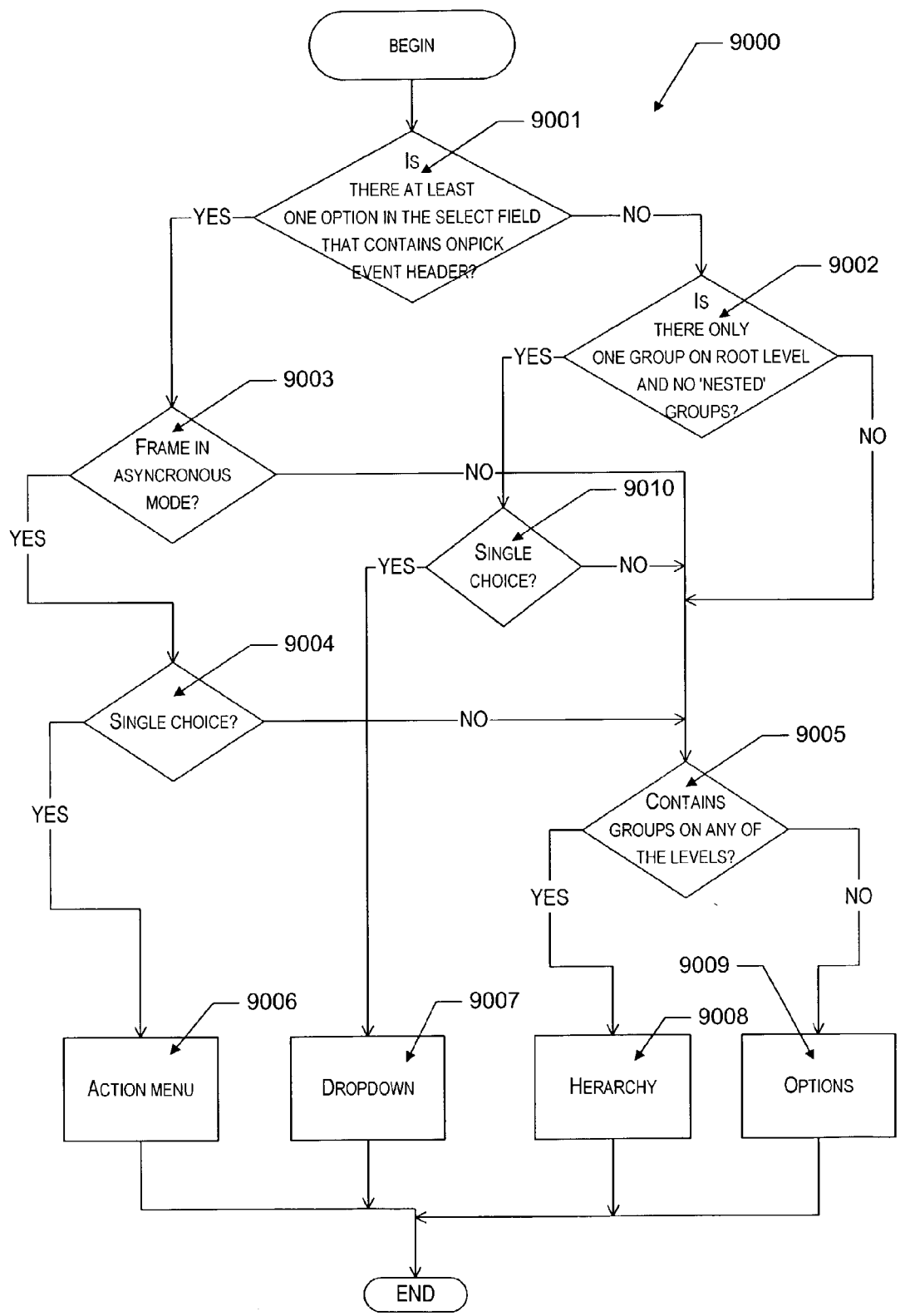
FIG. 18 is a logic flow diagram illustrating option control presentation logic.

FIG. 18 is a logic flow diagram illustrating option control presentation logic 9000. Routine 9000 may be implemented by Presentation Logic Engine 1031. In step 9001 the select field is checked for existence of "onpick" events in any of the nested options. If there are options with onpick events or similar elements, the "YES" branch is followed to step 9003, in which the engine 1031 checks if the frame is in asynchronous mode (through settings for onsubmit_async system variable). If the system variable is defined and contains "true" value (frame is asynchronous), the "YES" branch is followed to step 9004. If the frame is not asynchronous, the "NO" branch is followed to step 9005. Step 9004 checks select field selection mode. If only single choice allowed, the "YES" branch is followed to routine 9006 in which the engine 1031 defines the type of the control as Action Menu 7050, which is shown in FIG. 16E. If multiple simultaneous choices are allowed in step 9004, the "NO" step is followed to step 9005.

Continuing from the step 9001. If there are no such options, the "NO" branch is followed to step 9002. In step 9002, the engine 1031 checks the number of option groups on the top level of nesting in select field and number of nested levels. If there is only 1 group on the top level and it contains only options and no nested groups the "YES" branch is followed to step 9010, in which the engine checks selection mode for the field similarly to step 9004. If there is more than one group in the step 9002 and/or there are nested groups on the second and further levels or there are only options and no groups, the "NO" branch is followed to the step 9005 in which the engine tests whether there are groups on any level. If there are nested groups in step 9005, the "YES" branch is followed to routine 9008 in which the engine 1031 selects Hierarchy control 7003, shown in FIG. 16A. If there are no groups, the "NO" branch is followed to routine 9009, in which the engine 1031 selects Options control 7034, shown in FIG. 16C.

Continuing from step 9010, if the control allows single option selection only, the "YES" branch is followed to routine 9007, in which the engine selects Dropdown control 7041, 7042, shown in FIG. 16D. If multiple selections are allowed, the "NO" branch is followed to step 9005.

Routines 9006, 9007, 9008, 9009 are followed by the "END" step, which concludes routine 9000.

Figure 19:
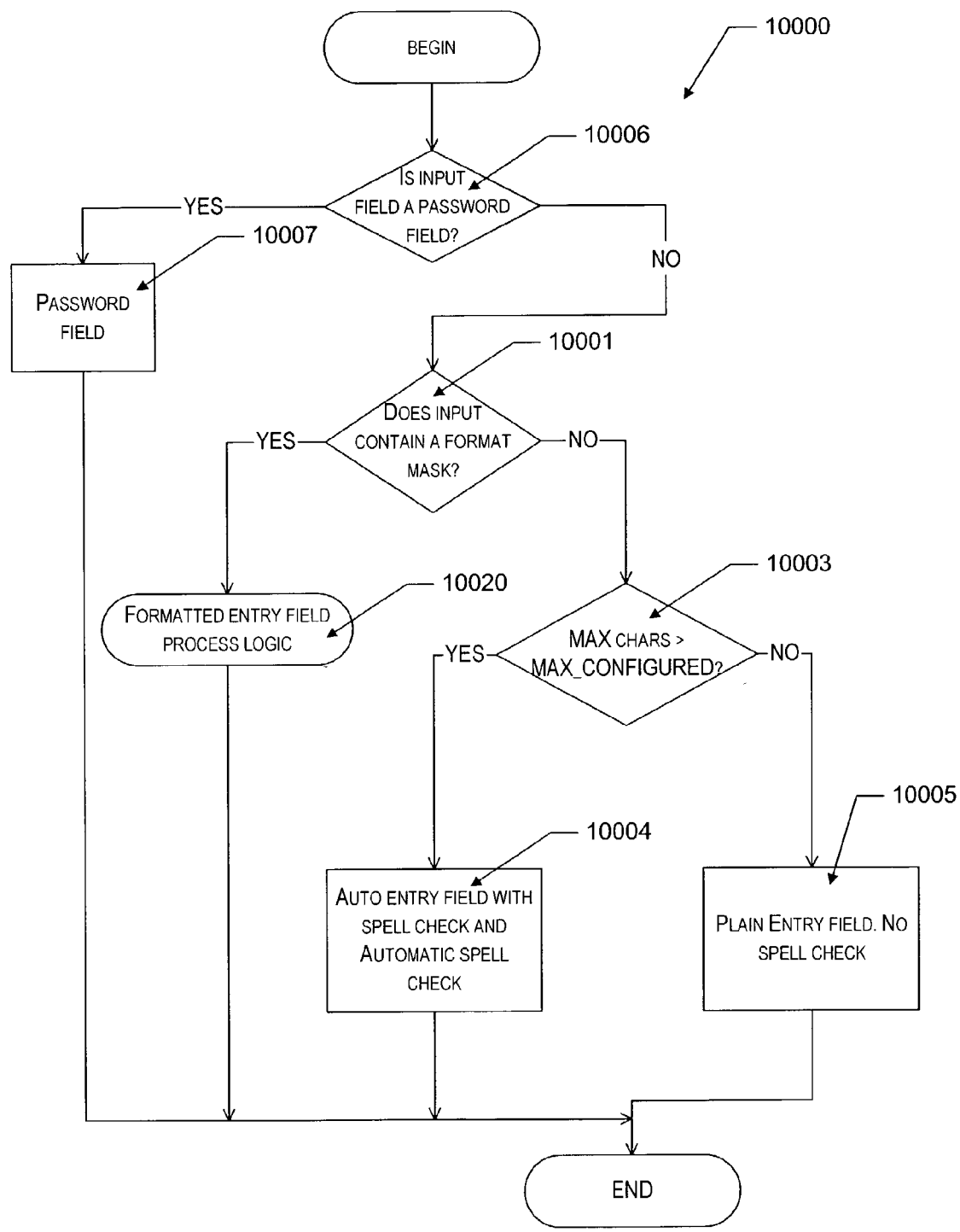
FIG. 19A is a logic flow diagram illustrating text entry field presentation logic.
FIG. 19B is a logic flow diagram illustrating formatted entry field presentation logic.
Figure 19:
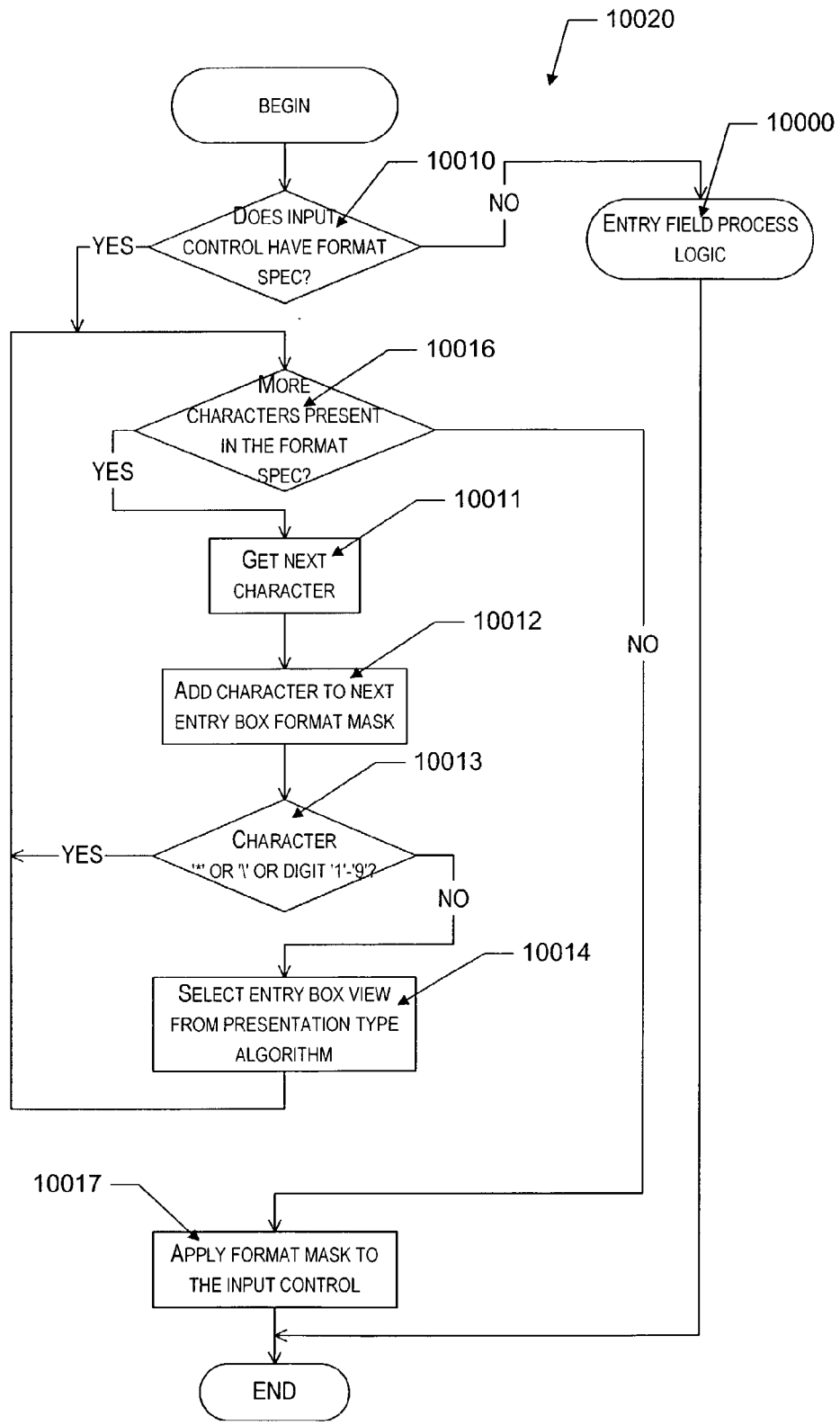
Figure 20:
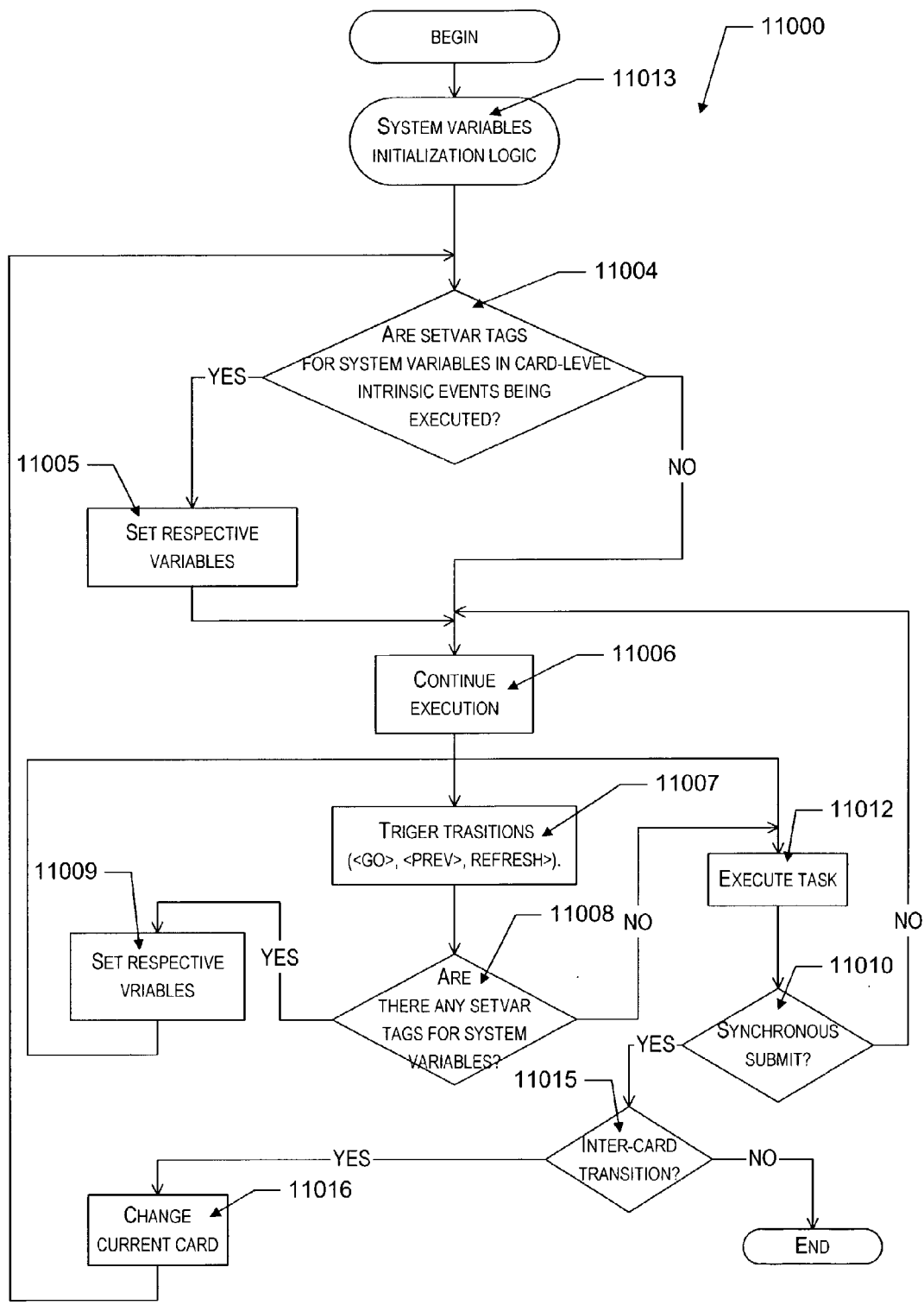
FIG. 20A is a logic flow diagram illustrating system variables life cycle.
FIG. 20B is a logic flow diagram illustrating system variables initialization logic.
Figure 20:
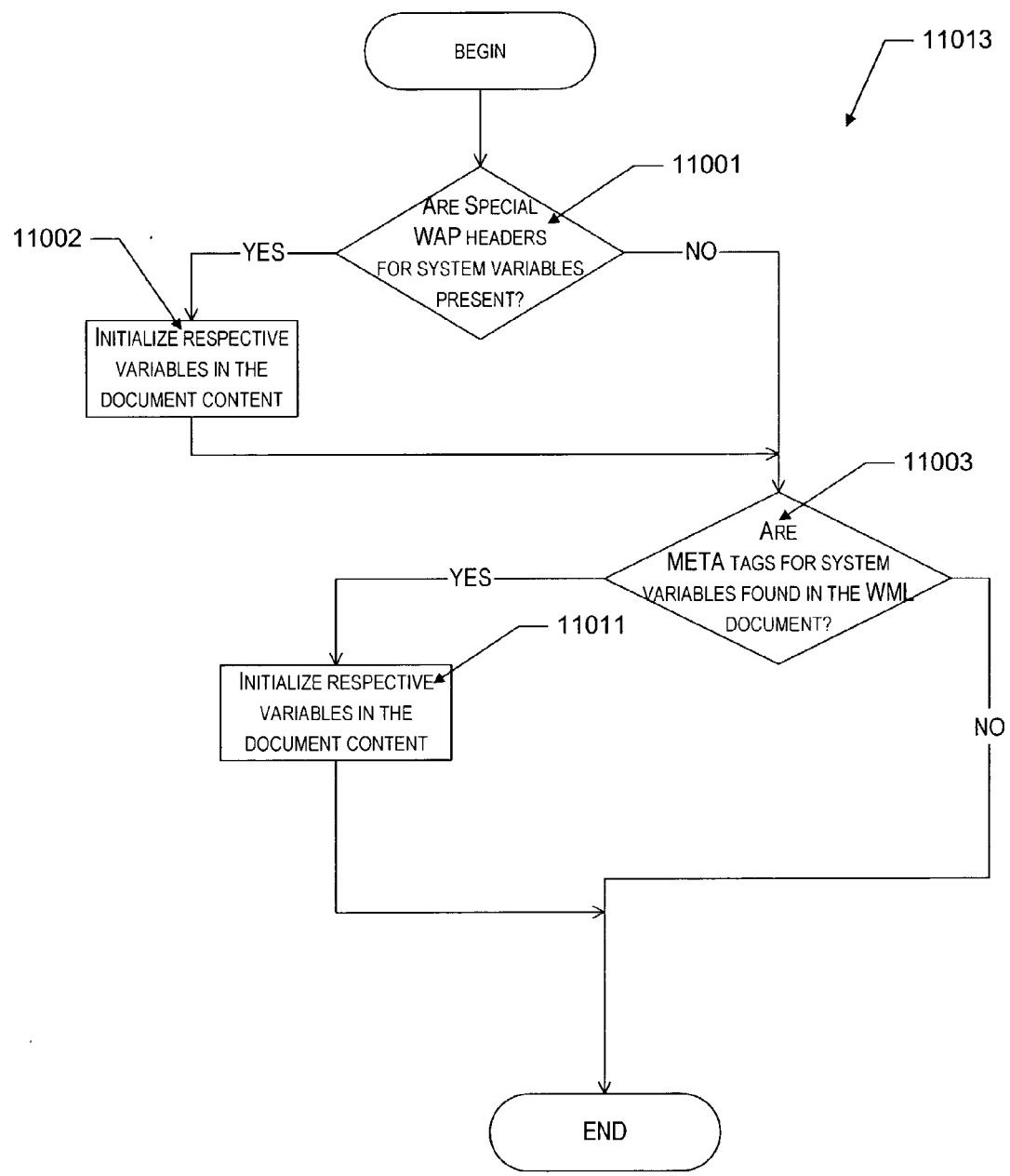
Figure 21:
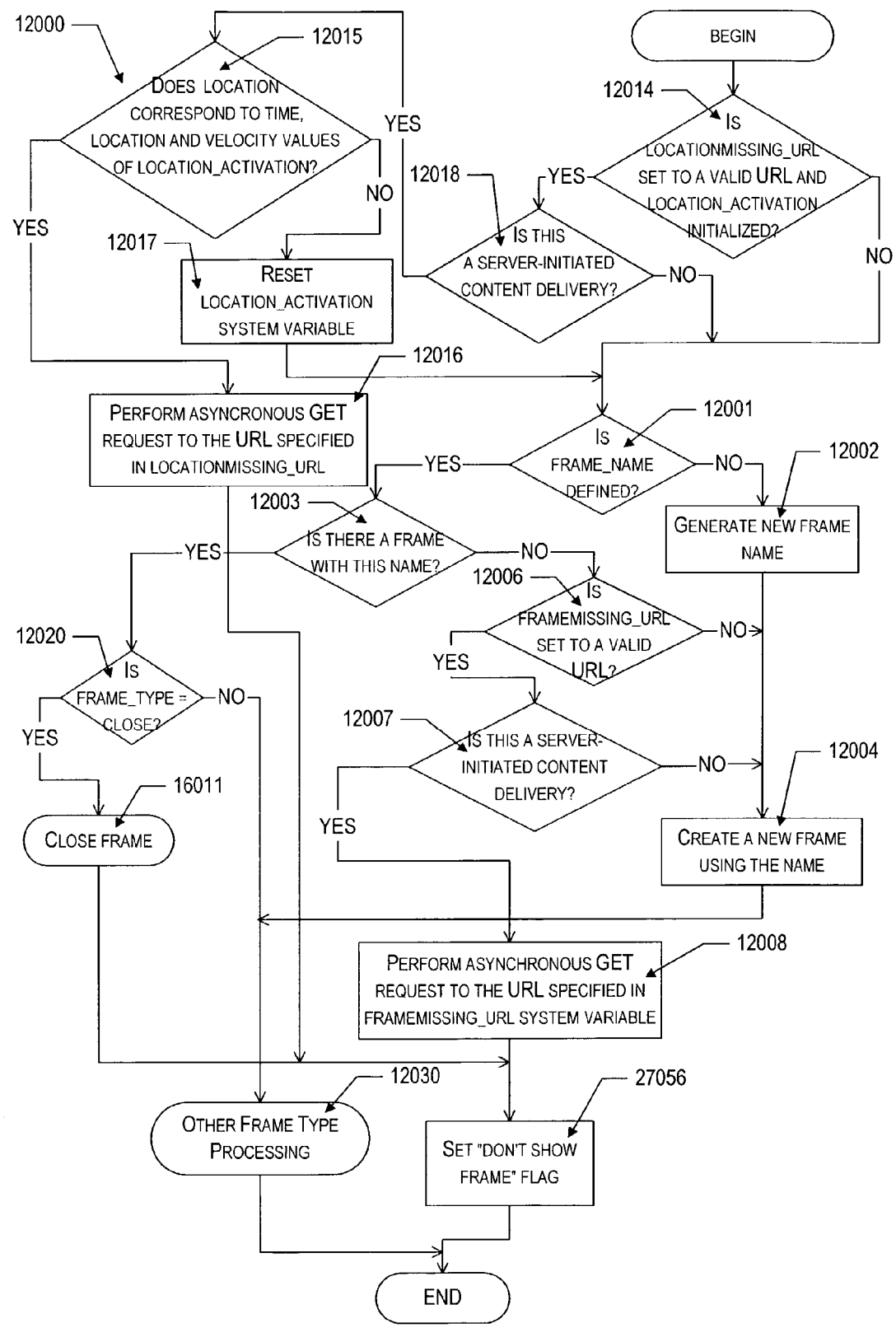
FIG. 21A is a logic flow diagram illustrating frame_name, locationmissing_url and framemissing_url system variables logic.
FIG. 21B is a supplementary to 21A logic flow diagram illustrating frame_type processing for values other than "close".
Figure 21:
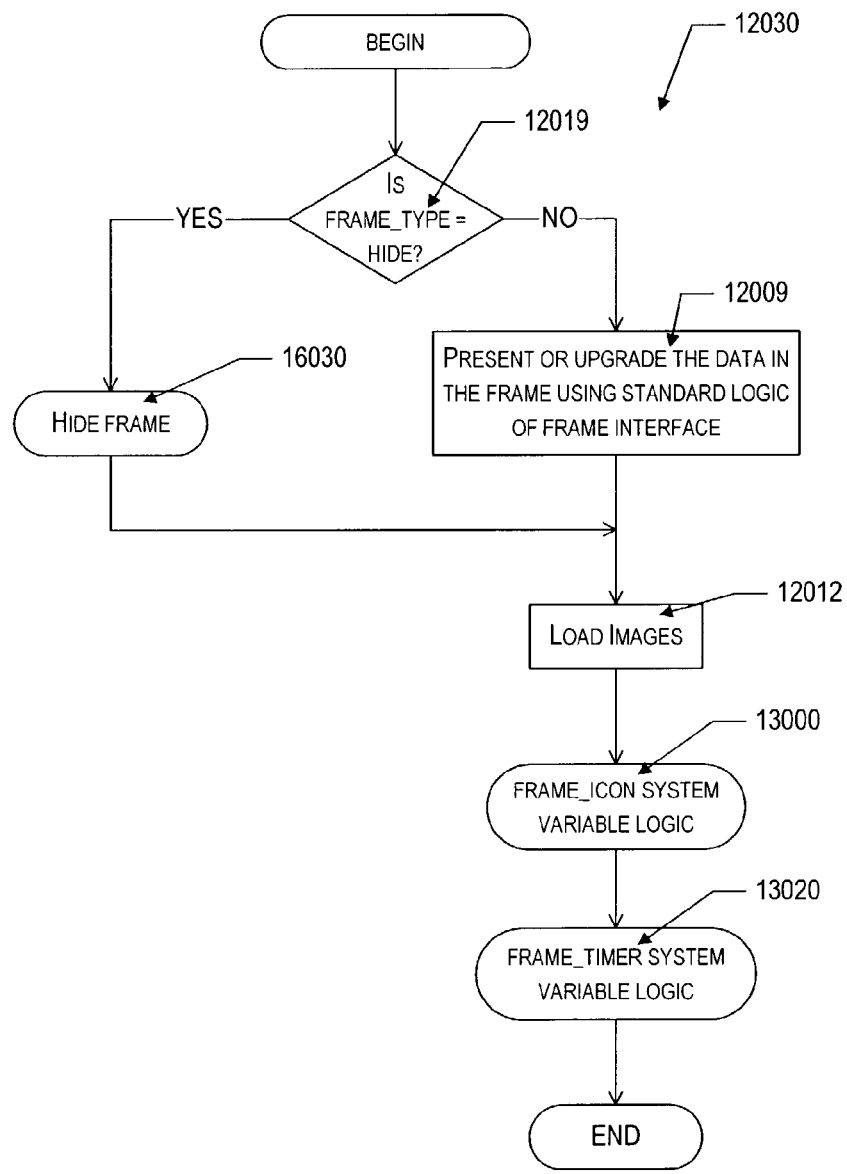
Figure 22:
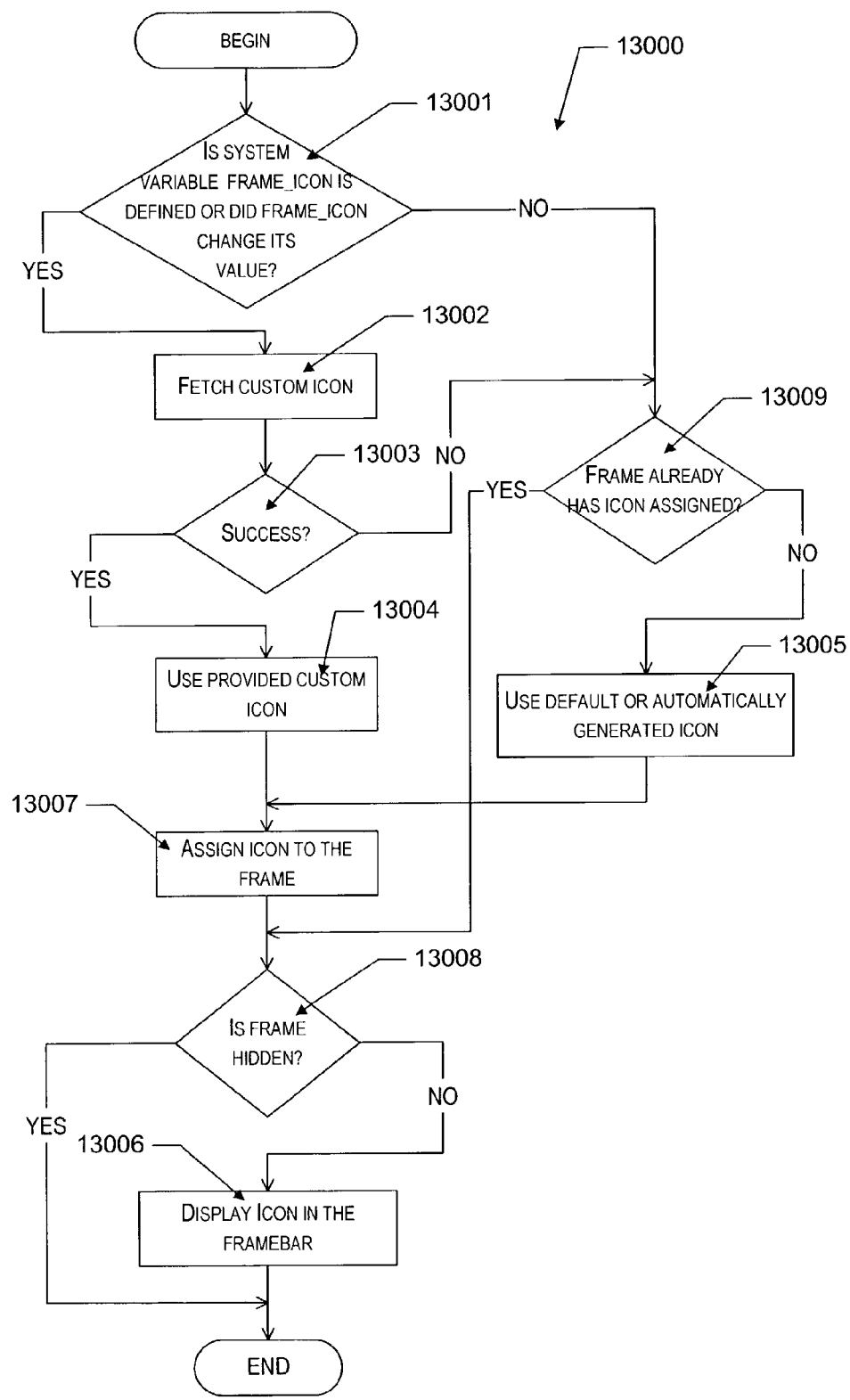
FIG. 22A is a logic flow diagram illustrating frame_icon system variable logic.
FIG. 22B is a logic flow diagram illustrating timer_activation and location_activation system variables logic.
Figure 22:
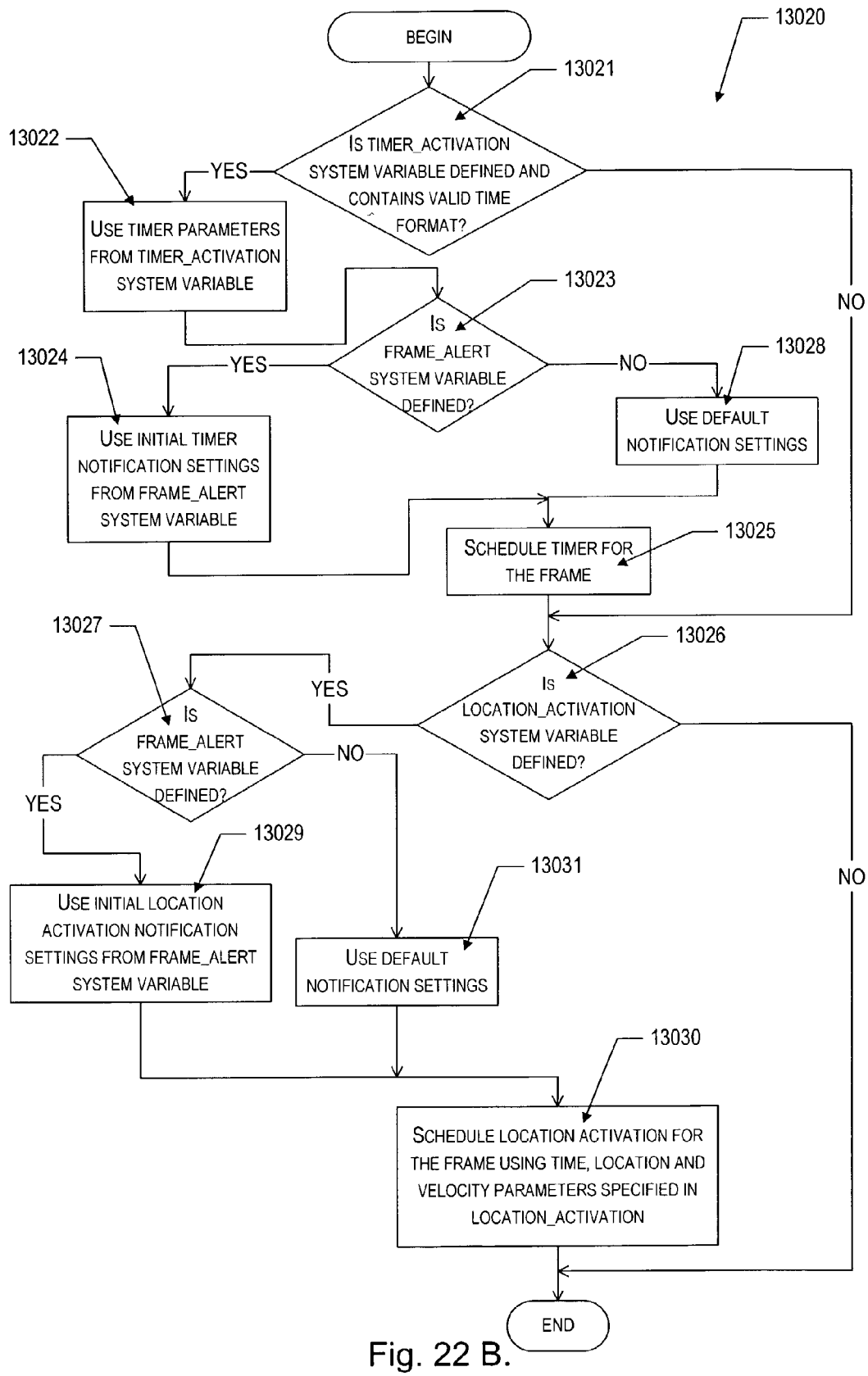
Figure 23:
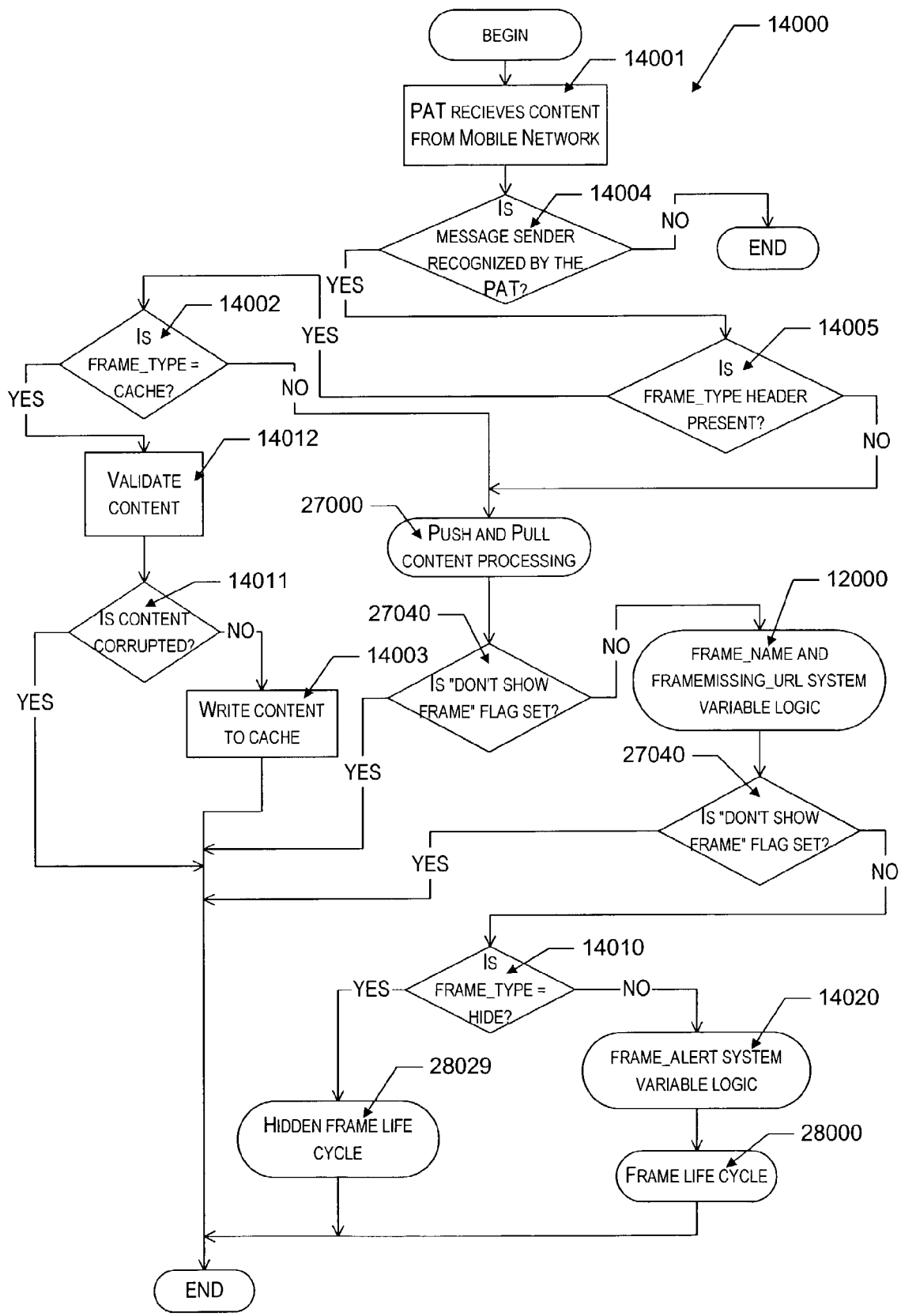
FIG. 23A is a logic flow diagram illustrating frame_type system variable logic.
FIG. 23B is a logic flow diagram illustrating frame_alert system variable logic.
Figure 23:
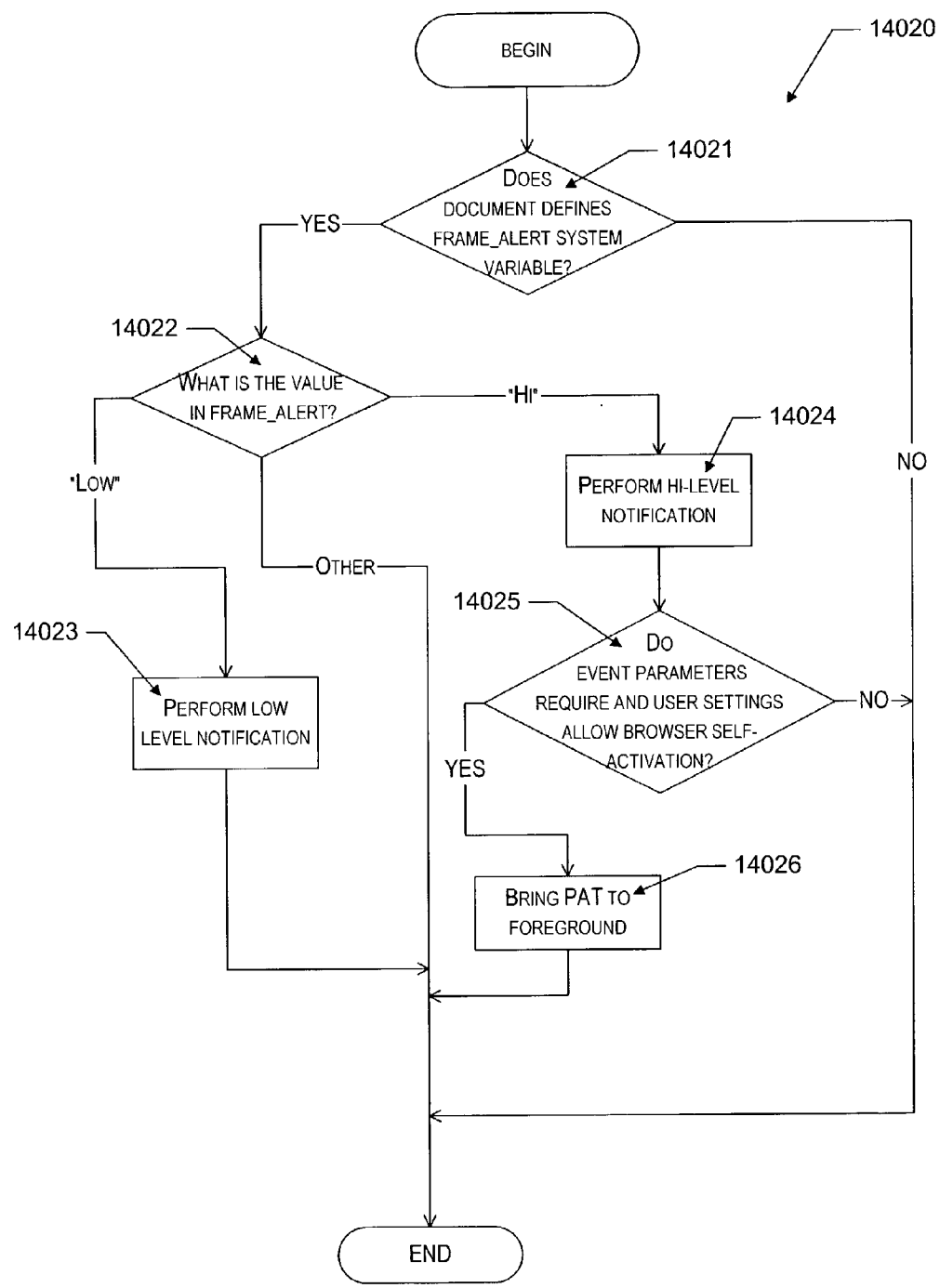
Figure 24:
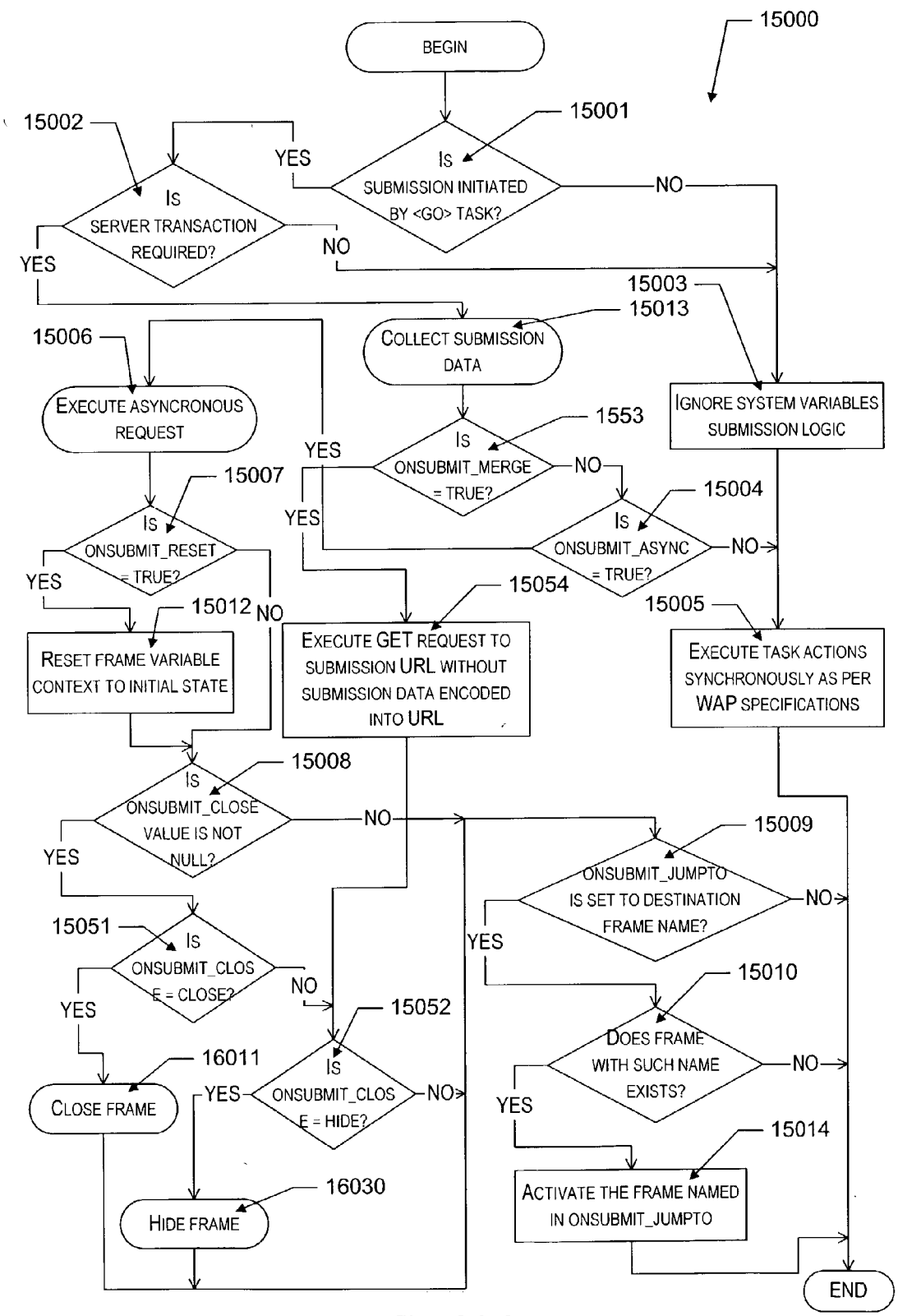
FIG. 24A is a logic flow diagram illustrating frame submission logic.
FIG. 24B is a logic flow diagram illustrating submission data collection logic.
FIG. 24C is a logic flow diagram illustrating asynchronous request execution logic.
FIG. 24D illustrates frame submission buffer manager.
FIG. 24E illustrates submission buffer frame view.
Figure 24:
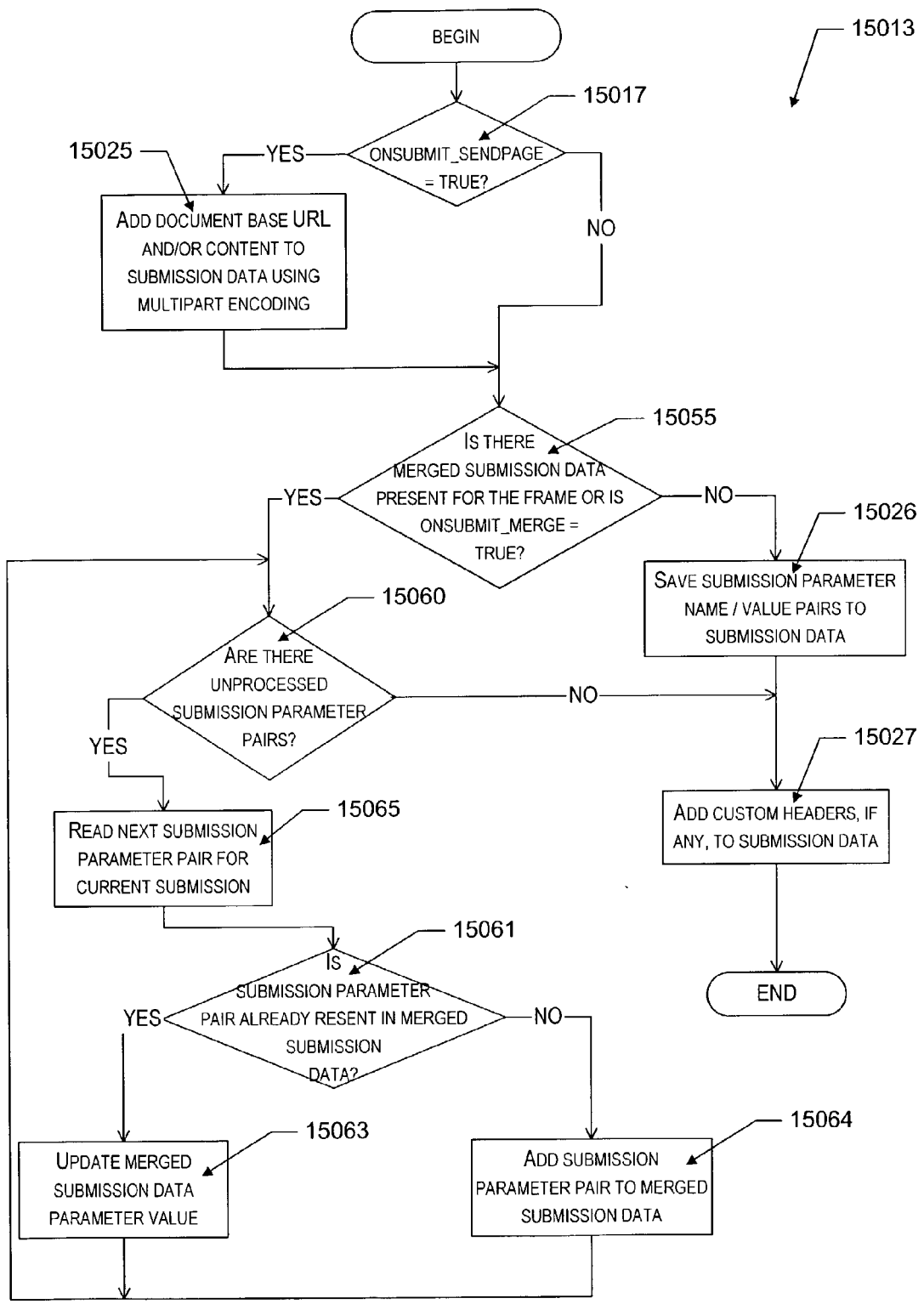
Figure 24:
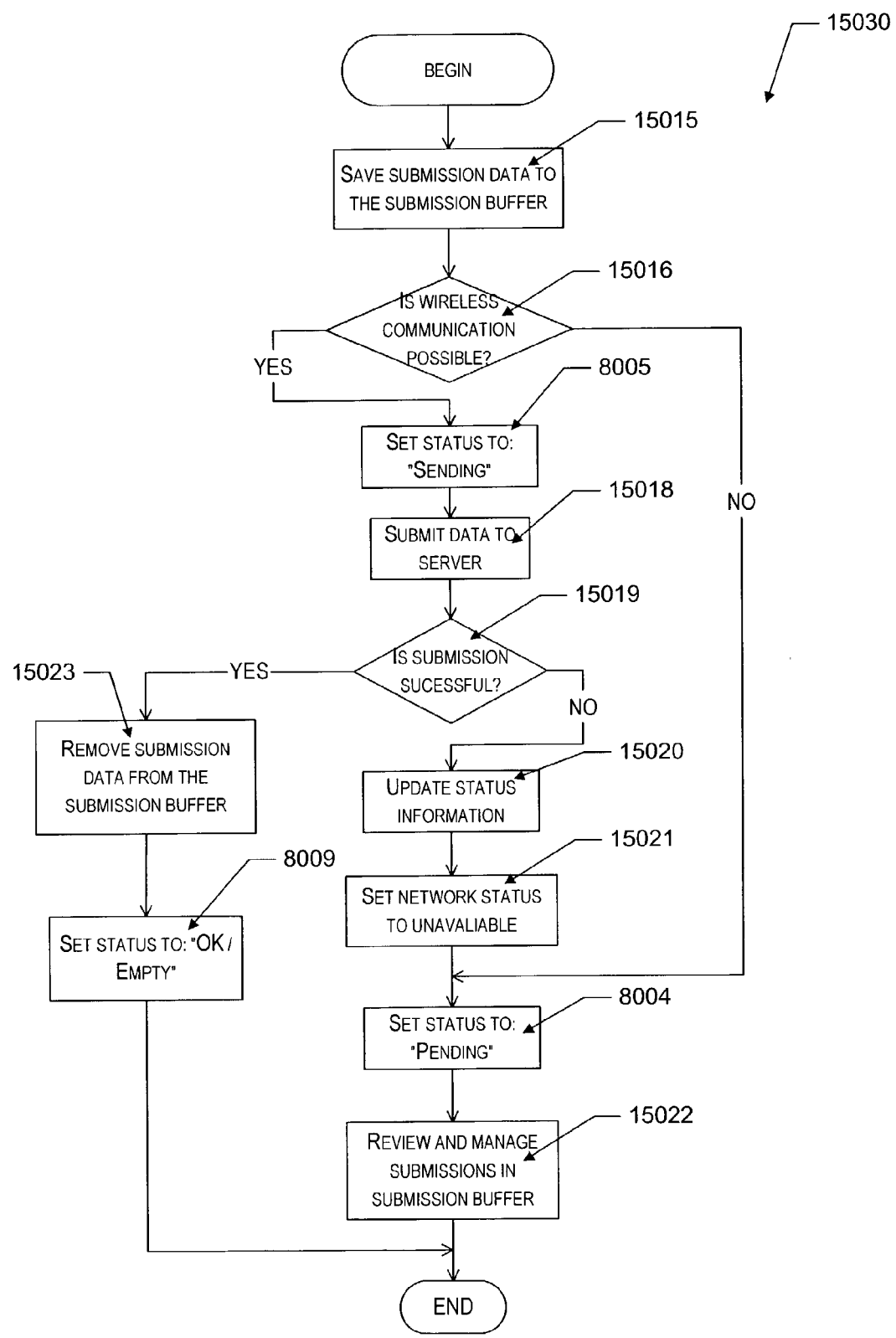
Figure 24:
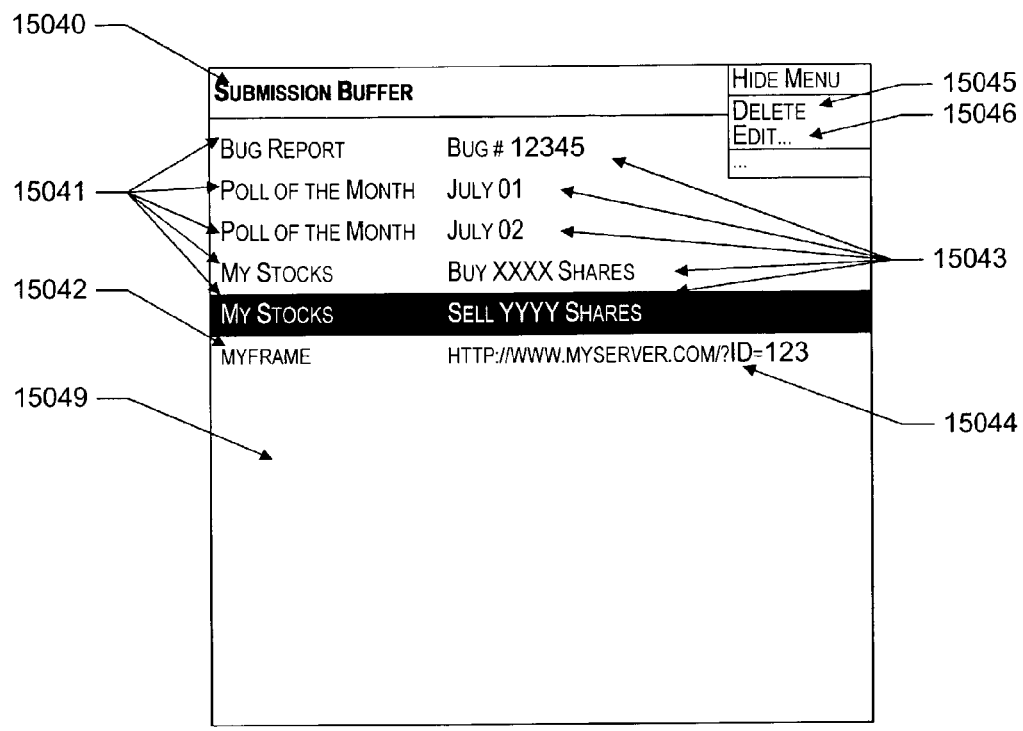
Figure 24:
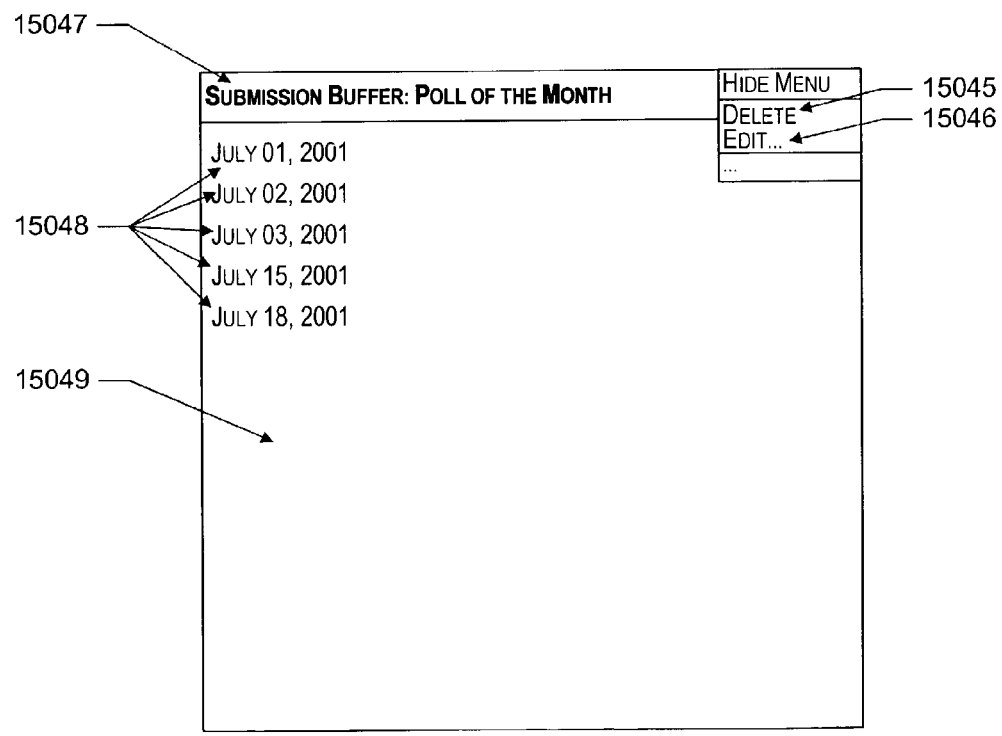

FIG. 19A is a logic flow diagram illustrating text entry field logic routine 10000. Routine 10000 may be implemented by Presentation Logic Engine 1031. Routine 10000 starts with step 10006 in which Presentation Logic Engine 1031 checks whether input field has to render user input masked out in order to provide a safe way to enter sensitive or confidential information, e.g. password. If the input is of password type, the "YES" branch is followed to routine 10007, in which the engine 1031 selects Password control for visual presentation. If the type is not password, the "NO" branch is followed to the step 10001, in which Presentation Logic Engine 1031 checks whether the input field defines a format mask. Format mask is considered defined, when it contains a non-empty value and the value conforms to format-mask specification, similar to the one described in WML Specification, which can be obtained from http://www.wapforum.org. If the format mask is defined, the "YES" branch is followed to Routine 10020, which is described in detail in FIG. 19B.

If the format mask is not defined, the "NO" branch is followed to the step 10003, in which Presentation Logic Engine 1031 checks the maximum number of characters allowed for entry in this entry field. The maximum number of character is an integer number, which can be specified by the developer for example by following the notions defined in WML Specification. If the maximum number of characters is greater than a certain threshold (MAX_CONFIGURED), the "YES" branch is followed to Routine 10004, in which Presentation Logic Engine 1031 presents auto entry field enhanced control. Auto entry field enhanced control presents the following possible advantages for entering text compared to the regular entry field control: automatic spell check and automatic error correction using built-in or external spell check capability, which can be defined by third parties or by the embodiment. It is understood that the value of characters (MAX_CONFIGURED) that is used in step 10003 and which affects presentation logic may differ and is adjustable for different devices with limited display capabilities and can be adjusted to better serve presentational needs.

If the maximum number of characters is not defined or is less than MAX_CONFIGURED, the "NO" branch is followed to routine 10005, in which Presentation Logic Engine 1031 shows traditional entry field control.

Routines 10007, 10004 and 10005 are followed by the "END" step, which concludes routine 10000.

FIG. 19B is a logic flow diagram illustrating formatted entry field process routine 10020. Routine 10020 may be implemented by the Presentation Logic Engine 1031 as a part of Routine 10000 described in FIG. 19A. In step 10010 the Presentation Logic Engine 1031 checks if the input field has format specification defined. If the format mask is defined, the "YES" branch is followed to the step 10016, which checks if there are more characters present in the format specification. If there are characters to be processed, the "YES" branch is followed to routine 10011, which reads the next character from the format specification. If the format specification has no more characters to process, the "NO" branch is followed to routine 10017, which combines all entry box presentation views with static formatting found on step 10013 and assigns them to formatted entry box field.

If the format mask is not defined in step 10010, the "NO" branch follows to the next step in entry field process logic routine 10000.

Routine 10011 follows to routine of adding read character to next entry box format mask 10012. Routine 10012 follows step 10013, which analyzes the last read character of the next entry box format string for "*", "\" characters occurrence or digits 1–9. If such characters or digits occur in the entry box format mask, the "YES" branch is followed to routine 10016 described above. If the last character is not "*", "\" or digit, the "NO" branch is followed to routine 10014, which maps entry box format mask to visual presentation and this presentation is assigned to the input presentation view. Routine 10014 follows to the step 10016.

Routine 10017 is followed by the "END" step which concludes routine 10020.

Most application platforms require parameterization capabilities in order to match requirements of the wide variety of applications. Presently page-based application developers are restricted in customizing browser functionality. The attempts to compensate such restrictions with more frequent interactions with the application logic residing on the server result in excessive network traffic and unacceptable user experience.

The invented parameterization method helps developers control above mentioned issues and it uses standard elements to set internal values in the application runtime platform (in this specification the PAT 22). The method can be applied to any content that supports definition of the elements that are hidden from the user, can contain value(s) and can be processed by the application runtime platform. Some examples of such elements are custom META tags, variables for WAP, hidden inputs for HTML, etc. This approach lets developer insert needed parameterization, which will be automatically ignored by the clients that do not support the features. The invented parameterization technique uses special variables defined in the document content and known to the PAT 22 (further referred as system variables). As documented further in this specification certain PAT algorithms in the present embodiment rely on the values of the system variables for algorithm parameterization. System variable context is encapsulated in the frame. The application developers can customize document handling and related logic by either initializing the variables by the server application with META tags, WAP, HTTP, or other applicable specification headers or any other applicable method or dynamically at runtime by changing variable values using setvar tags or other applicable methods.

It is understood that the scope of parameterization featured in this embodiment can be further extended following the application developer requirements. Other parameterization algorithms may be used to provide equivalent functionality and enable the present inventions.

FIG. 20A is a logic flow diagram illustrating system variables life cycle 11000. Routine 11000 is typically implemented by the PAT 22 and, specifically, its Presentation Logic Engine 1031 and Transaction Manager 1034. Routine starts by executing routine 11013 to initialize values for the system variable using META tags and headers, described in detail in FIG. 20B. Routine 11013 follows to step 11004, in which Presentation Logic Engine 1031 executes respective card-level intrinsic events, as defined by task processing in WML, HTML or other respective specifications. In this step, intrinsic events being executed may contain setvar tags, that are used in according to WAP Specification to set custom context variables in the PAT 22. Presentation Logic Engine 1031 examines setvar names for existence of the tags with the names equal to known system variable names. If such setvar tags are located, the "YES" branch is followed to routine 11005, which sets new values for the respecting system variables and continues execution to routine 11006. If no such setvar definitions found, the "NO" branch is followed to routine 11006, which presents content to the user, processes any system variables, according to logic described in FIGS. 21A–B, 130, 140 and waits for user interactions. When a submission is activated via link or any other means routine 11006 follows to routine 11007, which triggers task execution. Routine 11007 first follows to step 11008, which checks if there are setvar tags in the task with the same names as system variables in the task definition. If there are such setvars found, the "YES" branch is followed to routine 11009, where values of such setvar tags are applied to the browser context as values for the system variables and execution follows to routine 11012. If there are no such setvar tags the "NO" branch is followed to routine 11012, which continues task execution according to WAP specification and using values of system variables for enhanced submission techniques. Routine 11012 follows to step 11010, in which the engine 1031 checks if the submission is asynchronous. If the submission is asynchronous, the "NO" branch is followed to routine 11006. If the submission is synchronous, the "YES" branch is followed to the step 11015, in which the engine 1031 checks if the transition is between the cards on the current deck. If this is inter-card transition, the "YES" branch is followed to routine 11016, which changes the current card and follows to routine 11004. If in step 11015 the submission should be done to the server, the "NO" branch is followed to the "END" step, which concludes routine 11000.

FIG. 20B is a logic flow diagram illustrating system variables initialization logic 11013. In step 11001, the engine 1031 checks if the loaded content message contains WAP, HTTP or other applicable protocol specification headers with any of the dedicated names for system variables known to PAT 22 in the described implementation. In the present embodiment the header format is defined as follows:

<System Variable Header Name>:="X-Wap-"<System Variable Name>

In the present embodiment it starts with "X-Wap-" prefix, denoting that the header is user-defined and should be passed through any gateway or proxy without checking. <System Variable Name> is the name of the system variable known to the PAT 22, for which value assignment is requested. If there are such headers, the "YES" branch is followed to routine 11002, which initializes variables in the document context and follows to step 11003. If there are no such headers found, the "NO" branch is followed to step 11003. In step 11003, Presentation Logic Engine 1031 checks if the loaded document contains META tags with the same name as any of the system variables known to PAT 22. If there are such META tags, the "YES" branch is followed to routine 11011, which initializes the values for the respective system variables in the document context and follows to the "END" step. If no match found in step 11003, the "NO" branch is followed to the "END" step, which concludes routine 11013.

In addition to regular variables and application-assignable system variables used to customize PAT algorithms from the application (referred as system variables), the PAT 22 may also provide a class of read-only variables that contain information provided by the PAT, which can be delivered to the Application Server 25 along with other submission data. This embodiment defines a number of read-only variables, including but not limited to:

current_time, which contains the current time on the device;

current_date, which contains current date on the device;

client_id, which contains current device Client ID (e.g. as defined in WAP Client ID Specification). Depending on the implementation, Client ID may be initialized using certificate-based authorization. A special class of Client IDs may be introduced, which is PES instance-specific.

These variables can be used by the application in place of regular WAP variables (setvar tags, control attributes, etc.). Values of these variables are dynamically substituted by PAT and any developer-specified value assignments to the variables are ignored.

For system variables that define URL values (e.g. onprint_url, onread_url, etc.), a special "NULL" case-insensitive value may be supported. The value directs the PAT that it should perform associated actions as if the variable were defined, but should not make any attempts to access or retrieve the data at/from the URL. For example, if the frame should not be opened if it was closed by the user after the system had delivered the frame for the previous time, the system should assign onframemissing_url system variable some value (FIG. 21A), however, if the system does not have any other logic associated with the fact that the frame content was ignored, it may initially set the value to "NULL" to prevent unnecessary communications over Mobile Network.

FIG. 21A is a logic flow diagram illustrating frame_name, locationmissing_url and onframemissing_url system variables logic 12000. Routine 12000 is typically implemented by the PAT 22 and specifically its Presentation Logic Engine 1031 to support custom frame naming in Frames 1028. Routine 12000 starts by following to routine 12014, where locationmissing_url may be checked to be set to a valid URL and location_activation system variable is checked to be initialized with location specification. The location format in location_activation property may consist of three (3) expression-based parts that together fully specify location information. These parts are: time, velocity, and physical location. The time part may contain absolute or relative time and date values that specify period or moment of time, during which or at which the user should be at the physical location within specified radius and moving with the velocity that specifies set criteria to qualify being at the location (e.g. not less than 5 minutes after the user arrived at the physical location, moving with the velocity not exceeding 3 mph, etc.). The velocity part may contain the velocity of the device as well as motion vector identifying the direction of motion, which can be calculated by PAT 22 using location and time properties which are provided by the device (e.g. device does not move: velocity is 0, device moves in south-west direction at velocity of 2 mph, etc.). The location part specifies the absolute or relative physical location of the device (e.g. in the hospital, in radius of 5 miles from work, etc.). The time, location and velocity parameter expressions may support wide variety of formats and may be customized by user, application developer, system administrator, etc. Each part of the location specification may support use of predicates to form complex expressions (e.g. at 2:00 pm and 4:00 pm and 6:00 pm, at the office, etc.)

If in step 12014 the condition is not true, the "NO" branch is followed to step 12001 described below. If the condition is true, the "YES" branch is followed to step 12018, where the Engine 1031 checks if this content was obtained as a result of server-initiated content delivery. If the content was obtained with a client pull request, the "NO" branch is followed to step 12001 described below. If the content arrived with a server-initiated content delivery, the "YES" branch is followed to step 12015, where the Engine 1031 reads location_activation value and compares current location information with the one specified in the system variable. If the location specifications match the "YES" branch is followed to routine 12016, where the PAT 22 performs asynchronous request to the URL specified in locationmissing_url to inform the Application Server 25 that the user has left this location, in result to which the Application Server 25 may dispatch some content to the client or ask to fill some forms, and follows to routine 27056 described below and in detail in FIG. 36D. If the location specifications in step 12015 do not match, the "NO" branch is followed to routine 12017, where the Engine 1031 resets the value of location_activation system variable to prevent PAT 22 from considering location-driven activation turned on (described in FIG. 33F) and follows to step 12001.

In step 12001, the Presentation Logic Engine 1031 checks value of frame_name system variable, which can be defined by those skilled in art using system variable definition logic 11000 or similar algorithm. The value is considered defined if it is not empty. If the frame_name system variable is defined, the "YES" branch is followed to step 12003, in which the Presentation Control Engine 1031 searches in Frames 1028 for the frame with the same name as the current value of frame_name system variable.

If the frame_name variable is not defined, the "NO" branch is followed to the step 12002, in which the Presentation Control Engine 1031 automatically generates unique name for the frame. Routine 12002 follows to routine 12004, which creates a new frame, assigns it the new name, and inserts into Frames 1028 and follows to routine 12030 described in FIG. 21B and then to the "END" step.

In the step 12003, if the frame with the same name is found in the list of frames 1028, the "YES" branch is followed to step 12020, which checks the value of frame_type system variable. If the value is "close", the "YES" branch is followed to routine 16011, which closes the frame and proceeds to routine 27056 described below and in FIG. 36D. If frame_type value is not "close", the "NO" branch is followed to routine 1230 described in FIG. 21B and then to the "END" step.

Continuing from step 12003. If the frame name is not found in frames 1028, the "NO" branch is followed to the step 12006. In step 12006 the value of onframemissing_url system variable is checked. If the value is "true", the "YES" branch is followed to the step 12007. If the value is "false" or is not defined, the "NO" branch is followed to routine 12004.

Continuing from the step 12007. If the frame arrived with a push message, the "YES" branch is followed routine 12008, which performs an empty request to the URL value from onframemissing url to identify that the frame is no longer open (using the above described rule for special "NULL" value in the variable) and follows to routine 27056, in which special "don't show frame" flag is set. Routine 27056 follows to the "END" step, which concludes routine 12000.

In step 12007 if the frame arrived from a user request, the "NO" branch is followed to routine 12004 described above.

FIG. 21B is a logic flow diagram illustrating supplementary algorithm of frame_type system variable processing other than "close"—routine 12030. Routine 12030 starts by following to the step 12019, where the value is checked to be "hide". If the value is "hide", the "YES" branch is followed to routine 16030, which hides the frame and adds entry to the hidden frame list, which detail description can be found in FIG. 25C. If the value is not "hide", the "NO" branch is followed to routine 12009, which presents the content to the user either by upgrading existing frame or by opening a new frame with the name. Routines 12009 and 16030 follow to routine 12012. Routine 12012 downloads, processes and shows images needed to complete frame presentation. Routine 12012 follows to routine 1300, which processes frame_icon system variable to identify icon for the frame and follows to routine 1320, which processes timer_activation system variable to set frame timer if the value was defined by the system. Routine 1320 follows to the "END" step.

FIG. 22A is a logic flow diagram illustrating frame_icon system variable logic 13000. Routine 13000 is typically implemented by the PAT 22 and specifically its Presentation Logic Engine 1031 to enable custom frame icons 3004, 3005 (FIG. 30) along with automatically generated 5001, 5002 (FIG. 14A) or default 3003 icons. In Routine 13001 engine 1031 checks value of frame_icon system variable, which can be defined by those skilled in art using system variable definition logic 11000 or similar algorithm. The value is considered defined if it is not empty and conforms to the relative or absolute URL specifications that can be obtained from http://www.w3c.org or other sources. If the frame_icon system variable is defined or was changed as a result of user interaction with the document, the "YES" branch is followed to the Routine 13002, in which the PAT 22 downloads and validates the image data from the URL specified in frame_icon system variable using Mobile Network 50 or from the internal resources (e.g. cache memory). It is understood that the actual download procedure may involve cooperative work of Gateway 23, Mobile Network 50, WTLS 1032, Communication Stack 1022 and Cache 1026 layers in the PAT 22. Icon images may be bundled by the server or gateway with the document content using multipart content format. If in routine 13001 frame_icon variable is not defined or was not changed since last icon update, the "NO" branch is followed to the step 13009. In step 13009 the engine 1031 checks if the frame already had custom or default icon defined. If the frame had the icon, the "YES" branch is followed to the step 13008. If the frame didn't have an icon assigned, the "NO" branch is followed to the step 13005, in which the Presentation Logic Engine 1031 makes an effort to choose default or automatically generated icon for the frame, preprocess and prepares it for presenting using Image processor 1024.

Routine 13002 is followed by the step 13003, where the PAT 22 determines whether download was successful. It is understood that successful download is when the data loaded by the PAT 22 is a valid picture representation. If the download was successful, the "YES" branch is followed to the Routine 13004 where PAT 22 preprocesses and validates the icon using Image processor 1024 and Cache 1026.

If the download was not successful, the "NO" branch is followed to Routine 13005, described above.

Routines 13004 and 13005 are followed by routine 13007, in which the chosen icon value is assigned to the frame. The routine follows to step 13008, in which the engine 1031 checks if the frame is hidden, i.e. it was moved to hidden frame list. If the frame is not hidden, which means that its icon is shown in the frame bar or similar navigation element, the "NO" branch is followed to routine 13006, which results in actual displaying/upgrading the icon in the frame bar 3002. Routine 13006 is followed by the "END" step.

If the frame is hidden in step 13008, the "YES" branch is followed to the "END" step, which concludes routine 13000.

FIG. 22B is a logic flow diagram illustrating timer_activation and location_activation system variables logic 13020. The routine may be implemented by Presentation Logic Engine 1031 as a part of routine 12000 while presenting document content to the user. The routine allows to set frame timer and location activation values not only locally using browser dialogs and screen control but also as a part of frame loading or updating algorithm from the Application Server 25. Routine 13020 starts by following to step 13021, where the engine 1031 checks if timer_activation system variable is defined according to system variable definition logic routine 11000 and contains a valid format value for timers. Frame timer value format is implementation specific, and it may allow absolute (exact date and time), relative (time elapsed from some fixed point of time or the time when the timer initialization was processed by the PAT 22) and repetitive timer values (every month, week, etc). If the value is not defined or is not valid, the "NO" branch is followed to step 13026 described below to set location activation settings. If the value is defined, the "YES" branch is followed to routine 13022, in which the Engine 1031 reads frame timer settings from timer_activation system variable. Routine 13022 follows to step 13023, where frame_alert system variable value is checked. If frame_alert variable is defined, the "YES" branch is followed to routine 13024, where the Engine 1031 reads frame_alert value to define the initial notification level (user may decide to change the level) for the timer based on the value of the variable. Routine 13024 follows to routine 13025 where frame timer is scheduled based on timer settings from timer_activation variable and notification settings in steps 13024 or 13028. If in step 13023 the value is not defined, the "NO" branch is followed to routine 13028, in which the engine 1031 uses default notification settings for timers, and follows to routine 13025 described above. Routine 13025 follows to step 13026 where location_activation system variable value is checked. If the value is defined and is a valid location, the "YES" branch is followed to step 13027, where the Engine 1031 reads the value of frame_alert system variable to define initial notification settings for this type of activation. If the value in frame_alert system variable is defined, the "YES" branch is followed to routine 13029, which reads initial location activation notification information from the value of frame_alert system variable (the notification level can be changed by the user later with the help of location activation editor dialog which may be similar to timer editor dialog described in FIG. 15B.). If the frame_alert value if not defined, the "NO" branch is followed to routine 13031, where the default PAT 22 notification settings are used for location-driven frame activation. Routines 13029 and 13031 follow to routine 13030, where the values of location activation and location notification are used to schedule location-driver activation for the frame.

Routine 13030 and step 13025 ("NO" branch) are followed by "END" step, which concludes routine 13020.

FIG. 23A is a flow diagram illustrating frame_type system variable processing logic 14000. This routine is the starting point for processing all events arriving to the PAT 22 from Mobile Network 50. Routine 14000 is typically implemented by Presentation Logic Engine 1031.

Routine 14000 start by following to routine 14001, which executes whenever any message with content is received by the PAT 22 from Mobile Network 50. Routine 14001 follows to step 14004, in which the Transaction Manager 1034 checks if the content sender is authorized and recognized to deliver content to this PAT system. The verification is performed using implementation-specific algorithms including user settings, application server restrictions negotiated with clients, server certificates, special authorization, etc. If the content sender is not recognized as the valid content provider, the "NO" branch is followed to the "END" step, received content is ignored and no user notification is performed. If the content sender is recognized, the "YES" branch is followed to step 14005, where the engine 1031 checks if frame_type header value is defined in the message as described in routine 11000. If frame_type header is defined, the "YES" branch is followed to step 14002, which checks the actual value of the variable. If there is no frame_type definition found, the "NO" branch is followed to routine 27000 (assuming default value of frame_type which is "frame").

In step 14002, if the value of frame_type variable equals to "cache", the "YES" branch is followed to routine 14020, where the content of the message is validated. Routine 14012 follows to step 14011, in which the engine performs validation of the content written to cache. If the content is valid, the "NO" branch is followed to routine 14003, which records binary data in non-volatile memory cache 1026 for subsequent use with applications. Routine 14003 is followed by the "END" step. If the content is not valid in step 14011, the "YES" branch is followed to the "END'" step, without alterations to the cached data.

In step 14002, if value is not "cache", the "NO" branch is followed to routine 27000 to process message content. After the content is processed the routine follows to step 27040, where special "don't show frame" flag is checked, which might be set a result of routine 27000 or its subroutines indicating that the content should not be shown to the user. If the flag is set, the "YES" branch is followed to the "END" step. If the flag is not set, the "NO" branch is followed to routine 12000, which processes frame_name and onframemissing_url system variables and presents the content if needed. Routine 12000 may affect "don't show frame" flag settings. Routine 12000 again follows to routine 27040, which checks the flag. If the flag is set, the "YES" branch is followed to the "END" step. If the flag is not set, the "NO" branch is followed to step 14010, in which the engine 1031 checks if the frame_type variable value equals "hide". If the value is "hide", the "YES" branch is followed to routine 24029 (FIG. 33B), which starts hidden frame cycle for the frame. If the value for frame_type variable is not "hide", the default "frame" value is assumed and the "NO" branch is followed to routine 14020 (FIG. 23B), which executes alerts and notifies user according to notification parameters in the message. Routine 14020 follows to routine 24000 (FIG. 33A), which starts frame lifecycle for the frame.

Routines 24000 and 24029 follow to the "END" step, which concludes routine 14000.

The described implementation is the best mode known to the inventors and it is understood that similar functionality may be implemented differently within the scope of the present invention.

FIG. 23B is a flow diagram illustrating frame_alert system variables processing logic 14020. The routine is typically implemented by Presentation Logic Engine 1031 as a part of routine 14000. Routine 14020 starts by following to the step 14021, which checks if there is frame_alert variable defined in the document as described in routine 11000. If the value is not defined, the "NO" branch is followed to the "END" step. If the value is defined, the "YES" branch is followed to step 14022, which reads the value of frame_alert system variable. If the value equals "low", the "Low" branch is followed to routine 14023, which performs low-level notification of the user. It is understood that low-level notification may be optionally adjustable by user and is implementation-specific. If the value equals "hi" (abbreviation for "high"), routine 14024 is executed, where high-level notification is performed. It is understood that high-level notification may be optionally adjustable by user and is implementation-specific. Routine 14024 follows to step 14025 which checks if the PAT is currently in background mode and if event parameters and user settings require and allow PAT self-activation. If either of the conditions is false, the "NO" branch is followed to the "END" step. If both conditions are true, which means that the PAT 22 is in background execution mode and settings allow self-activation, the "YES" branch is followed to routine 14026, which may bring the PAT 22 to foreground gaining control from currently running applications. If in step 14022 the value of frame_alert is some other than "hi" or "low", the "Other" branch is followed to the "END" step. Routine 14026 is followed by the "END" step, which concludes routine 14020.

FIG. 24A is a flow diagram illustrating frame submission logic 15000. Routine 15000 is typically implemented by Presentation Logic Engine 1031. It is executed whenever user requests document submission in one of the ways defined by the PAT 22 implementation. Application developers may place submission elements with associated tasks in the document. The present embodiment is the best known implementation of the invention for WAP, however the same functionality can be implemented using any other document formats. Currently WAP specification defines 4 types of tasks: "go", "prev", "refresh", "noop". Routine 15000 starts by following to step 15001, in which Presentation Logic Engine 1031 checks how the action was initiated. If the action was not initiated by a "go" task, the "NO" branch is followed to routine 15003, which directs the engine 1031 to ignore any system variable settings for this submission and follows to routine 15005, which executes task actions synchronously as per WAP specifications, which may result in synchronous server submission process. During synchronous task execution the frame is blocked, and the action results may alter the document content.

If in step 15001 the task type is "go" task, the "YES" branch is followed to the step 15002, which checks whether it is inter-card (between cards in the same document) or server transition. If the transition is inter-card, the "NO" branch is followed to routine 15003.

If transition involves a server request, the "YES" branch is followed to routine 15013 (FIG. 24B), which collects data for submission and follows to the step 15053, which checks the value of onsubmit_merge system variable for "true", denoting that merged submission mode is used for processing this submission. If the value of onsubmit_merge is "true", the "YES" branch is followed to routine 15054, which executes the task by making request to the GET URL originally entered in<go> task without any submission parameters encoded in the URL. Routine 15054 checks and uses Cache component 1026 to retrieve the document content and follows to step 15052, described below. If in step 15053, the value is not defined, or has a different value, the "NO" branch is followed to step 15004, in which the engine 1031 checks if onsubmit_async system variable is set to "true". If the variable value is "true", the "YES" branch is followed to the routine 15006, which initiates asynchronous request in background, immediately starts communication over Mobile Network(s) 50, and sets the flag to discard response content received to true (FIG. 24B). If in step 15004 the variable value is not "true" or is not defined according to routine 11000, the "NO" branch is followed routine 15005, which upon completion follows to the "END" step.

Figure 25:
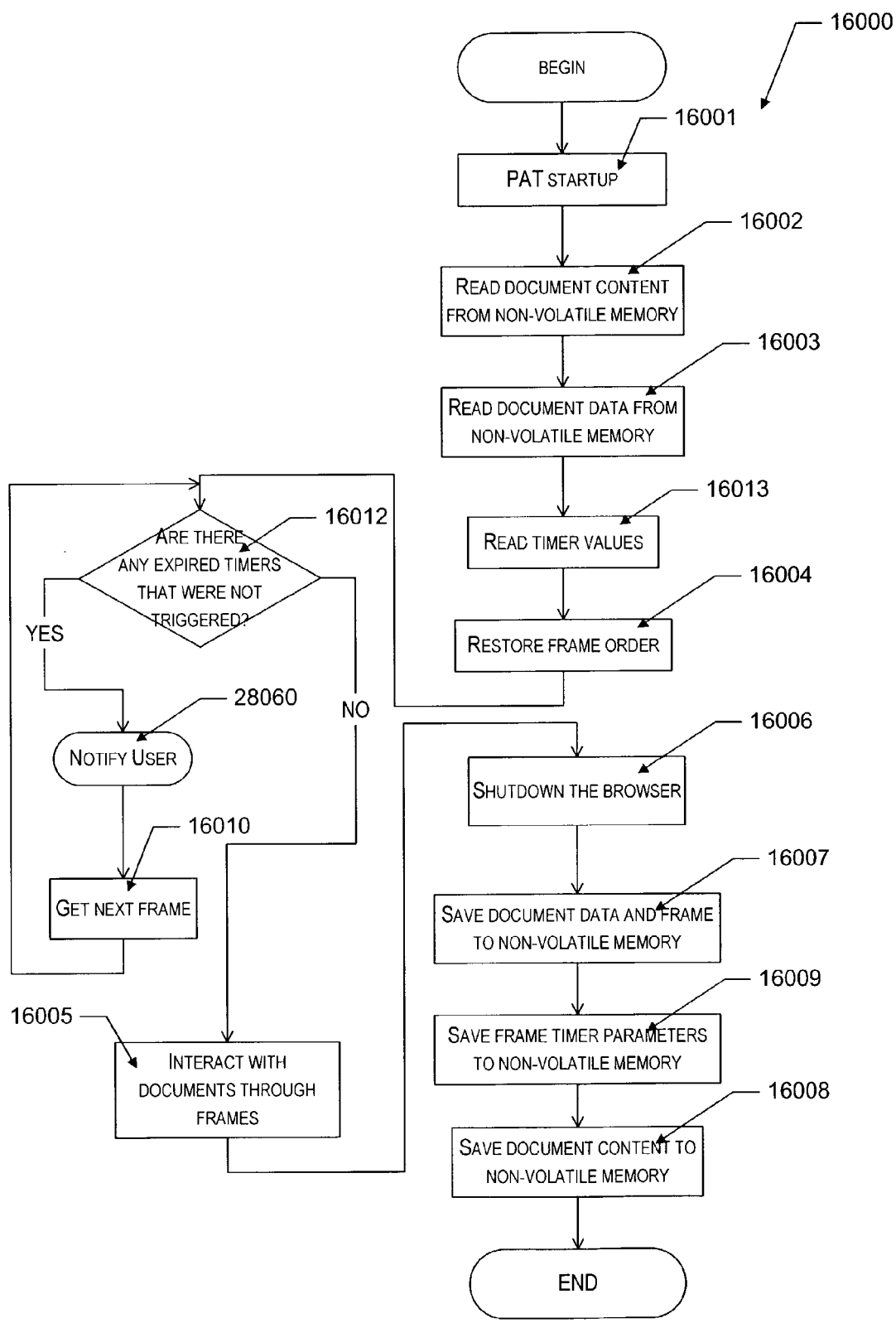
FIG. 25A is a logic flow diagram illustrating persistency cycle of the permanently resident documents.
FIG. 25B is a logic flow diagram illustrating close frame logic.
FIG. 25C is a logic flow diagram illustrating hide frame logic.
Figure 25:
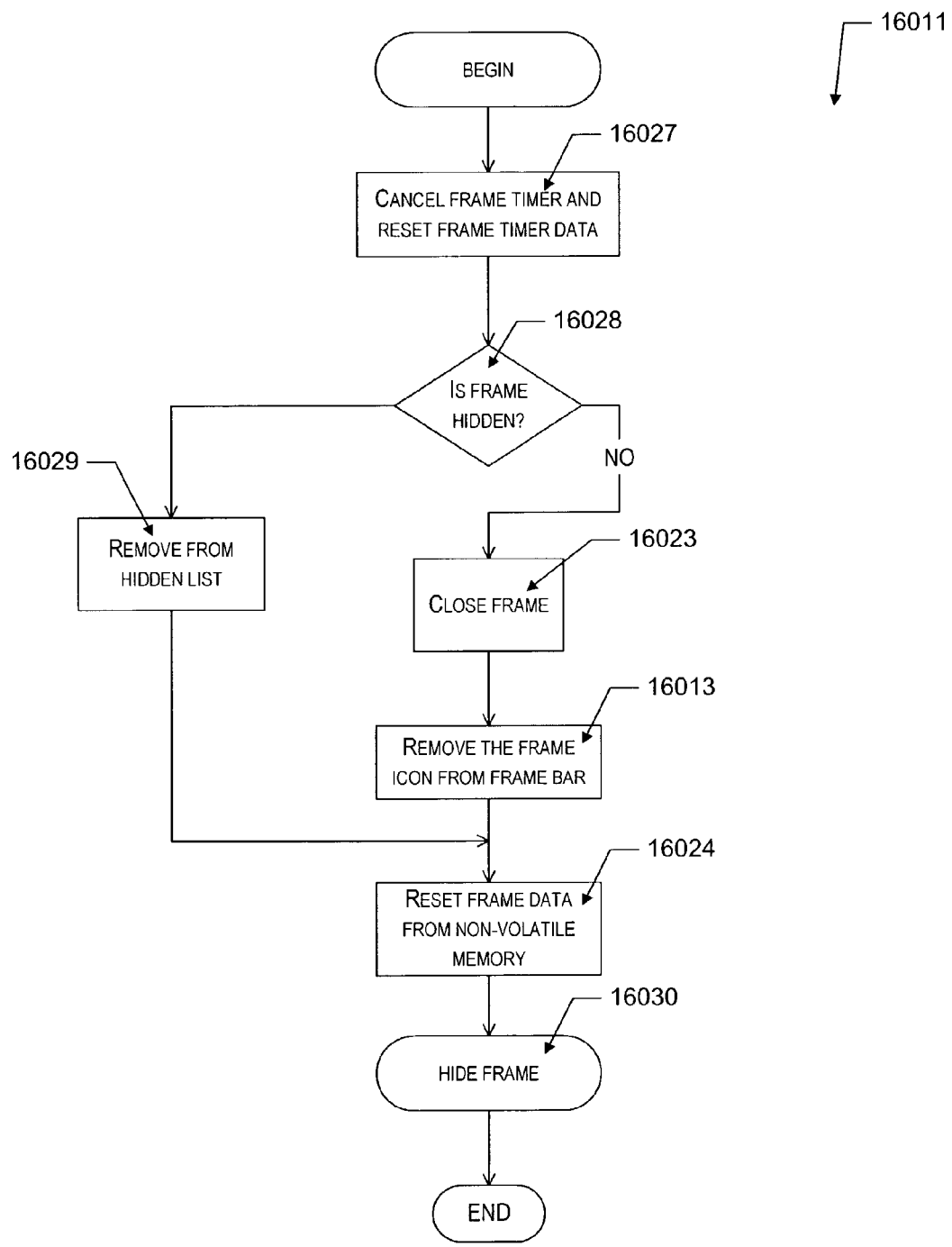
Figure 25:
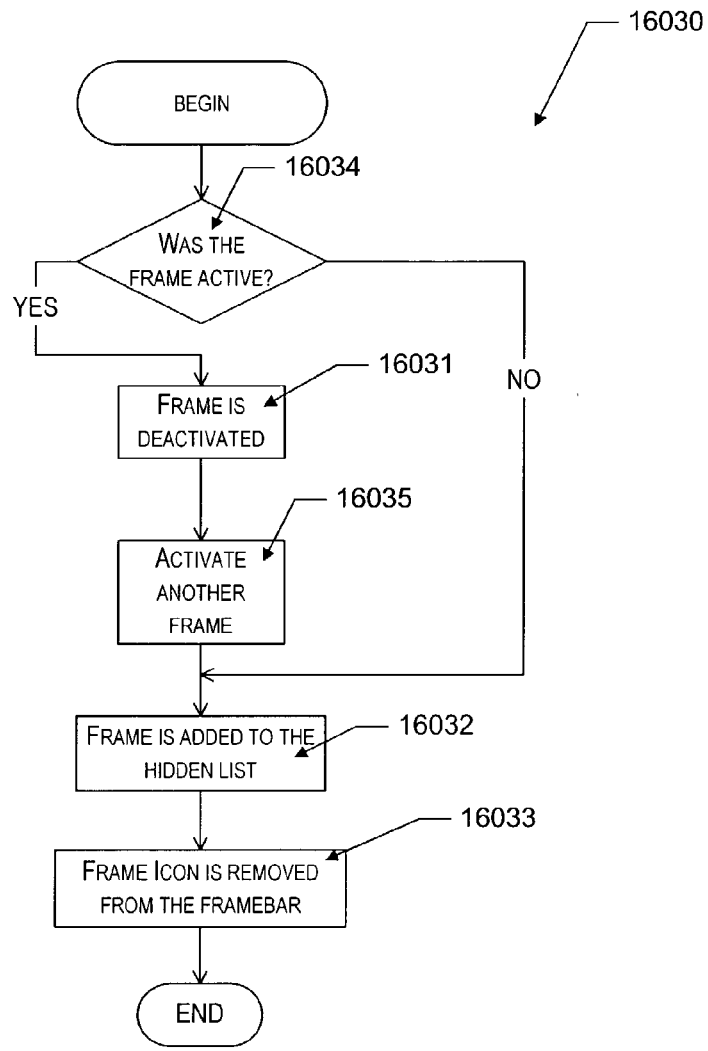

Routine 15006 follows to step 15007, in which engine 1031 checks the value of onsubmit_reset system variable. If the variable in step 15007 has the value of "true", the "YES" branch is followed to routine 15012, in which the engine 1031 resets the values for all user variables (excluding the system ones) for the frame to initial state, in which they were originally. If the variable in step 15007 has a different value or is not defined as described in routine 11000, the "NO" branch is followed to the step 15008, in which the engine checks the value of onsubmit_close system variable. If the variable in step 15008 is defined, the "YES" branch is followed to step 15051, in which the value of onsubmit close system variable is checked for "close" value. If the value is "close", the "YES" branch is followed to routine 16011, which closes the frame, which results in frame becoming no longer available to user and its respective entry data being removed from frames 1028, active documents 1029, and proceeds to step 15009. If in step 15051 the value in onsubmit_close is not "close", the "NO" branch is followed to step 15052. In step 15052 the value of onsubmit_close is checked for "hide" value. If the value is "hide", the "YES" branch is followed to routine 16030, which adds frame to the hidden list (FIG. 25C). Routine 16030 follows to step 15009. If the value in onsubmit_close is not "hide", the "NO" branch is followed to step 15009.

Continuing from step 15008. If the value of the variable is not defined, the "NO" branch is followed to step 15009, in which the engine 1031 checks the value of onsubmit-jumpto system variable. If the variable in step 15009 has the value of "true", the "YES" branch is followed to step 15010, in which the engine 1031 checks, if the frame with this name is found in Frames 1028. If the variable in step 15009 not defined, the "NO" branch is followed to the "END" step. If in step 15010 if the frame with the name resulted from step 15009 is found, the "YES" branch is followed to routine 15014 in which the Engine 1031 activates the named frame by presenting it to the user. If in step 15010 there is no frame with the name resulting from step 15009 is located, the "NO" branch is followed to the "END" step. Routine 15014 is followed by the "END" step, which concludes routine 15000.

The PAT 22 features special submission merging algorithm to merge several submissions from different documents shown sequentially in one frame into a single submission data set, which is delivered to the Application Server 25. The merged submissions are separate entries in the frame history, which enables history navigation ("go back") functionality as well as offline submission management in between merged submissions in offline mode, etc. The concept of merged submission is possible due to special task processing logic, when the merge submissions mode is switched ON (system variable onsubmit_merge is set to "true"). In this case the request is split in two (2) parts-original URL entered by the application developer in "href" attribute of the <go> task and a list of server-related submission data entries (post/get parameters added to the <go> task with <param> WML elements). The original URL may be static or dynamic, when some of its parts or the whole value depend on the variables. When the PAT 22 receives such task for execution, it makes a GET request to the original URL, and whenever applicable checks the PAT Cache 1026 and retrieves previously cached document content from the Cache 1026 if any (this method allows to make the target document content available even when the PAT 22 is in offline mode) or loads and caches the newer version for future use. In order to take advantage of this method, application developers enable the document caching mode for the documents used as a part of submission merging algorithm. Also the PAT saves/merges submission parameter pairs from this request for further delivery to the Application Server 25 with the first request made from the frame with the merged submission mode turned OFF.

FIG. 24B is a logic flow diagram illustrating collection of submission data 15013. Routine starts by following to the step 15017, in which the value of onsubmit_sendpage system variable is checked. If the value of the variable is "true", the "YES" branch is followed to routine 15025, in which the Engine 1031 adds document base URL and/or document serialized binary content to the submission data. Routine 15025 follows to step 15055.

If in step 15017 the value of the variable is either not defined or has a different from "true" value, the "NO" branch is followed to step 15055.

In step 15055 the engine 1031 checks if the merged submission data from previous submissions in the same frame is defined or if the value of onsubmit_merge system variable is equal to "true". If neither or the conditions is true, the "NO" branch is followed to routine 15026, where the Engine 1031 saves the submission parameter name/value pairs to the submission data. Routine 15026 follows to routine 15027. If either of the conditions is true in step 15055, the "YES" branch is followed to step 15060 to merge merged submission data with current submission data for the frame. In step 15060 the Engine 1031 checks if there are any unprocessed submission parameter pairs for the current submission. If there are such pairs, the "YES" branch is followed to step 15065, where the Engine 1031 reads the next current submission parameter pair and follows to step 15061, where the Engine 1031 checks if the named submission parameter is present in the merged submission data. If the data is present, the "YES" branch is followed to routine 15063, which updates the parameter value in the merged submission data and follows to step 15060. If the submission entry is not present in the merged submission data in step 15061, the "NO" branch is followed to routine 15064, which adds the parameter pair to the merged submission data and follows to step 15060.

If in step 15060 there are no more unprocessed submission parameter pairs, the "NO" branch is followed to routine 15027, in which the engine 1031 adds any user-defined headers to the submission data. Routine 15027 follows to the "END" step, which concludes routine 15013.

FIG. 24C is a logic flow diagram illustrating asynchronous request execution logic 15030. Routine starts by following to routine 15015, in which Transaction Manager 1034 saves previously collected submission data to Submission Buffer 1023 and follows to step 15016, in which the Communication Stack 1022 checks if communication is possible (radio on, network coverage available, etc.). If communication is not available, the "NO" branch is followed to step 8004, which sets the transmission status indicator to "pending" 8022. If communication is possible in step 15016, the "YES" branch is followed to routine 8005, which changes the frame transmission status indicator to "sending" 8023 and proceeds to routine 15018, which attempts to submit data to the server and follows to step 15019. In step 15019 transaction manager 1034 checks if the submission was successful (for example, a valid response received, etc.). If the submission was successful, the "YES" branch is followed to routine 15023, which removes the submission data from submission buffer 1023 and follows to routine 8009, which sets transmission status indicator in the frame to "ok/empty" 8024. If the submission in step 15019 was not successful, the "NO" branch is followed to routine 15020, in which Communication Stack 1022 updates routing and status information and follows to routine 15021, which sets network status in Communication Stack 1022 to unavailable and proceeds to routine 8004. Routine 8004 follows to routine 15022, which allows user to review and manage submissions from this and other frames in submission buffer using interface illustrated in FIGS. 24D–E.

Routines 15022 and 8009 are followed by the "END" step, which concludes routine 15030.

Submission buffer 1023 contains data submitted by the user or automatically by the system at the time when communication with Mobile Network 50 was not available due to some external (e.g. out of coverage) or internal (e.g. radio shut off due to low battery) condition. Whenever communication is restored, the buffer automatically flushes all submissions to the server as described in routine 15030. While the communication is not possible, the user may be enabled to manage submissions, delete entries, review and edit particular submission data visually, etc. This may be made possible by making the PAT 22 for each entry in the buffer 1023 store, along with the information that should be submitted to the server, a copy of the document data (history, user and system variables, etc) as it was at the moment submission was initiated. Whenever user requests to edit a submission, the PAT 22 opens a new frame with the document content restored from cache 1026 and applies the document data from the submission buffer 1023 for the particular submission to it. When the user makes the changes and updates the submission, the PAT 22 will update existing submission data without adding new entry to the buffer 1023. The only difference while browsing the frame originally, before the submission was issued, and when the submission is edited from submission buffer, is that the history functionality is not available in the latter case, because the submitted document is open in a new frame and the submission data and document context are restored for this document only. The newly open frame automatically closes and the PAT 22 updates the submission buffer 1023, when the user makes changes in data and initiates a submission to the server. If the user does not update the submission from the frame, but request the frame closure, the submission buffer 1023 will not be updated. When open for editing, specific submission is blocked in the submission buffer 1023, until the frame is closed, and cannot be submitted to the server even if network communications become available.

FIG. 24D illustrates submission buffer manager for submissions from all frames. The screen has a title area 15040 and a content area 15049, where the list of pending submissions sorted by date and time of submission is shown. Each line in the list corresponds to a pending submission made by the user. The submission entry contains the information about frame it was initiated from 15041, 15042 and the submission name 15043, 15044. The name of the submission 15043 visible in the content area can be set by the application developer using onsubmit id system variable. If the name is not defined, the target URL 15044 is used for the name. The name of the frame can be in 2 forms: if the active card has a title, then the title will be used for the name 15041, otherwise the internal name of the frame is shown 15042.

The buffer manager 15047 also provides commands to manipulate list of submissions, like Delete 15045, which permanently removes the submission from the submission buffer 1023; Edit, which opens a new frame with the document in the state it was when submission was initiated and allows user to modify submission data 15046, etc. Operations such as Delete 15045 and Edit 15046 affect the records in the submission buffer that are not delivered to the server and thus allow users to manage submission data in offline mode prior to delivery of the submissions to the applications.

FIG. 24E illustrates view of the submission buffer 1023 for a single frame. The submission buffer 1023 may accumulate a number of entries initiated from the same frame, especially, if the PAT 22 stayed offline for a long period of time. To simplify and categorize the submission list, each frame provide means to open editable view of the data in the submission buffer 1023 where only submissions initiated from the selected frame are listed 15048 and the title area of the buffer manager 15047 reflects the name/title of the frame. The view is editable and provides the same list of commands to manipulate the list as in the full submission buffer manager view 15040, e.g. Delete 15045, Edit 15046, etc. Any manipulations done in this mode will affect the data in the submission buffer 1023. The sample screen shows list of submission from "Poll Of the Month" frame for July, 01–18 period of time.

Multi-frame functionality works in conjunction with PAT's ability to manipulate, manage and store plurality of documents on the client. In the PAT 22 this functionality may be implemented with active documents 1029 and frames 1028. Frames 1028 are views to active documents 1029, that store document data and user context. Frames can be opened, closed, activated, deactivated. They provide means and UI for the user to interact with the active document data. Document context can may be changed by user as a result of interaction with the document content though frames.

FIG. 25A is a logic flow diagram illustrating document lifecycle 16000. Routine 16000 is typically implemented by Presentation Logic Engine 1031 using cache 1026, active documents 1029, frames 1028 and submission buffer 1023 components. In routine 16001 the PAT 22 starts as a result of device startup or manual PAT startup initiated by the user. Routine 16001 follows to routine 16002, in which content of all the previously stored documents is read from non-volatile device memory and restored to the cache 1026. Routine 16002 follows to routine 16003, which reads document data from non-volatile memory and follows to routine 16013 in which the engine 1031 reads all frame timer settings for each loaded frame to active or hidden list. Routine 16013 follows to routine 16004 in which the engine 1031 reads and restores all document and frame data to the state as of the PAT was last shut down, applies it to the documents, restores frame order, and presents them to the user if the PAT is working if foreground mode, see FIG. 28 for detail on background/foreground execution. Routine 16004 follows to step 16012 in which the engine 1031 checks if among the timer values read from the persistent stores there are such that expired but have not been triggered due to the PAT 22 shutdown state. If there are such frame timers, the "YES" branch is followed to routine 24060 (FIG. 33E), which alerts the user and activates the frame and follows to routine 16010, which gets the next frame with such timer. Routine 16010 follows to step 16012. If there are no expired frame timer in step 16012, the "NO" branch is followed to routine 16005, in which the user interacts with the documents through frames and hidden frames. Routine 16005 follows to routine 16006 as a result of user request to shut down PAT 22 or device. Routine 16006 shuts down the PAT 22 by shutting down all listeners and closing all open connections, removing any visual elements and then follows to routine 16007, in which the engine 1031 saves document and frame data, current frame location and state (active/inactive) to the device non-volatile memory. Routine 16007 follows to routine 16009, which saves frame parameters to non-volatile memory and follows to routine 16008, in which the engine 1031 saves the PAT 22 cache 1026 to non-volatile memory and finalizes the shutdown procedure. Routine 16008 is followed by the "END" step, which concludes routine 16000.

FIG. 25B is a logic flow diagram illustrating close frame logic 16011. Routine 16023 is initiated by user by making a request to close the frame using the techniques provided by the PAT 22 or due the automatic or system requested close frame action. Routine 16023 follows to routine 16027, where the frame timer for the frame (if any) is cancelled and any related timer data is reset. Routine 16027 follows to step 16028 in which the state of the frame is checked to be hidden. If the frame is hidden, the "YES" branch is followed to routine 16029, which removes frame entry from the hidden list and follows to routine 16024. If the frame is not hidden, the "NO" branch is followed to routine 16023, which visually closes the frame and proceeds to routine 16013, which removes the frame icon from the frame bar and follows to routine 16024, which resets document data from frames 1028, active documents 1029. Routine 16024 follows to step 16026, in which the engine 1031 checks if the frame was active before closing. If the frame was active, the "YES" branch is followed to routine 16025, which activates another (next by existing order) frame and shows it to the user. If the frame was not active before closing, the "NO" branch is followed to the "END" step. Routine 16025 follows to the "END" step, which concludes the routine 16011.

FIG. 25C is a logic flow diagram illustrating hide frame logic 16030. Routine 16030 starts by following to the step 16034 in which the engine 1031 checks if the frame was active and visible to the user. If the frame was active, the "YES" branch is followed to routine 16031, in which the frame is deactivated if it was active and visible to the user. If the frame was not active, the "NO" branch is followed to routine 16032. Routine 16031 follows to routine 16035, which activates and shows next (following) frame. Routine 16035 follows to routine 16032, in which the frame is added to the hidden frame list, and then to routine 16033, where the frame icon is removed from the frame bar and the frame content is removed from the content area 3001 if it was visible to the user. Routine 16033 follows to the "END" step, which concludes routine 16030.

In order to ensure reliable information handling independent of the network coverage and other conditions, both PAT and PES implement queuing algorithms. Whenever radio communication is enabled, the pending queued client submissions are automatically sent to server and any pending push messages on the server are sent to the client. Such approach enables the server and client applications to send the data any time, while the recipient is going to receive it when it becomes possible. The following techniques and components deliver above described functionality in the current embodiment:

client registration/deregistration with the server whenever the radio and network state changes;
 device network presence monitoring on the server including router and routing tables;
 submission buffer on the client;
 queue and queue storage on the server.

It should be understood that similar functionality may be implemented differently depending on the capabilities of the underlying network and host devices. The described implementation is the best mode use known to the inventors and it is not intended to restrict the general scope of the present invention.

Figure 26:
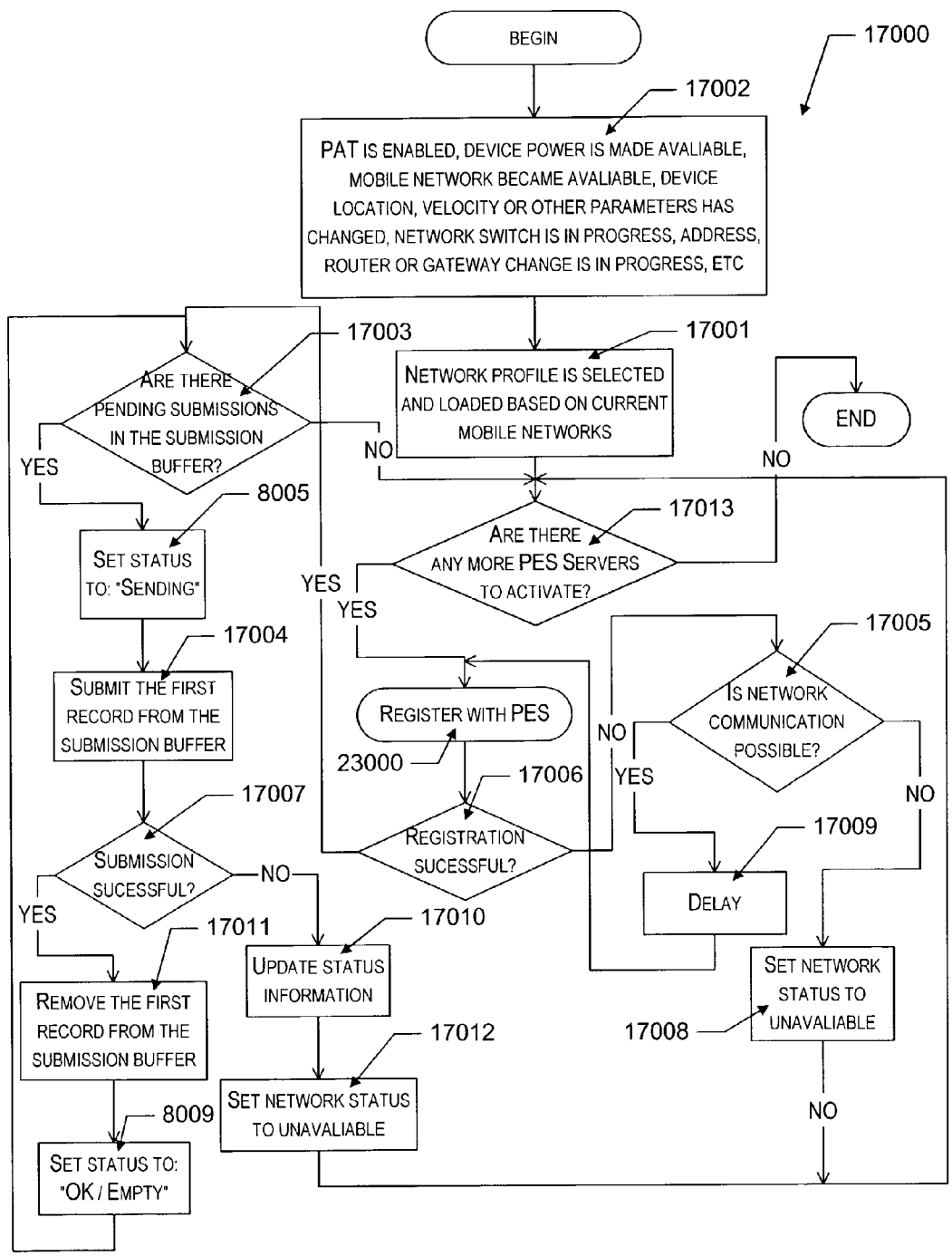
FIG. 26 is a logic flow diagram illustrating network activation process for the PAT.

FIG. 26 is a logic flow diagram illustrating PAT 22 registration with PES 27: routine 17000. Routine 17000 is typically implemented by the Transaction Manager 1034. Routine 17002 starts whenever PAT 22 starts, either manually or as a result of device power on, power made available to transmit, or whenever device enters coverage area (network became available), switches networks; or address, router or gateway change is in progress, device location, velocity or other parameters have changed, inventory parameters or any other parameters that might have to be reported to the PES 27 and/or Application Server 25 have changed, etc. It follows to routine 17001 in which the network profile, containing information about this network, is selected and loaded. Routine 17001 follows to step 17013, in which the engine checks the PAT 22 settings, to select the next unprocessed PES server registration to activate device with. If there are no more unprocessed PES registrations, the "NO" branch is followed to the "END" step.

If there are registrations to be carried out, the next registration information is read and the "YES" branch is followed to routine 23000, which registers the device with the PES 27 (FIG. 32A) and sends registration notification back to the device. In step 17006 the PAT 22 checks the registration notification. If the registration was successful, the "YES" branch is followed to the step 17003 in which the PAT 22 checks if there are submissions pending in the submission buffer 1023. If there are no such submissions and the buffer is empty, the "NO" branch is followed to the step 17013.

If there are pending submissions, the "YES" branch is followed to routine 8005 and follows to routine 17004, which submits the first records in the buffer to the server and follows to the step 17007, which waits for the server response and determines if the submission was successful. If it was successful, the "YES" branch is followed to routine 17011, which removes the transmitted submissions from the submission buffer 1023 and follows to routine 8009. Routine 8009 follows to routine 17003 to send other pending submissions. If submission in step 17007 was not successful, the "NO" branch is followed to routine 17010 which updates device status information, and follows to the routine 17012 which sets the network status to unavailable and follows to the step 17013.

If the registration was not successful in step 17006, the "NO" branch is followed to the step 17005 in which the device checks if the network communication is still available. If it is available, the "YES" branch is followed to routine 17009, which causes the PAT 22 to wait for some time (e.g. 20 sec) and follows to routine 23000 again. If the network is no longer available, the "NO" branch is followed to routine 17008, which sets the network status to unavailable and follows to the step 17013.

The "END" step concludes routine 17000.

Often application developers use relative URLs in applications, which may help to minimize content size transmitted through Mobile Network and make applications more portable. To enable this the base URL notion is defined. For regular pull applications base URL is the URL location requested by the user, but in push applications, where the request was initiated by the server, resolving relative URLs might present challenges, because the client system may not know the original document location. Similar problem may arise when the application server makes redirect operations and delivers pulled content to the client from different URL locations, than the ones originally requested. These challenges are solved with a special algorithm of passing base URL from server to client in X-Wap-Content-URI protocol header or similar means, which is supported by PAT 22.

Figure 27:
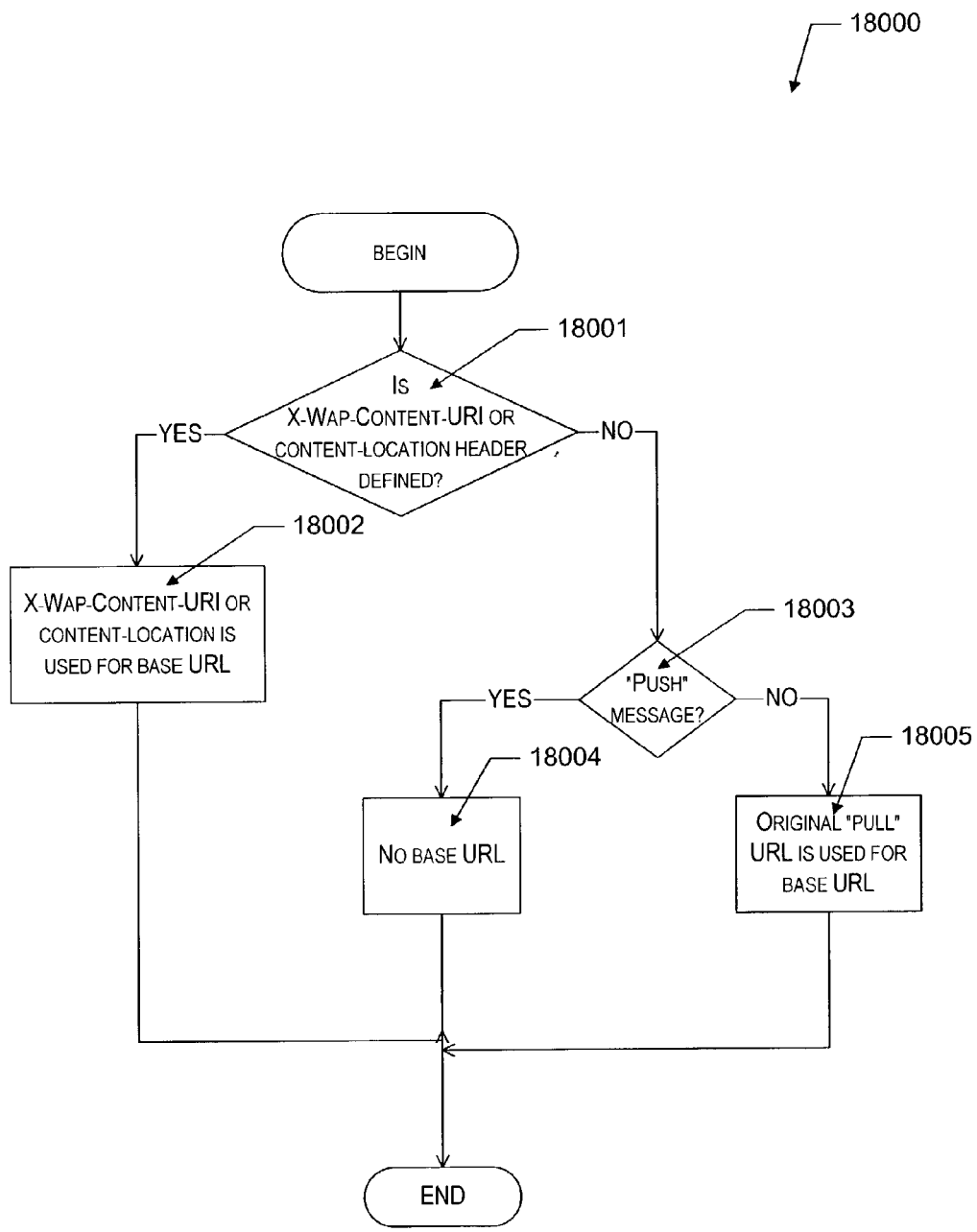
FIG. 27 is a logic flow diagram illustrating the base URL management logic.

FIG. 27 is a logic flow diagram illustrating base URL management logic 18000. Routine 18000 is typically implemented by Presentation Logic Engine 1031 to enable proper origin URL resolving while saving and presenting content in frames 1028. In step 18001 the engine 1031 checks if there is a "X-Wap-Content-URI" header delivered in the response (if it was not delivered its value may default to the "content-location" standard header, as defined in WAP Push Message Specification). If there is the subject header, the "YES" branch is followed to routine 18002 which extracts "X-Wap-Content-URI" value for use as a base URL for the document delivered with push messages or pulled by the PAT 22. Routine 18002 uses the extracted value to resolve all relative URLs in the document and then follows to the "END" step.

X-Wap-Content-URI header may not be defined in one of the following cases: pull request and no redirect done on Gateway 23, a gateway, which does not support this functionality, is used, etc. If this is the case, the "NO" branch is followed from the step 18001 to step 18003, in which the engine 1031 checks the origin of the push message, and, specifically, whether this content was sent to the client due to the server-initiated content delivery request (push). If this is server-initiated content delivery request, the "YES" branch is followed to routine 18004, in which document refresh and similar base URL-related functionality is disabled, preventing the user from accessing undefined URLs, all local links for images, etc. will result in PAT presenting alternative image text (if any), and all links that use relative URL will not submit to server, etc. Routine 18004 follows to the "END" step. If the request was done by user pull (original/requested URL is known to the engine 1031), the "NO" branch is followed to step 18005, in which original URL is taken for base URL and all relative links are resolved using it as the base. Routine 18005 follows is followed by the "END" step, which concludes routine 18000.

One of the basic requirements for proactive applications is the ability to receive information from the server any time the device is switched on and is in coverage area. The present embodiment implements the concept of background communications, when the PAT 22 may stay active and listen for radio events (or other communication events) all the time the device is switched on and communication is enabled. Along with server and client request buffering, this makes the PAT 22 an always-online system for proactive application.

Figure 28:
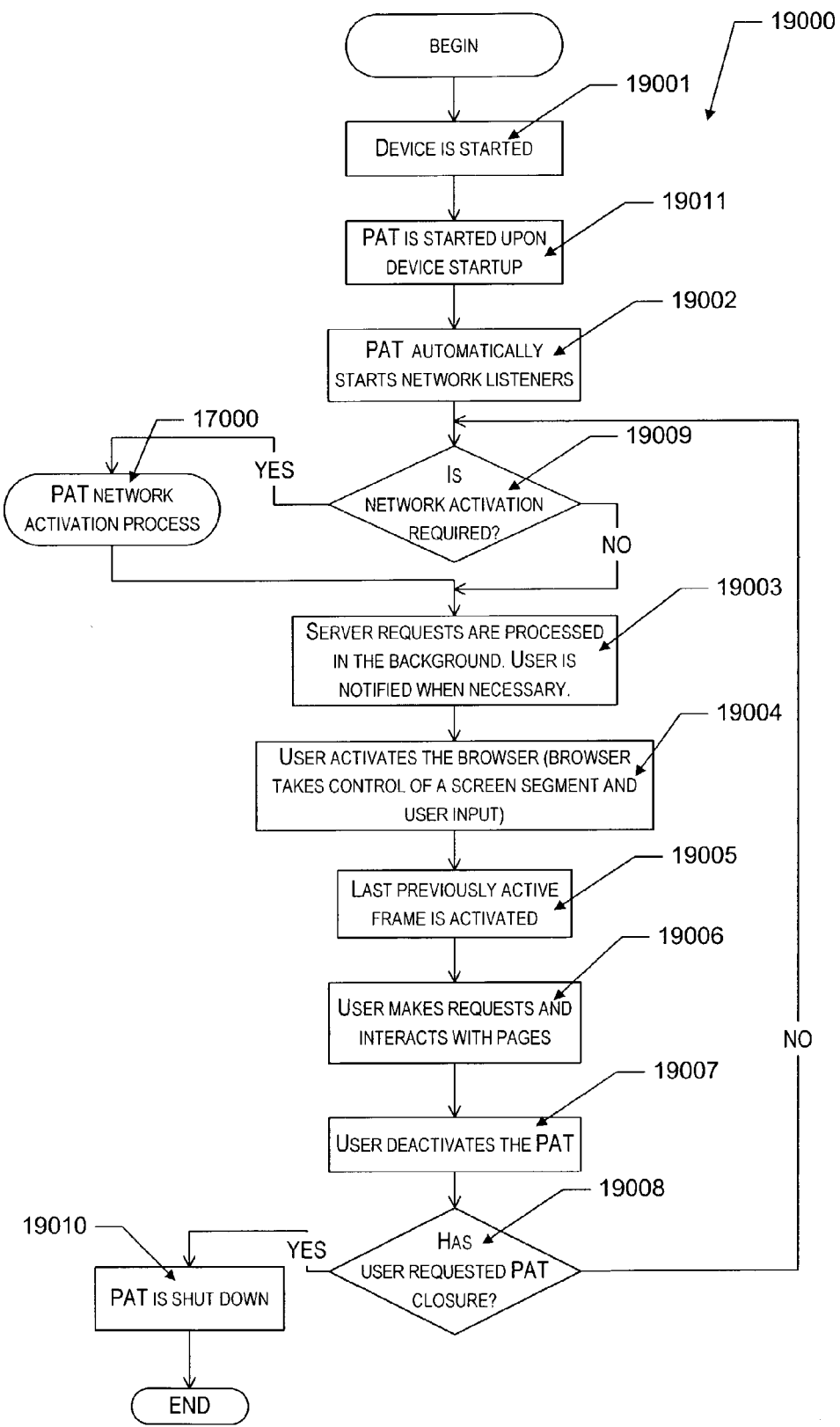
FIG. 28 is a logic flow diagram illustrating background communication logic.

FIG. 28 is a logic flow diagram illustrating background communication logic 19000. Background communications allow the PAT 22 to receive radio and Mobile Network 50 events, when it is not active and optionally to notify the user of incoming requests. Routine 19000 is typically implemented by the Transaction Manager 1034. Routine 19000 starts by following to routine 19001, which indicates device startup. Routine 19001 follows to routine 19011, in which the PAT 22 is automatically started or otherwise initiated upon device startup. As a result of routine 19011, the execution follows to routine 19002, in which the PAT 22 subscribes for network events and notifications without bringing itself to foreground unless it is specially configured to do so. Routine 19002 follows to step 19009, where the PAT 22 checks if the network activation is required. If the network activation is required, the "YES" branch is followed to routine 17000 and then to routine 19003. If the network activation is not required, the "NO" branch is followed to routine 19003, which is a process of accepting and processing radio and Mobile Network 50 events received in background mode, which may eventually result in user notification and automatic PAT 22 activation based on frame_alert system variable value (FIG. 23A). Routine 19003 follows to routine 19004, which denotes the moment of user activation of the PAT 22. Activation in this contents means bringing the PAT 22 to the state where user can communicate with the PAT 22 via visual or other applicable representation. Routine 19004 follows to routine 19005, in which the PAT 22 presents the current state of frames 1028 to the user (the last active frame on the front) and waits for user submissions or requests. Routine 19005 follows to routine 19006, in which user interacts with the frames, makes requests, and receives responses. Eventually following user action the routine 19006 follows to routine 19007, in which user requests PAT 22 deactivation, which transfers all communications in background mode again and hides PAT from the direct user interaction. Routine 19007 follows the step 19008 in which the PAT 22 checks if the user requested PAT 22 closure. If the user did not request PAT 22 closure, the "NO" branch is followed to routine 19009. If the user did request the closure, the "YES" branch is followed to routine 19010 to shutdown the PAT and then to the "END" step, which concludes the routine 19000.

Developers and system administrators usually need to track application/device errors that may happen in runtime. In order to provide this capability a distributed logging and inventory system was invented.

Figure 29:
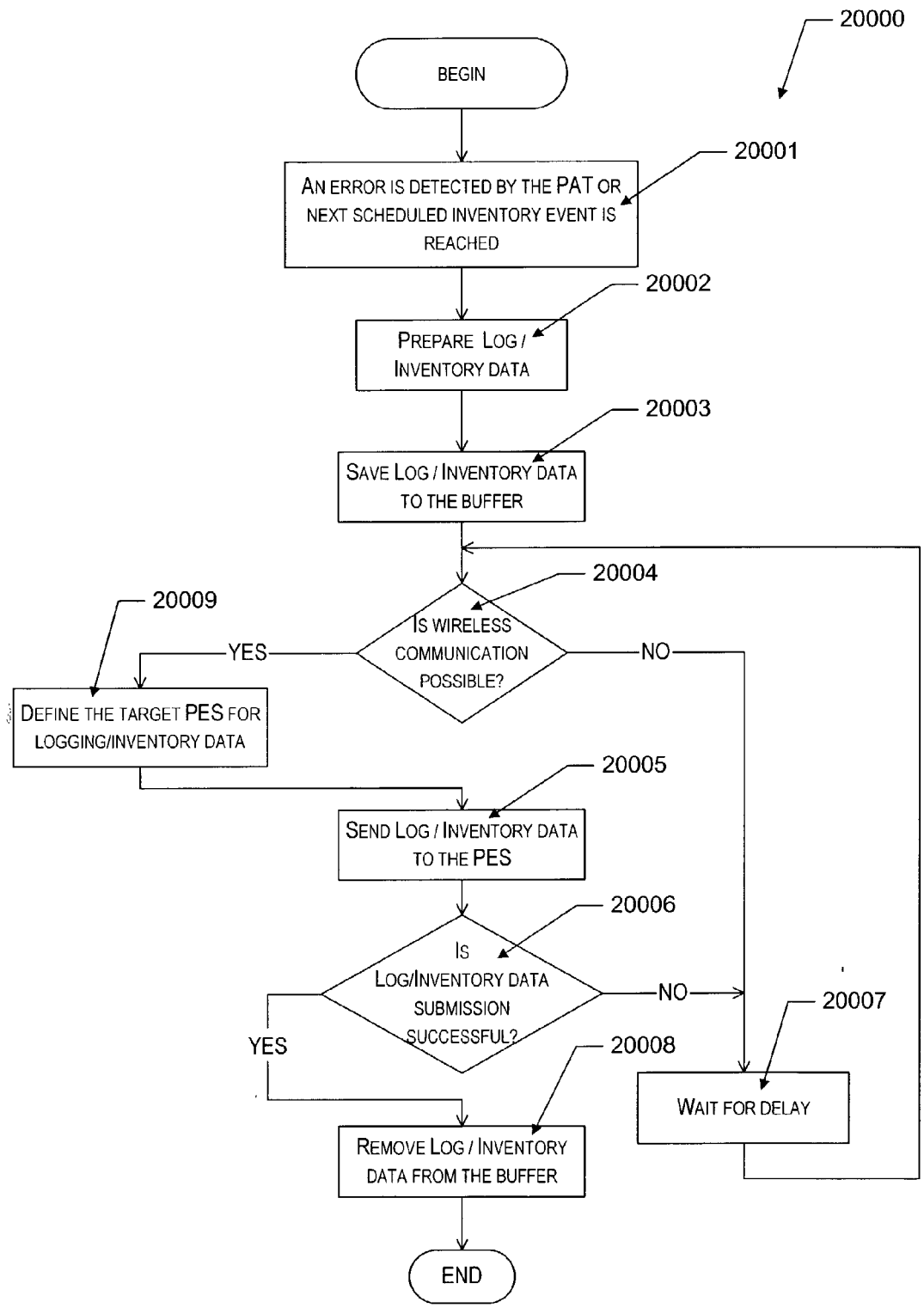
FIG. 29 is a logic flow diagram illustrating distributed logging logic for the PAT.

FIG. 29 is a logic flow diagram illustrating client system distributed logging logic 20000. Routine 20000 may be implemented by the PAT 22 through Logging Buffer 1047. Routine 20001 executes whenever an erroneous situation is detected in the PAT 22 or the next scheduled inventory event is reached or requested by the user, system administrator or application. It is understood that in different implementation there can be different logging levels or logging may be turned off by configuration process, inventory scheduling events may be hard-coded in the PAT or arrive from the PES 27, application, etc. The routine 20001 follows to routine 20002 in which the PAT 22 prepares the log/inventory data, by compiling the appropriate message or dumping internal PAT 22 state information, etc. Routine 20002 immediately follows to the routine 20003, in which the PAT 22 saves the data to the Logging Buffer 1047 and follows to routine 20004, in which the PAT 22 checks if the wireless communication is possible (there is network coverage, etc.). If the wireless communication is possible, the "YES" branch is followed to the routine 20009, in which PAT 22 determines the target PES 27 to receive logging and inventory data. The definition algorithm may be based on document base URL where the error occurred, last used PES 27, user settings for default PES, etc. Routine 20009 follows to routine 20005, in which the PAT 22 sends the data to the PES 27, and waits for response. When server response comes through, it follows to step 20006, in which it checks the response. If the response contains a success message, the "YES" branch is followed to routine 20008, which removes the data from the Logging buffer 1047. If the response indicates that the logging action was not successfully completed on server, the "NO" branch is followed to the routine 20007.

If in step 20004 the wireless communication was not possible, the "NO" branch is followed to routine 20007, which waits for certain timeout and when elapsed, eventually follows to the step 20004.

It is understood that the timeout value may be defined in various ways, starting from static timeout value, user-defined timeout value, dynamically calculated timeout, etc.

The routine 20008 is followed by the "END" step, which concludes routine 20000.

Figure 30:
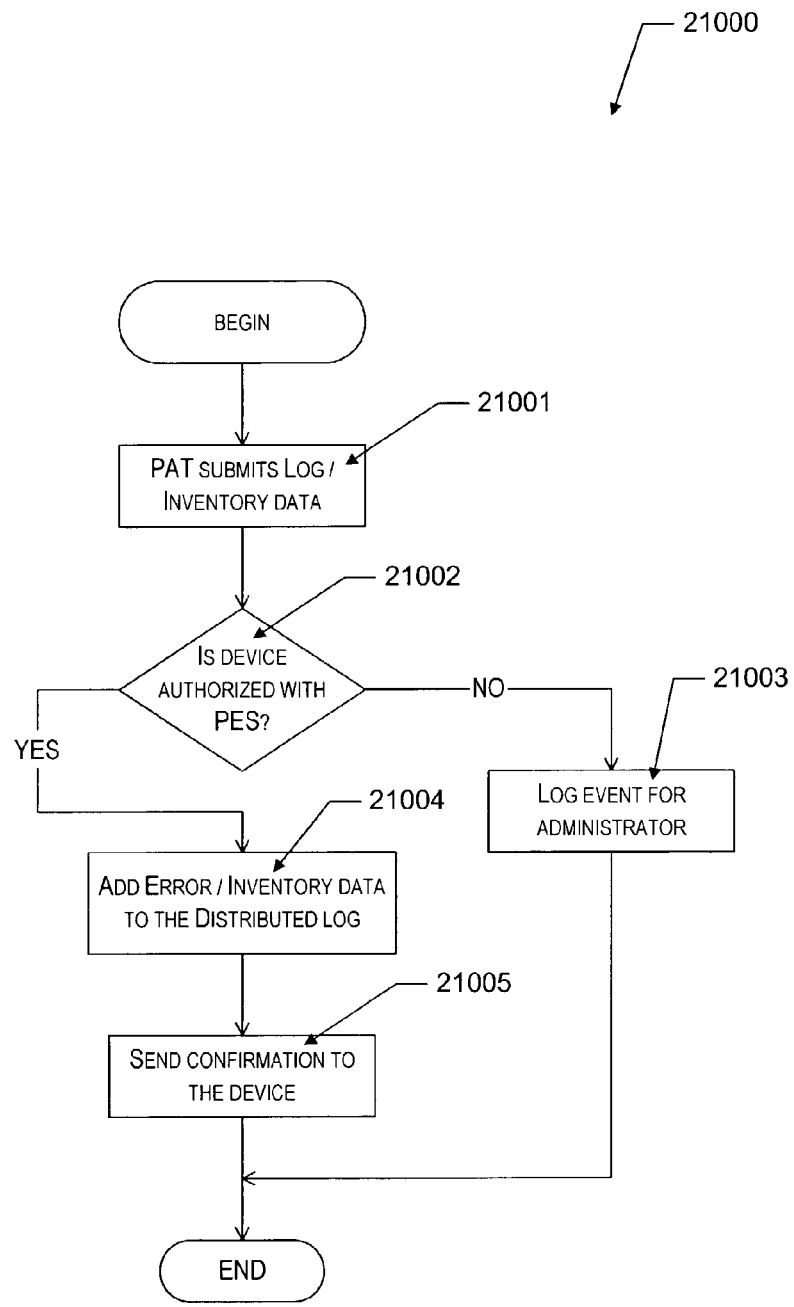
FIG. 30 is a logic flow diagram illustrating distributed logging logic for the Server.

FIG. 30 is a logic flow diagram illustrating server system distributed logging logic 21000. Routine 21000 is typically implemented by the Logging and Inventory Management Engine (LIME) 1045. Routine 21000 starts by following to routine 21001, which occurs when the PAT 22 submits log/inventory data to the server for logging. Routine 21001 follows to the step 21002, in which the PES 27 checks if the device was authorized with it. If the device was not authorized by the PES 27, the "NO" branch is followed to the routine 21003, which logs the event to the administrator and follows to the "END" step. If the device is authorized with the PES 27, the "YES" branch is followed to routine 21004, in which LIME 1045 logs data to the distributed log and follows to routine 21005 in which the PES 27 sends the confirmation back to the device.

Routine 21005 and 21003 follow to the "END" step, which concludes routine 21000.

When device switches between networks the gateway and device addresses might change. In order to know the correct information to send delivery requests, the PES 27 may implement request routing algorithms.

Figure 31:
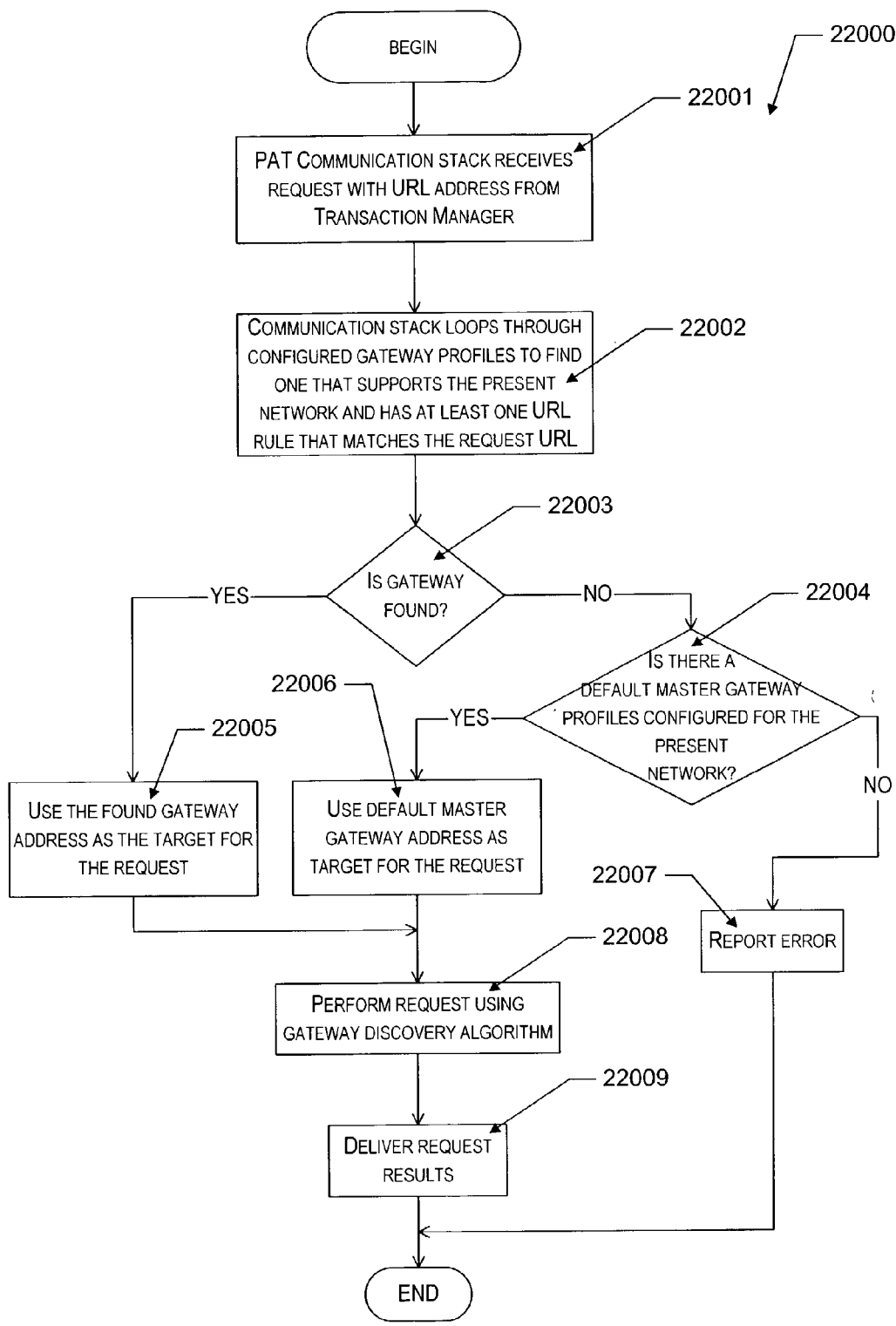
FIG. 31 is a logic flow diagram illustrating PAT request routing.

FIG. 31 is a logic flow diagram illustrating PAT 22 request routing logic 22000. Routine 22000 is typically implemented by the Communication Stack 1022. Routine 22000 starts by following to routine 22001, whenever request comes from the Transaction Manager 1034 to load content or make request from/to URL address. Routine 22001 follows to the routine 22002, in which the Communication Stack 1022 loops though the gateway addresses known to the PAT 22, to find the one suitable for the present Mobile Network 50. It may also check for the gateway configuration to have at least one URL rule that matches the request URL. Routine 22002 follows to step 22003 where the stack 1022 checks if routine 22002 found such gateway address. If there is such gateway, the "YES" branch is followed to routine 22005, in which Communication Stack 1022 sets the gateway as a target for communications for this request, and follows to routine 22008, which performs the request, and waits for results if any, and follows to routine 22009, which handles result processing and delivers them further in the PAT 22 delivery chain.

Continuing from the step 22003. If the gateway was not found, the "NO" branch is followed to the step 22004, in which Communication Stack 1022 checks user configuration settings or uses any other network-specific method to discover the default master gateway information for the present network. If there is a default master gateway for the network, the "YES" branch is followed to routine 22006, which sets the default master gateway as the target for communications for this request and follows to routine 22008. If in step 22004 the default master gateway for this network was not found, the "NO" branch is followed to routine 22007, which reports the configuration error to the user.

Routines 22007 and 22009 follow to the "END" step, which concludes routine 22000.

Figure 32:
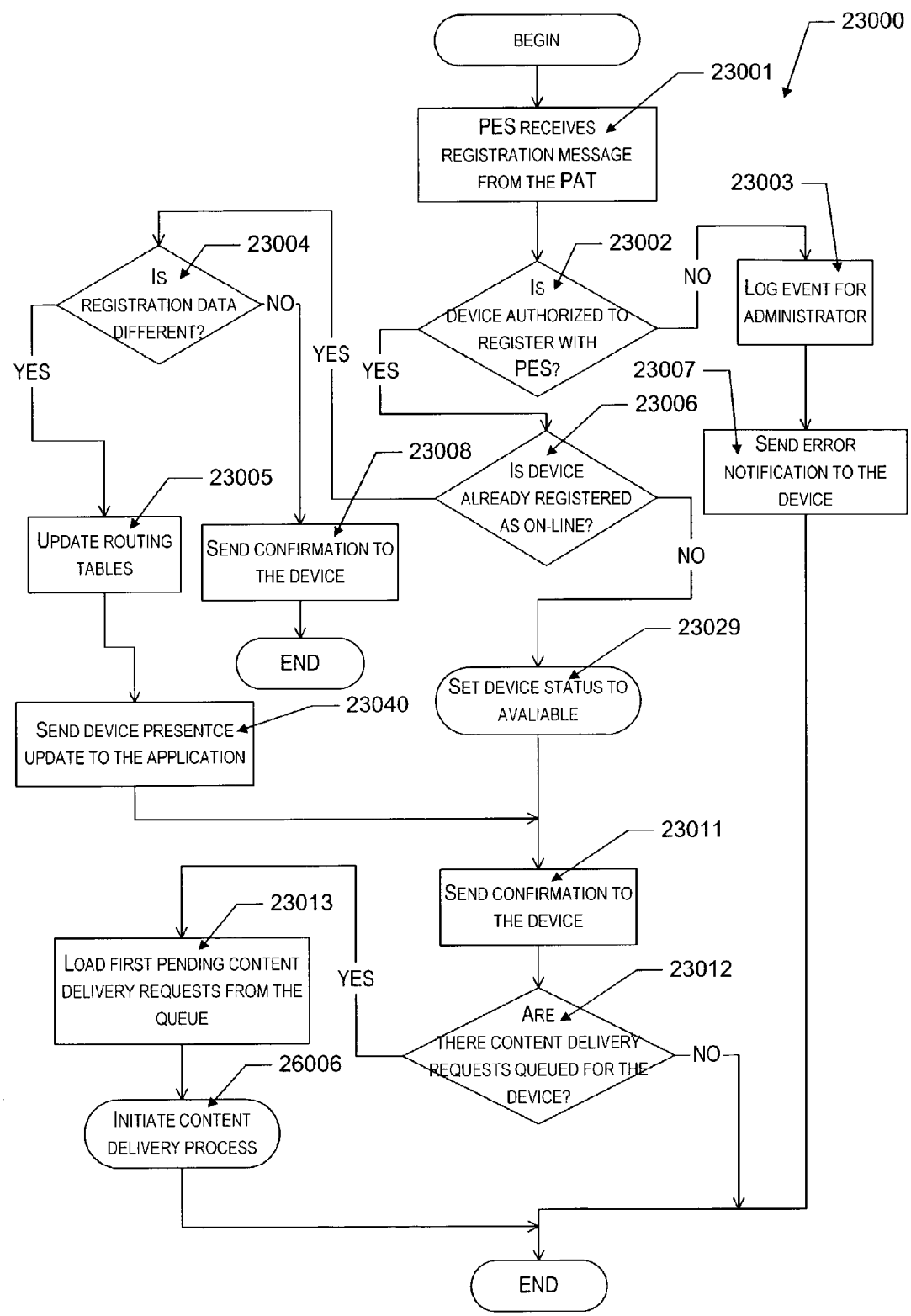
FIG. 32A is a logic flow diagram illustrating device registration logic.
FIG. 32B is a logic flow diagram illustrating device de-registration logic.
FIG. 32C is a logic flow diagram illustrating setting device status to available logic.
FIG. 32D is a logic flow diagram illustrating setting device status to unavailable logic.
Figure 32:
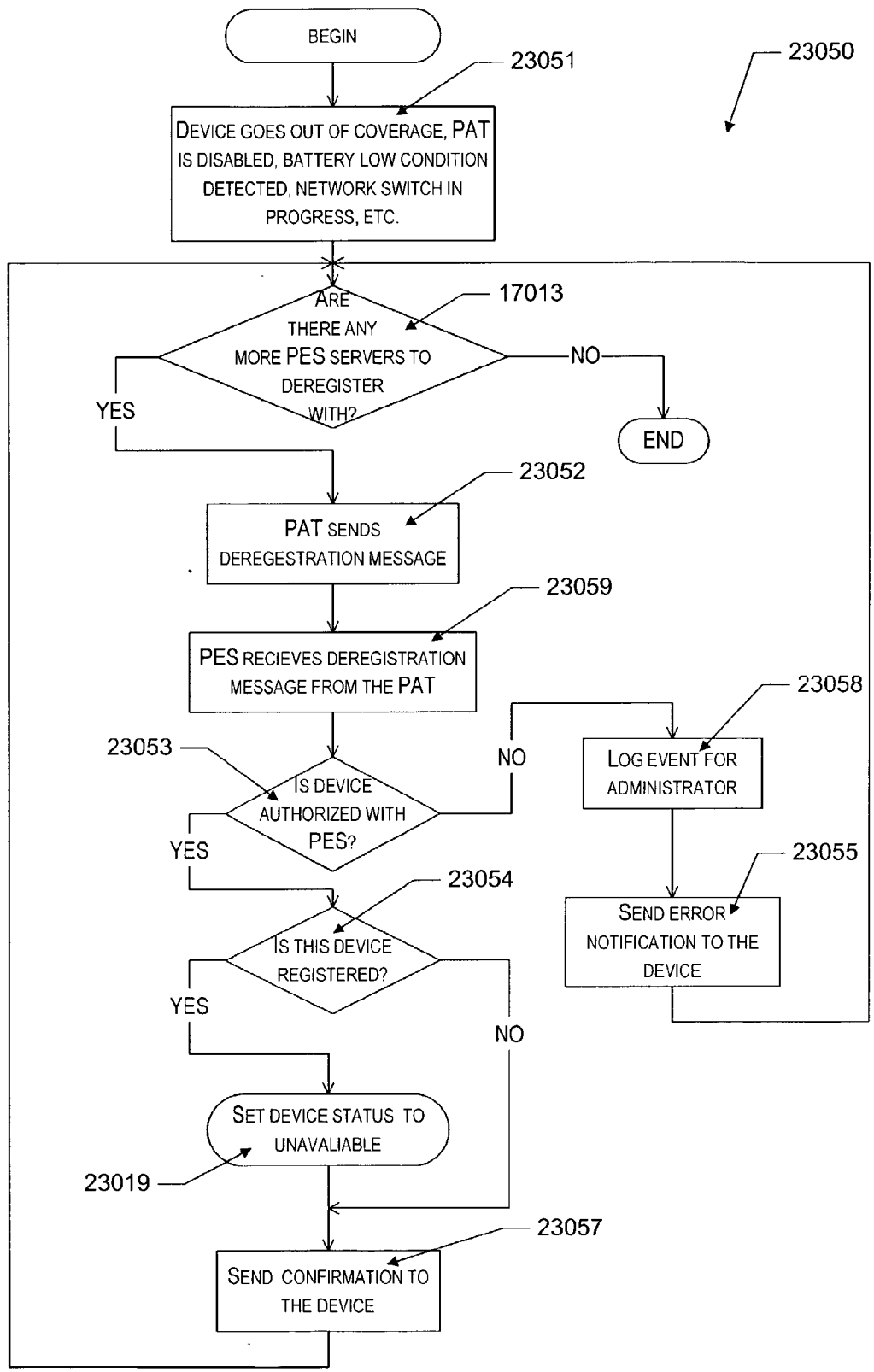
Figure 32:
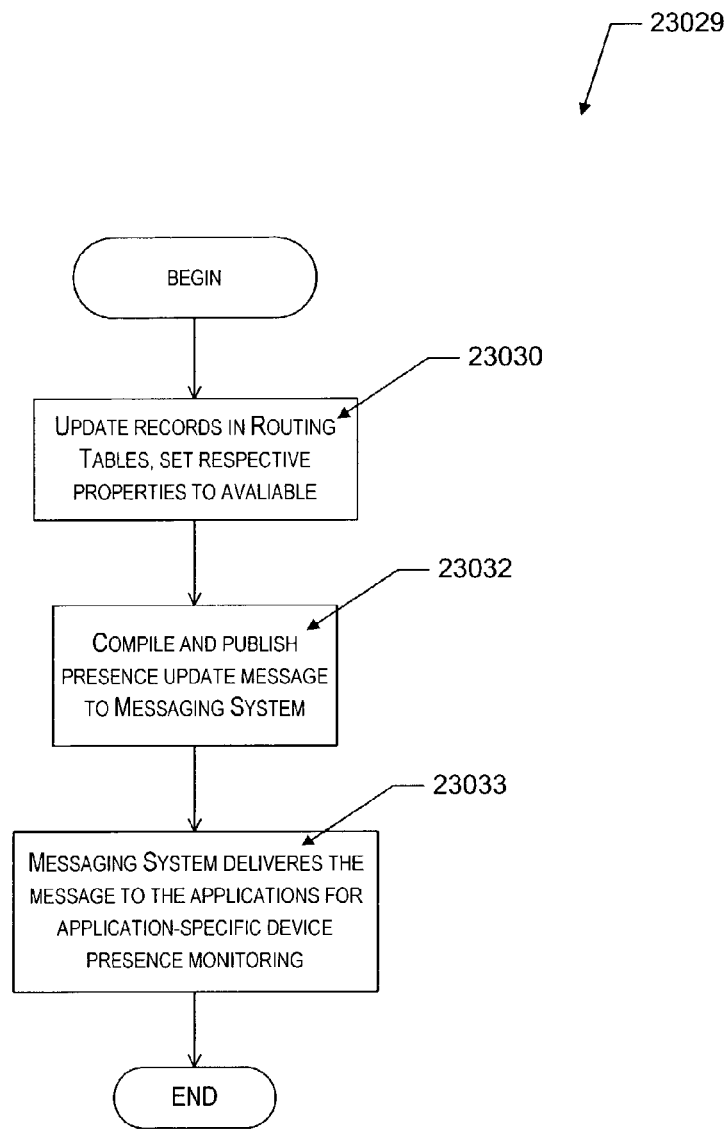
Figure 32:
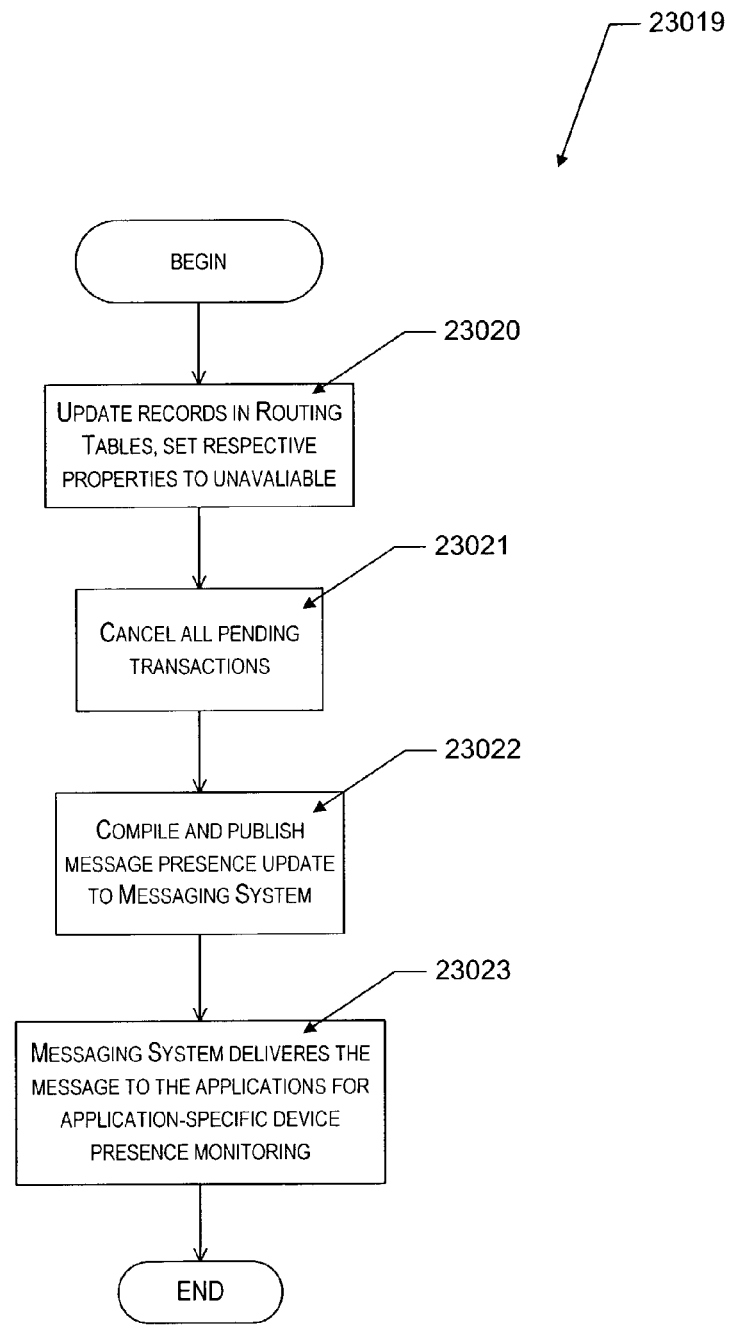

FIG. 32A is a logic flow diagram illustrating device registration process logic 23000. The device registration is used to let PES 27 and specifically Presence Monitor 1019 know about device location, used Mobile Network 50, ability to receive content delivery requests, etc. The device registration information is used by PES 27 in various authorization scenarios and device identification information, including managing device identifiers, network information, gateway information, as well as for location-specific, location-driven and presence dependent applications, etc. The device registration process is started as a result of routine 17000. It starts from routine 23001 in which the PES 27 receives the registration information from the PAT 22. It then follows to routine 23002, in which it checks by any implementation-specific method (including possibly using certificates for authorization) if the device is authorized to register with the PES 27. This may be defined with mappings, built-in algorithms, can be based on server administrator settings, etc. For example, the administrator may allow any device to register with the PES 27 or only limited group of devices is allowed, etc. If the device is not authorized to register with the PES 27, the "NO" branch is followed to routine 23003, in which PES 27 logs this attempt to the log file and follows to routine 23007, which sends notification back to the device which had its registration request rejected. The notification response may include any information used by the device to discover that the server rejected the registration, with additional comments, including rejection reason, etc.

If the device is authorized by the PES 27 to register in step 23002, the "YES" branch is followed to the step 23006, in which the PES 27 checks its stored records and/or mappings to identify if the device from which the registration request was received, is marked as online. If the device is marked as online, the "YES" branch is followed to the step 23004, in which the PES 27 compares the registration data with the data from the previous registration. If in routine 23004 the data are the same, the "NO" branch if followed to routine 23008, in which PES 27 sends registration confirmation to the device. The confirmation may contain any information used by the device to identify that the PES 27 accepted the registration and is ready for processing content delivery requests.

If the registration data in step 23004 are different, the "YES" branch is followed to routine 23005, in which PES 27 updates device routing tables, where it stores detailed data for each device, including network(s) used, gateway(s) used, etc., and follows to routine 23040, which sends device online presence update message to the Application Server 25, which includes all available information including but not limited to device identification, device addresses, time, location, network identification, velocity and direction vector of device motion, inventory data, such as radio signal level, battery level, available memory on the device, air temperature, etc., and follows to routine 23011, which sends registration confirmation to the device.

Continuing from the step 23006. If the device, which sent registration information, is not registered as online, the "NO" branch is followed to routine 23029 described in FIG. 32C, which follows to routine 23011.

Figure 35:
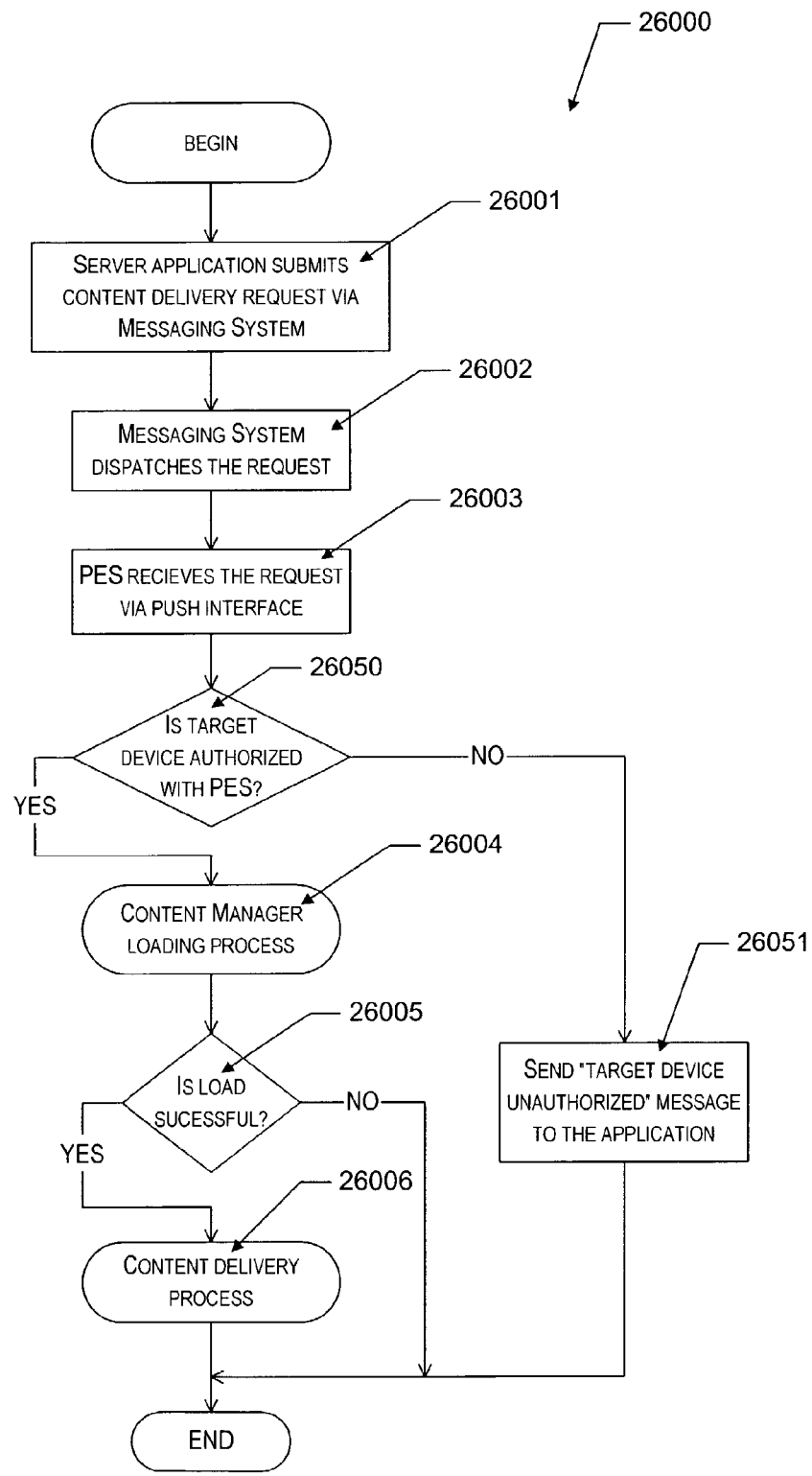
FIG. 35A is a logic flow diagram illustrating server initiated content delivery logic.
FIG. 35B is a logic flow diagram illustrating content manager loading process.
FIG. 35C is a logic flow diagram illustrating content delivery process.
Figure 35:
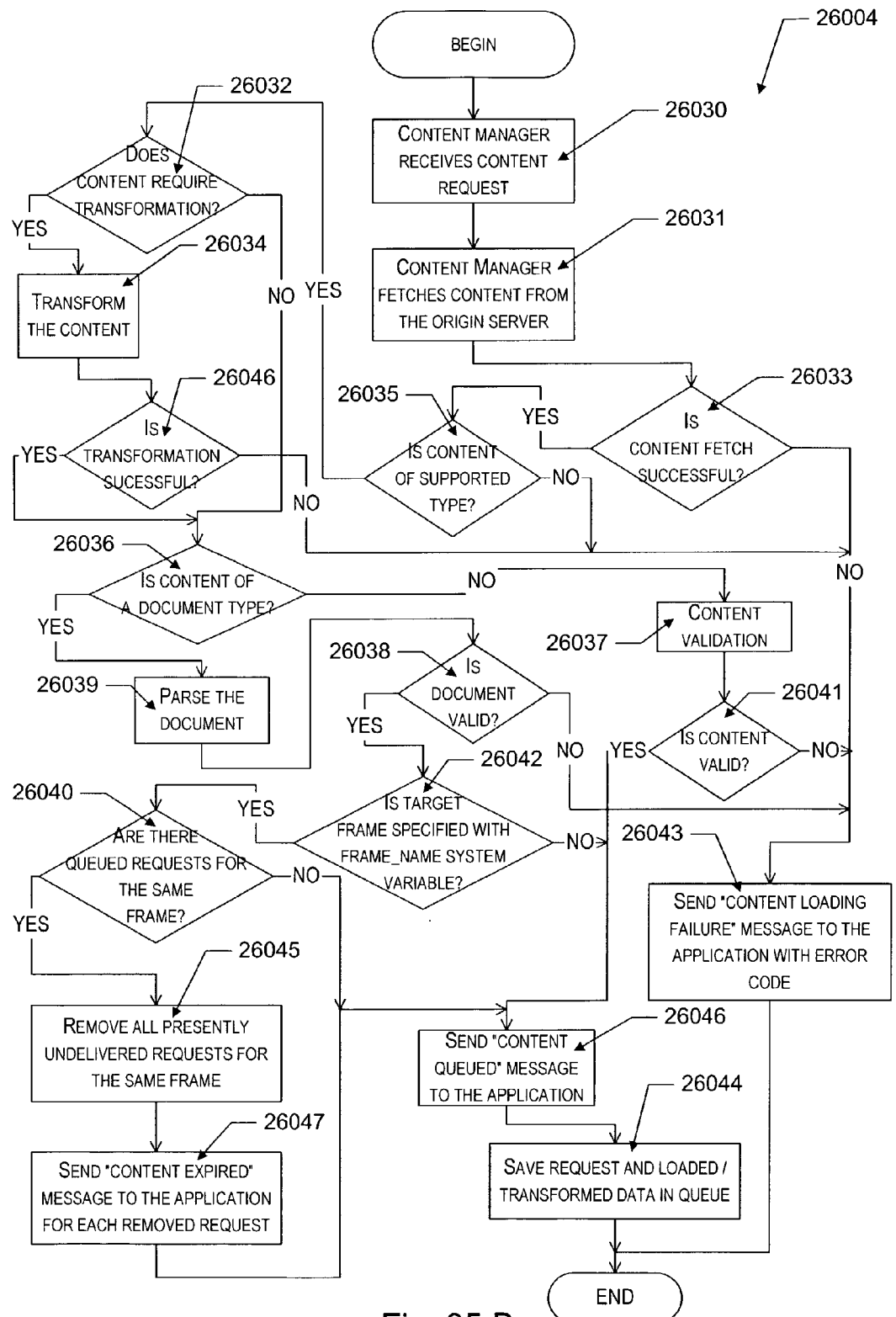
Figure 35:
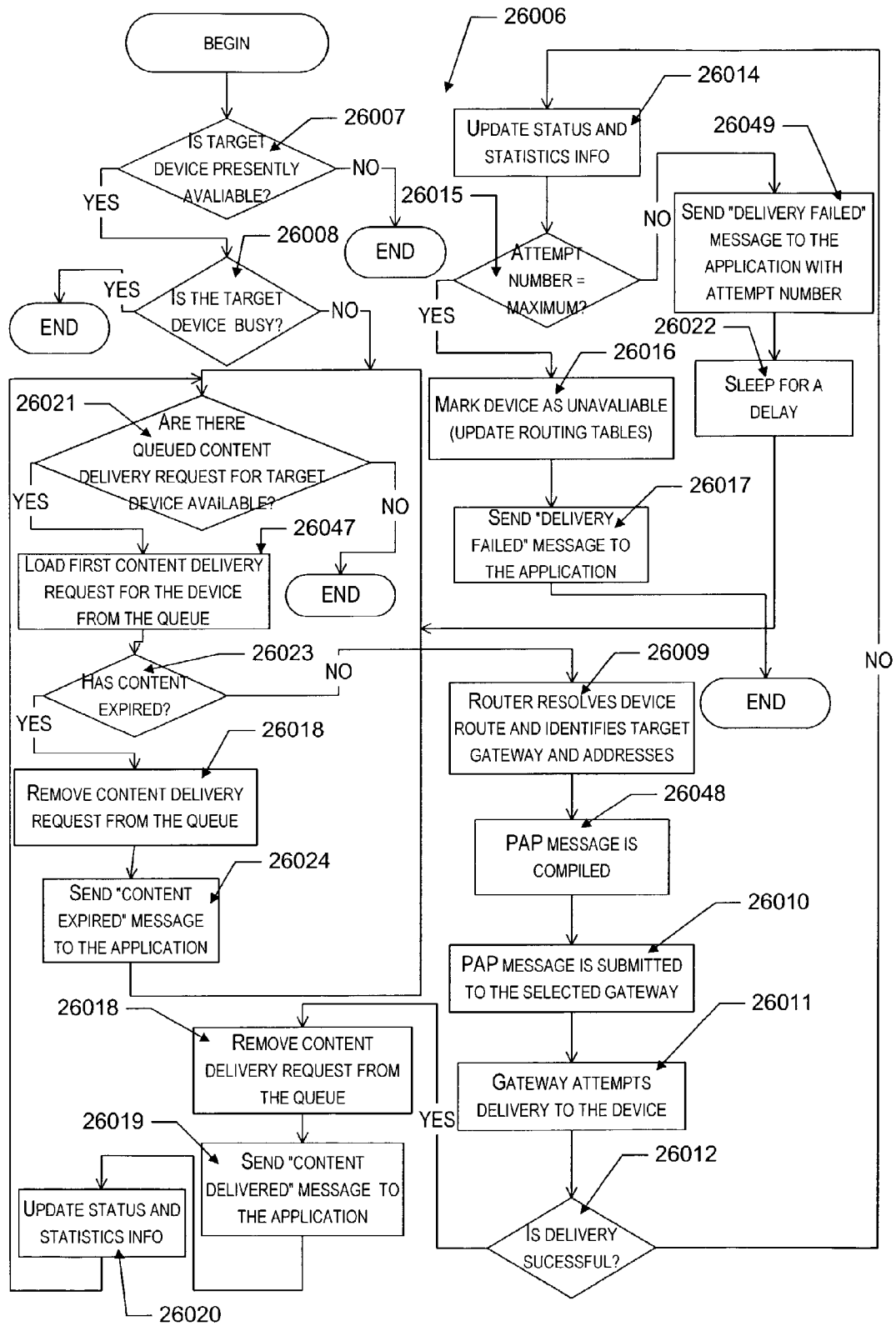

Routine 23011 immediately follows to step 23012, in which PES 27 looks up the queue of content delivery requests for this device. If it is not empty and there are pending requests, the "YES" branch is followed to routine 23013, in which PES ranges the requests by their priority and loads the first requests from the queue. Routine 23013 is followed by subroutine 26006 of content delivery process (FIG. 35B).

Routines 23007, 23008, 23012 ("NO" branch), 26006 are followed by the "END" step, which concludes routine 23000.

FIG. 32B is a logic flow diagram illustrating device de-registration process logic 23050. Device de-registration process is the part of this invention and is needed to allow the PES to be informed that the device is not able to receive content delivery requests from that moment on until the next timer device registration 23000 occurs. Routine 23051 indicates possible reasons why the device may need to deregister, they include device going out of coverage, PAT 22 being disabled, battery low condition, etc. Routine 23051 follows to step 17013, which checks if there are any more PES servers to deregister and reads the next server information. If there are no more PES servers to deregister, the "NO" branch is followed to the "END" step. If there are PES servers, the "YES" branch is followed to routine 23052, in which the PAT 22 sends the deregistration request to PES 27. The deregistration message contains any required device identification information, optionally accompanied by the deregistration reason information. Routine 23052 follows to routine 23059, which denotes PES receiving the request from the device. Routine 23059 follows to step 23053, where the PES 27 receives the deregistration request from the device and checks if the device is authorized to communicate with PES 27 (see routine 23000 for more on authorization). If it is authorized with PES 27, the "YES" branch is followed to step 23054, in which PES 27 checks if the device was registered. If it is not authorized with PES 27, the "NO" branch is followed to routine 23058, in which PES 27 reports the access violation to the log for administrator and follows to routine 23055, in which PES sends error notification to the device (see routine 23000 for more on error notification).

Continuing from the step 23054. If the device is registered with this PES 27, the "YES" branch is followed to routine 23019 described in FIG. 32D, which follows to routine 23057, in which the PES 27 sends confirmation to the device that deregistration was successful. If in step 23054 the device is not registered with the PES, the "NO" branch is followed to the routine 23057. Routines 23057 and 23055 follow to step 17013 to start deregistration for the next PES 27.

The "END" step concludes routine 23050.

FIG. 32C is a logic flow diagram illustrating server actions used for setting device status to available (online) 23029. The routine 23029 starts by following to routine 23030, in which the PES 27 updates device information in Routing Tables 47 and other records to set device status to available. Routine 23031 follows to routine 23032, which compiles and publishes presence update messages to the Messaging System 1007 using Push Interface 1014. Routine 23032 follows to routine 23033, in which Messaging System 1007 delivers the device presence update messages to the Application Server 25 for application-specific device presence monitoring functionality as described in routine 23000.

FIG. 32D is a logic flow diagram illustrating PES 27 actions used for setting device status to unavailable (offline) 23019. The routine 23019 starts by following to routine 23020, in which the PES 27 updates device information in Routing Tables 47 and other records to set device status to unavailable. A special situation may occur when the PAT 22 fails to respond to the server-initiated content delivery attempts, in which case the PES 27 marks the device as unavailable and executes this routine in order to deregister the device if it failed to deregister itself prior to loosing communication abilities. Routine 23020 follows to routine 23021, where the PES 27 cancels all pending transactions for the device and follows to routine 23022. Routine 23022 compiles and publishes presence update messages to Messaging System 1007 using Push Interface 1014. Routine 23022 follows to routine 23023, in which Messaging System 1007 delivers the device presence update message to the Application Server 25 for application-specific device presence monitoring functionality.

Routine 23023 is followed by the "END" step which concludes routine 23020.

In the PAT 22 users usually keep multiple frames open at the same time. Such frames act as conduits to application functionality, often frames need to stay open for extended periods of time. It is possible to leave all frames permanently open in the frame bar, but this may exceed rational limits of framebar navigation capacity or result in the frame bar being filled with a large number of frames that are accessed infrequently by the user. An alternative solution is invented to address this challenge: hidden stateful frames, which are not reflected in the frame bar. The user can transfer the frame into hidden state, where the state including document data and context are maintained, as if the frame were shown on the framebar. It is understood that there are means in the PAT 22 for the user to switch frames between hidden/visible states.

Figure 33:
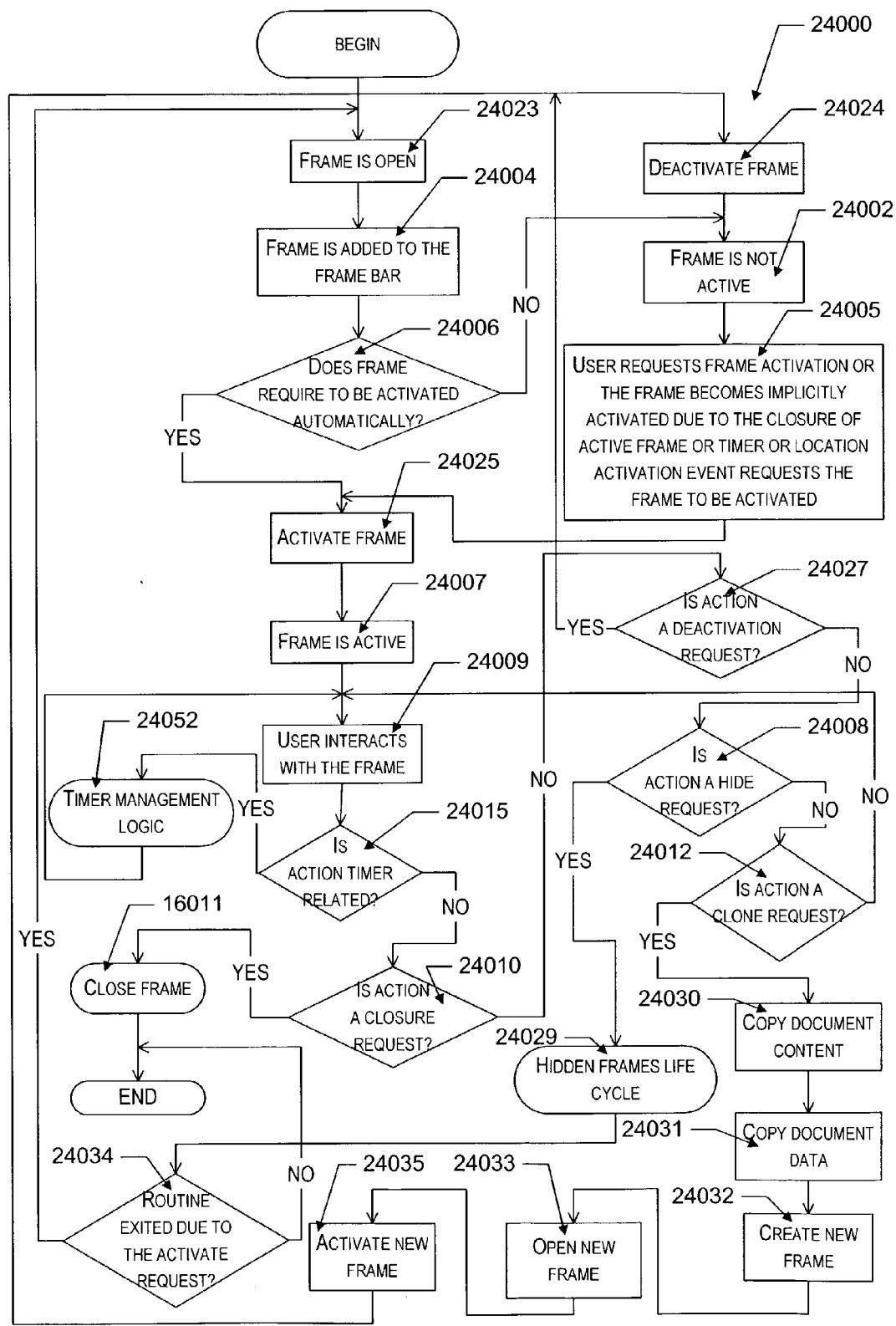
FIG. 33A is a logic flow diagram illustrating frame life cycle.
FIG. 33B is a logic flow diagram illustrating hidden frame life cycle.
FIG. 33C is a logic flow diagram illustrating timer event life cycle.
FIG. 33D is a logic flow diagram illustrating timer management logic.
FIG. 33E is a logic flow diagram illustrating user notification logic.
FIG. 33F is a logic flow diagram illustrating location_activation event life cycle.
Figure 33:
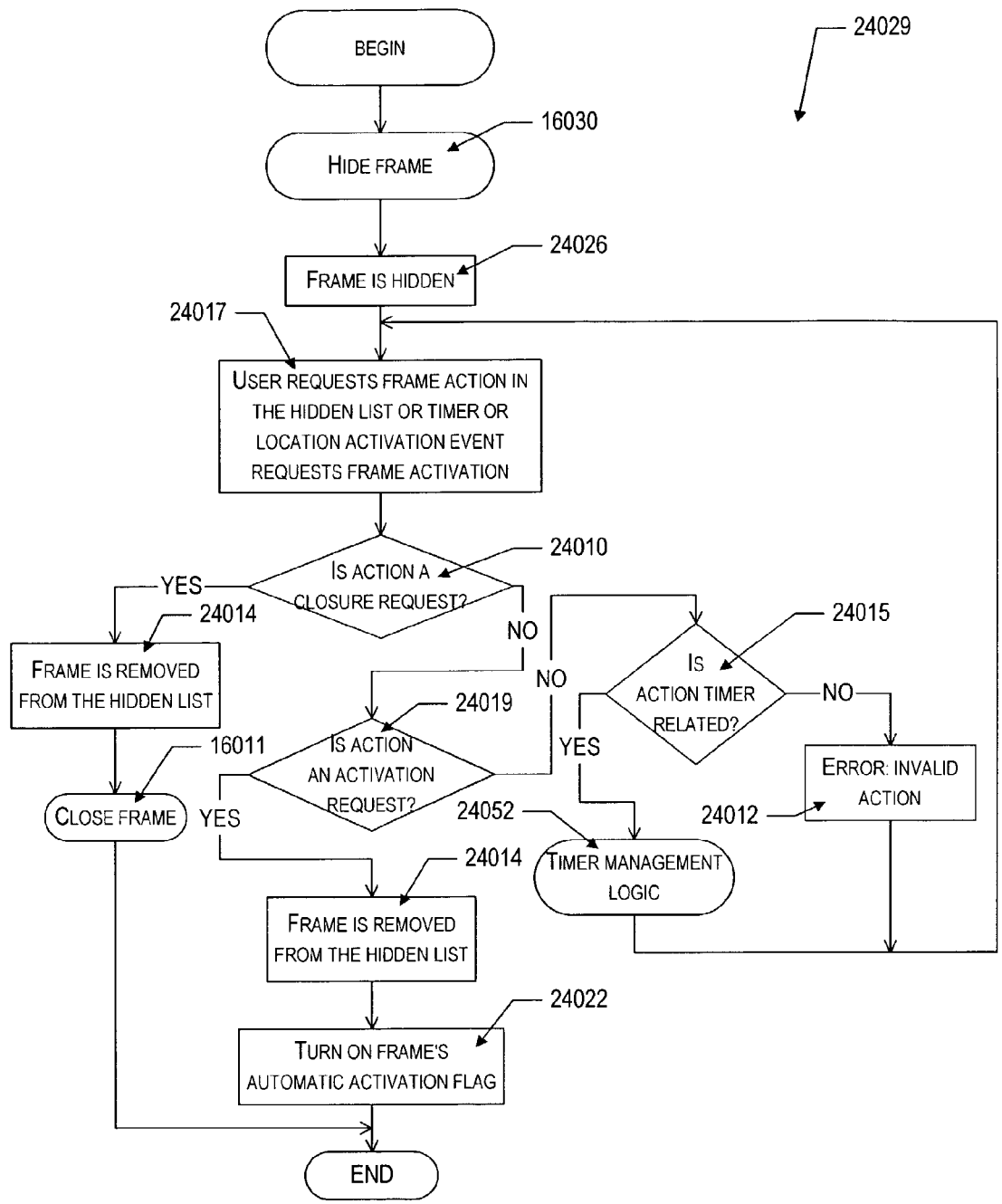
Figure 33:
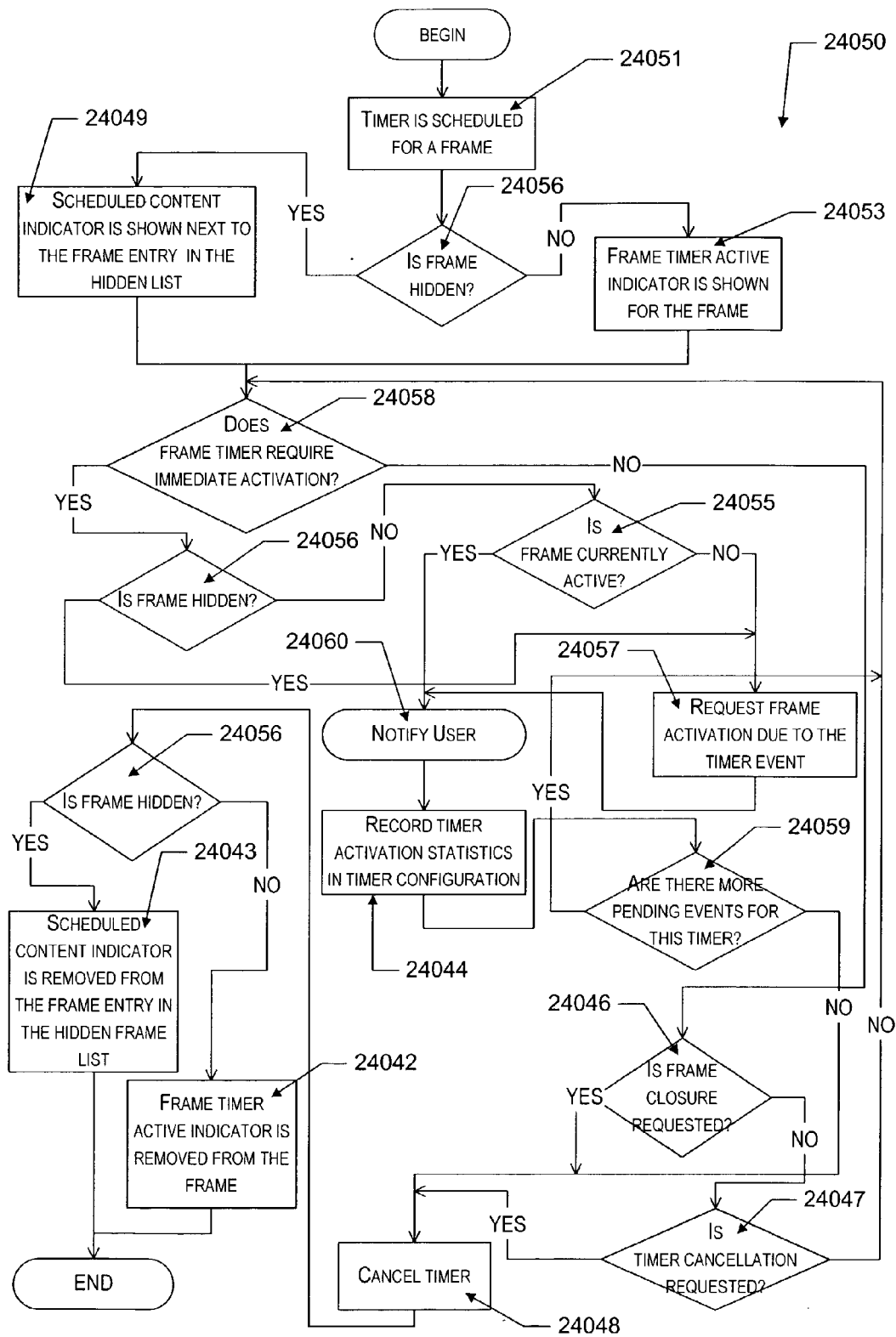
Figure 33:
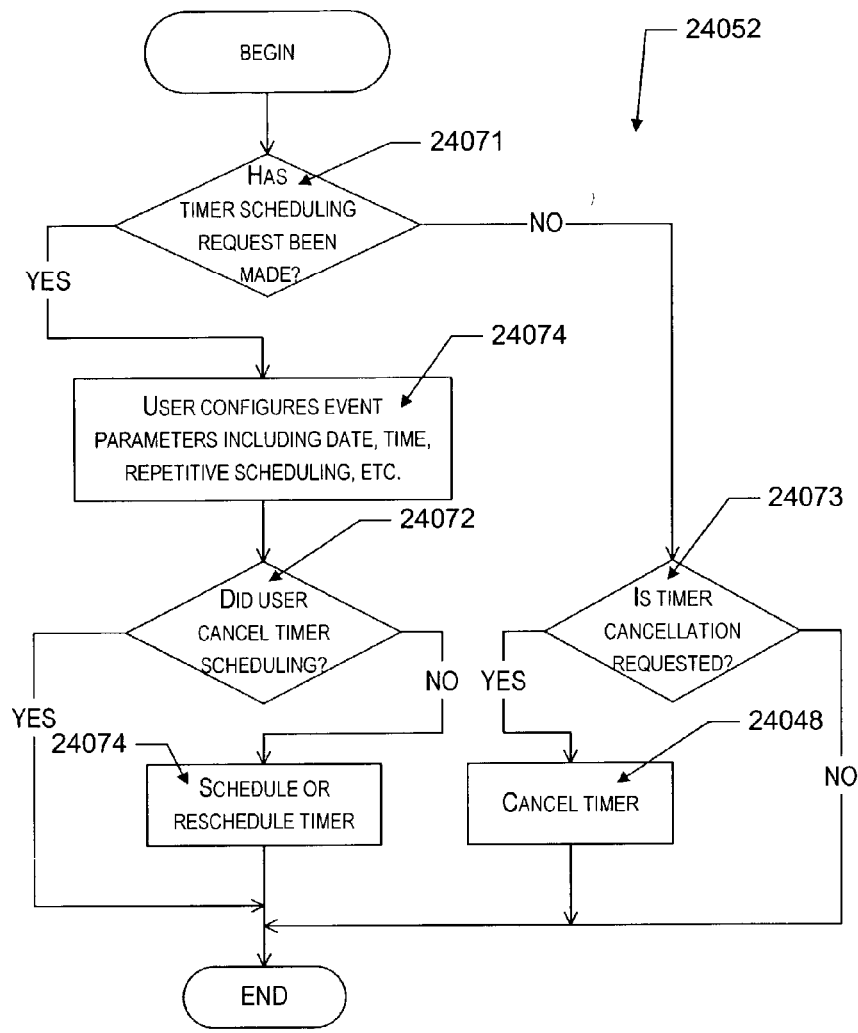
Figure 33:
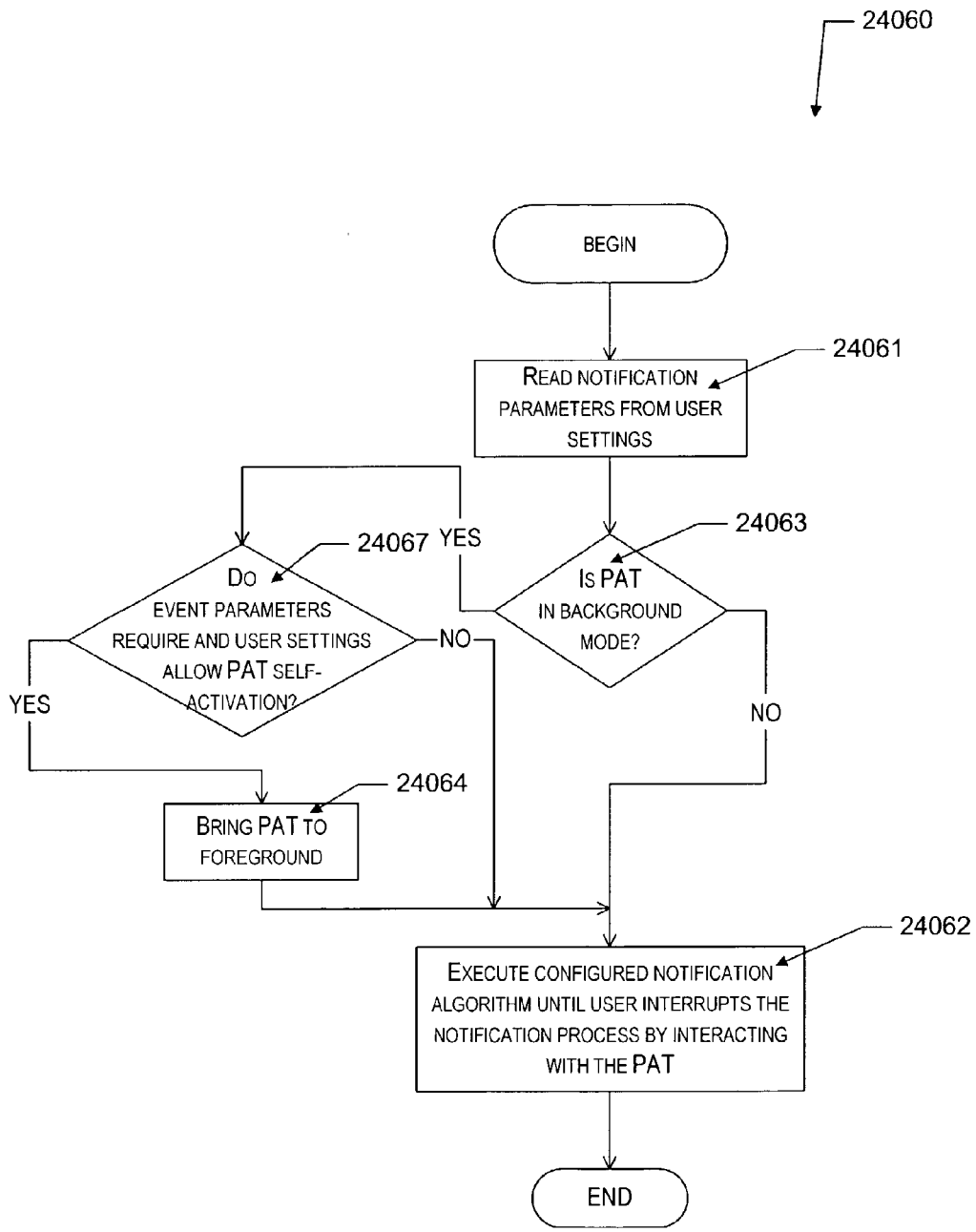
Figure 33:
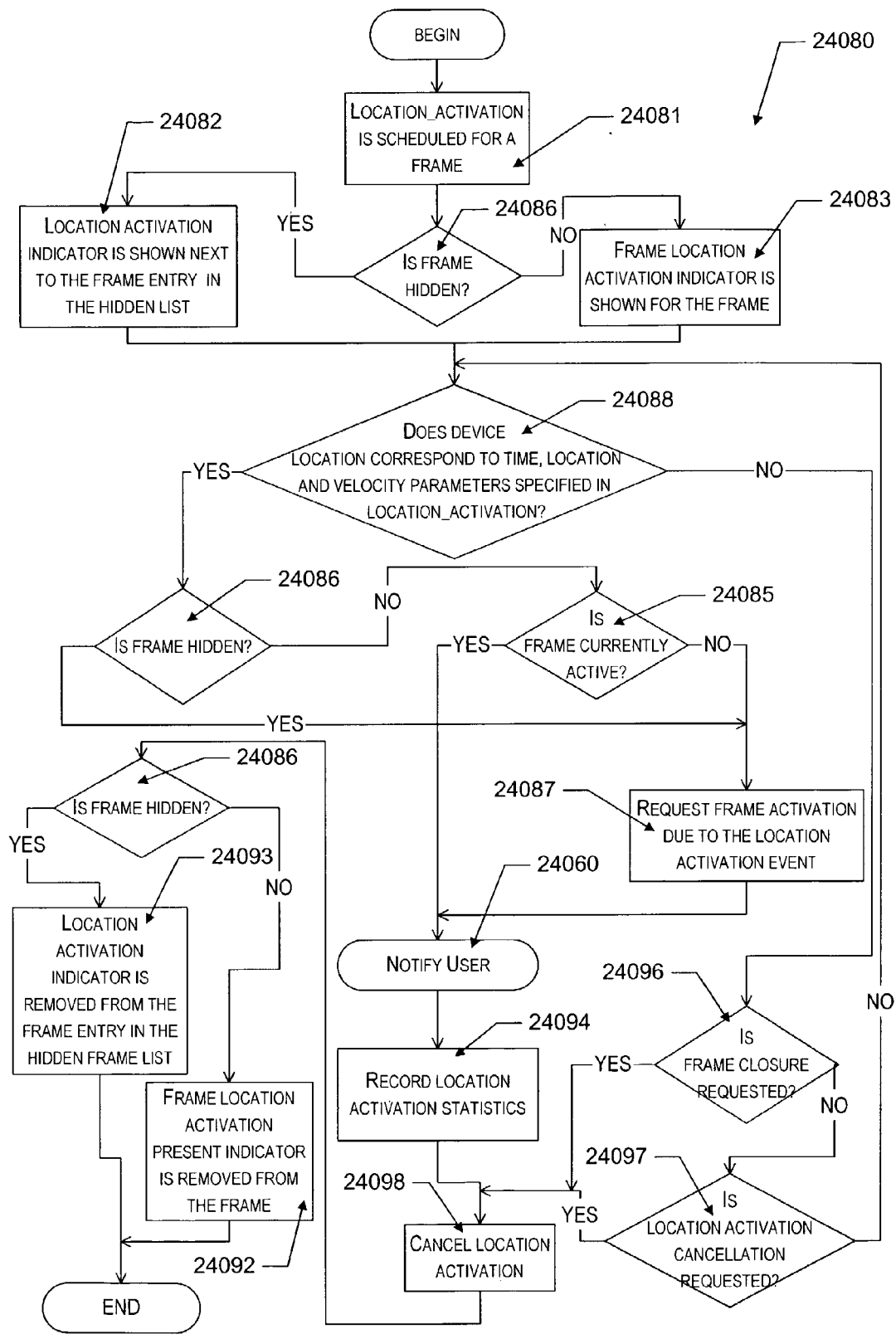

FIG. 33A is a logic flow diagram illustrating frame life cycle 24000. This routine is implemented by the Presentation Logic Engine 1031. Routine 24000 starts from routine 24023 when the frame is opened as a result of any of the frame open algorithms included in the PAT 22 (frame is cloned, pull request, server-initiated content delivery request, etc.). The routine 24023 follows to routine 24004, in which the engine 1031 adds the frame icon to the frame bar and proceeds to the step 24006. In step 24006 the engine 1031 checks the frame settings and priorities, to define if the frame needs to be activated automatically. If the frame should be activated automatically, the "YES" branch is followed to routine 24025, which activates the frame, and then to follows routine 24007. Otherwise, the "NO" branch is followed to routine 24002, which transfers this frame to the idle state. Eventually routine 24002 may follow to routine 24005, which starts whenever user requests frame activation for this frame or timer event requests frame activation, or the frame is implicitly activated as a result of another frame closure or location-driven activation algorithms. Routine 24005 follows to routine 24025.

In routine 24007 the frame is in active state. Routine 24007 follows to routine 24009, in which user interacts with the frame content and may request some actions to be performed with the frame. Whenever such action comes through the routine moves to the step 24015, which checks if the action was related to the frame timer. If the action was related to the frame timer, the "YES" branch is followed to routine 24052, described in FIG. 33D. Routine 24052 follows to the routine 24009. If the action was not related to the frame timer, the "NO" branch is followed to step 24010, in which the Engine 1031 checks if the user requested to close the frame. If the request is to close the frame, the "YES" branch is followed to routine 16011, in which the PAT closes the frame, removes the content from Active Documents 1029, etc.

If in step 24010 the request was not to close the frame, the "NO" branch is followed to step 24027, in which the engine 1031 checks if this is a deactivation request. If the request is to deactivate the frame, the "YES" branch is followed to routine 24024, which deactivates the frame using algorithms described earlier in this specification and follows to routine 24002.

If in step 24027 the action is not a deactivation request, the "NO" branch is followed to step 24008, in which the engine 1031 checks if the action was a request to hide the frame.

If in step 24008 the request made was a hide request, the "YES" branch is followed to routine 24029, described in FIG. 33B. Routine 24029 follows to routine 24034, which checks the exit status of the routine and the last action requested. If the routine exited due to hidden frame activation request, the "YES" branch is followed to routine 24023. If routine 24029 exited as a result of some other last request the "NO" branch is followed to the "END" step.

If the request was not a hide request in step 24008, the "NO" branch is followed to step 24012, which checks if the action was to clone the frame. If the request was not to clone the frame, the "NO" branch is followed to routine 24009 ignoring unrecognized user action.

If the action is a clone request in step 24012, the "YES" branch is followed to routine 24030, which copies the document content. Routine 24030 follows to routine 24031, which copies document user-defined and system data and follows to routine 24032, which creates a new frame based on copied data. Routine 24032 follows to 24033 which opens the newly cloned frame for the user and proceeds to routine 24035 which activates the frame and follows to the frame deactivation routine 24024 because the new frame activation leads to deactivation of the previously active frame.

Routine 16011 is followed by the "END" step, which concludes routine 24000.

FIG. 33B is a logic flow diagram illustrating hidden frames lifecycle 24029. It starts by following to routine 16030 in which the frame is deactivated, added to the hidden list. Routine 16030 follows to routine 24026, which denotes that the frame is in hidden state and that the system enters the idle loop waiting for user actions on this frame. Whenever user issues any actions to the frame, the routine 24017 starts, which means that user requested frame actions in the hidden list of timer or location activation event requested frame activation, and follows to step 24010, in which the engine 1031 checks if the user requested to close the frame. If the user requested to close the hidden frame the "YES" branch is followed to routine 24014, where the frame is removed from the hidden list. Routine 24014 follows to routine 16011, which closes the frame and removes frame data from Active Documents 1029, etc. Routine 16011 is followed by the "END" step.

If in step 24010 the request was not to close the hidden frame, the "NO" branch is followed to step 24019. In step 24019 the Engine 1031 checks if the request is to activate the frame.

If it is not an activation request, the "NO" branch is followed to 24015, which checks if the action is the frame timer-related. If the action is related to the frame timer, the "YES" branch is followed to routine 24052, described in FIG. 33D. Routine 24052 follows to routine 24017 transforming the frame to the idle state.

If the action in step 24015 is not related to the frame timer, the "NO" branch is followed to step 24012, which reports the error to the user and follows to routine 24017.

If in step 24019 the request is for frame activation, the "YES" branch is followed to routine 24014, in which the frame is removed from the hidden list. Routine 24014 follows to routine 24022, which sets the frame properties for automatic activation and follows to the "END" step to continue with routine 24000.

FIG. 33C is a logic flow diagram illustrating frame timer event lifecycle 24050. The routine may be implemented by the Presentation Logic Engine 1031 for each hidden, visible or active frame whenever it has timer scheduled. The routine executes in parallel with other described above lifecycle routines for the frame. Routine 24050 starts by following to routine 24051, which directs the frame in the state when the timer is scheduled. Routine 24051 follows to step 24056 in which the Engine 1031 checks if the frame for which timer is scheduled is hidden. If the frame is hidden, the "YES" branch is followed to routine 24049. Routine 24049 shows scheduled content indicator 6006 next to the frame entry in the hidden list. If the frame is not hidden, the "NO" branch is followed to routine 24053, which shows "frame timer active" indicator in the frame. Routine 24052 and 24053 follow to step 24058, which checks if the frame timer requires immediate activation. If it requires activation, the "YES" branch is followed to routine 24056 described above. If the frame is hidden the "YES" branch is followed to routine 24057, described below. If the frame is not hidden, the "NO" branch is followed to step 24055, which checks if the frame is currently active, i.e. its document content is visible to the user and user can interact with it. If the frame is not currently active, the "NO" branch is followed to routine 24057, which requests frame activation due to the timer event, which as described in FIGS. 33A–B results in frame being removed from the hidden list if it was hidden, frame opened and frame icon being added to the frame bar. Routine 24057 follows to routine 24060 described in FIG. 33E. If in step 24055 frame is currently active, the "YES" branch is followed to routine 24060. Routine 24060 follows to routine 24044, which records/updates timer statistics in the timer configuration, e.g. the number of times the timer was activated in total, etc., and follows to step 24059, which checks if there are more pending events for this timer in this frame (e.g. the timer is recurring and the end date and time is not yet reached, etc.). If there are such events, the "YES" branch is followed to step 24058 to continue timer lifecycle for the frame. If there are no such events, the "NO" branch is followed to routine 24048, which initiates timer cancellation, resets timer associated data and follows to step 24056. If the frame is hidden, the "YES" branch is followed to routine 24043, which removes scheduled content indicator 6006 from the entry in the hidden frame list. If the frame is visible, the "NO" branch is followed to routine 24042, which removes "frame timer active" indicator from the respective frame. Routines 24043, 24042 follow to the "END" step, which concludes routine 24050.

Continuing from step 24058. If the frame does not require immediate activation, the "NO" branch is followed to step 24046, which checks if the frame closure was requested by either user or the system. If the closure was requested, the "YES" branch is followed to routine 24048. If the request was some other than closure, the "NO" branch is followed to step 24047, which checks if the request was to cancel the timer. If the request was not to cancel the timer, the "NO" branch is followed to step 24058, which continues lifecycle execution. If the timer is a cancellation request, the "YES" branch is followed to routine 24048.

FIG. 33D is a logic flow diagram illustrating timer scheduling logic 24052.

Routine 24052 starts by following to step 24071 which checks if the timer scheduling request has been made by the user or the system. If it has been made, the "YES" branch is followed to routine 24074, in which the user sets timer parameters, recurrence, etc. Routine 24074 follows to step 24072, which checks if user requested to cancel timer scheduling. If he/she did so, the "YES" branch is followed to the "END" step exiting timer management logic. If the user did not cancel timer scheduling, the "NO" branch is followed to routine 24074, which schedules or reschedules timer settings. Routine 24074 is followed by the "END" step which concludes routine 24052.

Continuing from step 24071. If the request was other than timer scheduling, the "NO" branch is followed to step 24073. In step 24073 the Engine 1031 checks if the timer cancellation is requested either by the user or by the system. If the cancellation is requested, the "YES" branch is followed to routine 24048, which cancels the timer. If the cancellation is not requested, the "NO" branch is followed to the "END" step. Routine 24048 also follows to the "END" step, which concludes routine 24052.

FIG. 33E is a logic flow diagram illustrating user notification logic routine 24060. The routine starts by reading notification parameters from the PAT 22 user settings for the type of event user should be notified about 24061. Routine 24061 follows to step 24063, which checks if the PAT 22 is currently working in background mode. If the PAT is in background mode, the "YES" branch is followed to step 24067, in which the PAT 22 checks if the event parameters require, and user settings allow, PAT self-activation for this type of event. If self-activation is permitted, the "YES" branch is followed to routine 24064, which brings the PAT to foreground and follows to step 24062. If in step 24067 self-activation is not permitted, the "NO" branch is followed to step 24062.

If the PAT in step 24063 is working in foreground mode, the "NO" branch is followed to step 24062. Routine 24062, executes configured notification algorithm until user interrupts the notification process interacting with the PAT 22 and follows to the "END" step, which concludes the routine 24060.

FIG. 33F is a logic flow diagram illustrating location-driven activation (location_activation) event lifecycle 24080. The routine is implemented by the Presentation Logic Engine 1031 for each hidden, visible or active frame whenever it has location-driven activation scheduled. The routine executes in parallel with other described above lifecycle routines for the frame. Routine 24080 starts by following to routine 24081, which directs the frame in the state when the location-driven frame activation is scheduled. Routine 24081 follows to step 24086 in which the Engine 1031 checks if the frame for which location-driven frame activation is scheduled is hidden. If the frame is hidden, the "YES" branch is followed to routine 24082. Routine 24082 shows location-activation scheduled content indicator next to the frame entry in the hidden list. If the frame is not hidden, the "NO" branch is followed to routine 24083, which shows "location-driven activation timer active" indicator in the frame. Routine 24082 and 24083 follow to step 24088, which checks if the location-driven activation timer requires immediate activation in according to logic described in step 12015 (FIG. 21A). If it requires activation, the "YES" branch is followed to routine 24086 described above. If the frame is hidden the "YES" branch is followed to routine 24087, described below. If the frame is not hidden, the "NO" branch is followed to step 24085, which checks if the frame is currently active, i.e. its document content is visible to the user and user can interact with it. If the frame is not active, the "NO" branch is followed to routine 24087, which requests frame activation due to the location activation event, which results in frame being removed from the hidden list if it was hidden, frame opened and frame icon being added to the frame bar. Routine 24087 follows to routine 24060 described in FIG. 33E. If in step 24085 frame is currently active, the "YES" branch is followed to routine 24060. Routine 24060 follows to routine 24094, which records/updates location activation statistics in the configuration, e.g. the number of times the location was entered, etc., and follows to step 24098, which initiates location-driven activation cancellation, resets location-driven activation timer associated data and follows to step 24086 described above. If the frame is hidden, the "YES" branch is followed to routine 24093, which removes activation-driven scheduled indicator from the entry in the hidden frame list. If the frame is visible, the "NO" branch is followed to routine 24092, which removes "location-driven activation active" indicator from the respective frame. Routines 24093, 24092 follow to the "END" step, which concludes routine 24080.

Continuing from step 24088. If the frame does not require immediate activation, the "NO" branch is followed to step 24096, which checks if the frame closure was requested by either user or the system. If the closure was requested, the "YES" branch is followed to routine 24098 described above. If the request was some other than closure, the "NO" branch is followed to step 24097, which checks if the request was to cancel the location-driven activation. If the request was not to cancel the location-driven activation, the "NO" branch is followed to step 24088, which continues lifecycle execution. If the timer is a cancellation request, the "YES" branch is followed to routine 24098 described above.

Figure 34:
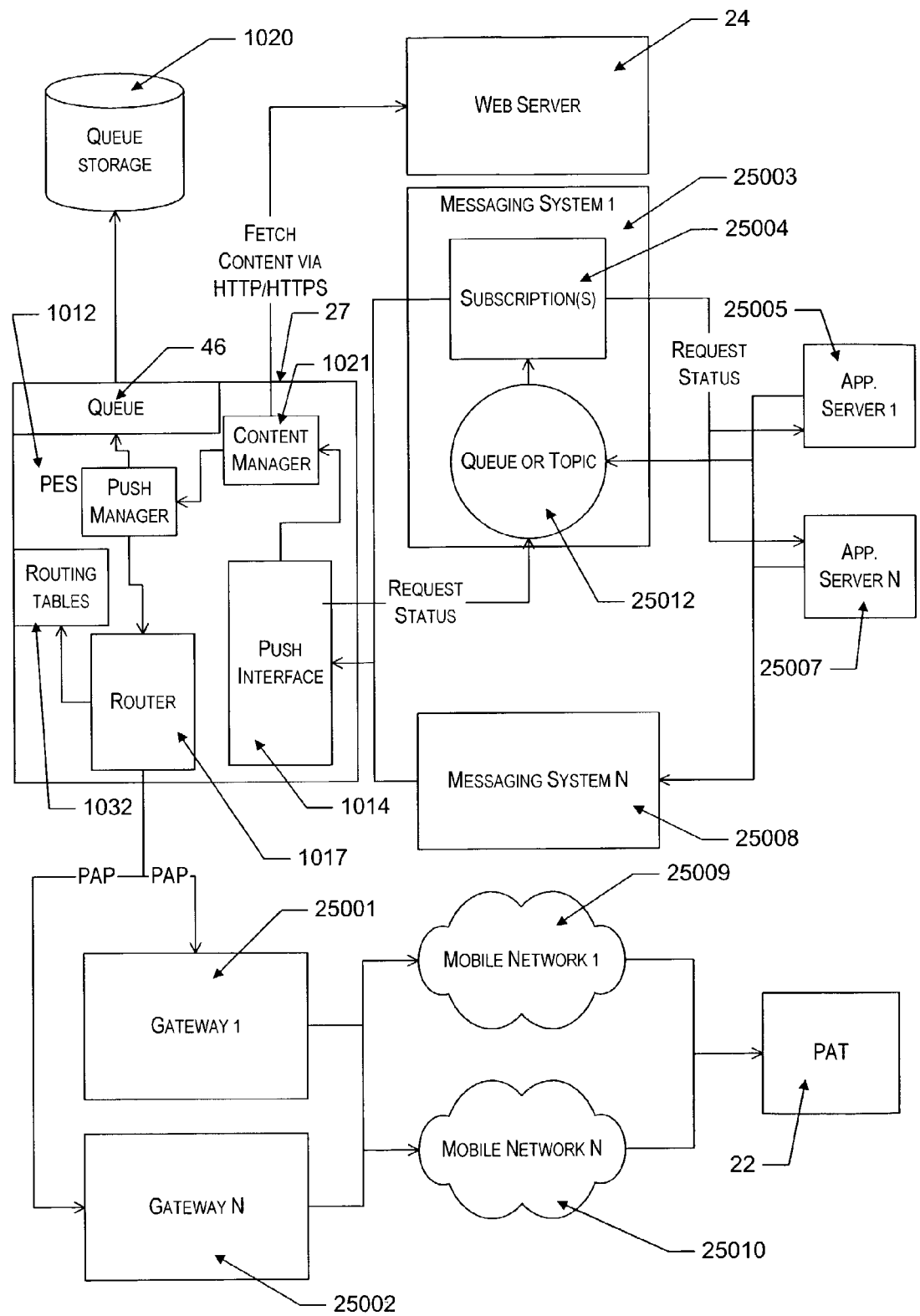
FIG. 34A is a functional block diagram illustrating server initiated content delivery.
FIG. 34B is a functional block diagram illustrating application-specific device presence monitoring.
Figure 34:
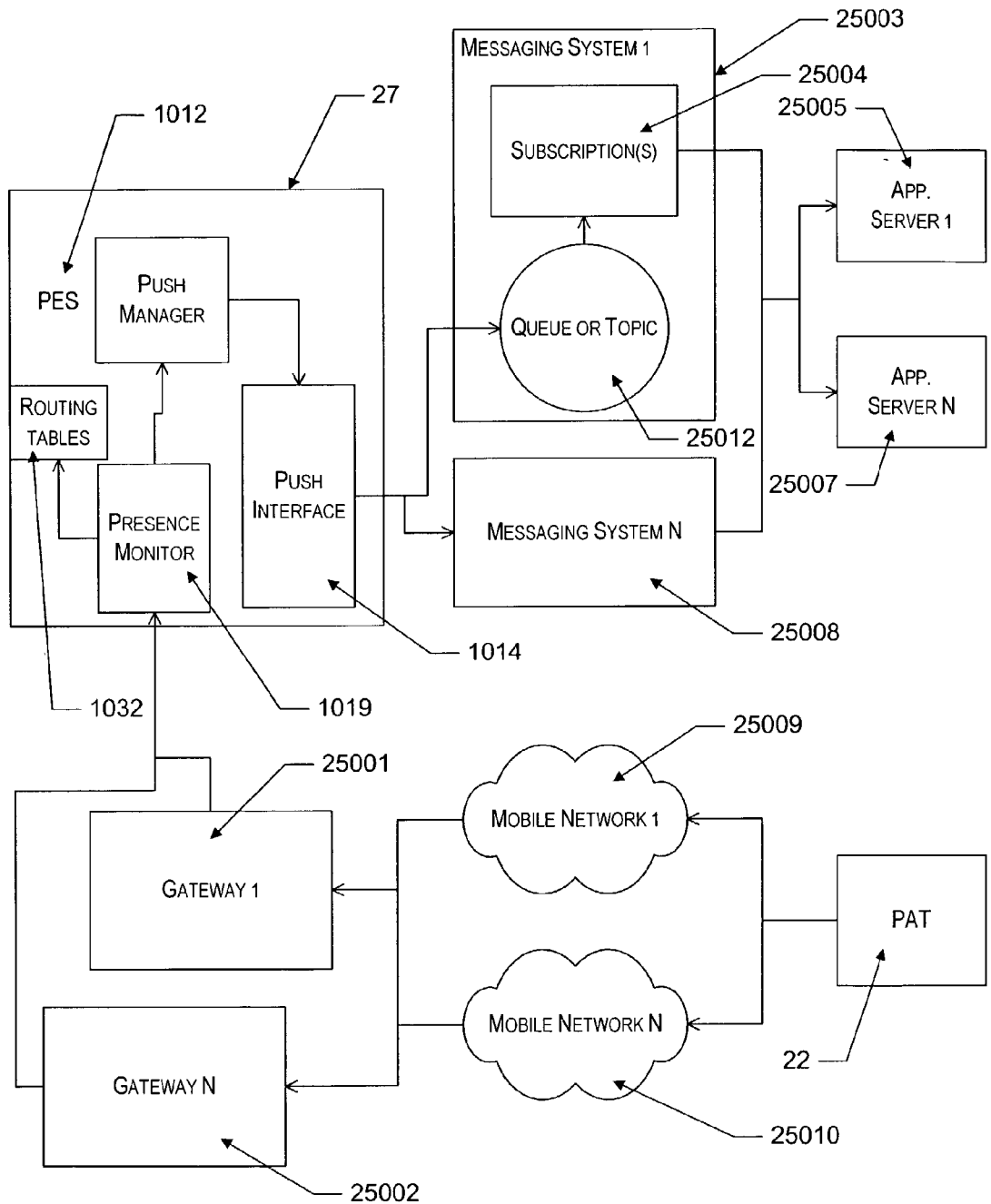

FIG. 34A is a block diagram illustrating the invented server-initiated content delivery process (see also FIG. 35A). The delivery request originates at the application server 25005, 25007, in response to application algorithms, that can be defined by those skilled in art at application design time. The request then follows to Messaging Systems 25003, 25008 to the messaging queue or topic that the application and PES 27 negotiated for content delivery requests. In this architecture the Application Server 25005, 25007 is the publisher of the messages to the messaging topics or queues 25012 and the PES 27 is the subscriber for the messages through message subscription(s) 25004. When the message arrives to the PES 27 it is received by Push Interface 1014, which provides bridging and decoding functions between Messaging System 25003, 25008 and PES 27 components. Once the message is processed the information follows to the Content Manager 1021, which fetches content delivery request data from the Application Servers 25005, 25007 or any other content provider using HTTP requests through Web Server 24 or other applicable means. Upon it receiving the data PES 27, preprocesses and validates it, and saves the content to the Queue 46, which stores the content in Queue storage 1020. In the next step the Content Manager 1021 communicates to the router 1017, which reads information from Routing tables 47, to decide if the device is available and can process server-initiated content delivery. Once the device is available, the content is sent to the PAT 22 through one or more gateways 25001, 25002 and Mobile Networks 25009, 25010. At this point the device receives the content and follows the algorithms described above to present the content to the user. During content delivery queuing and other related delivery processing Push Manager 1012 generates messages with delivery status notifications on each status change and publishes them through the Push Interface 1014 to messaging Queues or Topics 25012 in Messaging System 25003, 25008. Application Server 25005, 25007 can subscribe to the queues and topics through Subscriptions 25004 in order to obtain delivery status notifications if they are required by the application algorithms. Currently the PES 27 generates the messages for the following delivery events:

The content is placed in the queue;

The content is replaced in the queue (older content was suppressed to ensure delivery of the most fresh content only);

The content delivery failed (with attempt number and error code), and delivery attempts will continue until queue for the frame expires;

The content is delivered to the target device;

The content expired (queue for the frame may be reset upon expiration of application-configured timeout);

The details of content delivery algorithms are described in routine 26000.

There are applications with application-specific functionality that is sensitive to device presence in the network. For such applications a method for generating and delivering device status notification messages to the application was invented.

FIG. 34B is a block diagram illustrating the invented application-specific device presence monitoring. The registration/deregistration request originates on the device as a result of routine 17000. It is submitted from the PAT 22 through Mobile Network(s) 25009, 25010 to Gateway(s) 25001, 25002, which will deliver the request to the Presence Monitor 1019 in the PES 27. The Presence Monitor 1019 checks the records according to algorithm 23000, and may communicate with Routing Tables 1032 to obtain device status before the request arrived. If the device status is changed, it will issue device presence update message to the Push Manager 1012, which through the Push Interface 1014 will publish the message to some Messaging System 25008, 25003, to a specific Topic or Queue 25012 the Application Server 25005, 25004 is subscribed to, through Subscription(s) 25004. Then Application Server 25005, 25004 receives the device network presence update message and may execute the application-specific logic. It is understood that the described process is an optional extension, which may be ignored by the applications not sensitive to device network presence.

FIG. 35A is a logic flow diagram illustrating server-initiated content delivery process 26000. Routine 26000 is typically implemented by the PES 27. This diagram is a detail view to the application delivery model process illustrated in FIG. 34. Routine 26001 executes whenever an application server 25005, 25007 submits the content delivery request. The execution follows to routine 26002, in which Messaging System 25008, 25003 dispatches the request to the PES 27. Routine 26002 follows to routine 26003 in which the PES 27 receives the request via the Push Interface 1014. Routine 26003 follows to the step 26050 in which the PES 27 checks if the device is authorized to work with the PES. If the device is authorized, the "YES" branch is followed to routine 26004, which is illustrated in detail in FIG. 35B, in which the content data is loaded and processed by the content manager 1021. Routine 26004 follows to step 26005 in which the content manager 1021 checks if the loading was successful. The definition of the successful loading is when all the data is loaded, and it is of valid content type, etc. If the loading was successful, the "YES" branch is followed to routine 26006, which delivers the content to the client, as illustrated in detail in FIG. 35C. If the loading was not successful, the "NO" branch is followed to the "END" step. In step 26050 if the target device is not authorized with the PES 27, the "NO" branch is followed to routine 26051 in which PES 27 may send notification message to the application, which initiated the content delivery request, through Messaging System 25008, 25003. Routines 26051, 26006 and "NO" branch of step 26005 follow to the "END" step, which concludes routine 26000.

FIG. 35B is a logic flow diagram illustrating content loading routine 26004 of the server-initiated content delivery process 26000. This routine is typically implemented by the content manager 1021 in the PES 27. Routine 26004 starts with routine 26030, in which the content manager 1021 receives request to download certain content for the server-initiated content delivery request. Routine 26030 follows to routine 26031 in which the content manager 1021 loads the content from the URL read from the content delivery request and follows to the step 25033, in which it checks whether loading was successful. If loading was not successful, the "NO" branch is followed to routine 26043, in which the PES 27 sends the delivery failed message to the application server, which initiated content delivery request, through Messaging System 25008, 25003. If loading was successful, the "YES" branch is followed to the step 25035, in which the server checks if the content is of supported type. Here supported type is the type, which can be transformed by the gateway 23 to the type understood by the PAT 22. The algorithms used for transformation are implementation specific and is not a subject of this specification. If the content type is not supported, the "NO" branch is followed to the routine 26043. If the content type is supported, the "YES" branch is followed to step 26032, in which the PES 27 checks if the content does require transformation before actual delivery to the PAT 22. The exact nature of the transformation may vary; some examples of the possible transformations include WML content compilation to binary format, HTML conversion, GIF to WBMP conversion, SVG compilation/transformation, etc. If the transformation is required, the "YES" branch is followed to routine 26034, which runs the algorithms to transform the content and follows to the step 26046, which checks if the transformation was successful. If it was not successful, the "NO" branch is followed to routine 26043. If the transformation was successful, the "YES" branch is followed to the step 26036. If in step 26032 the transformation is not required, the "NO" branch is followed to the step 26036. In step 26036 the PES 27 checks if the requested content is of the document content type, which means that the document is a candidate for active documents 1029 in the PAT 22. An example of such content type is WML WAP document. The current invention does not limit the exact document structure and specific formats may be defined individually by each embodiment (e.g. WML, HTML, XHTML, SVG, VoiceXML, etc.). If the document is of document content type, the "YES" branch is followed to routine 26039, in which the PES 22 parses the contents of the document and follows to the step 26038. In step 26038 the PES 27 checks if the document is valid. The validity criterion for is defined by the specifications for the document format used by particular implementation (e.g. WAP WML Specification), the document is also considered invalid if the parsing process in routine 26039 could not complete the request or ended abruptly. If the document is not valid, the "NO" branch is followed to the routine 26043. If the document is valid, the "YES" branch is followed to the step 26042, in which the PES 22 checks if the document has target frame name defined. The algorithm of defining the frame name for the document is illustrated in routine 12000. It is understood that different document structure may define other similar algorithms to define frame name. If the frame name is specified in the document, the "YES" branch is followed to step 26040, in which the PES 27 checks in the Queue 46 if there are other content delivery requests queued for the same frame for the same device. If there are such requests, the "YES" branch is followed to routine 26045, in which the PES 27 removes all presently undelivered requests for the same frame from the queue and follows to the routine 26047, which sends "content replaced" message to the application through Messaging System 1007 for each removed request. Routine 26047 follows to routine 26046, which sends content queued message to the Application Server 25 through Messaging System 1007 and follows to routine 26044. Routine 26044, which saves the request to the queue 46. If in step 26042 the frame name is not specified, the "NO" branch is followed to routine 26046. If in step 26040, there are no requests for the same device, for the same frame in the queue, the "NO" branch is followed to the routine 26046.

Continuing from the step 26036. If the content is not of the document content type (e.g. image data), the "NO" branch is followed to routine 26037, in which the PES 27 performs validation of the data based on its content type and follows to the step 26041. If the content in step 26041 is valid, the "YES" branch is followed to the routine 26044. If the content is not valid, the "NO" branch is followed to routine 26043.

Routines 26044 and 26043 are followed by the "END" step, which concludes routine 26004.

FIG. 35C is a logic flow diagram illustrating content delivery routine 26006 of the server-initiated content delivery process 26000. Routine 26006 starts by following to the step 26007, which checks if the target device is presently available for receiving push messages. If the device is not available, the "NO" branch is followed to the "END" step. If the device is available the "YES" branch is followed to step 26008, in which the device is checked to be busy. The device is considered busy if the number of concurrent requests currently being processed with the device exceeds configured maximum number. If the device is busy, the "YES" branch is followed to the "END" step. If the device is not busy, the "NO" branch is followed to the step 26021, in which the PES 27 checks if there are unprocessed queued content delivery requests for the device. If there are no requests in the queue, the "NO" branch is followed to the "END" step.

If there are unprocessed queued requests, the "YES" branch is followed to routine 26047, where the PES 27 loads the first content delivery request pending for the device from the Queue 46. Queue 46 regularly performs expiration checks to ensure that expired content is removed from the queue and that applications are notified of content expiration timely. However, since such checks are performed periodically with certain interval between subsequent checks, the subject content delivery request may have already expired but not yet removed from the Queue 46. For that reason the following step may be necessary. Routine 26047 follows to step 26023 which checks if the content has expired. If the content has expired, the "YES" branch is followed to routine 26018, in which the PES 27 removes the delivery request from the queue 46 and follows to routine 26024, which sends "content expired" message to the Application Server 25. It is understood that the particular data sent to application server in the confirmation may vary, and, generally, may contain the device identifier, success/failure status flag, etc. Routine 26024 follows to step 26021 to continue processing requests.

Continuing from the step 26023. If the content has not yet expired, the "NO" branch is followed to routine 26009, where the Router 1017 resolves device route (e.g. by device identifier), which contains information about gateway(s) and address(es). Router 1017 uses Routing Tables 47 as well as Mobile Network 50 and Gateway 23 configuration information for resolving current device route. Router resolving enables transparent server-initiated content delivery across multiple Mobile Networks 50, including support for automatic cross-network device roaming. When the route is resolved it follows to routine 26048, where Push Manager 1012 compiles PAP (or other applicable format) message and proceeds to routine 26010, in which the message is submitted to the Gateway 23 as identified by device route, and follows to routine 26011. In routine 26011, the Gateway 23 attempts to deliver the content to the device using negotiated network protocol. Routine 26011 then follows to step 26012, where the delivery status to/from the Gateway 23 is checked by the PES 27. If the delivery is successful, the "YES" branch is followed to routine 26018, in which the PES 27 removes the delivery request from the queue 46 and follows to routine 26019, which may send confirmation message to the Application Server 25 confirming that delivery was successful. Routine 26019 follows to routine 26020 which updates device status and statistics. Routine 26020 follows to step 26021 to continue request processing.

Continuing from the step 26012. If the delivery was not successful, the "NO" branch is followed to routine 26014, in which the PES 27 updates status and statistics and follows to the step 26015, in which server checks if the number of attempts to deliver the request has reached maximum number (which can be either adjustable or fixed and is implementation-dependent). If the number of attempts is less than maximum, the "NO" branch is followed to the routine 26049, which may send the delivery failed message containing the attempt number to the Application Server 25 using Messaging System 1007. The routine follows to routine 26022, which waits for a delay, increases attempt counter and follows to the step 26021 to continue request processing. If in step 26015, the number of attempts has reached configured maximum number, the "YES" branch is followed to the routine 26016, which marks the device as unavailable by updating Routing Tables 47 through Router 1017, and follows to routine 26017, which may send error notification to the Application Server 25.

Routine 26017, steps 26021, 26007 ("NO" branches), 26008 ("YES" branch) are followed by the "END" step, which concludes routine 26006.

One of the major challenges in mobile networks is restricted bandwidth. Using "push into cache" algorithm may solve the challenge with predictable navigation, but might not be useful when the document presentation and data dynamically change between submissions. The invented methods of combining asynchronous submissions with server content delivery requests to client, help to overcome the challenge. There is also a concept of reverse data post invented to address the challenge in frequently reloaded dynamic pages. The reverse post method enables to compile dynamic document on the client using the document parameterized with variables or other applicable parameterization method and reverse submission from the application. The reverse submission contains post parameters with values for the document variables. Another important feature of the reverse post algorithm, described in routine 27000, is ability to fill documents with data, do incremental upgrades and initialization of any WAP, HTML, or other applicable documents with user-defined or application-defined variables. This allows to easily convert any document into a template for a separate application or integrate it as a part of other proactive system just by issuing reverse post with values for system and other variables along with the document content delivery with pull or push request. This initialization method works for both system and custom variables, so such properties as ability to submit content asynchronously, custom frame icons, onread notifications, user alerts, etc. can be managed and customized without any changes to the existing documents (e.g. delivering http://wap.yahoo.com page to the user with high-level notification in a separate frame that is just a matter of sending reverse post with values for two system variables: "frame-type" and "frame-name").

Figure 36:
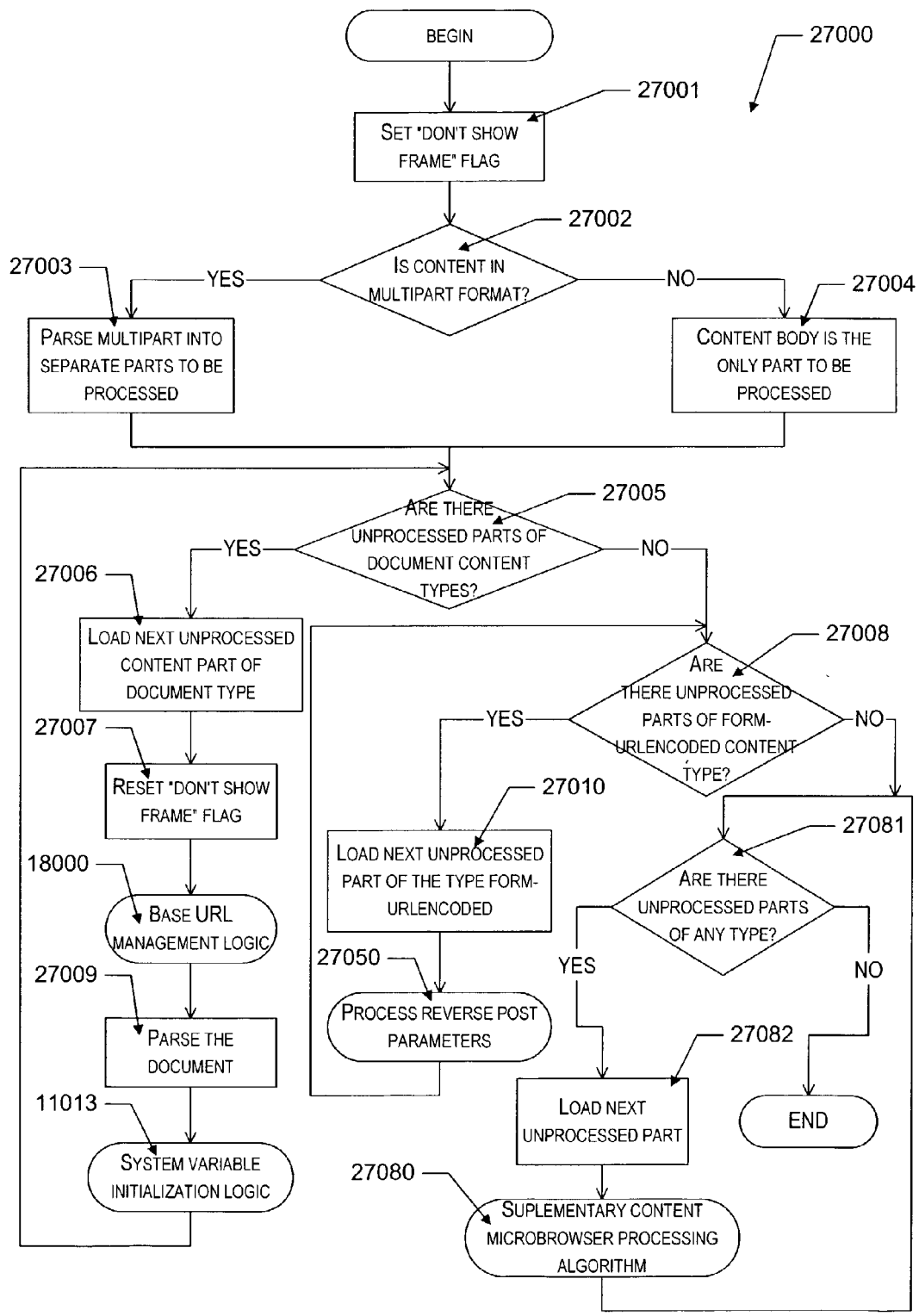
FIG. 36A is a logic flow diagram illustrating algorithm of the PAT for processing of the Pull and Push based content.
FIG. 36B is a logic flow diagram illustrating supplementary content processing logic algorithm.
FIG. 36C is a logic flow diagram illustrating initialization of context variables from reverse post parameters.
FIG. 36D is a logic flow diagram illustrating reverse post parameters processing logic.
Figure 36:
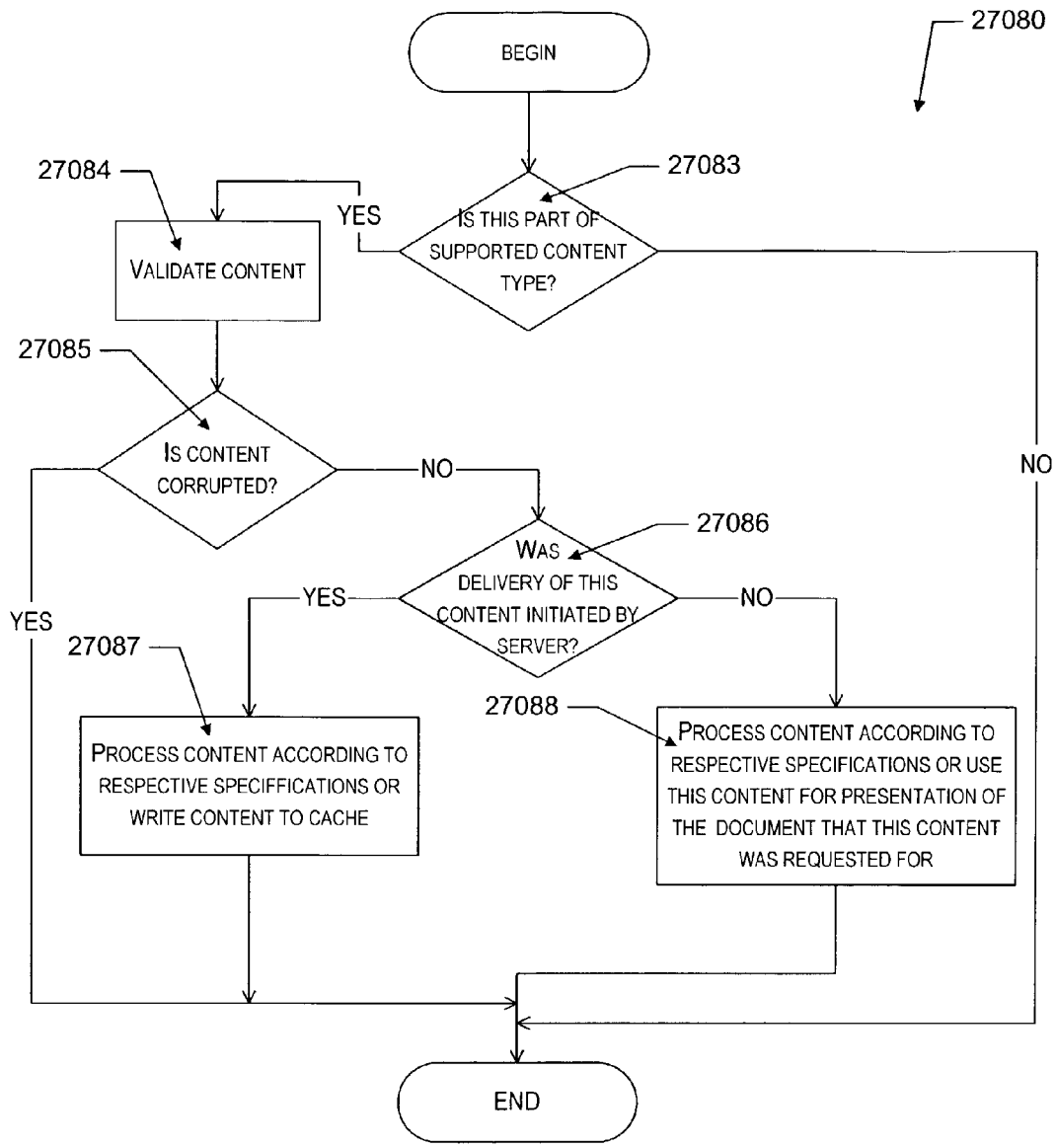
Figure 36:
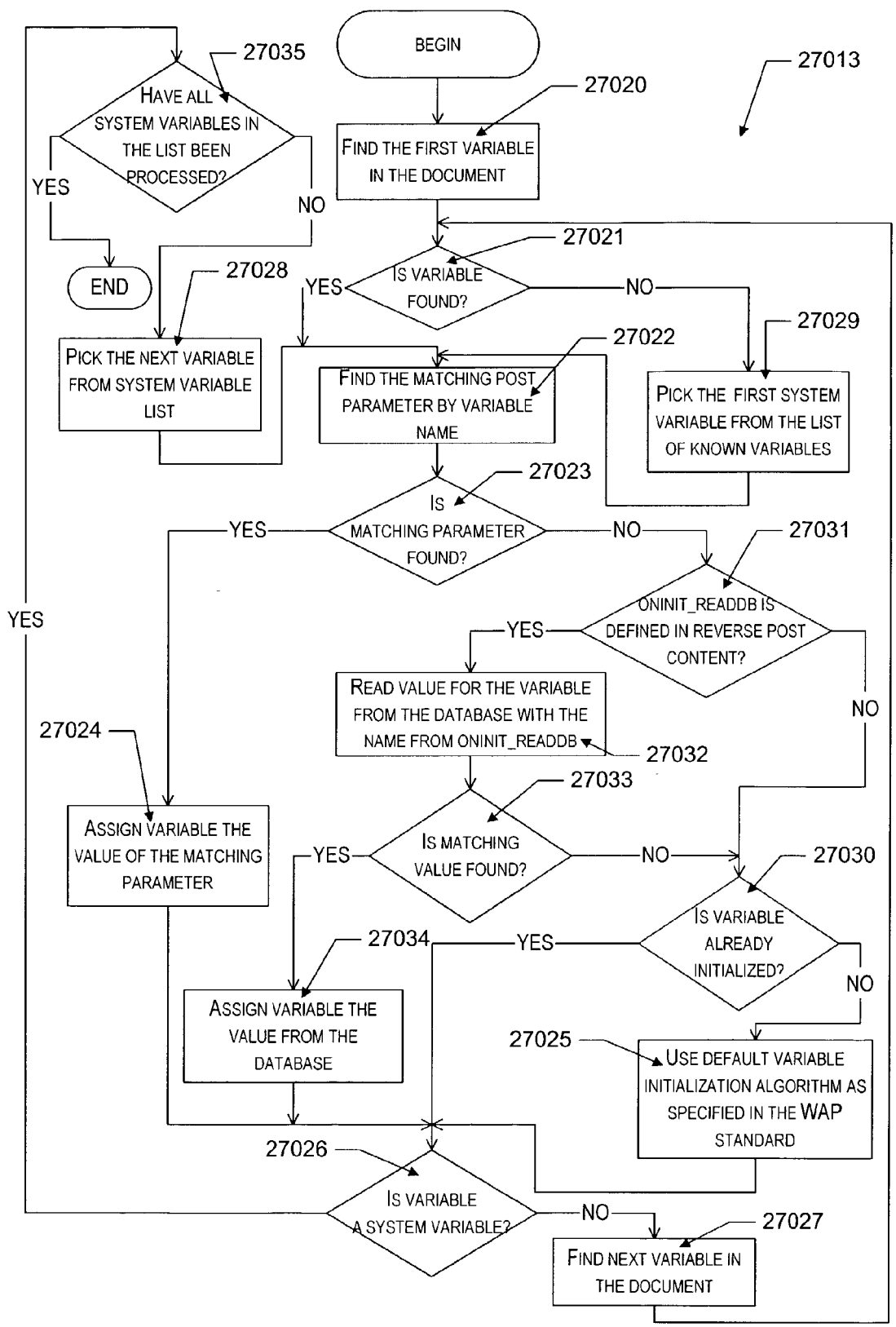
Figure 36:
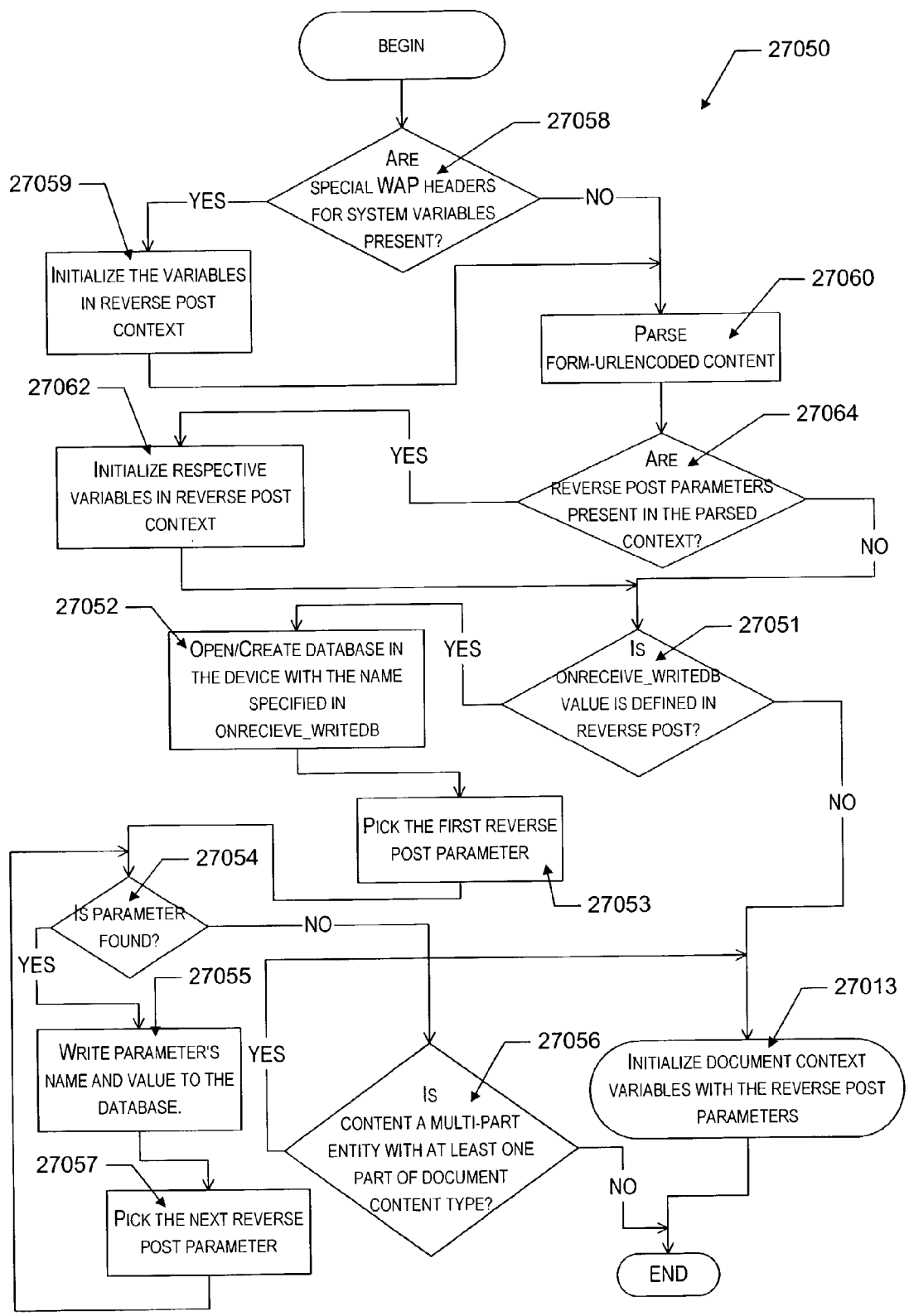

FIG. 36A is a logic flow diagram illustrating pull and push logic processing algorithm 27000. Routine 27000 is typically implemented by the Transaction Manager 1034 in the PAT 22. Routine 27000 starts with routine 27001, which sets "don't show frame" special algorithm flag which is used further in this and other related routines. Routine 27001 follows to step 27002, which checks if the document content is in multipart format. If the document is in multipart format, the "YES" branch is followed to routine 27003. Routine 27003 parses the multipart content and breaks it into parts to be processed separately. If in step 27002 the content is not in multipart format, the "NO" branch is followed to routine 27004. Routine 27004 files the content body as the only part for processing further in this algorithm. Routines 27003 and 27004 follow to the step 27005.

Step 27005 checks if there are unprocessed parts of document content types, i.e. parts that may be presented in frames as documents. Examples include WML, VoiceXML, HTML, SVG, etc. If there are such parts, the "YES" branch is followed to routine 27006, which loads next unprocessed part of document content type for processing. Routine 27006 follows to routine 27007, which resets "don't show frame flag" value, denoting that the content should be presented to the user. Routine 27007 follows to routine 18000, which resolves base URL for the document and follows to routine 27009. Routine 27009 parses the document using standard parsing algorithms for the specific document content type and follows to routine 11013, which uses parsed document data to initialize document context system variables with the values supplied by the application developer. Routine 11013 follows to step 27005 to continue content processing.

If in step 27005 there are no more unprocessed parts of document content type, the "NO" branch is followed to step 27008. Step 27008 checks if there are parts of form-urlencoded (or other applicable) content type, which is used in the PAT 22 for delivery of reverse post data. If there are such parts, the "YES" branch is followed to routine 27010. Routine 27010 loads next part of form-urlencoded content type for processing and follows to routine 27050, which processes the part content with reverse post processing algorithm described in FIG. 36D. When finished, routine 27050 follows to step 27008 to check if there are more parts of this content type to be processed.

If in step 27008, there are no unprocessed parts with form-urlencoded content type, the "NO" branch is followed to step 27081. Step 27081 checks if there are unprocessed part of any type other than document or form-urlencoded, both of which are processed earlier in this algorithm. If there are no such parts, this means that all content parts are processed, the "NO" branch is followed to the "END" step, which concludes the routine.

If there are unprocessed parts with any other content type in step 27081, the "YES" branch is followed to routine 27082 which loads the next unprocessed part data for processing and follows to routine 27080, which applies content-specific processing to the supplementary content data. Routine 27080 is described in detail in FIG. 36B.

FIG. 36B is a logic flow diagram illustrating supplementary content browser processing algorithm. The supplementary content for the browser can be any content that is not of document content format and is not reverse post data. Such data may include images, sounds, various clips, system entities, such as WAP Service Indication (SI), etc. Routine 27080 starts by following to step 27083 in which the Presentation Logic Engine 1031 checks if the content is of supported type, i.e. the type for which the PAT 22 has an associated processing algorithm. If the content is not of supported type, the "NO" branch is followed to the "END" step ignoring the content (unless there are binary bulk processing algorithms available, such as download, etc.). If the content is of supported content type, the "YES" branch is followed to routine 27084, which validates the content using specific standard or custom validation algorithms for this content type. Routine 27084 follows to step 27085, which checks if the content is corrupted, which means that the validation failed to complete properly. If the content is corrupted, the "YES" branch is followed to the "END" step ignoring the content. If the content is valid, the "NO" branch is followed to step 27086. Step 27086 checks if the content delivery was server-initiated, i.e. arrived from the server with a push message. If the content was obtained as a part of server delivery process, the "YES" branch is followed to routine 27087, which processes the content in according to respective specifications (for example parses WAP Service Indication (SI), extracts directives, and makes request to obtain the content with pull method, etc.) or writes content to PAT Cache 1026 unless caching is prohibited by the application developer. Routine 27087 follows to the "END" step. If in step 27086 the content was delivered to the PAT 22 with client-initiated request, the "NO" branch is followed to routine 27088. Routine 27088 processes the content is according to respective specifications or uses this content for presentation in the document(s) where it was requested from (for example, show image in the document, play sound, etc.).

Routine 27088 follows to the "END" step which concludes routine 27080.

FIG. 36C is a logic flow diagram illustrating document context variables initialization from reverse post parameters 27013. Routine 27013 is implemented as a part of routine 27050. The document initialization is a process that sets values of variables, that parameterize the document handling logic in PAT 22. The routine starts with routine 27020, which looks up the first unprocessed variable definition in the document content and proceeds to step 27021, which checks if the subject variable was found. If the variable was not found, the "NO" branch is followed to the routine 27029, which starts the cycle to initialize all known system variables. Routine 27029 picks the first system variable from the list of known system variables and follows to routine 27022 described below.

If the variable was found in step 27021, the "YES" branch is followed to routine 27022, in which parsed post form-urlencoded data is searched for the post parameter for this variable (parameter-variable association can be done by them sharing the name) and follows to step 27023. In step 27023 the Transaction Manager 1034 checks if the parameter for variable initial value was found in the post data. If the parameter was found, the "YES" branch is followed to routine 27024, in which the Transaction Manager 1034 assigns the value of the found parameter to the variable in the document. The routine then follows to the step 27026 described below.

If the parameter in step 27023 was not found, the "NO" branch is followed to the step 27031, which checks if the reverse post data defines oninit_readdb system variable value as described in routine 11000. If the value of the variable is not defined, the "NO" branch is followed to step 27030, in which the engine 1031 checks if the variable was already initialized. If the variable was not initialized, the "NO" branch is followed to routine 27025, which uses the default variable initialization algorithm as specified in WAP standard, or other applicable and follows to step 27026. If the variable was already initialized in step 27030, e.g. by another reverse post submission or as a result of user interaction with the document, etc., the "YES" branch is followed to step 27026.

Continuing from step 27031. If the value of the system variable oninit readdb is defined the PAT 22 attempts to read values from the database to set values for the variables, and "YES" branch is followed to routine 27032. In routine 27032 the Engine 1031 locates and opens the database on the device by name from oninit_readdb system variable, and retrieves the value stored by variable name entry. It then follows to step 27033, in which the engine 1031 checks if the matching value was found and validates it. If the value was found and is valid, the "YES" branch is followed to routine 27034, which assigns this value to the variable in the document. If the values was not found or is not valid in step 27033, the "NO" branch is followed to step 27030 to perform default initialization if any.

Continuing from step 27026. In step 27026 the engine checks if the last processed variable is a system variable. If the variable is system, the "YES" branch is followed to step 27035, which checks if all system variables have been processed. If the end of the list is reached, the "YES" branch is followed to the "END" step, which concludes the routine 27013. If there are more system variables to process, the "NO" branch is followed to routine 27028, which picks up the next unprocessed system variable and follows to routine 27022, described above.

If in step 27026 the variable is from the document context, the "NO" branch is followed to routine 27027, which finds next unprocessed variable in the browser context and follows to step 27021.

FIG. 36D is a logic flow diagram illustrating reverse post parameters processing routine 27050. Routine 27050 is implemented as a part of routine 27000. The routine starts by following to step 27058, which checks if the special protocol headers (or other applicable elements) for system variables known to the PAT 22 are defined in the content. If there are such headers, the "YES" branch is followed to routine 27059, which initializes respective variables in the reverse post context, which is a temporary storage for variable values before they are applied to the document context or further processed. Routine 27059 follows to routine 27060. If there are no special headers defined in step 27058, the "NO" branch is followed to routine 27060, which parses form-urlencoded reverse post content and follows to step 27064. Step 27064 checks if there are reverse post parameters for system variable initialization present in the parsed content. If there are such parameters, the "YES" branch is followed to routine 27062, which initializes all respective system variables with the values read from the reverse post parameters. Routine 27062 follows to step 27051. If in step 27064 there are no parameters for system variables, the "NO" branch is followed to step 27051, in which the value of onreceive_writedb system variable is checked to be defined according to routine 11000 in reverse post data or headers. If the value is not defined, the "NO" branch is followed to routine 27013 described in FIG. 36B.

If the value is defined and valid, the "YES" branch is followed to routine 27052, which opens and if required creates the database on the device with the name read from this system variable and follows to routine 27053, which picks the first reverse post parameter. Routine 27053 follows to step 27054, in which the Engine 1031 checks if the valid parameter is found. If the valid parameter is found, the "YES" branch is followed to routine 27055, which creates/updates database entry with the name taken from parameter name and value from reverse post parameter value. Routine 27055 follows to routine 27057, which picks the next parameter from the reverse post and follows to step 27054. If in step 27054 there are no more parameters left, the "NO" branch is followed to routine 27056, which checks if the document content received multipart content with at least one part of document content type. If the condition is true, the "YES" branch is followed to routine 27013, which applies reverse post parameters to the respective document context. If the condition is false in step 27056, the "NO" branch is followed to the "END" step. Routine 27013 is also followed by the "END" step, which concludes the routine 27050.

In view of the foregoing, it will be appreciated that present invention greatly improves web-based browser functionality and the infrastructure for implementing wireless web-based application services. It should be understood that the foregoing relates only to the exemplary embodiments of the present invention, and that numerous changes may be made therein without departing from the spirit and scope of the invention as defined by the following claims.

The invention claimed is:

1. A computer implemented method for operating a browser comprising the steps of:
   displaying a plurality icons, each icon corresponding to a network-based site;
   receiving a first command selecting a first icon and, in response, linking to a first site and displaying a first frame in an active mode for user interaction with the first site, the first frame having a state comprising visible and operational characteristics associated with the first frame;
   while the first frame is in the active mode, receiving interaction commands in association with the first frame and altering the state of the first frame in response to the interaction commands;
   receiving a command selecting a second icon and, in response, linking to a second site, deactivating the first frame from the active mode, and displaying a second frame in the active mode for user interaction with the second site, the second frame having a state comprising visible and operational characteristics associated with the second frame;
   while the second frame is in the active mode, maintaining the first frame in a background mode which preserves the altered state of the first frame, and receiving interaction commands in association with the second frame and altering the state of the second frame in response to the interaction commands;
   receiving a second command selecting the first icon and, in response, linking to the first site and displaying the first frame in the active mode and in its altered state for user interaction with the first site; and
   while the first frame is in the active mode, maintaining the second frame in a background mode which preserves the altered state of the second frame.

2. The method of claim 1, further comprising the steps of wherein:
   maintaining the frames and icons on a proactive application terminal; and
   configuring a network-based proactive application is configured to identify a particular frame maintained on the proactive application terminal and to remotely interact with that frame.

3. The method of claim 2, further comprising the step of configuring the proactive application to initiate the interaction with the frame maintained on the proactive application terminal.

4. The method of claim 2, further comprising the step of configuring the proactive application to initiate an interaction with a background frame maintained on the proactive application terminal without interfering with the user's interaction with an active frame on the proactive application terminal.

5. The method of claim 1, further comprising the steps of:
   obtaining a content specific image associated with the first site;
   displaying the content specific image in connection with the first icon;
   obtaining a content specific image associated with the second site;
   displaying the content specific image in connection with the second icon.

6. The method of claim 5, further comprising the steps of:
   displaying the content specific image associated with the first site in connection with the first site; and
   displaying the content specific image associated with the second site in connection with the second site.

7. The method of claim 6, further comprising the step of:
   specifying the content specific image associated with the first site in a metatag associated with the first site; and
   specifying the content specific image associated with the second site is specified in a metatag associated with the second site.

8. The method of claim 6, further comprising the step of:
   displaying the content specific image associated with the first site in connection with an application server associated with the first site; and
   displaying the content specific image associated with the second site in connection with an application server associated with the second site.

9. The method of claim 5, further comprising the step of:
   creating the content specific image associated with the first site to conform to attributes associated with the first site; and
   creating the content specific image associated with the second site to conform to attributes associated with the second site.

10. The method of claim 9, further comprising the step of:
    associating the content specific image with a routing name assigned to the first site; and
    associating the content specific image with on a routing name assigned to the first site.

11. The method of claim 1, further comprising the steps of:
    receiving information associated with a frame in the background mode; and
    in response to the information, altering the state of the frame while it is in the background mode.

12. The method of claim 1, further comprising the steps of:
    altering the appearance of the icon associated with the background frame to indicate that its state has changed while the frame is in the background mode.

13. The method of claim 1, further comprising the steps of:
    receiving a message; and
    initiating a background frame associated with the message.

14. The method of claim 1, further comprising the steps of:
    receiving a message; and
    initiating an active frame associated with the message.

15. The method of claim 1, further comprising the steps of:
    initiating a data download into a first frame;
    maintaining the first frame as a background frame during the data download; and
    navigating to a second frame as the active while the data download takes place.

16. A unitary or distributed computer storage medium comprising computer-executable instructions for performing the method of claim 1.

17. A unitary or distributed computer storage medium comprising computer-executable instructions for performing the method of claim 5.

18. A computer system configured to perform the method of claim 1.

19. A computer system configured to perform the method of claim 5.

20. A computer system configured to perform the method of claim 11.

* * * * *